US012009712B2

(12) United States Patent
Mawatari et al.

(10) Patent No.: US 12,009,712 B2
(45) Date of Patent: Jun. 11, 2024

(54) ROTATING ELECTRIC MACHINE

(71) Applicant: DENSO CORPORATION, Kariya (JP)

(72) Inventors: Yuuki Mawatari, Kariya (JP); Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 325 days.

(21) Appl. No.: 17/578,243

(22) Filed: Jan. 18, 2022

(65) Prior Publication Data

US 2022/0140715 A1 May 5, 2022

Related U.S. Application Data

(63) Continuation of application No. PCT/JP2020/027743, filed on Jul. 16, 2020.

(30) Foreign Application Priority Data

Jul. 17, 2019 (JP) ................................ 2019-132307

(51) Int. Cl.

*H02K 21/22* (2006.01)
*H02K 3/28* (2006.01)
*H02K 3/47* (2006.01)
*H02K 15/02* (2006.01)

(52) U.S. Cl.

CPC ............... *H02K 21/22* (2013.01); *H02K 3/28* (2013.01); *H02K 3/47* (2013.01); *H02K 15/02* (2013.01)

(58) Field of Classification Search

CPC ............ H02K 3/28; H02K 3/47; H02K 15/02; H02K 21/22

See application file for complete search history.

(56) References Cited

U.S. PATENT DOCUMENTS 8,258,669 B2 * 9/2012 Shikata .................... H02K 1/16 310/216.069
2013/0076188 A1 * 3/2013 Ikeda ....................... H02K 3/28 310/195
2015/0372551 A1 * 12/2015 Hashimoto ............. H02K 3/50 310/71
2017/0288517 A1 * 10/2017 Ikeno ..................... H02K 21/16

FOREIGN PATENT DOCUMENTS

JP S57-21243 U 2/1982

* cited by examiner

*Primary Examiner* — Jue Zhang
(74) *Attorney, Agent, or Firm* — Oliff PLC

(57) ABSTRACT

A rotating electric machine includes an armature coil having a plurality of phase windings for respective phases. Each of the phase windings is constituted of a plurality of partial windings each having a pair of intermediate conductor portions and a pair of bridging portions connecting the pair of intermediate conductor portions. All the intermediate conductor portions of the partial windings are arranged in a predetermined sequence in a circumferential direction. At each of coil ends of the armature coil, the bridging portions of the partial windings of different phases intersect one another. Each of the partial windings has a mounting member provided integrally therewith for mounting it to a support member. For each circumferentially-adjacent pair of the partial windings whose bridging portions intersect one another, the mounting members provided respectively integrally with the pair of the partial windings are together fixed to the support member by a common fixing member.

14 Claims, 99 Drawing Sheets

ROTATING ELECTRIC MACHINE

CROSS-REFERENCE TO RELATED APPLICATIONS

The present application is a continuation application of International Application No. PCT/JP2020/027743 filed on Jul. 16, 2020, which is based on and claims priority from Japanese Patent Application No. 2019-132307 filed on Jul. 17, 2019. The entire contents of these applications are incorporated by reference into the present application.

BACKGROUND

1 Technical Field

The present disclosure relates to rotating electric machines.

2 Description of Related Art

There are known rotating electric machines which include a field system and an armature. The field system includes a magnet section having a plurality of magnetic poles whose polarities alternate in a circumferential direction. The armature includes a multi-phase armature coil. Moreover, there is also known a technique of forming the armature into a cylindrical overall shape by winding the armature coil between positioning protrusions formed on a bobbin (see, for example, Japanese Utility Model Application Publication No. JPS5721243U).

SUMMARY

However, since the armature described in the above document has the configuration where the armature coil is directly wound on an armature core, problems may occur such as increase in the size of a manufacturing device (e.g., a flyer or the like) employed for the winding process. It is considered that in, for example, armatures with a so-called toothless structure having no teeth, in other words, armatures with a structure where the armature coil is not wound on teeth, there is room for technical improvement regarding the assembly of the armature coil.

The present disclosure has been accomplished in view of the above circumstances. It is, therefore, an object of the present disclosure to provide a rotating electric machine capable of easily realizing the assembly of an armature coil.

A plurality of embodiments disclosed in this specification employ technical solutions different from each other to achieve respective objects. Objects, features and advantageous effects disclosed in this specification will become more apparent from the following detailed explanation with reference to the accompanying drawings.

According to a first solution of the present disclosure to the above-described problem, there is provided a rotating electric machine comprising:

- a field system having a plurality of magnetic poles whose polarities alternate in a circumferential direction;
- a multi-phase armature coil radially opposed to the field system, the armature coil including a plurality of phase windings provided respectively for a plurality of phases, each of the phase windings being constituted of a plurality of partial windings; and
- a support member provided on a radially opposite side of the armature coil to the field system to support the partial windings, wherein

- each of the partial windings has a pair of intermediate conductor portions and a pair of bridging portions, the pair of intermediate conductor portions each extending in an axial direction and being located at a predetermined interval in the circumferential direction, the pair of bridging portions being located respectively on opposite axial sides of the pair of intermediate conductor portions to connect the pair of intermediate conductor portions,
- each of the partial windings is formed of an electrical conductor wire that is multiply wound in the pair of intermediate conductor portions and the pair of bridging portions,
- in each of the partial windings, there is interposed, between the pair of intermediate conductor portions of the partial winding, one of the pair of intermediate conductor portions of another of the partial windings which is of a different phase from the partial winding,
- all the intermediate conductor portions of the partial windings constituting the phase windings of the armature coil are arranged in a predetermined sequence and in alignment with each other in the circumferential direction,
- the armature coil has a pair of coil ends located respectively on opposite axial sides of the support member,
- at either or both of the coil ends of the armature coil, the bridging portions of the partial windings of different phases intersect one another,
- each of the partial windings has a mounting member provided integrally therewith for mounting the partial winding to the support member, and
- for each circumferentially-adjacent pair of the partial windings whose bridging portions intersect one another, the mounting members provided respectively integrally with the pair of the partial windings are together fixed to the support member by a common fixing member.

In the armature coil of the rotating electric machine having the above configuration, each of the partial windings has the pair of intermediate conductor portions and the pair of bridging portions located respectively on opposite axial sides of the pair of intermediate conductor portions to connect them. All the intermediate conductor portions of the partial windings constituting the phase windings of the armature coil are arranged in the predetermined sequence and in alignment with each other in the circumferential direction. At either or both of the coil ends of the armature coil, the bridging portions of the partial windings of different phases intersect one another. Consequently, even with a toothless structure of the armature having no teeth arranged in the circumferential direction, it still becomes possible to suitably construct the armature coil by assembling each of the partial windings to the support member.

Moreover, with the above configuration, at either or both of the coil ends of the armature coil, for each circumferentially-adjacent pair of the partial windings whose bridging portions intersect one another, the mounting members provided respectively integrally with the pair of the partial windings are together fixed to the support member by the common fixing member. Consequently, it becomes possible to easily mount the partial windings to the support member. Hence, in the case of manufacturing the armature using a manufacturing device such as a winding machine, the manufacturing device can be downsized. As a result, it becomes possible to easily realize the assembly of the armature coil in the armature having the toothless structure.

According to a second solution of the present disclosure to the above-described problem, in the above first solution, the partial windings constituting the phase windings of the armature coil include first partial windings and second partial windings. Each of the first partial windings has, as the pair of bridging portions thereof, a pair of first bridging portions that are radially bent from the pair of intermediate conductor portions of the first partial winding to the support member side. Each of the second partial windings has, as the pair of bridging portions thereof, a pair of second bridging portions each of which extends, on an axially outer side of the first bridging portions of the first partial windings, circumferentially across part of at least one of the first bridging portions. Each of the first partial windings has, as the mounting member thereof, a first mounting member provided integrally therewith. Each of the second partial windings has, as the mounting member thereof, a second mounting member provided integrally therewith. The second mounting member has a pair of protruding portions that radially protrude respectively from the pair of second bridging portions of the second partial winding to the support member side. At either or both of the coil ends of the armature coil, the protruding portions of the second mounting members are arranged to overlap corresponding ones of the first mounting members in the axial direction. For each axially-overlapping pair of one of the first mounting members and one of the protruding portions of the second mounting members, the fixing member is provided to engage with both the first mounting member and the protruding portion and fix them together to the support member.

With the above configuration, each of the first bridging portions of the first partial windings is radially bent to the support member side. Each of the second bridging portions of the second partial windings extends, on the axially outer side of the first bridging portions of the first partial windings, circumferentially across part of at least one of the first bridging portions. Consequently, all of the first bridging portions of the first partial windings and the second bridging portions of the second partial windings are arranged so as to intersect one another on an imaginary circle on which the intermediate conductor portions of the first and second partial windings are aligned with each other in the circumferential direction. Moreover, at either or both of the coil ends of the armature coil, the protruding portions of the second mounting members are arranged to overlap corresponding ones of the first mounting members in the axial direction. For each axially-overlapping pair of one of the first mounting members and one of the protruding portions of the second mounting members, the fixing member is provided to engage with both the first mounting member and the protruding portion and fix them together to the support member. Consequently, it becomes possible to suitably fix each axially-overlapping pair of the first and second mounting members to the support member using the common fixing member.

It should be noted that each of the first partial windings may have only one first bridging portion on one axial side of the pair of intermediate conductor portions thereof or a pair of first bridging portions respectively on opposite axial sides of the pair of intermediate conductor portions thereof. It also should be noted that each of the second partial windings may have only one second bridging portion on one axial side of the pair of intermediate conductor portions thereof or a pair of second bridging portions respectively on opposite axial sides of the pair of intermediate conductor portions thereof.

According to a third solution of the present disclosure to the above-described problem, in the above second solution, in each of the first partial windings, the first mounting member is mounted to cover a range including at least the pair of first bridging portions of the first partial winding. In each of the second partial windings, the second mounting member is mounted to cover a range including at least the pair of second bridging portions of the second partial winding.

With the above configuration, in each of the partial windings, the mounting member is mounted to cover the range including at least the pair of bridging portions of the partial winding. Consequently, it becomes possible to suitably mount the partial windings to the support member through the mounting members at the coil ends of the armature coil. Moreover, forming the mounting members with an electrically insulative material, it is also possible to prevent the insulation properties of the armature coil from being lowered due to the bridging portions of the partial windings rubbing against each other at the coil ends.

According to a fourth solution of the present disclosure to the above-described problem, in the above third solution, each of the first mounting members has, for each of the pair of first bridging portions of the first partial winding, a pair of side walls covering the first bridging portion respectively from opposite circumferential sides of the first bridging portion. Each of the first mounting members also has a pair of first engaged portions formed respectively in the pair of side walls thereof. Each of the second mounting members has, for each of the pair of second bridging portions of the second partial winding, one of the protruding portions thereof formed in a part of the second mounting member which covers the second bridging portion. Each of the second mounting members also has, in each of the protruding portions thereof, a second engaged portion formed at a center position between two ends of the second mounting member in the circumferential direction. At either or both of the coil ends of the armature coil, for each axially-overlapping pair of one of the first mounting members and one of the protruding portions of the second mounting members, one of the first engaged portions formed in the pair of side walls of the first mounting member and the second engaged portion formed in the protruding portion are axially connected with each other and the fixing member engages with the axially-connected first and second engaged portions.

With the above configuration, at either or both of the coil ends of the armature coil, the fixing can be performed at the boundary position between each circumferentially-adjacent pair of the first mounting members. Consequently, it becomes possible to fix each circumferentially-adjacent pair of the first mounting members and one of the second mounting members together to the support member by a common fixing pin.

According to a fifth solution of the present disclosure to the above-described problem, in the above fourth solution, each of the first bridging portions of the first partial windings has such a curved shape as to be convex toward the support member side in a radial direction. In each of the first mounting members, the first engaged portions are respectively formed, in the side walls of the first mounting member, at positions outside curved parts of the first bridging portions of the first partial winding covered by the first mounting member.

With the above configuration, between each circumferentially-adjacent pair of the first bridging portions of the first partial windings, there is formed a gap whose width increases in the direction toward the distal ends of the first bridging portions. Hence, it becomes possible to form the first engaged portions, in the respective side walls, at positions outside the curved parts of the first bridging portions by utilizing the gaps between the first bridging portions adjacent to one another in the circumferential direction. In other words, it becomes possible to fix the first and second mounting members by the common fixing pins in the gaps between the first bridging portions adjacent to one another in the circumferential direction. As a result, it becomes possible to minimize the amount by which the protruding portions of the second mounting members radially protrude to the support member side.

According to a sixth solution of the present disclosure to the above-described problem, in the above third solution, each of the first mounting members has, for each of the pair of first bridging portions of the first partial winding, an overlapping portion formed in a part of the first mounting member which covers the first bridging portion. The overlapping portion is located at a position axially overlapping the support member and between the pair of intermediate conductor portions of the first partial winding in the circumferential direction. Each of the first mounting members also has a first engaged portion formed in the overlapping portion. Each of the second mounting members has, for each of the pair of second bridging portions of the second partial winding, one of the protruding portions thereof formed in a part of the second mounting member which covers the second bridging portion; the protruding portions are formed in a range including both ends of the second mounting member in the circumferential direction. Each of the second mounting members also has, in each of the protruding portions thereof, a pair of second engaged portions formed respectively at opposite circumferential ends of the protruding portion. At either or both of the coil ends of the armature coil, for each axially-overlapping pair of one of the first mounting members and one of the protruding portions of the second mounting members, the first engaged portion formed in the overlapping portion of the first mounting member and one of the second engaged portions formed in the protruding portion are axially connected with each other and the fixing member engages with the axially-connected first and second engaged portions.

With the above configuration, at either or both of the coil ends of the armature coil, the fixing can be performed at the boundary position between each circumferentially-adjacent pair of the second mounting members. Consequently, it becomes possible to fix each circumferentially-adjacent pair of the second mounting members and one of the first mounting members together to the support member by a common fixing pin.

According to a seventh solution of the present disclosure to the above-described problem, in any of the above second to sixth solutions, each of the first partial windings has a pair of first insulating covers mounted respectively on the pair of first bridging portions thereof; the pair of first insulating covers together constitute the first mounting member for mounting the first partial winding to the support member. Each of the second partial windings has a pair of second insulating covers mounted respectively on the pair of second bridging portions thereof; the pair of second insulating covers together constitute the second mounting member for mounting the second partial winding to the support member and respectively have the pair of protruding portions of the second mounting member formed therein. At either or both of the coil ends of the armature coil, the protruding portions of the second insulating covers are arranged to overlap corresponding ones of the first insulating covers in the axial direction. For each axially-overlapping pair of one of the first insulating covers and one of the protruding portions of the second insulating covers, the fixing member is provided to engage with both the first insulating cover and the protruding portion and fix them together to the support member.

With the above configuration, the insulating covers are mounted respectively on the bridging portions of the partial windings on both the axial sides of the support member, so as to electrically insulate the bridging portions of the partial windings of different phases from one another. Consequently, it becomes possible to prevent the insulation properties of the armature coil from being lowered due to the bridging portions of the partial windings rubbing against each other at the coil ends. As a result, it becomes possible to easily realize the assembly of the armature coil to the support member while preventing the insulation properties of the armature coil from being lowered at the coil ends.

According to an eighth solution of the present disclosure to the above-described problem, in any of the above second to sixth solutions, each of the first partial windings has a first winding holder mounted thereto in a range including the pair of intermediate conductor portions and the pair of first bridging portions thereof; the first winding holder constitutes the first mounting member for mounting the first partial winding to the support member. Each of the second partial windings has a second winding holder mounted thereto in a range including the pair of intermediate conductor portions and the pair of second bridging portions thereof; the second winding holder constitutes the second mounting member for mounting the second partial winding to the support member and has the pair of protruding portions of the second mounting member formed therein. At either or both of the coil ends of the armature coil, the protruding portions of the second winding holders are arranged to overlap corresponding ones of the first winding holders in the axial direction. For each axially-overlapping pair of one of the first winding holders and one of the protruding portions of the second winding holders, the fixing member is provided to engage with both the first winding holder and the protruding portion and fix them together to the support member.

With the above configuration, it becomes possible to mount each of the partial windings to the support member through the winding holder mounted thereto. Moreover, forming the winding holder with an electrically insulative material, it is also possible to secure electrical insulation of each of the partial windings in the range including the pair of intermediate conductor portions and the pair of bridging portions thereof.

According to a ninth solution of the present disclosure to the above-described problem, in the above first solution, in each circumferentially-adjacent pair of the partial windings whose bridging portions intersect one another, one of the intersecting bridging portions is a first bridging portion that is radially bent from the intermediate conductor portions to the support member side and the other of the intersecting bridging portions is a second bridging portion that extends, on an axially outer side of the first bridging portion, circumferentially across part of the first bridging portion. The first bridging portion has, as one of the mounting members of the partial windings, a first mounting member provided integrally therewith. The second bridging portion has, as one of the mounting members of the partial windings, a second mounting member provided integrally therewith. The second mounting member has a protruding portion that radially protrudes from the second bridging portion to the support member side. The protruding portion of the second mounting member is arranged to overlap the first mounting member in the axial direction. The fixing member is provided to engage with both the first mounting member and the protruding portion of the second mounting member and fix them together to the support member.

With the above configuration, all of the first and second bridging portions are arranged so as to intersect one another on an imaginary circle on which the intermediate conductor portions of the partial windings are aligned with each other in the circumferential direction. Moreover, at either or both of the coil ends of the armature coil, the protruding portions of the second mounting members are arranged to overlap corresponding ones of the first mounting members in the axial direction. For each axially-overlapping pair of one of the first mounting members and one of the protruding portions of the second mounting members, the fixing member is provided to engage with both the first mounting member and the protruding portion and fix them together to the support member. Consequently, it becomes possible to suitably fix each axially-overlapping pair of the first and second mounting members to the support member using the common fixing member.

It should be noted that the above fixing may be performed at only one of the coil ends of the armature coil or at both of the coil ends of the armature coil. According to a tenth solution of the present disclosure to the above-described problem, in the above ninth solution, the fixing member is inserted into overlapping parts of the first mounting member and the protruding portion of the second mounting member in the axial direction. The protruding portion of the second mounting member has a lower step part formed therein; the lower step part has a smaller height from an axial end face of the support member than the second bridging portion. The protruding portion of the second mounting member is fixed by the fixing member at the lower step part thereof.

In the configuration where the axially-overlapping first and second mounting members are fixed together by the common fixing member, if the fixing member was shorter than the total axial height of the overlapping parts of the first mounting member and the protruding portion of the second mounting member, it would be difficult to perform the fixing by the fixing member. On the other hand, if the fixing member was excessively long, the axial length of the armature would be increased. In this regard, in the tenth solution, the protruding portion of the second mounting member has the lower step part formed therein; the lower step part has a smaller height from the axial end face of the support member than the second bridging portion. Moreover, the protruding portion of the second mounting member is fixed by the fixing member at the lower step part thereof. Consequently, it becomes possible to facilitate the fixing by the fixing pin while suppressing increase in the axial length of the armature.

According to an eleventh solution of the present disclosure to the above-described problem, in any of the above first to tenth solutions, at each of the coil ends of the armature coil, the bridging portions of the partial windings include n axially-inner bridging portions arranged in alignment with each other in the circumferential direction and n axially-outer bridging portions arranged in alignment with each other in the circumferential direction; the n axially-outer bridging portions are located axially outside and axially overlap the n axially-inner bridging portions, where n is a natural number. In each of axial end faces of the support member, there are formed n fixing portions at equal intervals in the circumferential direction. To each of the n fixing portions, there is fixed one end of the fixing member.

With the above configuration, at each of the coil ends of the armature coil, 2×n bridging portions (i.e., 2×n partial windings) can be suitably fixed to the support member by n fixing members.

According to a twelfth solution of the present disclosure to the above-described problem, in any of the above first to eleventh solutions, the support member has a cooling part configured to cool the armature coil. Each of the bridging portions of the partial windings is fixed by the fixing member to a corresponding one of axial end faces of the support member.

With the above configuration, the bridging portions of the partial windings are fixed to the support member that has the cooling part. Consequently, heat generated in the partial windings can be directly transferred from the bridging portions of the partial windings to the vicinity of the cooling part, thereby improving the performance of cooling the armature coil.

According to a thirteenth solution of the present disclosure to the above-described problem, in the above twelfth solution, the support member includes an armature core and an armature holding member. The armature core is assembled to a radially inner or radially outer periphery of the armature coil. The armature holding member is located on a radially opposite side of the armature core to the armature coil and has the cooling part formed therein. Each of the bridging portions of the partial windings is fixed by the fixing member to a corresponding one of axial end faces of the armature holding member.

With the above configuration, the bridging portions of the partial windings are fixed to the armature holding member at a position beyond the armature core. Consequently, it becomes unnecessary to fix the bridging portions of the partial windings to the armature core; thus it becomes unnecessary to form recesses or the like in the armature core for inserting the fixing members therein. As a result, it becomes possible to suppress generation of cogging torque.

According to a fourteenth solution of the present disclosure to the above-described problem, in any of the above second to eighth solutions, at either or both of the coil ends of the armature coil, for each axially-overlapping pair of one of the first mounting members and one of the protruding portions of the second mounting members, the fixing member is inserted into overlapping parts of the first mounting member and the protruding portion in the axial direction. Each of the protruding portions of the second mounting members has a lower step part formed therein; the lower step part has a smaller height from an axial end face of the support member than the second bridging portion. Each of the protruding portions of the second mounting members is fixed by the fixing member at the lower step part thereof.

With the above fourteenth solution, it is possible to achieve the same advantageous effects as achievable with the above tenth solution.

BRIEF DESCRIPTION OF THE DRAWINGS

The above-described object, other objects, features and beneficial advantages according to the present disclosure will become more apparent from the following detailed explanation with reference to the accompanying drawings.

In the accompanying drawings:

FIG. 118 is a cross-sectional view taken along the line 118-118 in FIG. 117;

FIG. 119 is a plan view showing first coil modules in a state of having been assembled to a core assembly in the sixteenth modification;

FIG. 120 is a plan view showing both the first coil modules and second coil modules in a state of having been assembled to the core assembly in the sixteenth modification;

Figure 121A:
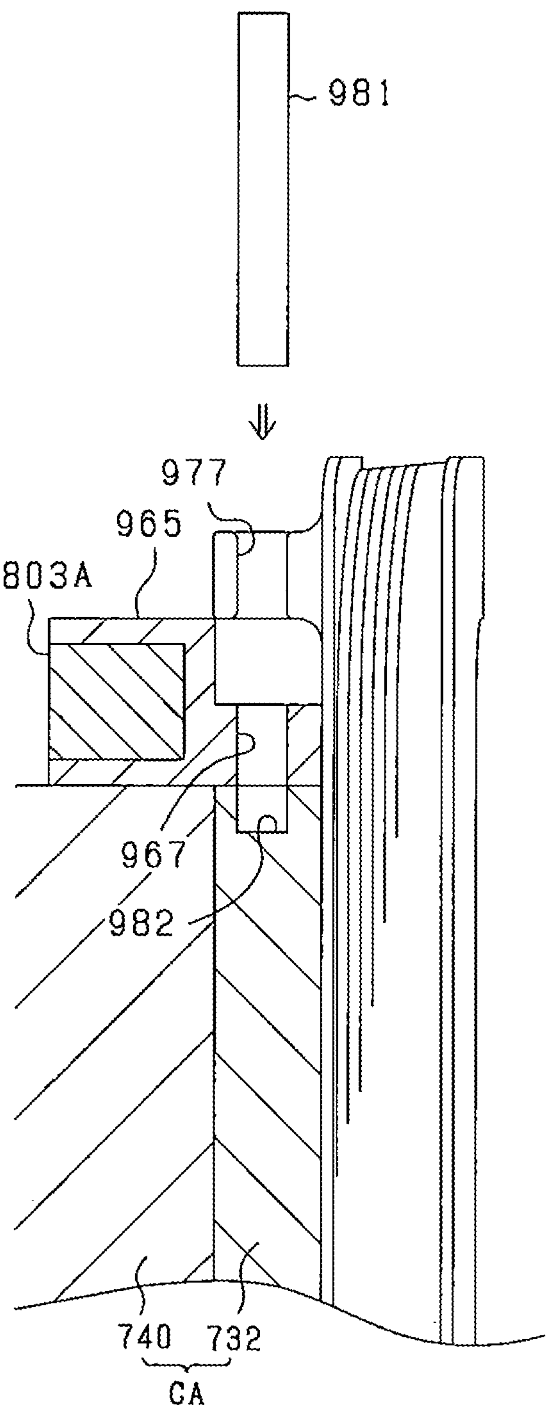
Figure 121B:
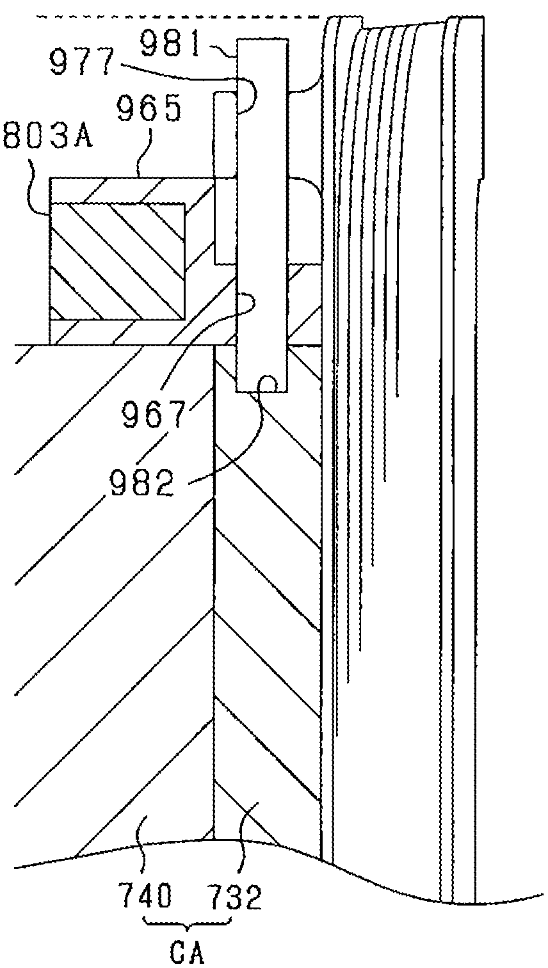
Figure 122:
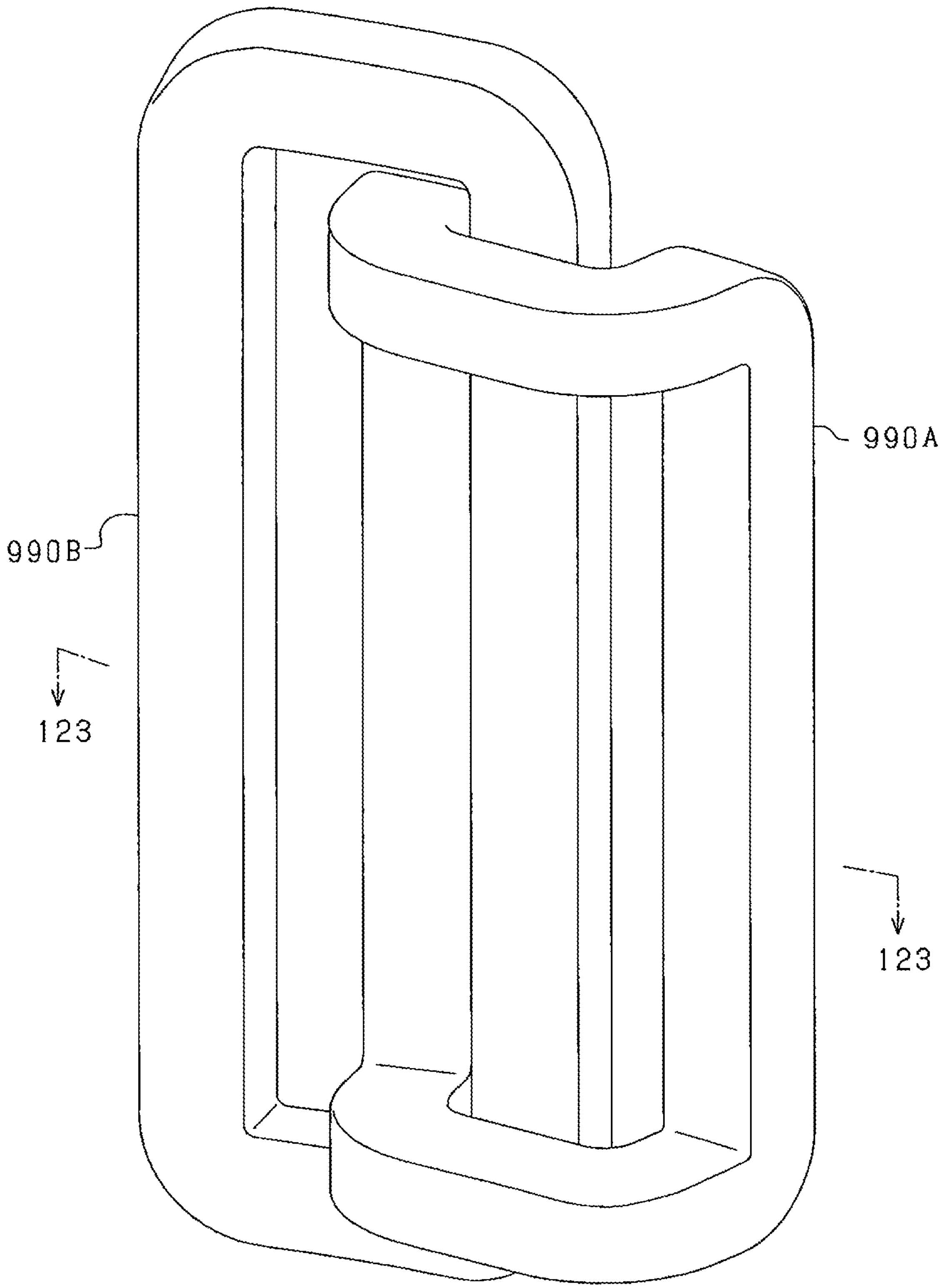
Figure 123:
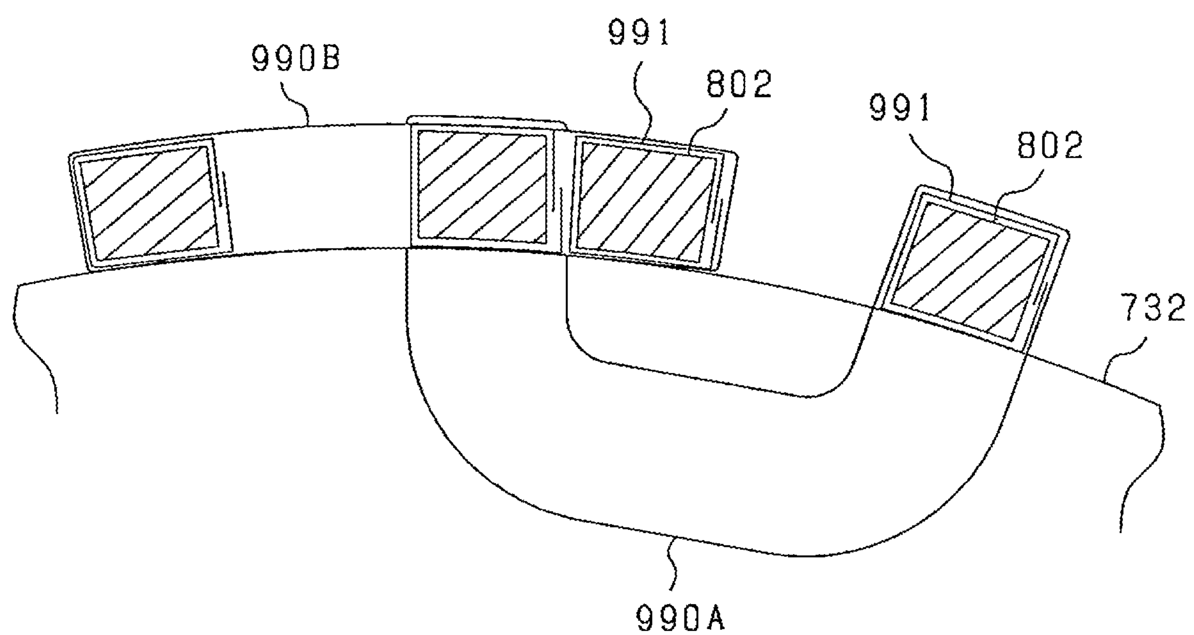
Figure 124A:
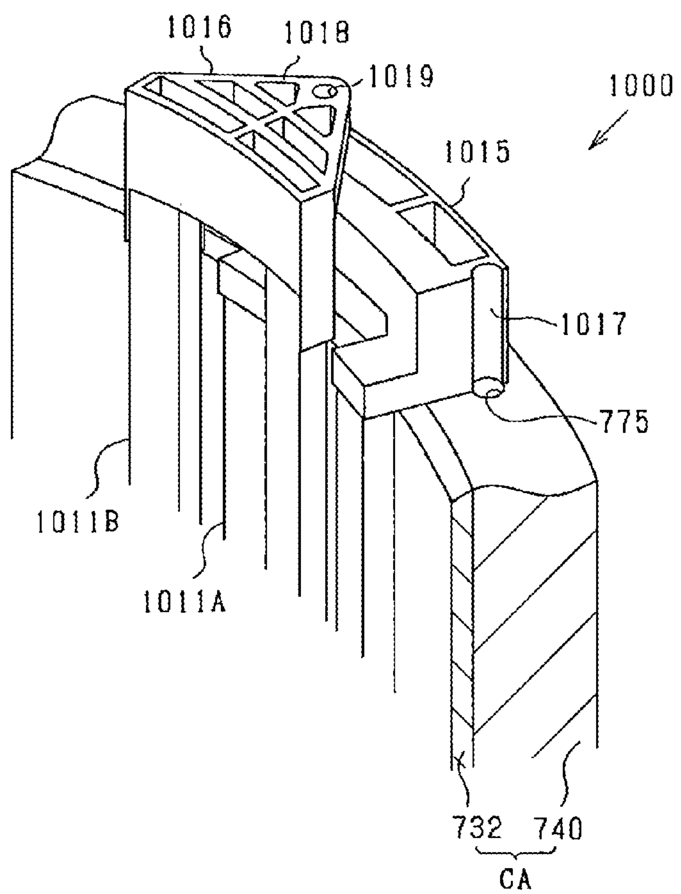
Figure 124B:
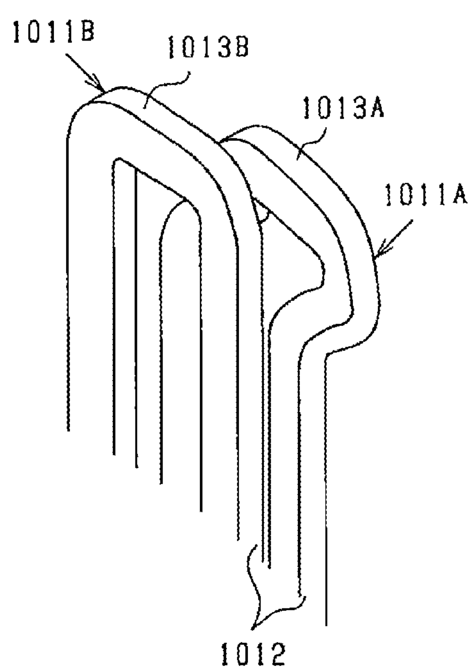
Figure 125:
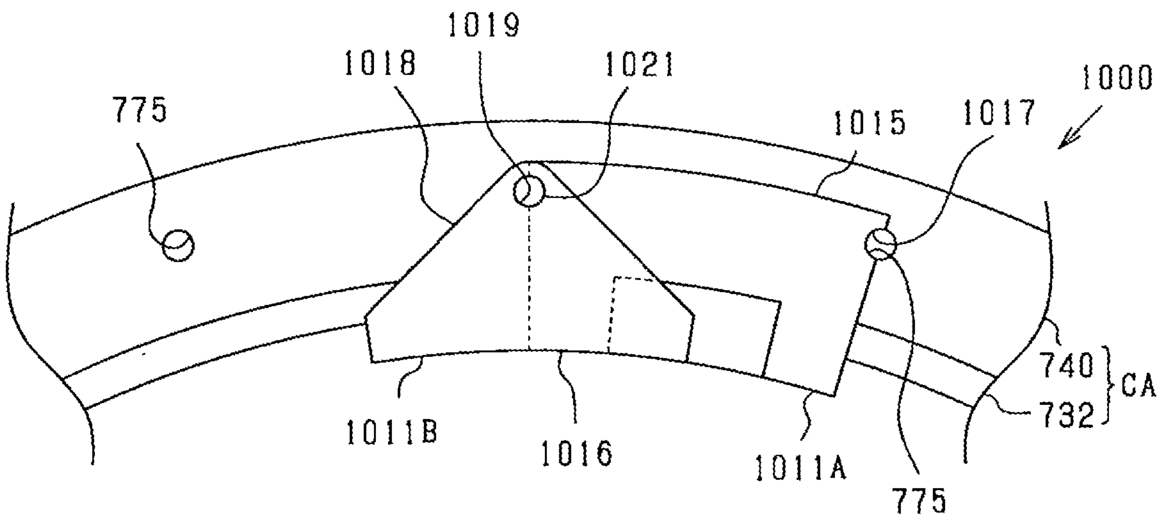

FIGS. 121(*a*) and 121(*b*) are longitudinal cross-sectional views illustrating the fixing of the first and second coil modules to the core assembly by fixing pins in the sixteenth modification;

FIG. 122 is a perspective view of a pair of coil modules in a seventeenth modification;

FIG. 123 is a cross-sectional view taken along the line 123-123 in FIG. 122;

FIGS. 124(*a*) and 124(*b*) are diagrams illustrating the configuration of a stator unit of an inner rotor type rotating electric machine in a variation of the fifteenth to the seventeenth modifications; and FIG. 125 is a plan view showing coil modules in a state of having been assembled to a core assembly in the inner rotor type rotating electric machine.

DESCRIPTION OF EMBODIMENTS

Embodiments will be described with reference to the drawings. In the embodiments, parts functionally and/or structurally corresponding to each other and/or parts associated with each other will be designated by the same reference signs or by reference signs which are different in the hundreds place from each other. The corresponding parts and/or the associated parts may refer to the explanation of the other embodiments.

Rotating electric machines in the embodiments are configured to be used, for example, as vehicular power sources. However, the rotating electric machines may also be widely used for other applications, such as industrial, automotive, household, office automation and amusement applications. In addition, in the following embodiments, identical or equivalent parts will be designated by the same reference signs in the drawings, and explanation thereof will not be repeated.

First Embodiment

Figure 1:
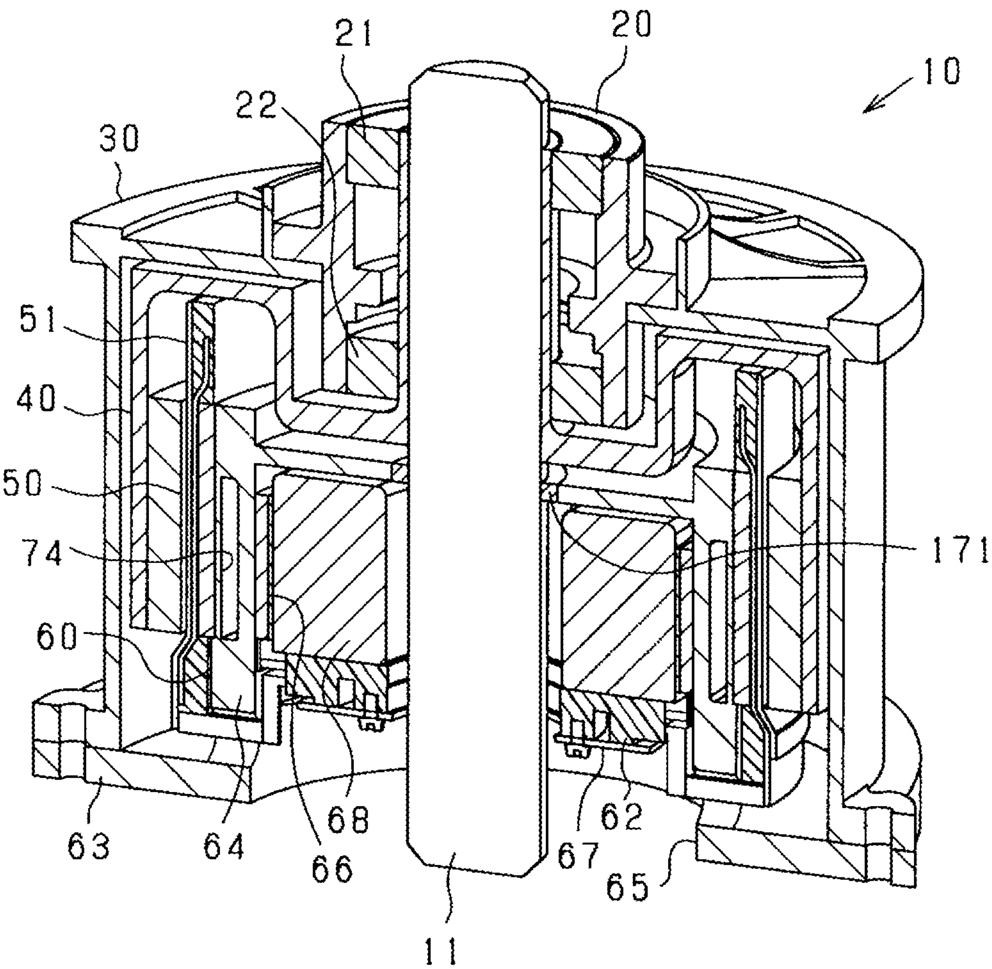
FIG. 1 is a perspective longitudinal cross-sectional view of a rotating electric machine.
Figure 2:
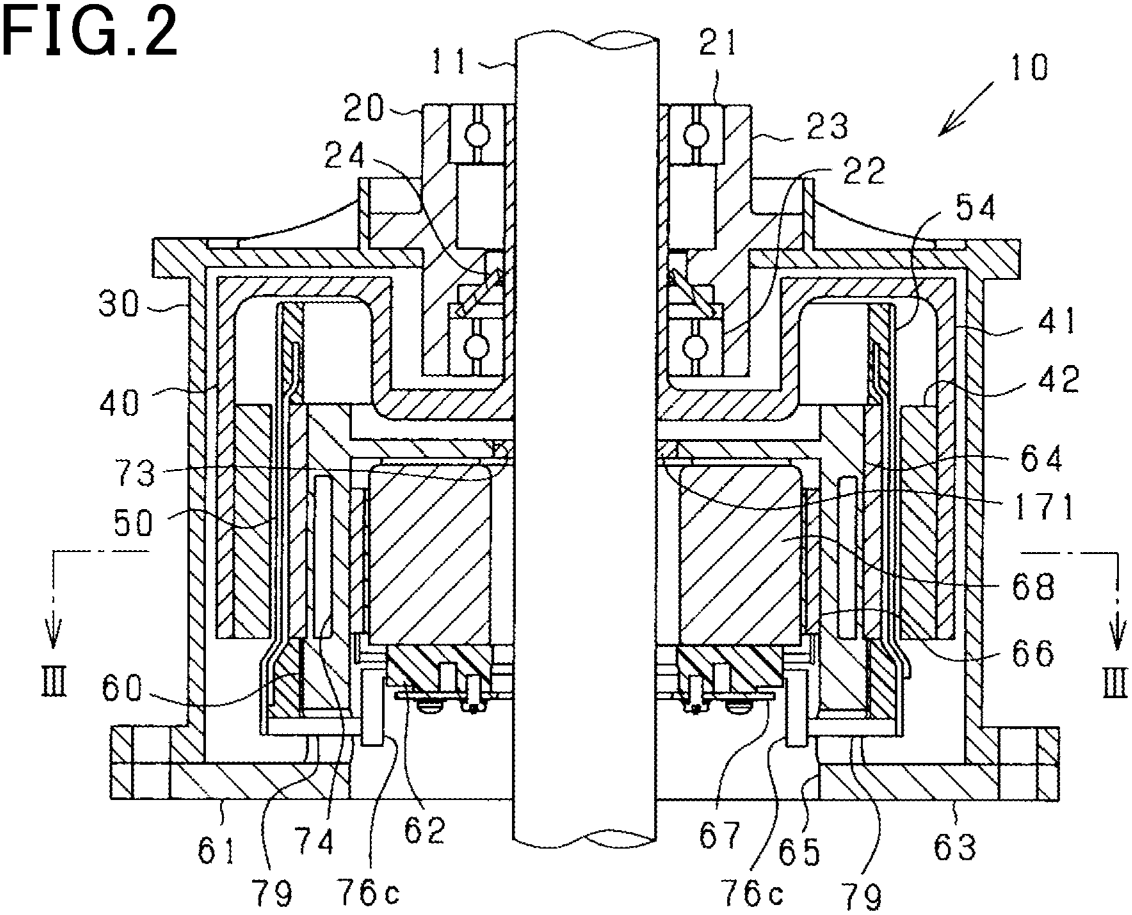
FIG. 2 is a longitudinal cross-sectional view of the rotating electric machine.
Figure 3:
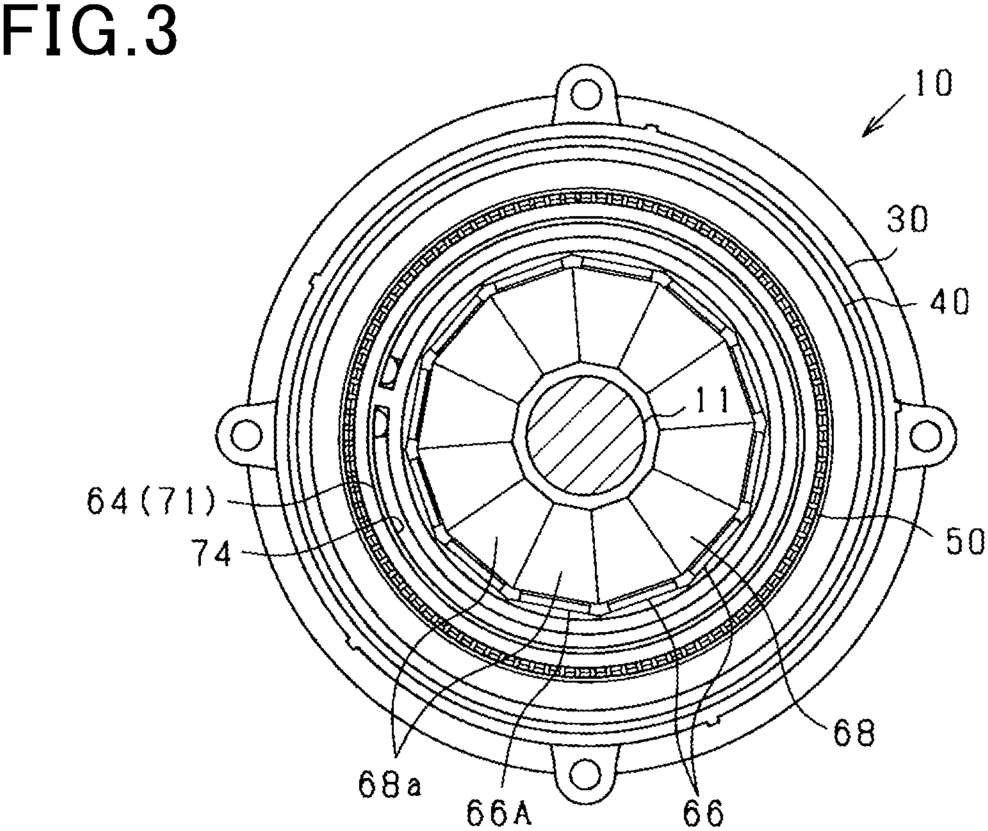
FIG. 3 is a cross-sectional view taken along the line in FIG. 2.
Figure 4:
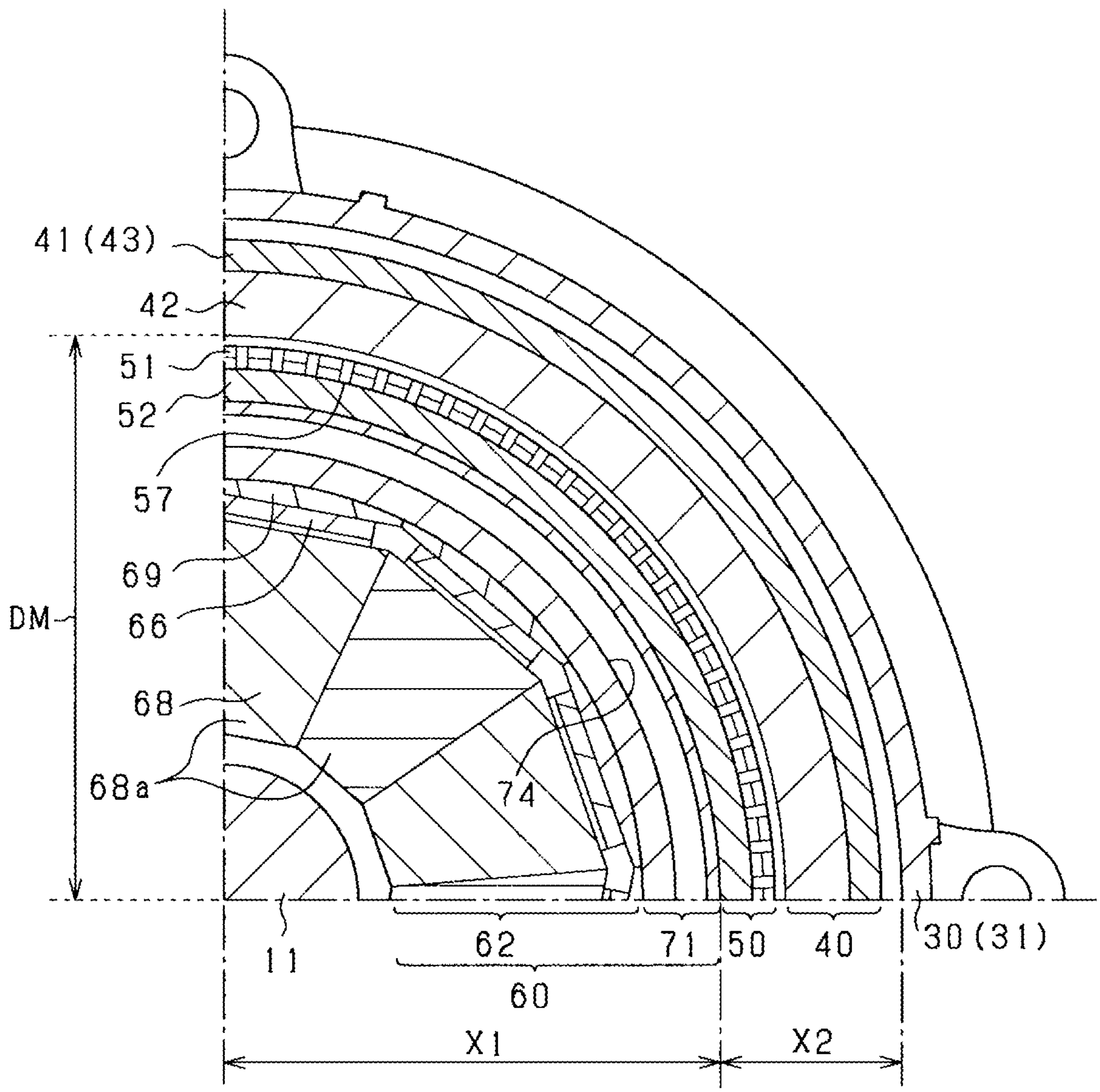
FIG. 4 is an enlarged cross-sectional view of part of FIG. 3.
Figure 5:
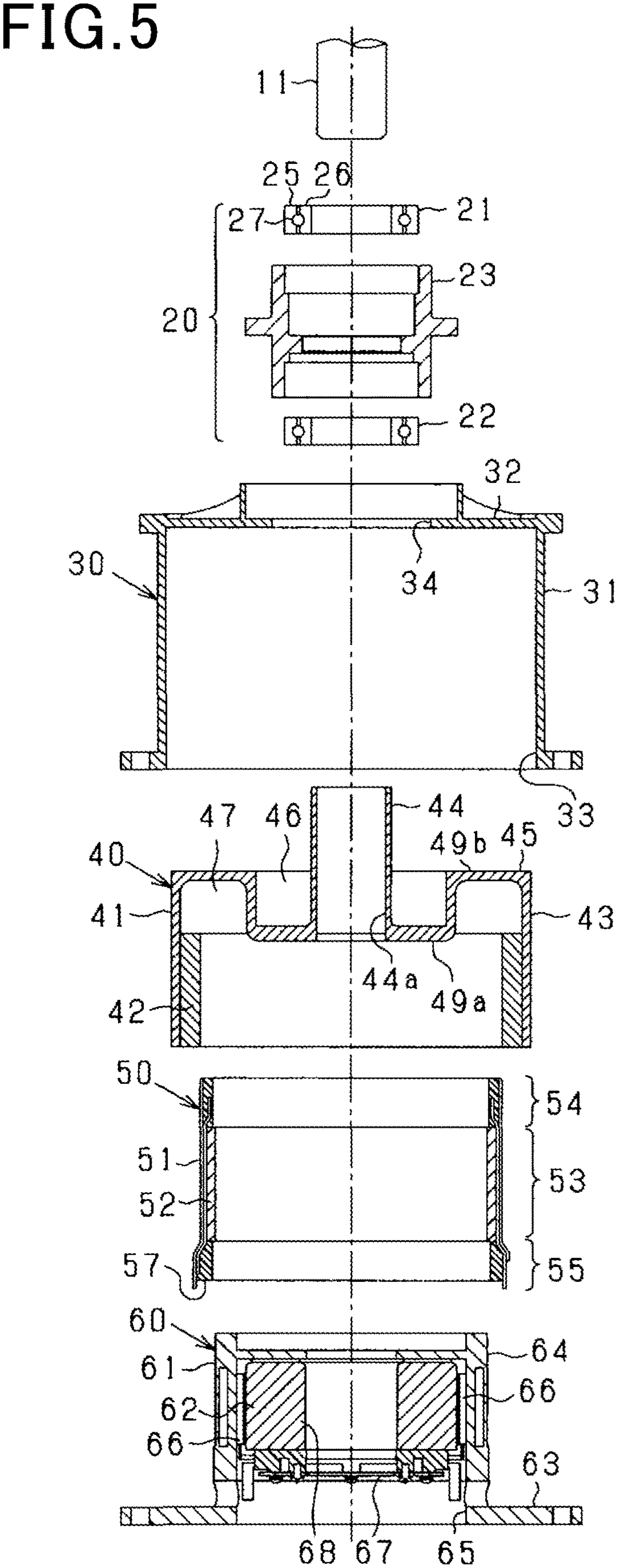
FIG. 5 is an exploded view of the rotating electric machine.

The rotating electric machine 10 according to the present embodiment is a synchronous multi-phase AC motor with an outer rotor structure (i.e., an outer rotating structure). The outline of the rotating electric machine 10 is illustrated in FIGS. 1 to 5. FIG. 1 is a perspective longitudinal cross-sectional view of the rotating electric machine 10. FIG. 2 is a longitudinal cross-sectional view along a rotating shaft 11 of the rotating electric machine 10. FIG. 3 is a transverse cross-sectional view (i.e., cross-sectional view taken along the line in FIG. 2) of the rotating electric machine 10 perpendicular to the rotating shaft 11. FIG. 4 is an enlarged cross-sectional view of part of FIG. 3. FIG. 5 is an exploded view of the rotating electric machine 10. In addition, it should be noted that in FIG. 3, for the sake of simplicity, hatching lines designating cross sections of components of the rotating electric machine 10 except for the rotating shaft 11 are omitted. In the following explanation, the direction in which the rotating shaft 11 extends will be referred to as the axial direction; the directions extending radially from the center of the rotating shaft 11 will be referred to as radial directions; and the direction extending along a circle centering on the rotating shaft 11 will be referred to as the circumferential direction.

The rotating electric machine 10 includes a bearing unit 20, a housing 30, a rotor 40, a stator 50 and an inverter unit 60. These members are each arranged coaxially with the rotating shaft 11 and assembled in a given sequence in the axial direction to together constitute the rotating electric machine 10. The rotating electric machine 10 of the present embodiment is configured to have the rotor 40 functioning as a "field system" and the stator 50 functioning as an "armature". That is, the rotating electric machine 10 is embodied as a rotating-field type rotating electric machine.

The bearing unit 20 includes two bearings 21 and 22 arranged apart from each other in the axial direction and a holding member 23 that holds both the bearings 21 and 22. The bearings 21 and 22 are implemented by, for example, radial ball bearings each of which includes an outer ring 25, an inner ring 26 and a plurality of balls 27 disposed between the outer ring 25 and the inner ring 26. The holding member 23 is cylindrical-shaped and has both the bearings 21 and 22 assembled thereto on the radially inner side thereof. Moreover, on the radially inner side of the bearings 21 and 22, there are rotatably supported the rotating shaft 11 and the rotor 40. That is, the bearings 21 and 22 constitute a pair of bearings rotatably supporting the rotating shaft 11.

In each of the bearings 21 and 22, the balls 27 are retained by a not-shown retainer, thereby keeping the pitch between each pair of the balls 27. Moreover, each of the bearings 21 and 22 has sealing members on the upper and lower sides of the retainer in the axial direction, and has non-electrically conductive grease (e.g., non-electrically conductive urea-based grease) filled inside the sealing members. In addition, the position of the inner ring 26 is mechanically held by a spacer, and constant-pressure preloading is performed from the inner side to make it convex in the vertical direction.

The housing 30 has a circumferential wall 31 that is cylindrical in shape. The circumferential wall 31 has a first end and a second end that are opposite to each other in the axial direction. Moreover, the circumferential wall 31 has an end surface 32 at the first end and an opening 33 at the second end. The opening 33 is formed to open over the entire second end of the circumferential wall 31. The end surface 32 has a circular hole 34 formed at the center thereof. The bearing unit 20 is inserted in the hole 34 and fixed by fixtures such as screws or rivets. Inside the housing 30, i.e., in an internal space defined by the circumferential wall 31 and the end surface 32, there are received the rotor 40 and the stator 50 both of which are hollow cylindrical in shape. In the present embodiment, the rotating electric machine 10 is of an outer rotor type such that the stator 50 is arranged radially inside the cylindrical rotor 40 in the housing 30. Moreover, the rotor 40 is supported in a cantilever fashion by the rotating shaft 11 on the end surface 32 side in the axial direction.

The rotor 40 includes a hollow cylindrical magnet holder 41 and an annular magnet unit 42 provided radially inside the magnet holder 41. The magnet holder 41 is substantially cup-shaped and functions as a magnet holding member. The magnet holder 41 has a cylindrical portion 43, an attaching portion (or attachment) 44 that is also cylindrical in shape and smaller in diameter than the cylindrical portion 43, and an intermediate portion 45 connecting the cylindrical portion 43 and the attaching portion 44. On an inner circumferential surface of the cylindrical portion 43, there is mounted the magnet unit 42.

The magnet holder 41 is formed of a material having sufficient mechanical strength, such as a cold-rolled steel sheet (e.g., SPCC), forged steel or Carbon Fiber-Reinforced Plastic (CFRP).

In a through-hole 44*a* of the attaching portion 44, there is inserted the rotating shaft 11. The attaching portion 44 is fixed to a portion of the rotating shaft 11 which is located inside the through-hole 44*a*. That is, the magnet holder 41 is fixed to the rotating shaft 11 via the attaching portion 44. In addition, the attaching portion 44 may be fixed to the rotating shaft 11 by spline coupling using protrusions and recesses, key coupling, welding or crimping. Consequently, the rotor 40 rotates together with the rotating shaft 11.

To a radially outer periphery of the attaching portion 44, there are assembled both the bearings 21 and 22 of the bearing unit 20. As described above, the bearing unit 20 is fixed to the end surface 32 of the housing 30; therefore, the rotating shaft 11 and the rotor 40 are rotatably supported by the housing 30. Consequently, the rotor 40 is rotatable in the housing 30.

The attaching portion 44 is provided at only one of two opposite axial ends of the rotor 40. Therefore, the rotor 40 is supported by the rotating shaft 11 in a cantilever fashion. Moreover, the attaching portion 44 of the rotor 40 is rotatably supported by the bearings 21 and 22 of the bearing unit 20 at two different axial positions. That is, the rotor 40 is rotatably supported, at one of two opposite axial ends of the magnet holder 41, by the two bearings 21 and 22 that are located apart from each other in the axial direction. Therefore, though the rotor 40 is supported by the rotating shaft 11 in the cantilever fashion, it is still possible to realize stable rotation of the rotor 40. In addition, the rotor 40 is supported by the bearings 21 and 22 at positions offset from an axially center position of the rotor 40 to one side.

In the bearing unit 20, the bearing 22 which is located closer to the center of the rotor 40 (i.e., on the lower side in the figures) and the bearing 21 which is located further from the center of the rotor 40 (i.e., on the upper side in the figures) are different in gap dimensions between the outer and inner rings 25 and 26 and the balls 27. For example, the gap dimensions in the bearing 22 which is located closer to the center of the rotor 40 are greater than the gap dimensions in the bearing 21 which is located further from the center of the rotor 40. In this case, on the closer side to the center of the rotor 40, even if deflection of the rotor 40 and/or vibration caused by imbalance due to parts tolerances act on the bearing unit 20, it is still possible to well absorb the deflection and/or the vibration. Specifically, in the bearing 22 which is located closer to the center of the rotor 40 (i.e., on the lower side in the figures), the play dimensions (or gap dimensions) are increased by preloading, thereby absorbing vibration caused by the cantilever structure. The preloading may be either fixed-position preloading or constant-pressure preloading. In the case of performing fixed-position preloading, both the outer rings 25 of the bearings 21 and 22 are joined to the holding member 23 by, for example, press-fitting or bonding. On the other hand, both the inner rings 26 of the bearings 21 and 22 are joined to the rotating shaft 11 by, for example, press-fitting or bonding. In this case, a preload can be produced by locating the outer ring 25 of the bearing 21 at a different axial position from the inner ring 26 of the bearing 21. Similarly, a preload can be produced by locating the outer ring 25 of the bearing 22 at a different axial position from the inner ring 26 of the bearing 22.

In the case of performing constant-pressure preloading, a preloading spring, such as a wave washer 24, is arranged in a region between the bearings 21 and 22 to produce a preload in the axial direction from the region toward the outer ring 25 of the bearing 22. In this case, both the inner rings 26 of the bearings 21 and 22 are joined to the rotating shaft 11 by, for example, press-fitting or bonding. The outer ring 25 of the bearing 21 or the bearing 22 is arranged with a predetermined clearance to the holding member 23. With the above configuration, a spring force is applied by the preloading spring to the outer ring 25 of the bearing 22 in a direction away from the bearing 21. Moreover, this force is transmitted via the rotating shaft 11 to the inner ring 26 of the bearing 21, pressing the inner ring 26 of the bearing 21 in the axial direction toward the bearing 22. Consequently, in each of the bearings 21 and 22, the axial positions of the outer and inner rings 25 and 26 are offset from each other, producing a preload as in the case of performing fixed-position preloading as described above.

In addition, in the case of performing constant-pressure preloading, the spring force is not necessarily applied to the outer ring 25 of the bearing 22 as shown in FIG. 2. For example, the spring force may be applied to the outer ring 25 of the bearing 21 instead. Moreover, preload can alternatively be produced in both the bearings 21 and 22 by: locating the inner ring 26 of either of the bearings 21 and 22 with a predetermined clearance to the rotating shaft 11; and joining both the outer rings 25 of the bearings 21 and 22 to the holding member 23 by, for example, press-fitting or bonding.

Furthermore, in the case of applying a force to the inner ring 26 of the bearing 21 in a direction away from the bearing 22, the force may be applied to the inner ring 26 of the bearing 22 as well in a direction away from the bearing 21. In contrast, in the case of applying a force to the inner ring 26 of the bearing 21 in a direction toward the bearing 22, the force may be applied to the inner ring 26 of the bearing 22 as well in a direction toward the bearing 21.

In addition, in the case of applying the rotating electric machine 10 to a vehicle as a vehicular power source, vibration having a component in the preload producing direction may be applied to the preload producing mechanism and/or the direction of gravity acting on the preload application target may be changed. Therefore, in the case of applying the rotating electric machine 10 to a vehicle, it is preferable to perform fixed-position preloading.

The intermediate portion 45 has both an annular inner shoulder part 49*a* and an annular outer shoulder part 49*b*. The outer shoulder part 49*b* is located outside the inner shoulder part 49*a* in the radial direction of the intermediate portion 45. Moreover, the inner shoulder part 49*a* and the outer shoulder part 49*b* are located apart from each other in the axial direction of the intermediate portion 45. Consequently, the cylindrical portion 43 and the attaching portion 44 partially overlap each other in the radial direction of the intermediate portion 45. That is, the cylindrical portion 43 protrudes axially outward from a proximal end (i.e., an inner end on the lower side in the figures) of the attaching portion 44. With this configuration, it is possible to support the rotor 40 with respect to the rotating shaft 11 at a closer position to the center of gravity of the rotor 40 than in the case of configuring the intermediate portion 45 to be in the shape of a flat plate without any step. Consequently, it is possible to realize stable operation of the rotor 40.

Moreover, with the above configuration of the intermediate portion 45, there are formed both an annular bearing-receiving recess 46 and an annular coil-receiving recess 47 in the rotor 40. The bearing-receiving recess 46 is radially located on the inner side of the intermediate portion 45 to surround the attaching portion 44. The bearing-receiving recess 46 receives part of the bearing unit 20 therein. The coil-receiving recess 47 is radially located on the outer side of the intermediate portion 45 to surround the bearing-receiving recess 46. The coil-receiving recess 47 receives therein a coil end 54 of a stator coil 51 of the stator 50 which will be described later. Moreover, the bearing-receiving recess 46 and the coil-receiving recess 47 are located to be radially adjacent to each other. In other words, the bearing-receiving recess 46 and the coil-receiving recess 47 are located to have part of the bearing unit 20 and the coil end 54 of the stator coil 51 radially overlapping each other. Consequently, it becomes possible to reduce the axial length of the rotating electric machine 10.

The intermediate portion 45 is formed to project radially outward from the rotating shaft 11 side. Moreover, in the intermediate portion 45, there is formed a contact prevention portion that extends in the axial direction to prevent contact with the coil end 54 of the stator coil 51 of the stator 50. In addition, the intermediate portion 45 corresponds to a projecting portion.

The coil end 54 may be bent radially inward or radially outward, thereby reducing the axial dimension of the coil end 54 and thus the axial length of the stator 50. The direction of bending the coil end 54 may be determined in consideration of the assembling of the stator 50 to the rotor 40. Specifically, considering the fact that the stator 50 is assembled to the radially inner periphery of the rotor 40, the coil end 54 may be bent radially inward on the insertion end side to the rotor 40. Moreover, a coil end on the opposite side to the coil end 54 may be bent in an arbitrary direction; however, in terms of manufacturing, it is preferable to bend the coil end to the radially outer side where there is a space allowance.

The magnet unit 42, which serves as a magnet section, is constituted of a plurality of permanent magnets that are arranged on the radially inner side of the cylindrical portion 43 so as to have their polarities alternately changing in the circumferential direction. Consequently, the magnet unit 42 has a plurality of magnetic poles arranged in the circumferential direction. In addition, the details of the magnet unit 42 will be described later.

The stator 50 is provided radially inside the rotor 40. The stator 50 includes the stator coil 51, which is wound into a substantially cylindrical (or annular) shape, and a stator core 52 that is arranged, as a base member, radially inside the stator coil 51. The stator coil 51 is arranged to face the annular magnet unit 42 through a predetermined air gap formed therebetween. The stator coil 51 is comprised of a plurality of phase windings. Each of the phase windings is formed by connecting a plurality of electrical conductors, which are arranged in the circumferential direction, to one another at a predetermined pitch. In the present embodiment, the stator coil 51 includes both a three-phase coil comprised of U-phase, V-phase and W-phase windings and a three-phase coil comprised of X-phase, Y-phase and Z-phase windings. That is, the stator coil 51 is comprised of six phase windings.

The stator core 52 is formed by laminating magnetic steel sheets that are made of a soft-magnetic material into an annular shape. The stator core 52 is assembled to a radially inner periphery of the stator coil 51. The magnetic steel sheets are formed, for example, of silicon steel that is obtained by adding silicon by a few percent (e.g., 3%) to iron. In addition, the stator coil 51 corresponds to an armature coil and the stator core 52 corresponds to an armature core.

The stator coil 51 has a coil side part 53, which is located radially outside the stator core 52 so as to radially overlap the stator core 52, and the coil ends 54 and 55 protruding respectively from opposite axial ends of the stator core 52. The coil side part 53 radially faces both the stator core 52 and the magnet unit 42 of the rotor 40. In the state of the stator 50 having been arranged inside the rotor 40, of the coil ends 54 and 55 respectively on the opposite axial sides, the coil end 54 on the bearing unit 20 side (i.e., the upper side in the figures) is received in the coil-receiving recess 47 formed in the magnet holder 41 of the rotor 40. In addition, the details of the stator 50 will be described later.

The inverter unit 60 includes a unit base 61, which is fixed to the housing 30 by fasteners such as bolts, and a plurality of electrical components 62 assembled to the unit base 61. The unit base 61 is formed, for example, of Carbon Fiber-Reinforced Plastic (CFRP). The unit base 61 includes an end plate 63 fixed to the edge of the opening 33 of the housing 30, and a casing 64 formed integrally with the end plate 63 and extending in the axial direction. The end plate 63 has a circular opening 65 formed in a central part thereof. The casing 64 is formed to extend upward from the peripheral edge of the opening 65.

On an outer circumferential surface of the casing 64, there is assembled the stator 50. That is, the outer diameter of the casing 64 is set to be equal to or slightly smaller than the inner diameter of the stator core 52. The stator 50 and the unit base 61 are integrated into one piece by assembling the stator core 52 to the outer periphery of the casing 64. Moreover, since the unit base 61 is fixed to the housing 30, with the stator core 52 assembled to the casing 64, the stator 50 is also integrated with the housing 30 into one piece.

In addition, the stator core 52 may be assembled to the unit base 61 by, for example, bonding, shrink fitting or press-fitting. Consequently, circumferential or axial displacement of the stator core 52 relative to the unit base 61 is suppressed.

On the radially inner side of the casing 64, there is formed a receiving space for receiving the electrical components 62. In the receiving space, the electrical components 62 are arranged around the rotating shaft 11. That is, the casing 64 serves as a receiving-space forming portion. The electrical components 62 include semiconductor modules 66 for forming an inverter circuit, a control substrate 67 and a capacitor module 68.

In addition, the unit base 61 corresponds to a stator holder (or armature holder) that is provided radially inside the stator 50 and holds the stator 50. The housing 30 and the unit base 61 together constitute a motor housing of the rotating electric machine 10. In the motor housing, the holding member 23 is fixed to the housing 30 on one axial side of the rotor 40; the housing 30 and the unit base 61 are joined to each other on the other axial side of the rotor 40. For example, in an electrically-driven vehicle such as an electric vehicle, the rotating electric machine 10 is installed to the vehicle by mounting the motor housing to the vehicle side.

Figure 6:
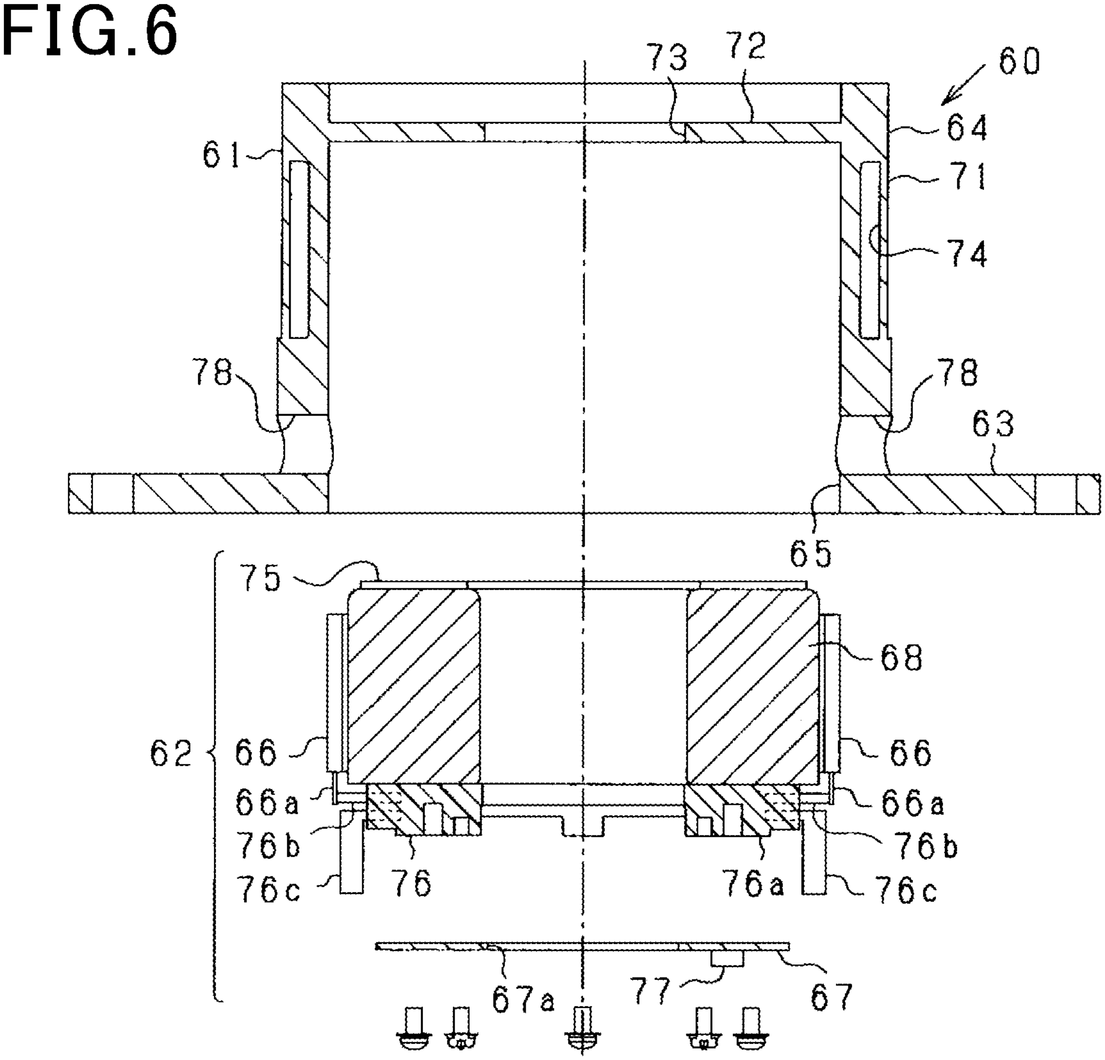
FIG. 6 is an exploded view of an inverter unit.

Hereinafter, the configuration of the inverter unit 60 will be described in detail with reference to FIG. 6, which is an exploded view of the inverter unit 60, in addition to FIGS. 1-5.

In the unit base 61, the casing 64 has a cylindrical portion 71 and an end surface 72 that is formed at one of the two opposite axial ends (i.e., the bearing unit 20-side end) of the cylindrical portion 71. At the axial end of the cylindrical portion 71 on the opposite side to the end surface 72, the cylindrical portion 71 fully opens via the opening 65 of the end plate 63. In a central part of the end surface 72, there is formed a circular hole 73 through which the rotating shaft 11 can be inserted. In the hole 73, there is provided a sealing member 171 to seal the gap between the outer circumferential surface of the rotating shaft 11 and the hole 73. The sealing member 171 may be implemented by, for example, a sliding seal formed of a resin material.

The cylindrical portion 71 of the casing 64 serves as a partition portion to partition between the rotor 40 and the stator 50 arranged on the radially outer side thereof and the electrical components 62 arranged on the radially inner side thereof. That is, the rotor 40, the stator 50 and the electrical components 62 are arranged in radial alignment with each other with the cylindrical portion 71 interposed between the rotor 40 and the stator 50 and the electrical components 62.

The electrical components 62 are electrical parts which form the inverter circuit. The electrical components 62 together perform a power running function and an electric power generation function. The power running function is a function of supplying electric current to each phase winding of the stator coil 51 in a predetermined sequence and thereby rotating the rotor 40. The electric power generation function is a function of receiving three-phase alternating current, which flows in the stator coil 51 with rotation of the rotating shaft 11, and outputting it as the generated electric power to the outside. In addition, the electrical components 62 may together perform only either one of the power running function and the electric power generation function. In the case of the rotating electric machine 10 being used as, for example, a vehicular power source, the electric power generation function may be a regenerative function, i.e., a function of externally outputting regenerative electric power.

Specifically, as shown in FIG. 4, the electrical components 62 include the hollow cylindrical capacitor module 68 arranged around the rotating shaft 11 and the semiconductor modules 66 arranged in circumferential alignment with each other on an outer circumferential surface of the capacitor module 68. The capacitor module 68 includes a plurality of smoothing capacitors 68*a* that are connected in parallel with each other. Specifically, each of the capacitors 68*a* is implemented by a laminated film capacitor that is formed by laminating a plurality of film capacitors. Each of the capacitors 68*a* has a trapezoidal cross section. The capacitor module 68 is constituted of twelve capacitors 68*a* that are arranged in an annular shape.

In addition, in manufacturing the capacitors 68*a*, a plurality of films are laminated to form a long film which has a predetermined width. Then, the long film is cut into a plurality of trapezoidal capacitor elements such that: the width direction of the long film coincides with the height direction of the trapezoidal capacitor elements; the upper bases and the lower bases of the trapezoidal capacitor elements are alternately arranged in the longitudinal direction of the long film; and all the legs of the trapezoidal capacitor elements have the same length. Thereafter, to each of the capacitor elements, electrodes are attached to form one of the capacitors 68*a*.

Each of the semiconductor modules 66 includes a semiconductor switching element, such as a MOSFET or an IGBT, and is substantially plate-shaped. In the present embodiment, the rotating electric machine 10 includes two three-phase coils, for each of which one inverter circuit is provided. Accordingly, a total of twelve semiconductor modules 66 are arranged in an annular shape to form a semiconductor module group 66A which is included in the electrical components 62.

The semiconductor modules 66 are sandwiched between the cylindrical portion 71 of the casing 64 and the capacitor module 68. An outer circumferential surface of the semiconductor module group 66A abuts an inner circumferential surface of the cylindrical portion 71 while an inner circumferential surface of the semiconductor module group 66A abuts an outer circumferential surface of the capacitor module 68. With this arrangement, heat generated in the semiconductor modules 66 is transmitted to the end plate 63 via the casing 64, thereby being dissipated from the end plate 63.

The semiconductor module group 66A may have a spacer 69 arranged on the outer circumferential surface thereof, i.e., arranged radially between the semiconductor modules 66 and the cylindrical portion 71. In this case, the shape of a transverse cross section of the capacitor module 68 perpendicular to the axial direction is regular dodecagonal while the inner circumferential surface of the cylindrical portion 71 is circular in cross-sectional shape. Accordingly, the spacer 69 may have an inner circumferential surface constituted of flat surfaces and an outer circumferential surface constituted of a curved surface. Moreover, the spacer 69 may be formed as one piece so as to continuously extend in an annular shape on the radially outer side of the semiconductor module group 66A. The spacer 69 may be formed of a material having high heat conductivity, for example a metal such as aluminum, or a heat dissipation gel sheet. In addition, the inner circumferential surface of the cylindrical portion 71 may be modified to have the same regular dodecagonal cross-sectional shape as the capacitor module 68. In this case, each of the inner and outer circumferential surfaces of the spacer 69 would be constituted of flat surfaces.

Moreover, in the present embodiment, in the cylindrical portion 71 of the casing 64, there is formed a cooling water passage 74 through which cooling water flows. Consequently, heat generated in the semiconductor modules 66 can be dissipated to the cooling water flowing through the cooling water passage 74. That is, the casing 64 includes a water-cooling mechanism. As shown in FIGS. 3 and 4, the cooling water passage 74 is annular-shaped to surround the electrical components 62 (i.e., the semiconductor modules 66 and the capacitor module 68). More specifically, the semiconductor modules 66 are arranged along the inner circumferential surface of the cylindrical portion 71; the cooling water passage 74 is formed radially outside the semiconductor modules 66 so as to radially overlap them.

The cylindrical portion 71 has the stator 50 arranged on the radially outer side thereof and the electrical components 62 arranged on the radially inner side thereof. Therefore, both heat generated in the stator 50 and heat generated in the electrical components 62 (e.g., heat generated in the semiconductor modules 66) are transmitted to the cylindrical portion 71. Consequently, it is possible to cool both the stator 50 and the semiconductor modules 66 at the same time; thus it is possible to effectively dissipate heat generated by the heat-generating members in the rotating electric machine 10.

Moreover, at least part of the semiconductor modules 66, which constitute part or the whole of the inverter circuits for energizing the stator coil 51 and thereby driving the rotating electric machine, is arranged within a region surrounded by the stator core 52 that is located radially outside the cylindrical portion 71 of the casing 64. It is preferable that the whole of one of the semiconductor modules 66 is arranged within the region surrounded by the stator core 52. It is more preferable that the whole of each of the semiconductor modules 66 is arranged within the region surrounded by the stator core 52.

Moreover, at least part of the semiconductor modules 66 is arranged within a region surrounded by the cooling water passage 74. It is preferable that the whole of each of the semiconductor modules 66 is arranged within a region surrounded by a yoke 141.

The electrical components 62 include an insulating sheet 75 arranged on one axial end surface of the capacitor module 68 and a wiring module 76 arranged on the other axial end surface of the capacitor module 68. More specifically, the capacitor module 68 has two opposite axial end surfaces, i.e., a first axial end surface and a second axial end surface. The first axial end surface of the capacitor module 68, which is located closer to the bearing unit 20, faces the end surface 72 of the casing 64 and superposed on the end surface 72 with the insulating sheet 75 sandwiched therebetween. The second axial end surface of the capacitor module 68, which is located closer to the opening 65, has the wiring module 76 mounted thereon.

The wiring module 76 has a main body **76*a*, which is formed of a synthetic resin material into a discoid shape, and a plurality of busbars 76*b* and 76*c* embedded in the main body 76*a*. The wiring module 76 is electrically connected with the semiconductor modules 66 and the capacitor module 68 via the busbars 76*b* and 76*c*. More specifically, each of the semiconductor modules 66 has a connection pin 66*a* extending from an axial end surface thereof; the connection pin 66*a* is connected, on the radially outer side of the main body 76*a*, to one of the busbars 76*b*. On the other hand, the busbars 76*c* extend, on the radially outer side of the main body 76*a*, in the axial direction away from the capacitor module 68. To distal end portions of the busbars 76*c*, there are respectively connected wiring members 79 (see FIG. 2**).

As described above, the capacitor module 68 has the insulating sheet 75 arranged on the first axial end surface thereof and the wiring module 76 arranged on the second axial end surface thereof. With this arrangement, there are formed heat dissipation paths of the capacitor module 68 from the first and second axial end faces of the capacitor module 68 respectively to the end surface 72 and the cylindrical portion 71. That is, there are formed both a heat dissipation path from the first axial end surface of the capacitor module 68 to the end surface 72 and a heat dissipation path from the second axial end surface of the capacitor module 68 to the cylindrical portion 71. Consequently, it becomes possible to dissipate heat generated in the capacitor module 68 via the end surfaces thereof other than the outer circumferential surface on which the semiconductor modules 66 are arranged. That is, it becomes possible to dissipate heat generated in the capacitor module 68 not only in the radial direction but also in the axial direction.

Moreover, the capacitor module 68, which is hollow cylindrical in shape, has the rotating shaft 11 arranged on the radially inner side thereof with a predetermined gap formed therebetween. Consequently, heat generated in the capacitor module 68 can also be dissipated via the hollow space formed therein. In addition, with rotation of the rotating shaft 11, air flow is created in the gap, thereby improving the cooling performance.

To the wiring module 76, there is mounted a control substrate 67 which has a discoid shape. The control substrate 67 includes a Printed Circuit Board (PCB) which has a predetermined wiring pattern formed thereon. On the PCB, there is mounted a controller 77 which is constituted of various ICs and a microcomputer. The controller 77 corresponds to a control unit. The control substrate 67 is fixed to the wiring module 76 by fixtures such as screws. In a central part of the control substrate 67, there is formed an insertion hole **67*a* through which the rotating shaft 11** is inserted.

The wiring module 76 has a first surface and a second surface that are opposite to each other in the axial direction, i.e., opposite to each other in the thickness direction thereof. The first surface faces the capacitor module 68. The wiring module 76 has the control substrate 67 provided on the second surface thereof. The busbars **76*c* of the wiring module 76 are configured to extend from one surface of the control substrate 67 to the other surface of the control substrate 67. Moreover, in the control substrate 67, there may be formed cuts to prevent interference with the busbars 76*c*. For example, the control substrate 67 may have the cuts formed in an outer edge portion of the discoid control substrate 67**.

As described above, the electrical components 62 are received in the space surrounded by the casing 64. The housing 30, the rotor 40 and the stator 50 are arranged in layers outside the casing 64. With this arrangement, electromagnetic noise generated in the inverter circuits can be suitably shielded. More specifically, in the inverter circuits, switching control is performed on each of the semiconductor modules 66 by PWM control with a predetermined carrier frequency. Consequently, electromagnetic noise may be generated by the switching control. However, the electromagnetic noise would be suitably shielded by the housing 30, the rotor 40 and the stator 50 on the radially outer side of the electrical components 62.

Moreover, at least part of the semiconductor modules 66 is arranged within the region surrounded by the stator core 52 that is located radially outside the cylindrical portion 71 of the casing 64. With this arrangement, even if magnetic flux is generated by the semiconductor modules 66, the stator coil 51 would be less affected by the magnetic flux than in the case of the semiconductor modules 66 and the stator coil 51 being arranged without the stator core 52 interposed therebetween. Moreover, even if magnetic flux is generated by the stator coil 51, the semiconductor modules 66 would be less affected by the magnetic flux than in the aforementioned case. In addition, the above advantageous effects would be more remarkable when the whole of each of the semiconductor modules 66 is arranged in the region surrounded by the stator core 52 that is located radially outside the cylindrical portion 71 of the casing 64. Moreover, with at least part of the semiconductor modules 66 surrounded by the cooling water passage 74, it becomes difficult for heat generated in the stator coil 51 and/or the magnet unit 42 to be transmitted to the semiconductor modules 66.

In the cylindrical portion 71, there are formed through-holes 78 in the vicinity of the end plate 63. Through the through-holes 78, the wiring members 79 (see FIG. 2) are respectively inserted to electrically connect the stator 50 located outside the cylindrical portion 71 with the electrical components 62 located inside the cylindrical portion 71. As shown in FIG. 2, the wiring members 79 are respectively joined, for example by crimping or welding, to end portions of the stator coil 51 as well as to the busbars **76*c* of the wiring module 76. It is preferable that the wiring members 79 are implemented by, for example, busbars having joining surfaces crushed flat. The number of the through-holes 78** formed in the cylindrical portion 71 may be single or plural. In the present embodiment, two through-holes 78 are formed respectively at two different locations. Consequently, it becomes possible to easily perform wiring of coil terminals extending from the two three-phase coils. Therefore, the above formation of the through-holes 78 is suitable for making multi-phase electrical connection.

As described above, in the housing 30, as shown in FIG. 4, the rotor 40, the stator 50 and the inverter unit 60 are arranged in this order from the radially outer side to the radially inner side. More specifically, the rotor 40 and the stator 50 are arranged radially outward from the center of rotation of the rotor 40 by more than d×0.705, where d is the radius of the inner circumferential surface of the housing 30. With this arrangement, the area of a transverse cross section of a first region X1 becomes larger than the area of a transverse cross section of a second region X2. Here, the first region X1 denotes the region radially inside the inner circumferential surface of the stator 50 (i.e., the inner circumferential surface of the stator core 52) that is located radially inside the rotor 40; the second region X2 denotes the region radially extending from the inner circumferential surface of the stator 50 to the housing 30. Moreover, in a range where the magnet unit 42 of the rotor 40 and the stator coil 51 radially overlap each other, the volume of the first region X1 is larger than the volume of the second region X2.

In addition, the rotor 40 and the stator 50 together constitute a magnetic-circuit component assembly. Then, in the housing 30, the volume of the first region X1 radially inside the inner circumferential surface of the magnetic-circuit component assembly is larger than the volume of the second region X2 radially extending from the inner circumferential surface of the magnetic-circuit component assembly to the housing 30.

Next, the configurations of the rotor 40 and the stator 50 will be described in more detail.

There are known stators of rotating electric machines which are generally configured to include a stator core and a stator coil. The stator core is formed by laminating steel sheets into an annular shape. The stator core has a plurality of slots arranged in the circumferential direction. The stator coil is wound in the slots of the stator core. More specifically, the stator core has a plurality of teeth formed, at predetermined intervals, to radially extend from a yoke. Each of the slots is formed between one circumferentially-adjacent pair of the teeth. The stator coil is constituted of electrical conductors that are received in a plurality of radially-aligned layers in the slots of the stator core.

However, with the above structure of the known stators, during energization of the stator coil, with increase in the magnetomotive force of the stator coil, magnetic saturation may occur in the teeth of the stator core, causing the torque density of the rotating electric machine to be limited. More specifically, in the stator core, rotating magnetic flux, which is generated with energization of the stator coil, may concentrate on the teeth, causing the teeth to be magnetically saturated.

Moreover, there are known IPM (Interior Permanent Magnet) rotors of rotating electric machines which are generally configured to have permanent magnets arranged on the d-axis of the d-q coordinate system and a rotor core arranged on the q-axis of the d-q coordinate system. In this case, upon the stator coil in the vicinity of the d-axis being excited, exciting magnetic flux flows from the stator into the q-axis of the rotor according to Fleming's rule. Consequently, magnetic saturation may occur in a wide range in the q-axis core portions of the rotor.

Figure 7:
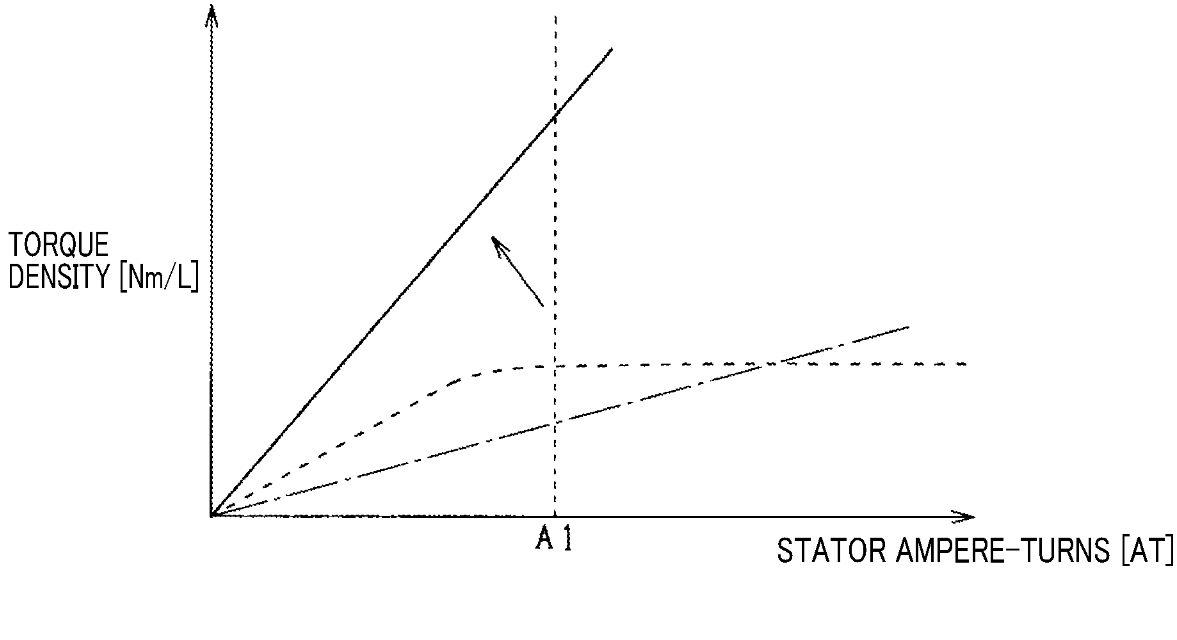
FIG. 7 is a torque diagram illustrating the relationship between the ampere-turns of a stator coil and torque density.

FIG. 7 is a torque diagram illustrating the relationship between the ampere-turns [AT], which represents the magnetomotive force of the stator coil, and the torque density [Nm/L]. A dashed line indicates characteristics of a conventional IPM rotor rotating electric machine. As shown in FIG. 7, in the conventional rotating electric machine, with increase in the magnetomotive force in the stator, magnetic saturation occurs at two locations, i.e., the teeth between the slots and the q-axis core portions, causing increase in the torque to be limited. Hence, in the conventional rotating electric machine, the design value of the ampere-turns is limited by A1.

In view of the above, in the present embodiment, to overcome the limitation due to the magnetic saturation, the following structures are employed in the rotating electric machine 10. Specifically, as a first measure, to eliminate magnetic saturation occurring in the teeth of the stator core in the stator, a slot-less structure is employed in the stator 50; moreover, to eliminate magnetic saturation occurring in the q-axis core portions of an IPM rotor, an SPM (Surface Permanent Magnet) rotor is employed. However, with the first measure, though it is possible to eliminate the above-described two locations where magnetic saturation occurs, torque may decrease in a low-electric current region (see the one-dot chain line in FIG. 7). Therefore, as a second measure, to enhance the magnetic flux of the SPM rotor and thereby suppress decrease in the torque, a polar anisotropic structure is employed in which magnet magnetic paths in the magnet unit 42 of the rotor 40 are lengthened to increase the magnetic force.

Moreover, as a third measure, to suppress decrease in the torque, a flat conductor structure is employed in which the radial thickness of the electrical conductors in the coil side part 53 of the stator coil 51 of the stator 50 is reduced. Here, with employment of the above-described polar anisotropic structure for increasing the magnetic force, higher eddy current may be generated in the stator coil 51 that faces the magnet unit 42. However, with the third measure, it is possible to suppress, by virtue of the radially-thin flat conductor structure, generation of radial eddy current in the stator coil 51. Consequently, with the above first to third structures, it becomes possible to considerably improve the torque characteristics with employment of the high-magnetic force magnets while suppressing generation of high eddy current due to the high-magnetic force magnets, as indicated a solid line in FIG. 7.

Furthermore, as a fourth measure, the magnet unit is employed in which magnetic flux density distribution approximate to a sine wave is realized using the polar anisotropic structure. Consequently, it becomes possible to improve the sine wave matching percentage with the later-described pulse control and thereby increase the torque while more effectively suppressing eddy current loss (i.e., copper loss due to eddy current) with gentler magnetic flux change than radial magnets.

Hereinafter, the sine wave matching percentage will be described. The sine wave matching percentage can be determined based on comparison between the actual waveform of the surface magnetic flux density distribution, which is measured by tracing the surfaces of the magnets using a magnetic flux probe, and a sine wave that has the same period and peak values as the actual waveform. Specifically, the sine wave matching percentage is defined as the ratio of the amplitude of the primary waveform, which is the fundamental wave of the rotating electric machine, to the amplitude of the actual waveform, i.e., the amplitude of the fundamental wave with harmonic components added thereto. With increase in the sine wave matching percentage, the waveform of the surface magnetic flux density distribution approximates the shape of the sine wave. Upon supply of electric current of the primary sine wave from an inverter to the rotating electric machine that includes the magnets with the improved sine wave matching percentage, high torque can be generated due to the waveform of the surface magnetic flux density distribution of the magnets approximate to the shape of the sine wave. In addition, instead of being actually measured, the surface magnetic flux density distribution may be estimated by, for example, an electromagnetic field analysis using Maxwell's equations.

Furthermore, as a fifth measure, the stator coil 51 is designed to have a wire conductor structure in which wires are bundled together. Consequently, with the wires connected in parallel with each other, it becomes possible to allow high electric current to flow through the electrical conductors. Moreover, since the cross-sectional area of each of the wires is small, it becomes possible to more effectively suppress, than the third measure of reducing the radial thickness of the electrical conductors, generation of eddy current in the electrical conductors that are expanded in the circumferential direction of the stator 50 due to the flat conductor structure. In addition, forming each of the electrical conductors by twisting the wires, with respect to the magnetomotive force of the electrical conductors, it becomes possible to cancel eddy currents, which are induced by magnetic flux generated according to the right-hand rule with respect to the electric current supply direction, by each other.

As above, by further taking the fourth and fifth measures, it becomes possible to employ the high-magnetic force magnets provided by the second measure while suppressing eddy current loss due to the high magnetic force and thereby increasing the torque.

Figure 8:
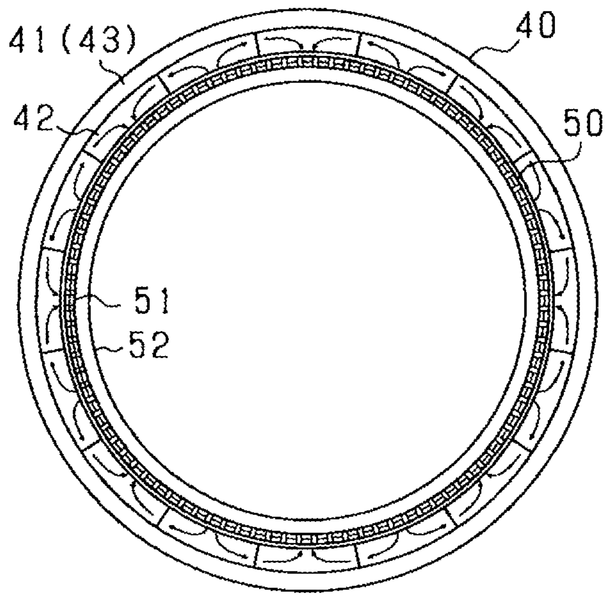
FIG. 8 is a transverse cross-sectional view of a rotor and a stator.
Figure 9:
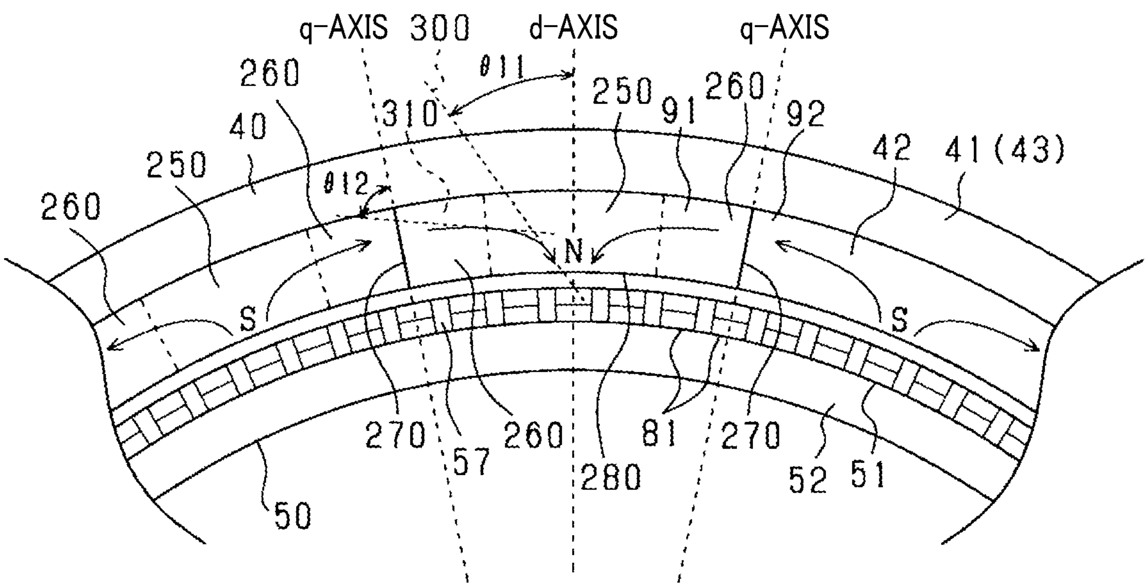
FIG. 9 is an enlarged view of part of FIG. 8.
Figure 10:
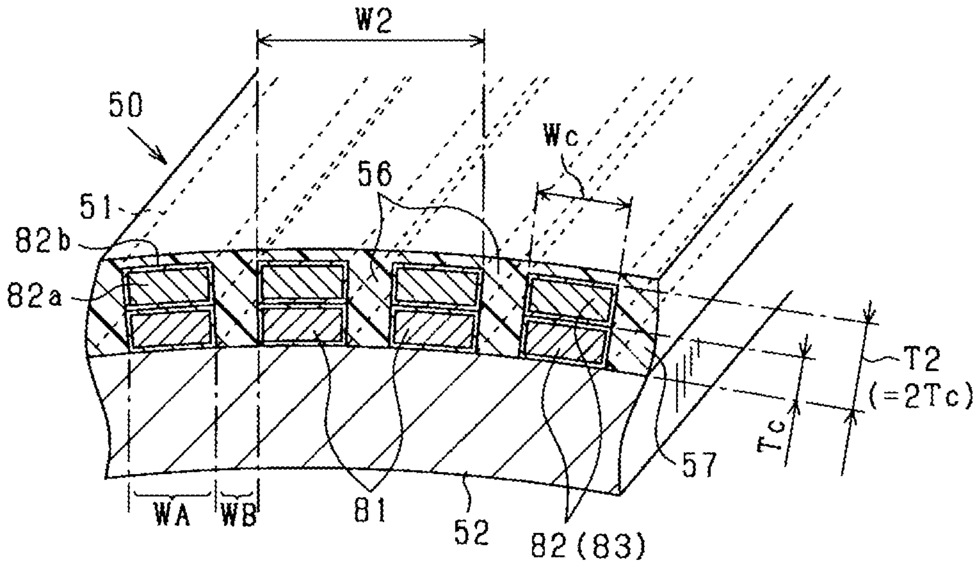
FIG. 10 is a transverse cross-sectional view of the stator.
Figure 11:
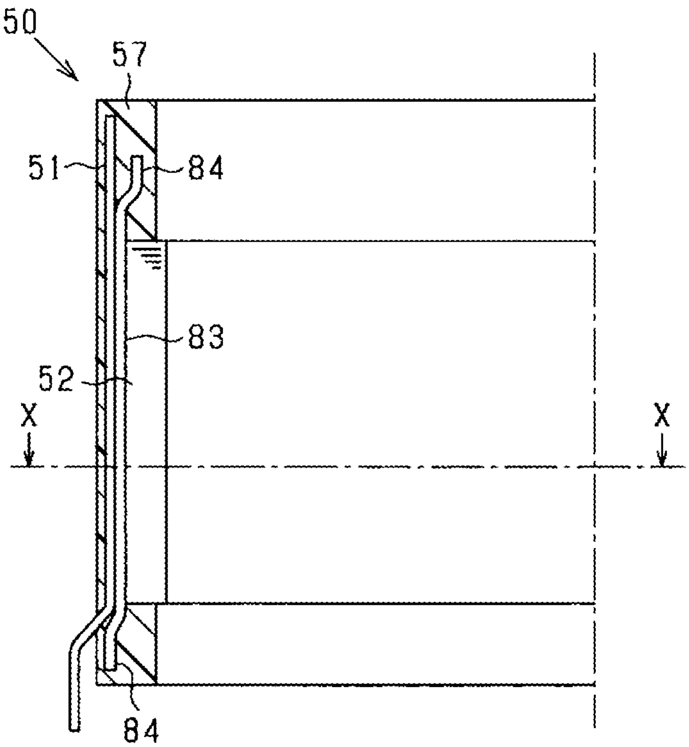
FIG. 11 is a longitudinal cross-sectional view of the stator.
Figure 12:
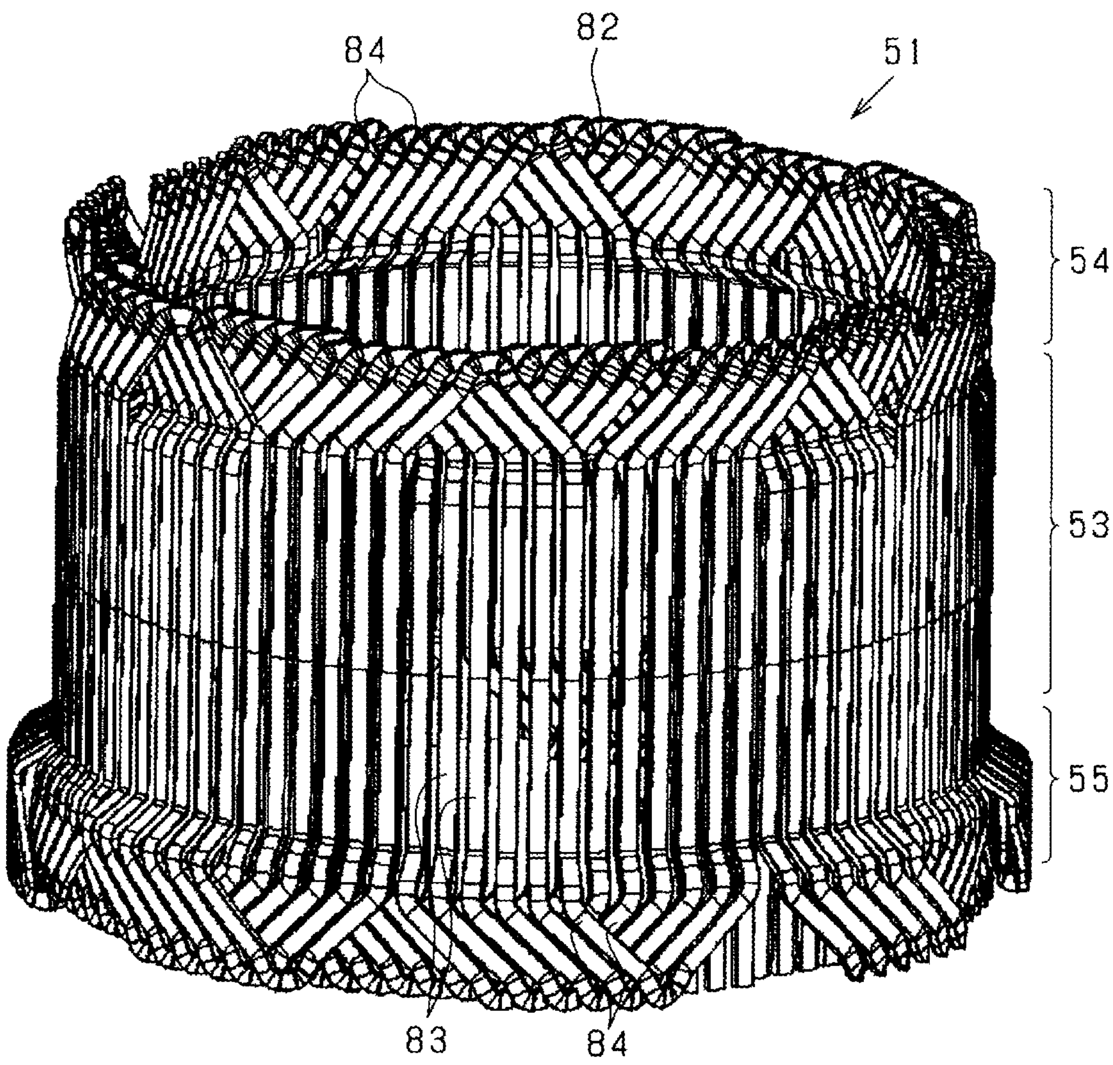
FIG. 12 is a perspective view of the stator coil.

Hereinafter, the slot-less structure of the stator 50, the flat conductor structure of the stator coil 51 and the polar anisotropic structure of the magnet unit 42 will be described in detail. First, the slot-less structure of the stator 50 and the flat conductor structure of the stator coil 51 will be described. FIG. 8 is a transverse cross-sectional view of both the rotor 40 and the stator 50. FIG. 9 is an enlarged view of part of the rotor 40 and the stator 50 shown in FIG. 8. FIG. 10 is a transverse cross-sectional view of the stator 50 which is taken along the line X-X in FIG. 11. FIG. 11 is a longitudinal cross-sectional view of the stator 50. FIG. 12 is a perspective view of the stator coil 51. In addition, in FIGS. 8 and 9, the magnetization directions of the magnets in the magnet unit 42 are indicated by arrows.

As shown in FIGS. 8-11, the stator core 52 is formed, by laminating a plurality of magnetic steel sheets in the axial direction, to have a hollow cylindrical shape with a predetermined radial thickness. The stator coil 51 is assembled to the radially outer periphery, i.e., the rotor 40-side periphery of the stator core 52. That is, the outer circumferential surface of the stator core 52 on the rotor 40 side constitutes an electrical conductor mounting part (or electrical conductor area). The outer circumferential surface of the stator core 52 is shaped as a smooth curved surface. A plurality of electrical conductor groups 81 are arranged on the outer circumferential surface of the stator core 52 at predetermined intervals in the circumferential direction. The stator core 52 functions as a back yoke to form part of a magnetic circuit for rotating the rotor 40. The stator 50 has a configuration (i.e., slot-less structure) such that between each circumferentially-adjacent pair of the electrical conductor groups 81, there is no tooth formed of a soft-magnetic material (i.e., no iron core). In the present embodiment, each of gaps 56 between the electrical conductor groups 81 is occupied by the resin material of a sealing member 57. That is, in the stator 50, inter-conductor members provided between the electrical conductor groups 81 in the circumferential direction are constituted of the sealing member 57 that is formed of a nonmagnetic material. Before the sealing by the sealing member 57, on the radially outer side of the stator core 52, the electrical conductor groups 81 are arranged at predetermined intervals in the circumferential direction with the gaps 56, which are inter-conductor regions, formed therebetween. Consequently, the stator 50 is constructed which has the slot-less structure. In other words, each of the electrical conductor groups 81 consists of two electrical conductors 82 as will be described later; the gap 56 formed between each circumferentially-adjacent pair of the electrical conductor groups 81 is occupied by only nonmagnetic materials. These nonmagnetic materials include, in addition to the resin material of the sealing member 57, nonmagnetic gas such as air and nonmagnetic liquid. In addition, the sealing member 57 will also be referred to as the inter-conductor member (or conductor-to-conductor member) hereinafter.

The configuration having teeth provided between electrical conductor groups 81 arranged in the circumferential direction is a configuration where: each of the teeth has a predetermined radial thickness and a predetermined circumferential width; and part of the magnetic circuit, i.e., magnet magnetic paths are formed between the electrical conductor groups 81. In contrast, the configuration having no teeth provided between the electrical conductor groups 81 is a configuration where the above magnetic circuit is not formed between the electrical conductor groups 81.

As shown in FIG. 10, the stator coil (or armature coil) 51 is formed to have a predetermined thickness T2 (hereinafter, to be also referred to as the first dimension) and a predetermined width W2 (hereinafter, to be also referred to as the second dimension). The thickness T2 is represented by the minimum distance between a radially outer side surface and a radially inner side surface of the stator coil 51. The width W2 is represented by the circumferential length of each part of the stator coil 51 which functions as one of the plurality of phases of the stator coil 51 (three phases in the embodiment: the three phases of U, V and W or the three phases of X, Y and Z). Specifically, in FIG. 10, one circumferentially-adjacent pair of the electrical conductor groups 81 functions as one of three phases, for example the U phase; the distance between two ends of the pair of the electrical conductor groups 81 in the circumferential direction represents the width W2. Moreover, the thickness T2 is set to be smaller than the width W2.

In addition, it is preferable that the thickness T2 is smaller than the sum of widths of two electrical conductor groups 81 present within the width W2. Moreover, in the case of the cross-sectional shape of the stator coil 51 (more specifically, the electrical conductors 82) being a perfect circle, ellipse or polygon, in a cross section of each of the electrical conductors 82 along the radial direction of the stator 50, the maximum radial length of the cross section may be designated by W12 and the maximum circumferential length of the cross section may be designated by W11.

As shown in FIGS. 10 and 11, the stator coil 51 is sealed by the sealing member 57 that is formed of a synthetic resin material that is a sealing material (or molding material). That is, the stator coil 51 is molded together with the stator core 52 by the molding material. In addition, a resin is a nonmagnetic material or an equivalent of a nonmagnetic material; thereof, the saturation flux density Bs of a resin can be regarded as being equal to zero, i.e., Bs=0.

As seen from the transverse cross-sectional view of FIG. 10, the gaps 56 between the electrical conductor groups 81 are filled with the synthetic resin material forming the sealing member 57. The sealing member 57 constitutes an electrically insulating member interposed between the electrical conductor groups 81. In other words, the sealing member 57 functions as an electrically insulating member in the gaps 56. The sealing member 57 is provided, on the radially outer side of the stator core 52, in a region encompassing all the electrical conductor groups 81, i.e., in a region whose radial thickness is larger than the radial thickness of the electrical conductor groups 81.

Moreover, as seen from the longitudinal cross-sectional view of FIG. 11, the sealing member 57 is provided in regions encompassing turn portions 84 of the stator coil 51. On the radially inner side of the stator coil 51, the sealing member 57 is provided in regions encompassing at least part of axially opposite end surfaces of the stator core 52. In this case, except for end portions of the phase windings, i.e., except for connection terminals connected with the inverter circuits, the stator coil 51 is substantially entirely resin-sealed.

With the sealing member 57 provided in the regions encompassing the end surfaces of the stator core 52, it is possible to press, by the sealing member 57, the laminated steel sheets of the stator core 52 axially inward. Consequently, with the sealing member 57, it is possible to maintain the laminated state of the steel sheets. In addition, in the present embodiment, the inner circumferential surface of the stator core 52 is not resin-sealed. As an alternative, the entire stator core 52 including the inner circumferential surface thereof may be resin-sealed.

In the case of the rotating electric machine 10 being used as a vehicular power source, it is preferable that the sealing member 57 is formed of a highly heat-resistant fluorocarbon resin, epoxy resin, PPS resin, PEEK resin, LCP resin, silicone resin, PAI resin or PI resin. In terms of suppressing occurrence of cracking due to a difference in coefficient of linear expansion, it is preferable that the sealing member 57 is formed of the same material as insulating coats of the electrical conductors of the stator coil 51. That is, it is preferable that silicone resins, whose coefficients of linear expansion are generally higher than twice those of other resins, are excluded from candidates for the material of the sealing member 57. Furthermore, in electrical products having no combustion engine, such as an electrical vehicle, a PPO resin, a phenol resin or an FRP resin, which have heat resistance of about 180° C., may be used as the material forming the sealing member 57. In addition, in fields where the ambient temperature of the rotating electric machine 10 is lower than 100° C., the material for forming the sealing member 57 is not limited to the aforementioned candidates.

The torque of the rotating electric machine 10 is proportional to the amplitude of magnetic flux. In the case of a stator core having teeth, the maximum amount of magnetic flux in the stator is limited depending on the saturation flux density at the teeth. In contrast, in the case of a stator core having no teeth, the maximum amount of magnetic flux in the stator is not limited. Therefore, the slot-less structure is advantageous in terms of increasing electric current supplied to the stator coil 51 and thereby increasing the torque of the rotating electric machine 10.

In the present embodiment, the inductance of the stator 50 is lowered by employing the toothless structure (or slot-less structure) in the stator 50. Specifically, the inductance of a stator of a conventional rotating electric machine, which has electrical conductors received in slots partitioned by teeth, is, for example, about 1 mH. In contrast, the inductance of the stator 50 according to the present embodiment is lowered to be 5-60 μH. Consequently, in the present embodiment, it becomes possible to lower the mechanical time constant Tm through the reduction in the inductance of the stator 50 while configuring the rotating electric machine 10 to have an outer rotor structure. That is, it becomes possible to achieve both increase in the torque and reduction in the mechanical constant Tm. In addition, the mechanical time constant Tm can be calculated by the following equation:

$$Tm=(J\times L)/(Kt\times Ke)$$

where J is the inertia, L is the inductance, Kt is the torque constant and Ke is the counterelectromotive force constant. From the above equation, it is clear that the mechanical time constant Tm decreases with decrease in the inductance L.

Each of the electrical conductor groups 81 on the radially outer side of the stator core 52 is comprised of a plurality of electrical conductors 82 that each have a flat rectangular cross section and are arranged in alignment with each other in a radial direction of the stator core 52. Moreover, each of the electrical conductors 82 is oriented so that in a transverse cross section thereof, (the radial dimension<the circumferential dimension). Consequently, each of the electrical conductor groups 81 becomes thinner in the radial direction. Meanwhile, the regions of the electrical conductors are expanded flat to those regions which would be conventionally occupied by teeth, thereby realizing a flat conductor region structure. Consequently, increase in the amount of heat generated by the electrical conductors, which would otherwise be caused by the reduction in the radial dimension and thus reduction in the cross-sectional area of each of the electrical conductors, is suppressed by suppressing reduction in the cross-sectional area of each of the electrical conductors through the increase in the circumferential dimension. In addition, with a configuration of arranging a plurality of electrical conductors in circumferential alignment with each other and connecting them in parallel with each other, though the cross-sectional area of each of the electrical conductors is reduced by an amount corresponding to the thickness of insulating coats of the electrical conductors, it is still possible to achieve the same effects as described above. It should be noted that hereinafter, each of the electrical conductor groups 81 and each of the electrical conductors 82 will also be referred to as "conductive member".

In the present embodiment, with the slot-less structure of the stator 50, it becomes possible to set the conductor regions occupied by the stator coil 51 to be greater than non-conductor regions not occupied by the stator coil 51 in each turn in the circumferential direction. In addition, in a conventional rotating electric machine for a vehicle, the ratio of the conductor regions to the non-conductor regions in each turn in the circumferential direction is generally lower than or equal to 1. In contrast, in the present embodiment, the electrical conductor groups 81 are configured to have the conductor regions equal to the non-conductor regions or greater than the non-conductor regions. Specifically, as shown in FIG. 10, the circumferential width WA of each of the conductor regions occupied by the electrical conductors 82 (or, straight portions 83 to be described later) is set to be larger than the circumferential width WB of each of the inter-conductor regions between the adjacent electrical conductors 82.

In the stator coil 51, the radial thickness of the electrical conductor groups 81 is set to be smaller than the circumferential width of the electrical conductor groups 81 per phase in each magnetic pole. More specifically, each of the electrical conductor groups 81 consists of two radially-stacked electrical conductors 82. In each region corresponding to one magnetic pole, there are provided two circumferentially-adjacent electrical conductor groups 81 per phase. Then, the following relationship is satisfied: $Tc \times 2 < Wc \times 2$, where Tc is the radial thickness of each of the electrical conductors 82 and Wc is the circumferential width of each of the electrical conductors 82. In addition, in an alternative configuration, each of the electrical conductor groups 81 consists of two radially-stacked electrical conductors 82; in each region corresponding to one magnetic pole, there is provided only one electrical conductor group 81 per phase. In this case, the following relationship is satisfied: $Tc \times 2 < Wc$. That is, in the stator coil 51, for the electrical conductor sections (i.e., electrical conductor groups 81) arranged at predetermined intervals in the circumferential direction, the radial thickness of each of the electrical conductor sections is set to be smaller than the circumferential width of one or more electrical conductor sections provided per phase in each region corresponding to one magnetic pole.

In other words, the radial thickness Tc of each of the electrical conductors 82 is preferably set to be smaller than the circumferential width We of each of the electrical conductors 82. Further, the radial thickness (i.e., 2Tc) of each of the electrical conductor groups 81, which consists of two radially-stacked electrical conductors 82, is preferably set to be smaller than the circumferential width We of each of the electrical conductor groups 81.

The torque of the rotating electric machine 10 is approximately in inverse proportion to the radial thickness of the electrical conductor groups 81. Therefore, the torque of the rotating electric machine 10 can be increased by reducing the radial thickness of the electrical conductor groups 81 on the radially outer side of the stator core 52. This is because with reduction in the radial thickness of the electrical conductor groups 81, the distance from the magnet unit 42 of the rotor 40 to the stator core 52 (i.e., the distance across a portion containing no iron) is shortened, thereby lowering the magnetic reluctance. Consequently, it is possible to increase the magnetic flux generated by the permanent magnets and crossing the stator core 52, thereby increasing the torque.

Moreover, with reduction in the radial thickness of the electrical conductor groups 81, it becomes easier for leakage magnetic flux from the electrical conductor groups 81 to be recovered by the stator core 52. Consequently, it becomes possible to suppress the magnetic flux from leaking outside without being effectively used for improvement of the torque. That is, it becomes possible to suppress the magnetic force from being lowered due to leakage of the magnetic flux and increase the magnetic flux generated by the permanent magnets and crossing the stator core 52, thereby increasing the torque.

Each of the electrical conductors 82 is implemented by a covered electrical conductor that includes a conductor body 82*a* and an insulating coat 82*b* covering the surface of the conductor body 82*a*. Therefore, electrical insulation is secured between each radially-stacked pair of the electrical conductors 82 and between the electrical conductors 82 and the stator core 52. As will be described later, the conductor body 82*a* is constituted of a bundle of wires 86. In the case of each of the wires 86 being a coated wire, the insulating coat 82*b* may be constituted of self-fusing coats of the wires 86. Otherwise, the insulating coat 82*b* may be constituted of an insulating member provided separately from the coats of the wires 86*b*. In addition, the electrical insulation of the phase windings formed of the electrical conductors 82 is secured, except for exposed portions of the phase windings for making electrical connection, by the insulating coats 82*b* of the electrical conductors 82. These exposed portions of the phase windings include, for example, input/output terminal portions, and neutral terminal portions when the phase windings are star-connected. In each of the electrical conductor groups 81, the radially-adjacent electrical conductors 82 are fixed to each other by the self-fused insulating coats of the electrical conductors and/or an insulating resin applied separately from the insulating coats. Consequently, it is possible to prevent electrical breakdown from occurring due to the electrical conductors 82 rubbing against each other and to suppress vibration and noise.

Figure 13:
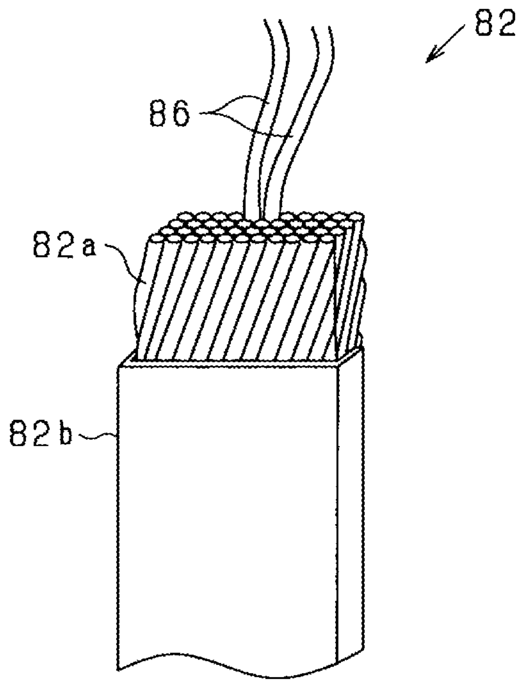
FIG. 13 is a perspective view illustrating the configuration of an electrical conductor.
Figure 14:
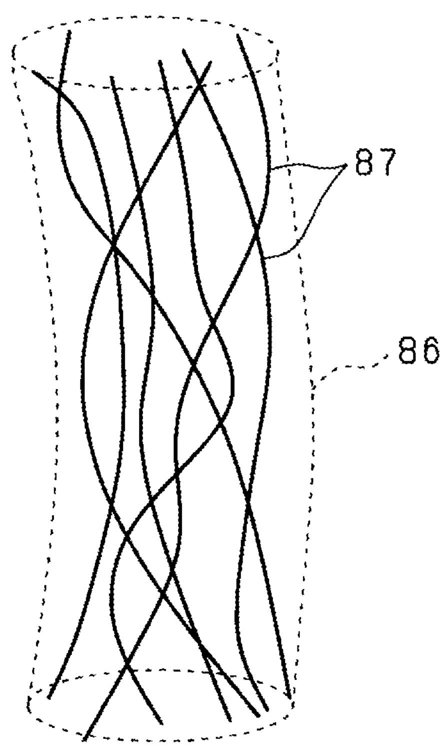
FIG. 14 is a schematic diagram illustrating the configuration of a wire.

In the present embodiment, the conductor body 82*a* of each of the electrical conductors 82 is constituted of a bundle of wires 86. Specifically, as shown in FIG. 13, the conductor body 82*a* is formed, by twisting the wires 86, into the shape of a twine. Moreover, as shown in FIG. 14, each of the wires 86 is constituted of a bundle of electrically conductive fibers 87. The fibers 87 are implemented by, for example, CNT (carbon nanotube) fibers. The CNT fibers are micro fibers which are obtained by substituting at least part of carbon with boron. The fibers 87 may alternatively be implemented by other carbon micro fibers, such as Vapor Grown Carbon Fibers (VGCF). However, it is preferable for the fibers 87 to be implemented by CNT fibers. In addition, the surface of each of the wires 86 is covered with an electrically-insulative polymer coat, such as an enamel coat. Moreover, it is preferable that the surface of each of the wires 86 is covered with an enamel coat, such as a polyimide coat or an amide-imide coat.

The electrical conductors 82 together form windings of n phases in the stator coil 51. In each of the electrical conductors 82 (more specifically, each of the conductor bodies 82*a*), all the wires 86 are adjacent to and in contact with one another. Moreover, in each of the electrical conductors 82, there is at least one place per phase where the wires 86 are twisted together. The electrical resistances between the twisted wires 86 are higher than the electrical resistance of each of the wires 86. Specifically, for each adjacent pair of the wires 86, a first electrical resistivity in the direction in which the wires 86 adjoin each other is higher than a second electrical resistivity in the longitudinal direction of each of the wires 86. In addition, each of the electrical conductors 82 may be constituted of a wire bundle in which the wires 86 are covered with an insulating member having extremely high first electrical resistivity. Moreover, the conductor body 82*a* of each of the electrical conductors 82 is constituted of the wires 86 that are twisted together.

Since the conductor body 82*a* is constituted of the wires 86 that are twisted together, it becomes possible to suppress generation of eddy current in each of the wires 86, thereby reducing eddy current in the conductor body 82*a*. Moreover, each of the wires 86 is twisted to have portions where the magnetic field application directions are opposite to each other; therefore, the counterelectromotive forces generated in these portions are canceled by each other. Consequently, it becomes possible to achieve further reduction in the eddy current. In particular, since each of the wires 86 is constituted of the electrically conductive fibers 87, it becomes possible to make each element of the wire 86 extremely thin and considerably increase the number of twists in the wire 86, thereby more effectively reducing the eddy current.

In addition, the method of insulating between the wires 86 is not limited to employment of the above electrically-insulative polymer coat. As an alternative, it may be possible to make it difficult for electric current to flow between the wires 86 by increasing the contact resistance therebetween. That is, when the resistance between the twisted wires 86 is higher than the resistance of each of the wires 86, it is possible to achieve the above effect by virtue of the electric potential difference caused by the resistance difference. For example, the contact resistance between the wires 86 may be preferably increased by: arranging the manufacturing equipment for manufacturing the wires 86 and the manufacturing equipment for manufacturing the stator 50 (or armature) of the rotating electric machine 10 to be separate from each other; and having the wires 86 oxidized during the delivery time and operation intervals.

As described above, the electrical conductors 82 each have a flat rectangular cross section and are arranged in radial alignment with each other. The shape of each of the electrical conductors 82 is maintained by: covering the surface of each of the wires 86 forming the electrical conductor 82 with a self-fusing insulating layer; and having the self-fusing insulating layers of the wires 86 fused. As an alternative, the shape of each of the electrical conductors 82 may be maintained by: twisting together the wires 86 with or without self-fusing insulating layers respectively covering the surfaces thereof; and fixing the twisted wires 86 together in a desired shape using a synthetic resin. The thickness of the insulating coat 82*b* of each of the electrical conductors 82 may be set to be, for example, 80-100 μm and thus larger than the thicknesses of insulating coats of generally-used electrical conductors which are 5-40 μm. In this case, it is possible to ensure electrical insulation between the electrical conductors 82 and the stator core 52 without interposing insulating paper therebetween.

It is preferable for the insulating coats 82*b* of the electrical conductors 82 to be configured to have higher insulating performance than the insulating layers of the wires 86 and to be capable of making inter-phase insulation. For example, in the case of the polymer insulating layers of the wires 86 having a thickness of, for example, about 5 μm, it is preferable for the insulating coats 82*b* of the electrical conductors 82 to have a thickness of 80-100 μm, thereby securing suitable inter-phase insulation.

Moreover, each of the electrical conductors 82 may be constituted of a bundle of wires 86 that are bundled together without being twisted. That is, each of the electrical conductors 82 may have any one of a configuration where the wires 86 are twisted over the entire length of the electrical conductor 82, a configuration where the wires 86 are twisted for only part of the entire length of the electrical conductor 82 and a configuration where the wires 86 are bundled together without being twisted over the entire length of the electrical conductor 82. To sum up, each of the electrical conductors 82 forming the electrical conductor sections is constituted of a wire bundle where a plurality of wires 86 are bundled together and the electrical resistances between the bundled wires 86 are higher than the electrical resistance of each of the wires 86.

The electrical conductors 82 are bent so as to be arranged in a predetermined pattern in the circumferential direction of the stator coil 51. Consequently, each phase winding of the stator coil 51 is formed. As shown in FIG. 12, straight portions 83 of the electrical conductors 82, each of which extends straight in the axial direction, together constitute the coil side part 53 of the stator coil 51; turn portions 84 of the electrical conductors 82, each of which protrudes from the coil side part 53 toward one side in the axial direction, together constitute the coil end 54 of the stator coil 51; turn portions 84 of the electrical conductors 82, each of which protrudes from the coil side part 53 toward the other side in the axial direction, together constitute the coil end 55 of the stator coil 51. Each of the electrical conductors 82 is configured as a wave-wound continuous electrical conductor where the straight portions 83 are formed alternately with the turn portions. The straight portions 83 of the electrical conductors 82 are located to radially face the magnet unit 42. Each pair of the straight portions 83, which belong to the same phase and are spaced at a predetermined interval in the circumferential direction, are connected with each other by one of the turn portions 84 on an axially outer side of the magnet unit 42. In addition, the straight portions 83 correspond to "magnet facing portions".

In the present embodiment, the stator coil 51 is wound in a distributed winding manner into an annular shape. In the coil side part 53 of the stator coil 51, for each phase, the straight portions 83 of each of the electrical conductors 82 belonging to the phase are arranged in the circumferential direction at intervals corresponding to one pole pair of the magnet unit 42. In the coil ends 54 and 55 of the stator coil 51, for each phase, the straight portions 83 of each of the electrical conductors 82 belonging to the phase are connected with one another by the substantially V-shaped turn portions 84 of the electrical conductor 82. For each pair of the straight portions 83 corresponding to one pole pair, the directions of electric currents respectively flowing in the straight portions 83 of the pair are opposite to each other. Moreover, those pairs of the straight portions 83 which are connected by the respective turn portions 84 in the coil end 54 are different from those pairs of the straight portions 83 which are connected by the respective turn portions 84 in the coil end 55. The connection of the straight portions 83 by the turn portions 84 in the coil ends 54 and 55 is repeated in the circumferential direction, forming the stator coil 51 into the substantially hollow cylindrical shape.

More specifically, each phase winding of the stator coil 51 is formed of two pairs of the electrical conductors 82. The first three-phase coil (U, V and W phases) and the second three-phase coil (X, Y and Z phases), which together constitute the stator coil 51, are provided in two radial layers. Let S be the number of phases of the stator coil 51 (i.e., 6 in the embodiment), and let m be the number of the electrical conductors 82 per phase. Then, the number of the electrical conductors 82 per pole pair is equal to 2×S×m=2 Sm. In the present embodiment, S is equal to 6, m is equal to 4, and the rotating electric machine has 8 pole pairs (or 16 poles). Accordingly, the total number of the electrical conductors 82 arranged in the circumferential direction of the stator core 52 is equal to 6×4×8=192.

As shown in FIG. 12, in the coil side part 53 of the stator coil 51, the straight portions 83 of the electrical conductors 82 are stacked in two radially-adjacent layers. In the coil ends 54 and 55 of the stator coil 51, for each radially-stacked pair of the straight portions 83 of the electrical conductors 82, those two turn portions 84 of the electrical conductors 82 which are respectively connected with the pair of the straight portions 83 extend respectively toward opposite sides in the circumferential direction. That is, for each radially-adjacent pair of the electrical conductors 82, the orientations of the turn portions 84 of one of the pair of the electrical conductors 82 are opposite to those of the turn portions 84 of the other of the pair of the electrical conductors 82 except for end portions of the stator coil 51.

Figure 15A:
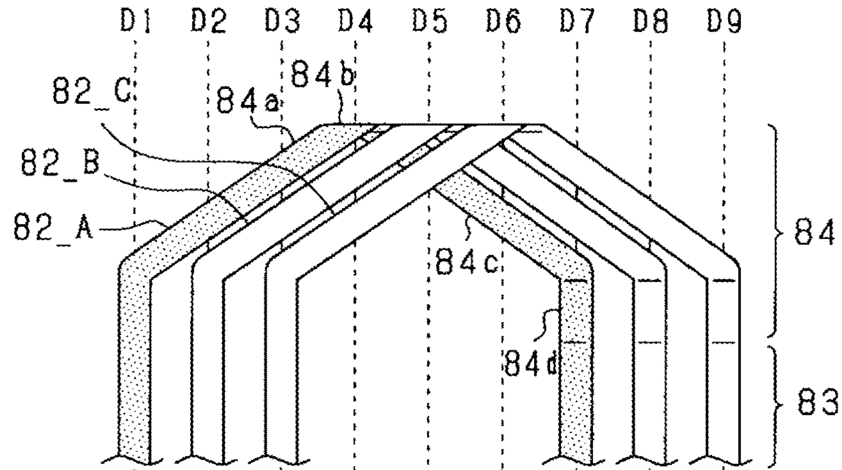
FIGS. 15(*a*) and 15(*b*) are diagrams illustrating the layout of electrical conductors at the nth layer.
Figure 15B:
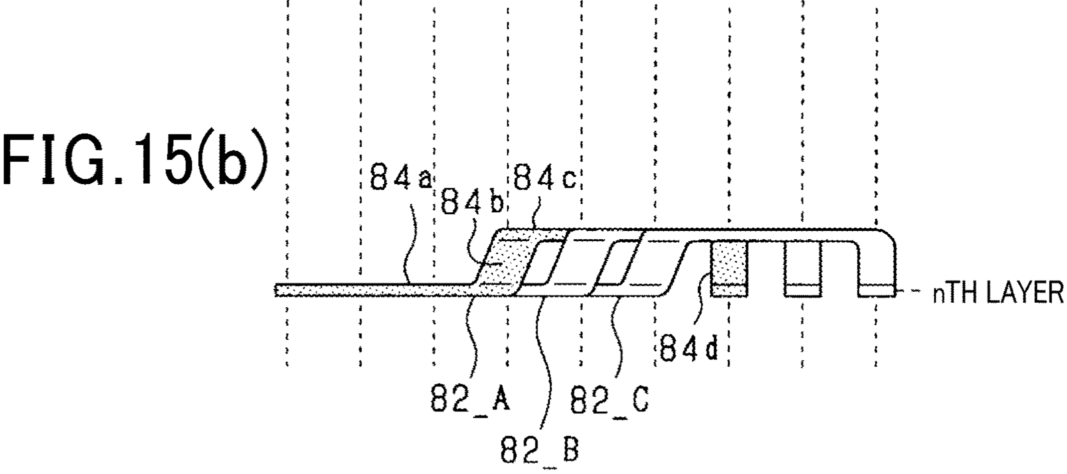

Hereinafter, the winding structure of the electrical conductors 82 forming the stator coil 51 will be described in more detail. In the present embodiment, the wave-shaped electrical conductors 82 are arranged in a plurality (e.g., two) of radially-adjacent layers. FIGS. 15(*a*) and 15(*b*) together illustrate the layout of the electrical conductors 82 at the nth layer. Specifically, FIG. 15(*a*) shows the shapes of the electrical conductors 82 viewed from the radially outer side of the stator coil 51. FIG. 15(*b*) shows the shapes of the electrical conductors 82 viewed from one axial side of the stator coil 51. In FIGS. 15(*a*) and 15(*b*), the positions at which the electrical conductor groups 81 are arranged are respectively designated by D1, D2, D3, . . . , and D9. Moreover, for the sake of convenience of explanation, there are illustrated only three electrical conductors 82, i.e., a first electrical conductor 82_A, a second electrical conductor 82_B and a third electrical conductor 82_C.

In each of the electrical conductors 82_A to 82_C, all the straight portions 83 are located at the nth layer, i.e., located at the same radial position. Each pair of the straight portions 83, which are circumferentially apart from each other by six positions (corresponding to 3×m pairs), is connected by one of the turn portions 84. More specifically, in each of the electrical conductors 82_A to 82_C, all of the seven straight portions 83 are arranged, on the same circle centering on the axis of the rotor 40, to be adjacent to one another in the circumferential direction of the stator coil 51. Moreover, each pair of ends of the straight portions 83 are connected by one of the turn portions 84. For example, in the first electrical conductor 82_A, two straight portions 83, which are arranged respectively at the positions D1 and D7, are connected by one turn portion 84 that has an inverted V-shape. The second electrical conductor 82_B is circumferentially offset from the first electrical conductor 82_A by one position at the same nth layer. The third electrical conductor 82_C is circumferentially offset from the second electrical conductor 82_B by one position at the same nth layer. In this case, since all the electrical conductors 82_A to 82_C are arranged at the same layer, the turn portions 84 of these electrical conductors may interfere with one another. Therefore, in the present embodiment, each of the turn portions 84 of the electrical conductors 82_A to 82_C has part thereof radially offset to form an interference prevention part.

Specifically, each of the turn portions 84 of the electrical conductors 82_A to 82_C is configured to include an oblique part 84*a*, an apex part 84*b*, an oblique part 84*c* and a return part 84*d*. The oblique part 84*a* circumferentially extends on the same circle (first circle). The apex part 84*b* extends from the oblique part 84*a* radially inward (i.e., upward in FIG. 15(*b*)) of the first circle to reach another circle (second circle). The oblique part 84*c* circumferentially extends on the second circle. The return part 84*d* returns from the second circle to the first circle. The apex part 84*b*, the oblique part 84*c* and the return part 84*d* together correspond to the interference prevention part. In addition, each of the turn portions 84 may alternatively be configured to have the oblique part 84*c* offset from the oblique part 84*a* radially outward.

That is, in each of the turn portions 84 of the electrical conductors 82_A to 82_C, the oblique part 84*a* and the oblique part 84*c* are located respectively on opposite sides of the apex part 84*b* that is circumferential centered in the turn portion 84. Moreover, the oblique part 84*a* and the oblique part 84*c* are different from each other in radial position (i.e., position in the direction perpendicular to the paper surface of FIG. 15(*a*); position in the vertical direction in FIG. 15(*b*)). For example, the turn portion 84 of the first electrical conductor 82_A first extends in the circumferential direction from the position D1 at the nth layer which is the start position, then is bent radially (e.g., radially inward) at the apex part 84*b* that is circumferentially centered in the turn portion 84, then is further bent circumferentially to extend again in the circumferential direction, and thereafter is bent radially (e.g., radially outward) at the return part 84*d* to reach to the position D7 at the nth layer which is the end position.

With the above configuration, the oblique parts 84*a* of the electrical conductors 82_A to 82_C are arranged from the upper side in the vertical direction in the order of the first electrical conductor 82_A, the second electrical conductor 82_B and the third electrical conductor 82_C. The arrangement order of the electrical conductors 82_A to 82_C is inverted at the apex parts 84*b* so that the oblique parts 84*c* of the electrical conductors 82_A to 82_C are arranged from the upper side in the vertical direction in the order of the third electrical conductor 82_C, the second electrical conductor 82_B and the first electrical conductor 82_A. Consequently, it becomes possible to arrange the electrical conductors 82_A to 82_C in the circumferential direction without causing interference therebetween.

Moreover, each of the electrical conductor groups 81 consists of a plurality of radially-stacked electrical conductors 82. For each of the electrical conductor groups 81, the turn portions 84 of the electrical conductors 82 of the group may be arranged more radially apart from each other than the straight portions 83 of the electrical conductors 82 are. Furthermore, in the case of the electrical conductors 82 of the same group being bent to the same radial side at the boundaries between the straight portions 83 and the turn portions 84, it is necessary to prevent electrical insulation from being degraded due to interference between the radially-adjacent electrical conductors 82.

Figure 16:
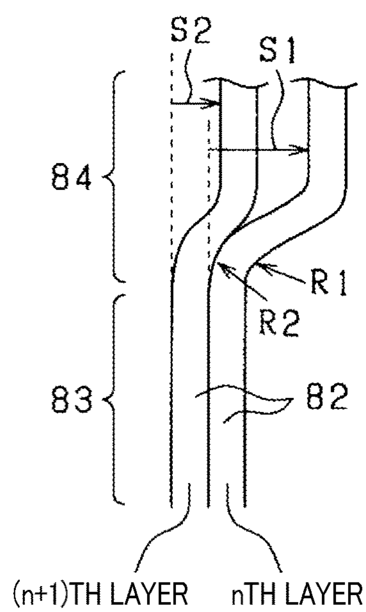
FIG. 16 is a side view illustrating electrical conductors at the nth layer and the (n+1)th layer.

For example, at the positions D7-D9 in FIGS. 15(*a*) and 15(*b*), the radially-stacked electrical conductors 82 are bent radially at the return parts 84*d* of the respective turn portions 84 thereof. In this case, as shown in FIG. 16, the radius of curvature of the bend of the nth-layer electrical conductor 82 may be set to be different from the radius of curvature of the bend of the (n+1)th-layer electrical conductor 82. More specifically, the radius of curvature R1 of the radially inner (i.e., the nth layer) electrical conductor 82 may be set to be smaller than the radius of curvature R2 of the radially outer (i.e., the (n+1)th layer) electrical conductor 82.

Moreover, the amount of radial shift of the nth-layer electrical conductor 82 may be set to be different from the amount of radial shift of the (n+1)th-layer electrical conductor 82. More specifically, the amount of radial shift 51 of the radially inner (i.e., the nth layer) electrical conductor 82 may be set to be larger than the amount of radial shift S2 of the radially outer (i.e., the (n+1)th layer) electrical conductor 82.

With the above configuration, even with the radially-stacked electrical conductors 82 bent in the same direction, it is still possible to reliably prevent interference between the electrical conductors 82. Consequently, it is possible to ensure high insulation properties.

Next, the structure of the magnet unit 42 of the rotor 40 will be described in detail. In the present embodiment, the magnet unit 42 is constituted of permanent magnets whose residual flux density Br is higher than or equal to 1.0 [T] and intrinsic coercive force Hcj is higher than or equal to 400

[kA/m]. More particularly, in the present embodiment, the permanent magnets are implemented by sintered magnets that are obtained by shaping and solidifying a granular magnetic material by sintering. The intrinsic coercive force Hcj of the permanent magnets on the J-H curve is higher than or equal to 400 [kA/m], and the residual flux density Br of the permanent magnets is higher than or equal to 1.0 [T]. When 5000-10000 [AT] is applied by interphase excitation, if the magnetic length of one pole pair, i.e., the magnetic length of one N pole and one S pole, in other words, the length of a magnetic flux flow path extending between one pair of N and S poles through the inside of the employed permanent magnets is equal to 25 [mm], Hcj is equal to 10000 [A] and thus the permanent magnets are not demagnetized.

In other words, the magnet unit 42 is configured so that: the saturation flux density Js is higher than or equal to 1.2 [T]; the grain size is smaller than or equal to 10 [μm]; and $Js\times\alpha$ is higher than or equal to 1.0 [T], where a is the orientation ratio.

Hereinafter, supplemental explanation will be given of the magnet unit 42. The magnet unit 42 (i.e., magnets) is characterized in that 2.15 $[T]\geq Js\geq 1.2$ [T]. In other words, as the magnets of the magnet unit 42, NdFe11TiN magnets, Nd2Fe14B magnets, Sm2Fe17N3 magnets or L10-type FeNi magnets may be employed. In addition, SmCo5 magnets which are generally called samarium-cobalt magnets, FePt magnets, Dy2Fe14B magnets and CoPt magnets cannot be employed as the magnets of the magnet unit 42. On the other hand, magnets, which are formed of the same-type compounds, such as Dy2Fe14B and Nd2Fe14B, to have the high coercive force of dysprosium that is a heavy rare-earth element while only slightly losing the high Js characteristics of neodymium, may satisfy 2.15 $[T]\geq Js\geq 1.2$ [T]. In this case, these magnets may be employed as the magnets of the magnet unit 42. In addition, these magnets may be referred to, for example, as [Nd1−xDyx]2Fe14B magnets. Furthermore, the magnets of the magnet unit 42 may be formed of two or more types of materials having different compositions, such as FeNi plus Sm2Fe17N3. For example, magnets, which are formed by adding a small amount of Dy2Fe14B whose Js is lower than 1 [T] to Nd2Fe14B whose Js is equal to 1.6 [T] to improve the coercive force, may be employed as the magnets of the magnet unit 42.

Moreover, in the case of the rotating electric machine being operated at a temperature outside the temperature range of human activities, such as a temperature higher than or equal to 60° C. exceeding the temperature of a desert, or being used as an electric motor in a vehicle where the temperature reaches 80° C. in summer, it is preferable for the magnets of the magnet unit 42 to contain a component having a low temperature coefficient, such as FeNi or Sm2Fe17N3. This is because when the rotating electric machine is operated in a temperature range from about −40° C. (within the temperature range of human activities in Northern Europe) to 60° C. or higher (exceeding the temperature of a desert) or to the heatproof temperature of coil enamel coats (e.g., 180-240° C.), the motor characteristics of the rotating electric machine in the motor operation depend greatly on the temperature coefficient of the magnets of the magnet unit 42; consequently, it becomes difficult to ensure optimal control with the same motor driver. The temperature coefficients of L10-type FeNi and Sm2Fe17N3 are lower than half the temperature coefficient of Nd2Fe14B. Therefore, forming the magnets of the magnet unit 42 with L10-type FeNi or Sm2Fe17N3, it is possible to effectively reduce the burden on the motor driver.

The magnet unit 42 is also characterized in that the grain size in a fine powder state before orientation is smaller than or equal to 10 μm and larger than or equal to the single-domain grain size. In general, the coercive force of magnets can be increased by reducing the size of the grains of the powder to the order of several hundred nanometers. Therefore, in recent years, powders have been used whose grains are reduced in size as small as possible. However, if the grain size was too small, the BH product of the magnets would be lowered due to, for example, oxidization. Therefore, it is preferable that the grain size is larger than or equal to the single-domain grain size. That is, to increase the coercive force, the grains of the powder may be reduced in size preferably to the extent that the grain size is not smaller than the single-domain grain size. In addition, the term "grain size" used hereinafter denotes the grain size in a fine powder state in an orientation step of the magnet manufacturing process.

Furthermore, each of first magnets 91 and second magnets 92 of the magnet unit 42 is implemented by a sintered magnet that is formed by sintering, i.e., heating and consolidating magnetic powder. The sintering is performed so as to satisfy the conditions that: the saturation magnetization Js of the magnet unit 42 is higher than or equal to 1.2 T; the grain size of the first and second magnets 91 and 92 is smaller than or equal to 10 μm; and $Js\times\alpha$ is higher than or equal to 1.0 T (Tesla), where $\alpha$ is the orientation ratio. Moreover, each of the first and second magnets 91 and 92 is sintered so as to satisfy the following conditions as well. In the orientation step of the magnet manufacturing process, orientation is performed on the first and second magnets 91 and 92. Consequently, the first and second magnets 91 and 92 have the orientation ratio unlike the magnetic force direction defined by a magnetization step for isotropic magnets. In the present embodiment, the orientation ratio of the first and second magnets 91 and 92 is set to be so high as to satisfy $Jr\geq Js\times\alpha\geq 1.0$ [T] with the saturation magnetization Js of the magnet unit 42 being higher than or equal to 1.2 [T]. For example, in the case of each of the first and second magnets 91 and 92 having six easy axes of magnetization, if five of the six easy axes are oriented in the same direction A10 and the remaining one is oriented in a direction B10 that is inclined by 90 degrees to the direction A10, then $\alpha=5/6$. Otherwise, if the remaining easy axis is oriented in a direction B10 that is inclined by 45 degrees to the direction A10, then the component of the remaining easy axis in the direction A10 is equal to cos 45°=0.707 and thus $\alpha=(5+0.707)/6$. As described previously, in the present embodiment, the first and second magnets 91 and 92 are formed by sintering. However, provided that the above conditions are satisfied, the first and second magnets 91 and 92 may alternatively be formed by other methods, such as a method of forming MQ3 magnets.

In the present embodiment, permanent magnets are employed whose easy axes of magnetization are controlled by orientation. Consequently, it becomes possible to increase the magnetic circuit length inside the magnets in comparison with the magnetic circuit length inside conventional linearly-oriented magnets of 1.0 [T] or higher. That is, it becomes possible to achieve the same magnetic circuit length per pole pair with a smaller volume of the magnets in comparison with conventional linearly-oriented magnets. Moreover, even if the permanent magnets are subjected to a severe high-temperature condition, it is still possible to maintain the reversible demagnetization range. Furthermore, the inventor of the present application has found a configuration with which it is possible to realize characteristics approximate to those of polar anisotropic magnets using conventional magnets.

In addition, an easy axis of magnetization denotes a crystal orientation in a magnet along which it is easy for the magnet to be magnetized. The orientation of easy axes of magnetization in a magnet is represented by the direction in which the orientation ratio is higher than or equal to 50%; the orientation ratio indicates the degree of alignment of the easy axes of magnetization. Otherwise, the orientation of easy axes of magnetization in a magnet is the direction which represents the average orientation of the magnet.

As shown in FIGS. 8 and 9, the magnet unit 42 is annular-shaped and arranged on the inner side of the magnet holder 41 (more specifically, on the radially inner side of the cylindrical portion 43). The magnet unit 42 is constituted of the first and second magnets 91 and 92 each of which is a polar anisotropic magnet. The polarity of the first magnets 91 is different from the polarity of the second magnets 92. The first magnets 91 are arranged alternately with the second magnets 92 in the circumferential direction. The first magnets 91 form N poles in the vicinity of the stator coil 51 while the second magnets 92 form S poles in the vicinity of the stator coil 51. The first and second magnets 91 and 92 are permanent magnets constituted of rare-earth magnets such as neodymium magnets.

As shown in FIG. 9, in each of the first and second magnets 91 and 92, the magnetization direction extends in an arc shape between the d-axis (i.e., direct-axis) and the q-axis (i.e., quadrature-axis) in the well-known d-q coordinate system. The d-axis represents the center of the magnetic pole while the q-axis represents the boundary between one pair of N and S poles (in other words, the magnetic flux density is 0 T on the q-axis). Moreover, in each of the first and second magnets 91 and 92, on the d-axis, the magnetization direction becomes coincident with a radial direction of the annular magnet unit 42; on the q-axis, the magnetization direction becomes coincident with the circumferential direction of the annular magnet unit 42. More specifically, as shown in FIG. 9, each of the first and second magnets 91 and 92 is configured to have a first part 250 and two second parts 260 located respectively on opposite sides of the first part 250 in the circumferential direction of the magnet unit 42. That is, the first portion 250 is located closer than the second parts 260 to the d-axis; the second portions 260 are located closer than the first part 250 to the q-axis. The magnet unit 42 is configured so that the direction of the easy axis of magnetization 300 of the first part 250 is more parallel than the direction of the easy axis of magnetization 310 of each of the second parts 260 to the d-axis. In other words, the magnet unit 42 is configured so that the angle θ11 between the d-axis and the easy axis of magnetization 300 of the first part 250 is smaller than the angle θ12 between the q-axis and the easy axis of magnetization 310 of each of the second parts 260.

More specifically, the angle θ11 is the angle between the d-axis and the easy axis of magnetization 300 with the direction from the stator 50 (or armature) toward the magnet unit 42 along the d-axis being defined as positive. The angle θ12 is the angle between the q-axis and the easy axis of magnetization 310 with the direction from the stator 50 toward the magnet unit 42 along the q-axis being defined as positive. In the present embodiment, both the angle θ11 and the angle θ12 are smaller than 90°. Here, each of the easy axes of magnetization 300 and 310 is defined as follows. In each of the parts of the magnets 91 and 92, in the case of one easy axis of magnetization being oriented in the direction A11 and another easy axis of magnetization being oriented in the direction B11, the absolute value of the cosine of an angle θ between the direction A11 and the direction B11 (i.e., |cos θ|) is defined as the easy axis of magnetization 300 or 310.

That is, in each of the first and second magnets 91 and 92, the direction of the easy axis of magnetization on the d-axis side (or in the d-axis-side part) is different from the direction of the easy axis of magnetization on the q-axis side (or in the q-axis-side parts). On the d-axis side, the direction of the easy axis of magnetization is close to a direction parallel to the d-axis. In contrast, on the q-axis side, the direction of the easy axis of magnetization is close to a direction perpendicular to the q-axis. Consequently, arc-shaped magnetic paths are formed in the magnet along the direction of the easy axis of magnetization. In addition, in each of the first and second magnets 91 and 92, on the d-axis side, the easy axis of magnetization may be oriented to be parallel to the d-axis; on the q-axis side, the easy axis of magnetization may be oriented to be perpendicular to the q-axis.

Moreover, in each of the magnets 91 and 92, a stator-side peripheral surface on the stator 50 side (i.e., lower side in FIG. 9) and end surfaces on the q-axis side in the circumferential direction constitute magnetic flux acting surfaces through which magnetic flux flows into or out of the magnet. The magnetic paths are formed in the magnet to connect the magnetic flux acting surfaces (i.e., the stator-side peripheral surface and the q-axis-side end surfaces) of the magnet.

Figure 17:
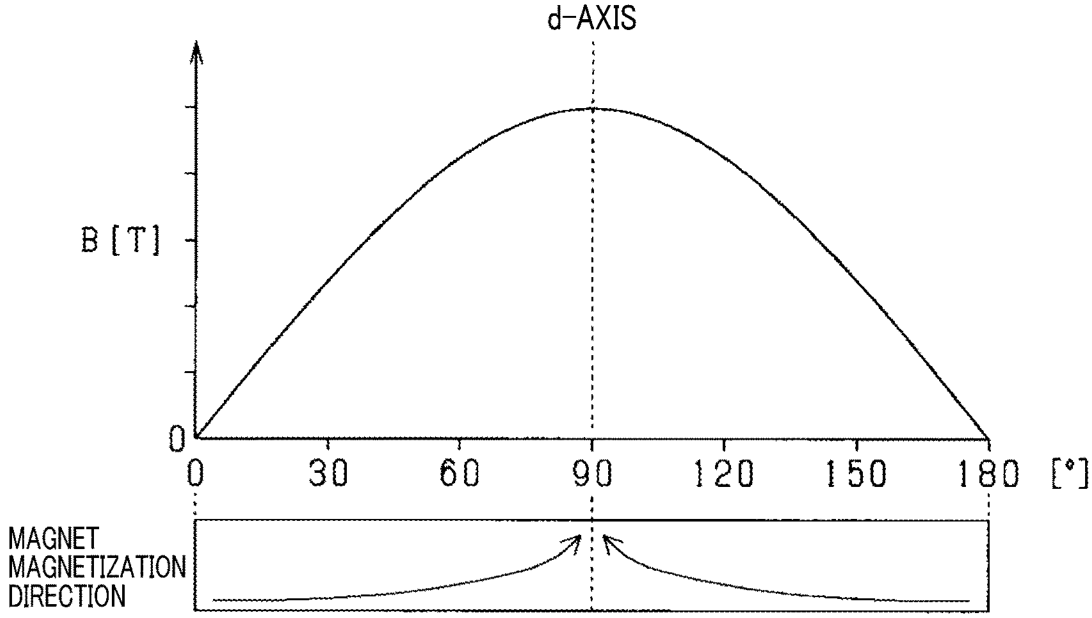
FIG. 17 is a diagram illustrating the relationship between electrical angle and magnetic flux density in magnets of an embodiment.
Figure 18:
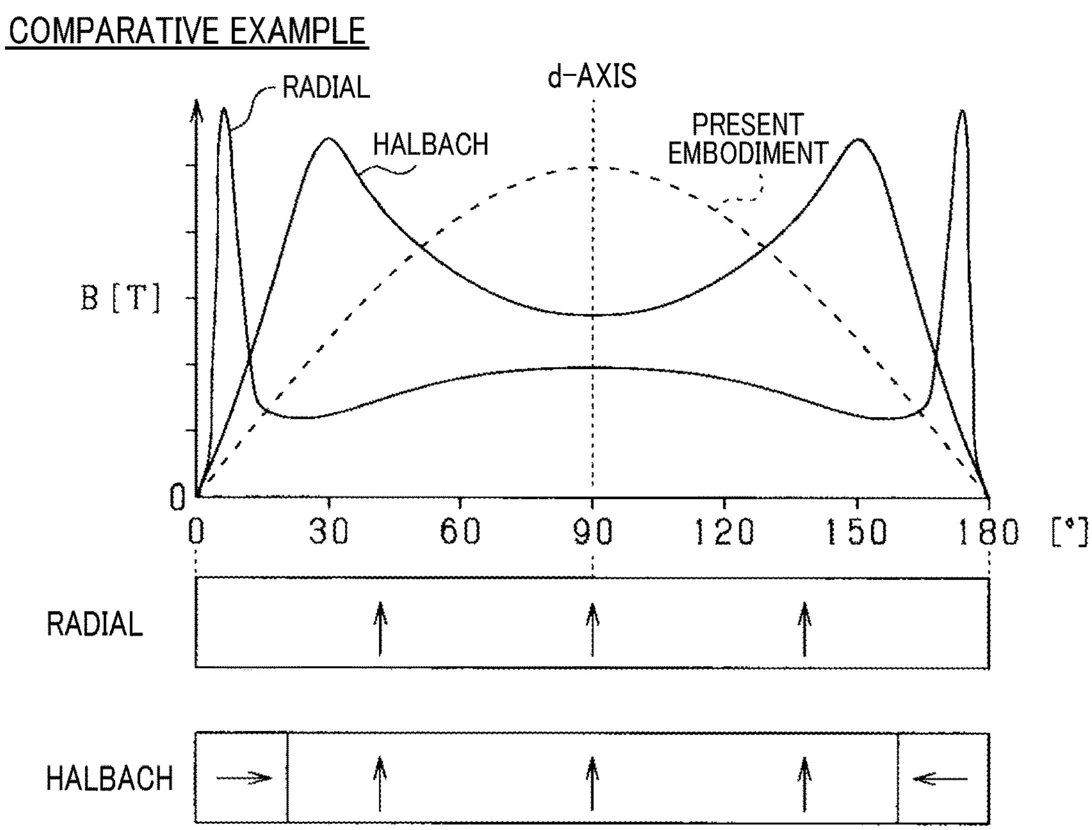
FIG. 18 is a diagram illustrating the relationship between electrical angle and magnetic flux density in magnets of comparative examples.

In the magnet unit 42, magnetic flux flows along the arc-shaped magnetic paths between the adjacent N and S poles, i.e., between the adjacent magnets 91 and 92. Therefore, the magnet magnetic paths are lengthened in comparison with the case of employing, for example, radial anisotropic magnets. Consequently, as shown in FIG. 17, the magnetic flux density distribution becomes approximate to a sine wave. As a result, as shown in FIG. 18, unlike the magnetic flux density distribution in a comparative example where radial anisotropic magnets are employed, it becomes possible to concentrate magnetic flux on the magnetic pole center side, thereby increasing the torque of the rotating electric machine 10. Moreover, it can be seen that the magnetic flux density distribution in the magnet unit 42 according to the present embodiment is also different from the magnetic flux density distribution in a comparison example where magnets are arranged in a conventional Halbach array. In addition, in each of FIGS. 17 and 18, the horizontal axis represents electrical angle and the vertical axis represents magnetic flux density; 90° on the horizontal axis represents the d-axis (i.e., the magnetic pole center) and 0° and 180° on the horizontal axis represent the q-axis.

Accordingly, with the configuration of the magnets 91 and 92 according to the present embodiment, the magnet magnetic flux on the d-axis is intensified and the magnetic flux change in the vicinity of the q-axis is suppressed. Consequently, it becomes possible to suitably realize the magnets 91 and 92 where the surface magnetic flux gradually changes from the q-axis to the d-axis in each magnetic pole.

The sine wave matching percentage of the magnetic flux density distribution may be, for example, 40% or higher. In this case, it is possible to reliably increase the amount of magnetic flux at the central portion of the waveform in comparison with the case of employing radial-oriented magnets and the case of employing parallel-oriented magnets. In the case of employing radial-oriented magnets, the sine wave matching percentage is about 30%. Moreover, setting the sine wave matching percentage to be higher than or equal to 60%, it is possible to reliably increase the amount of magnetic flux at the central portion of the waveform in comparison with the case of employing magnets arranged in a magnetic flux concentration array such as a Halbach array.

As shown in FIG. 18, in the comparative example where radial anisotropic magnets are employed, the magnetic flux density changes sharply in the vicinity of the q-axis. The sharp change in the magnetic flux density causes the amount of eddy current generated in the stator coil 51 to increase. Moreover, the magnetic flux on the stator coil 51 side also changes sharply. In contrast, in the present embodiment, the waveform of the magnetic flux density distribution is approximate to a sine wave. Consequently, the change in the magnetic flux density in the vicinity of the q-axis is gentler than in the comparative example where radial anisotropic magnets are employed. As a result, it becomes possible to suppress generation of eddy current.

In the magnet unit 42, in each of the magnets 91 and 92, in the vicinity of the d-axis (i.e., the magnetic pole center), magnetic flux is generated in a direction perpendicular to the magnetic flux acting surface 280 on the stator 50 side. The generated magnetic flux flows along the arc-shaped magnetic paths that extend away from the d-axis as they extend away from the magnetic flux acting surface 280 on the stator 50 side. Moreover, the closer the direction of the magnetic flux is to a direction perpendicular to the magnetic flux acting surface 280 on the stator 50 side, the stronger the magnetic flux is. In this regard, in the rotating electric machine 10 according to the present embodiment, the radial thickness of the electrical conductor groups 81 is reduced as described previously. Consequently, the radial center position of the electrical conductor groups 81 becomes closer to the magnetic flux acting surfaces of the magnet unit 42, thereby allowing the stator 50 to receive the stronger magnet magnetic flux from the rotor 40.

Furthermore, the stator 50 has the hollow cylindrical stator core 52 arranged on the radially inner side of the stator coil 51, i.e., on the opposite side of the stator coil 51 to the rotor 40. Therefore, the magnetic flux flowing out from the magnetic flux acting surfaces of the magnets 91 and 92 is attracted by the stator core 52 to circulate through the stator core 52 that constitutes part of the magnetic circuit. Consequently, it becomes possible to optimize the direction and paths of the magnet magnetic flux.

Next, a method of manufacturing the rotating electric machine 10, more particularly a process of assembling the bearing unit 20, the housing 30, the rotor 40, the stator 50 and the inverter unit 60 will be described with reference to FIG. 5. In addition, the inverter 60 includes the unit base 61 and the electrical components 62 as shown in FIG. 6. Therefore, the assembling process includes a step of assembling the unit base 61 and the electrical components 62. In the following explanation, the assembly of the stator 50 and the inverter unit 60 will be referred to as the first unit while the assembly of the bearing unit 20, the housing 30 and the rotor 40 will be referred to as the second unit.

The manufacturing method according to the present embodiment includes:

- a first step of mounting the electrical components 62 to the radially inner periphery of the unit base 61;
- a second step of mounting the unit base 61 to the radially inner periphery of the stator 50, thereby forming the first unit;
- a third step of inserting the attaching portion 44 of the rotor 40 into the bearing unit 20 that has been assembled to the housing 30, thereby forming the second unit;
- a fourth step of mounting the first unit to the radially inner periphery of the second unit; and
- a fifth step of fastening the housing 30 and the unit base 61 to each other, wherein these steps are performed in the sequence of the first step→the second step→the third step→the fourth step→the fifth step.

With the above manufacturing method, the bearing unit 20, the housing 30, the rotor 40, the stator 50 and the inverter unit 60 are first assembled into a plurality of subassemblies and then the subassemblies are further assembled together to form the rotating electric machine 10. Consequently, it becomes possible to realize ease of handling and complete inspection for each unit, thereby making it possible build a suitable assembly line. As a result, it becomes possible to easily cope with multi-product production.

In the first step, a heat conducting member with high heat conductivity may be attached, for example by coating or bonding, to the radially inner periphery of the unit base 61 or the radially outer periphery of the electrical components 62. Then, the electrical components 62 may be mounted to the unit base 61 so that the heat conducting member is interposed between the radially inner periphery of the unit base 61 and the radially outer periphery of the electrical components 62. Consequently, with the heat conducting member, it is possible to more effectively transfer heat generated in the semiconductor modules 66 to the unit base 61.

In the third step, the insertion of the rotor 40 may be performed keeping coaxiality between the housing 30 and the rotor 40. Specifically, a jig may be used to position the outer circumferential surface of the rotor 40 (i.e., the outer circumferential surface of the magnet holder 41) or the inner circumferential surface of the rotor 40 (or the inner circumferential surface of the magnet unit 42) with respect to, for example, the inner circumferential surface of the housing 30. Then, the assembling of the housing 30 and the rotor 40 may be performed with either of the housing 30 and the rotor 40 sliding along the jig. Consequently, it is possible to assemble the heavy-weight components without imposing unbalanced load on the bearing unit 20. As a result, it is possible to ensure reliability of the bearing unit 20.

In the fourth step, the assembling of the first and second units may be performed keeping coaxiality between them. Specifically, a jig may be used to position the inner circumferential surface of the unit base 61 with respect to the inner circumferential surface of the attaching portion 44 of the rotor 40. Then, the assembling of the first and second units may be performed with either of them sliding along the jig. Consequently, it is possible to perform the assembling of the first and second units without causing interference between the rotor 40 and the stator 50 that are arranged with the minute air gap formed therebetween. As a result, it is possible to prevent defects, such as damage to the stator coil 51 or to the permanent magnets, from occurring during the assembling of the first and second units.

Alternatively, the above steps may be performed in the sequence of the second step→the third step→the fourth step→the fifth step→the first step. In this case, the delicate electrical components 62 are assembled to the other components of the rotating electric machine 10 in the final step. Consequently, it is possible to minimize stress induced in the electrical components 62 during the assembly process.

Figure 19:
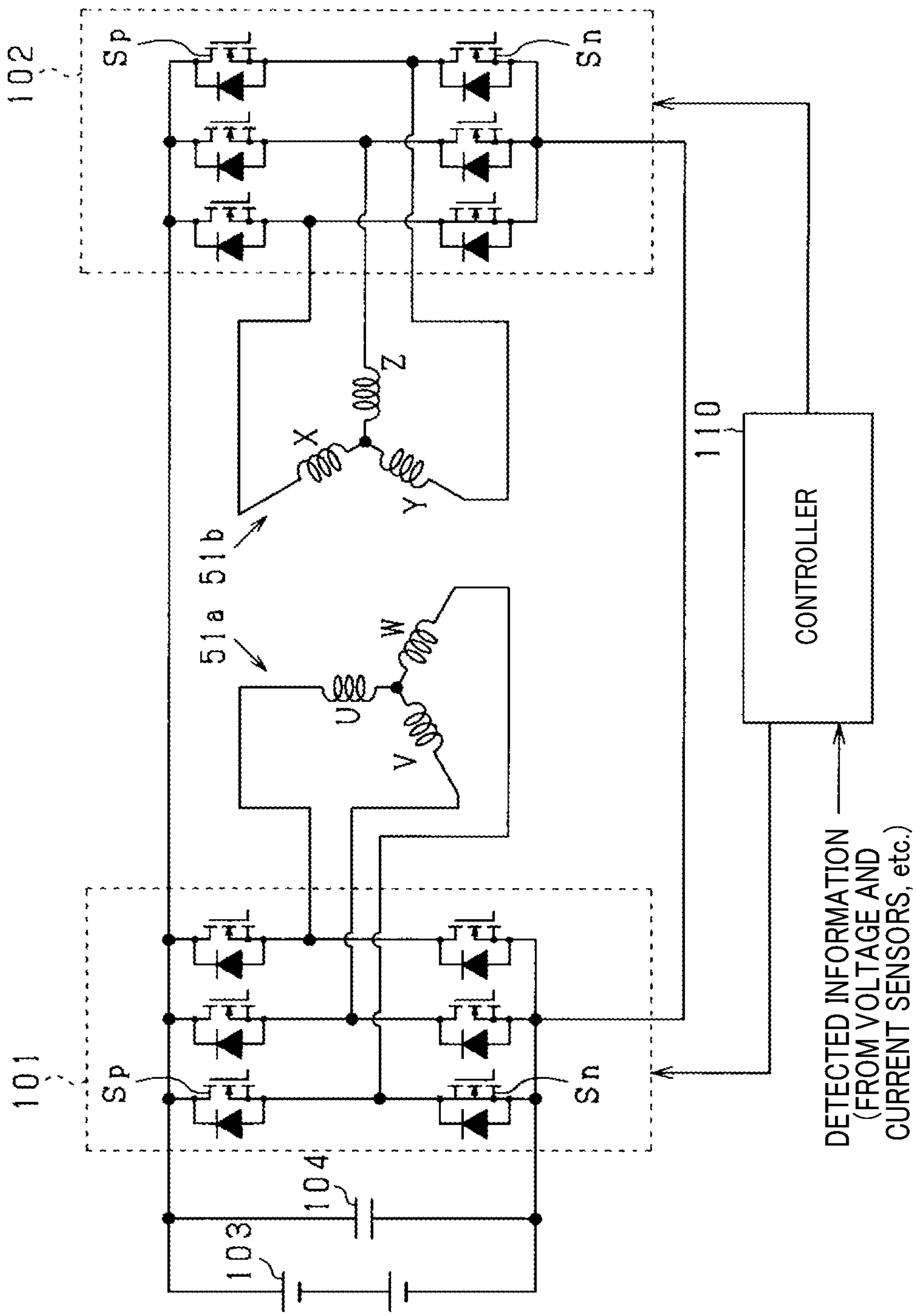
FIG. 19 is an electric circuit diagram of a control system of the rotating electric machine.
Figure 20:
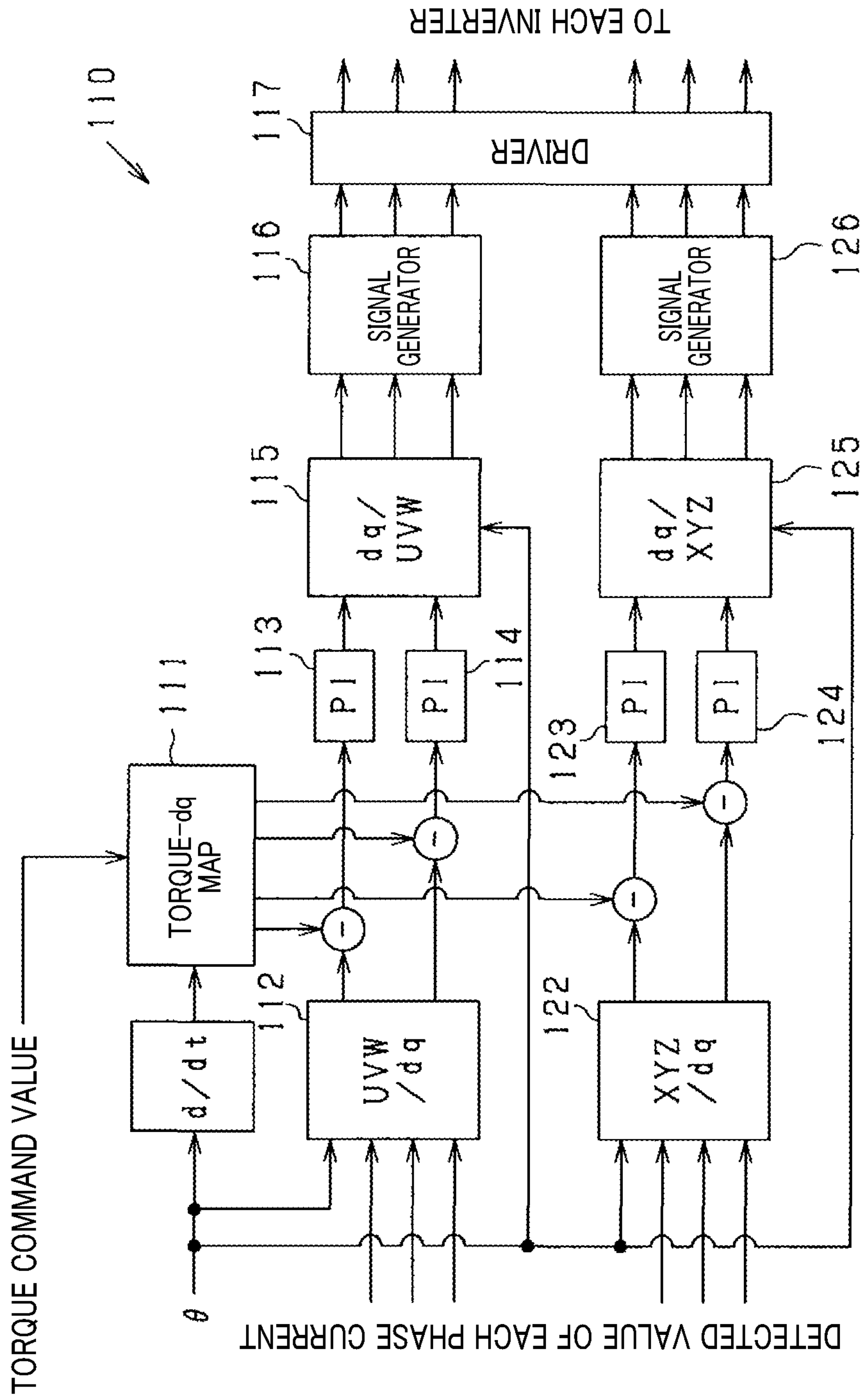
FIG. 20 is a functional block diagram illustrating a current feedback control process performed by a controller.

Next, the configuration of a control system for controlling the rotating electric machine 10 will be described. FIG. 19 is an electric circuit diagram of the control system of the rotating electric machine 10. FIG. 20 is a functional block diagram illustrating a current feedback control process performed by a controller 110 of the control system.

As shown in FIG. 19, the stator coil 51 is comprised of a pair of three-phase coils 51*a* and 51*b*. Moreover, the three-phase coil 51*a* is comprised of the U-phase, V-phase and W-phase windings and the three-phase coil 51*b* is comprised of the X-phase, Y-phase and Z-phase windings. In the control system, there are provided, as electric power converters, a first inverter 101 and a second inverter 102 respectively for the three-phase coils 51*a* and 51*b*. In each of the inverters 101 and 102, there is formed a full bridge circuit having a plurality of pairs of upper and lower arms. The number of pairs of the upper and lower arms in each of the inverters 101 and 102 is equal to the number of the phase windings of each of the three-phase coils 51*a* and 51*b*. Each of the upper and lower arms has a switch (or semiconductor switching element) provided therein. Electric current supplied to each phase winding of the stator coil 51 is regulated by turning on/off the switch of each of the upper and lower arms.

A DC power supply 103 and a smoothing capacitor 104 are connected in parallel to each of the inverters 101 and 102. The DC power supply 103 is implemented by, for example, an assembled battery that is obtained by connecting a plurality of battery cells in series with each other. In addition, each of the switches of the inverters 101 and 102 corresponds to one of the semiconductor modules 66 shown in FIG. 1. The smoothing capacitor 104 corresponds to the capacitor module 68 shown in FIG. 1.

The controller 110 includes a microcomputer which is configured with a CPU and various memories. Based on various types of detected information on the rotating electric machine 10 and power running drive and electric power generation requests, the controller 110 performs energization control by turning on and off the switches of the inverters 101 and 102. The controller 110 corresponds to the controller 77 shown in FIG. 6. The detected information on the rotating electric machine 10 includes, for example, a rotation angle (or electrical angle information) of the rotor 40 detected by an angle detector such as a resolver, a power supply voltage (or inverter input voltage) detected by a voltage sensor, and phase currents detected by respective current sensors. The controller 110 generates and outputs operation signals for operating the switches of the inverters 101 and 102. In addition, in the case of the rotating electric machine 10 being used as a vehicular power source, the power generation request may be a regenerative drive request.

The first inverter 101 includes, for each of the U, V and W phases, one serially-connected unit consisting of an upper-arm switch Sp and a lower-arm switch Sn. A high potential-side terminal of the upper-arm switch Sp is connected to a positive terminal of the DC power supply 103. A low potential-side terminal of the lower-arm switch Sn is connected to a negative terminal of the DC power supply 103 (or ground). To an intermediate junction point between the upper-arm switch Sp and the lower-arm switch Sn, there is connected a first end of a corresponding one of the U-phase, V-phase and W-phase windings. The U-phase, V-phase and W-phase windings are star-connected (or Y-connected) to define a neutral point therebetween, at which second ends of these phase windings are connected with each other.

The second inverter 102 has a similar configuration to the first inverter 101. Specifically, the second inverter 102 includes, for each of the X, Y and Z phases, one serially-connected unit consisting of an upper-arm switch Sp and a lower-arm switch Sn. A high potential-side terminal of the upper-arm switch Sp is connected to the positive terminal of the DC power supply 103. A low potential-side terminal of the lower-arm switch Sn is connected to the negative terminal of the DC power supply 103 (or ground). To an intermediate junction point between the upper-arm switch Sp and the lower-arm switch Sn, there is connected a first end of a corresponding one of the X-phase, Y-phase and Z-phase windings. The X-phase, Y-phase and Z-phase windings are star-connected (or Y-connected) to define a neutral point therebetween, at which second ends of these phase windings are connected with each other.

FIG. 20 shows both the current feedback control process for controlling the U-phase, V-phase and W-phase currents and the current feedback control process for controlling the X-phase, Y-phase and Z-phase currents. First, the current feedback control process for the U-phase, V-phase and W-phase currents will be described.

In FIG. 20, a current command value setter 111 is configured to set, using a torque-dq map, both a d-axis current command value and a q-axis current command value on the basis of a power running torque command value or an electric power generation torque command value to the rotating electric machine 10 and an electrical angular speed co obtained by differentiating the electrical angle θ with respect to time. In addition, the current command value setter 111 is provided for both control of the U-phase, V-phase and W-phase currents and control of the X-phase, Y-phase and Z-phase currents. In the case of the rotating electric machine 10 being used as a vehicular power source, the electric power generation torque command value is a regenerative torque command value.

A dq converter 112 is configured to convert current detected values (three phase currents), which are detected by the current sensors provided for respective phases, into d-axis current and q-axis current which are current components in a Cartesian two-dimensional rotating coordinate system whose d-axis indicates a field direction (or direction of an axis of a magnetic field).

A d-axis current feedback controller 113 is configured to calculate a d-axis command voltage as a manipulated variable for feedback-controlling the d-axis current to the d-axis current command value. A q-axis current feedback controller 114 is configured to calculate a q-axis command voltage as a manipulated variable for feedback-controlling the q-axis current to the q-axis current command value. These feedback controllers 113 and 114 are configured to calculate, using a PI feedback method, the command voltages on the basis of the differences of the d-axis current and the q-axis current from the respective current command values.

A three-phase converter 115 is configured to convert the d-axis and q-axis command voltages into U-phase, V-phase and W-phase command voltages. In addition, the above units 111-115 together correspond to a feedback controller for performing feedback control of fundamental currents by a dq conversion method. The U-phase, V-phase and W-phase command voltages are the feedback-controlled values.

An operation signal generator 116 is configured to generate, using a well-known triangular-wave carrier comparison method, the operation signals for the first inverter 101 on the basis of the U-phase, V-phase and W-phase command voltages. Specifically, the operation signal generator 116 generates the operation signals (or duty signals) for operating the upper-arm and lower-arm switches Sp and Sn of the U, V and W phases by PWM control based on comparison in amplitude between signals, which are obtained by normalizing the U-phase, V-phase and W-phase command voltages with respect to the power supply voltage, and a carrier signal such as a triangular-wave signal.

For the X, Y and W phases, there is provided a configuration similar to the above-described configuration provided for the U, V and W phases. Specifically, a dq converter 122 is configured to convert current detected values (three phase currents), which are detected by the current sensors provided for respective phases, into d-axis current and q-axis current which are current components in the Cartesian two-dimensional rotating coordinate system whose d-axis indicates the field direction.

A d-axis current feedback controller 123 is configured to calculate a d-axis command voltage. A q-axis current feedback controller 124 is configured to calculate a q-axis command voltage. A three-phase converter 125 is configured to convert the d-axis and q-axis command voltages into X-phase, Y-phase and Z-phase command voltages. An operation signal generator 126 is configured to generate the operation signals for the second inverter 102 on the basis of the X-phase, Y-phase and Z-phase command voltages. Specifically, the operation signal generator 126 generates the operation signals (or duty signals) for operating the upper-arm and lower-arm switches Sp and Sn of the X, Y and Z phases by PWM control based on comparison in amplitude between signals, which are obtained by normalizing the X-phase, Y-phase and Z-phase command voltages with respect to the power supply voltage, and a carrier signal such as a triangular-wave signal.

A driver 117 is configured to turn on and off the switches Sp and Sn of the inverters 101 and 102 based on the switch operation signals generated by the operation signal generators 116 and 126.

Next, a torque feedback control process will be described. This process is performed mainly for reducing losses and thereby increasing the output of the rotating electric machine 10 in operating conditions where the output voltages of the inverters 101 and 102 become high, such as in a high-rotation region and a high-output region. The controller 110 selectively performs either one of the torque feedback control process and the current feedback control process according to the operating condition of the rotating electric machine 10.

Figure 21:
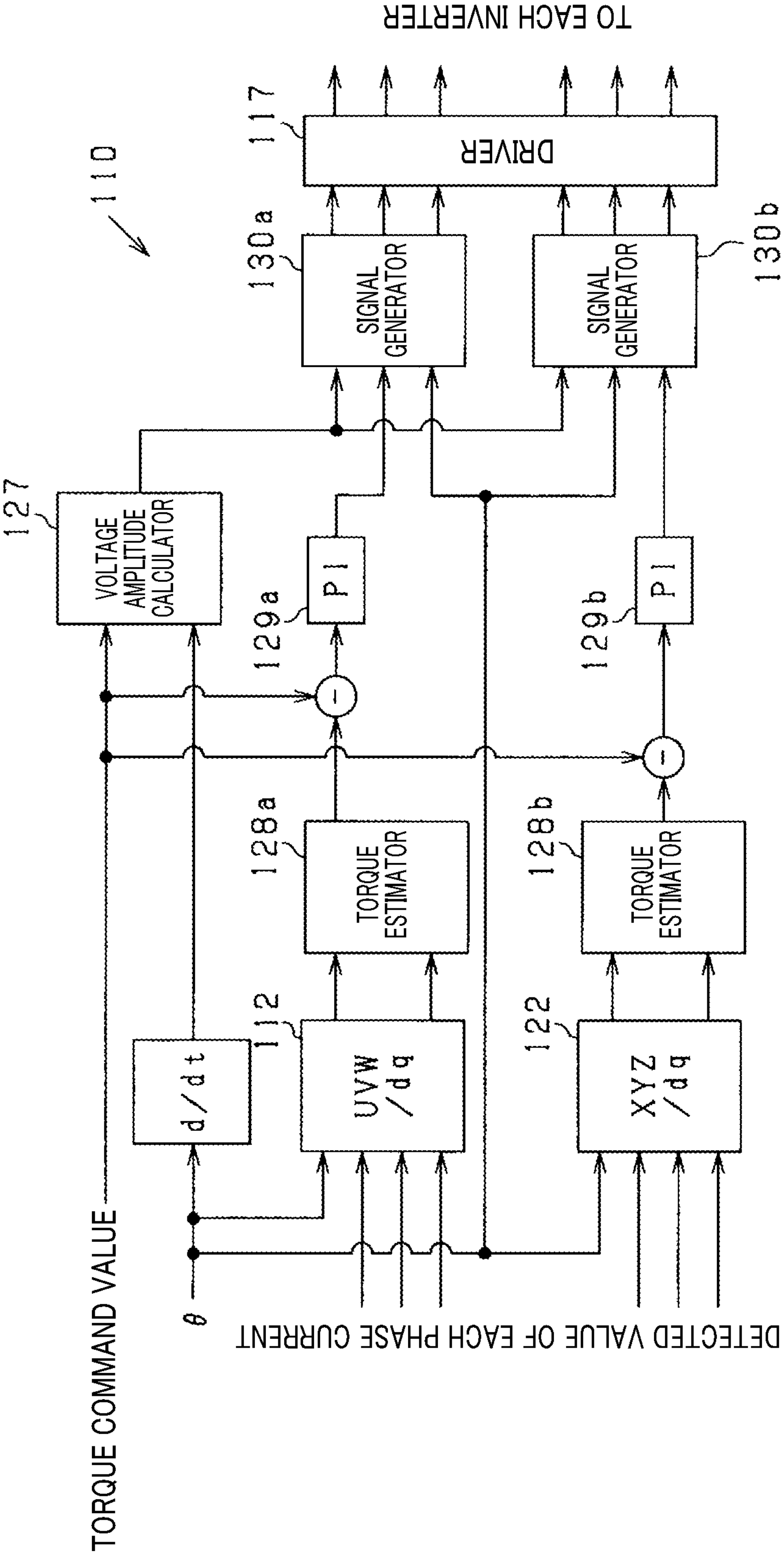
FIG. 21 is a functional block diagram illustrating a torque feedback control process performed by the controller.

FIG. 21 shows both the torque feedback control process corresponding to the U, V and W phases and the torque feedback control process corresponding to the X, Y and Z phases. In addition, in FIG. 21, functional blocks identical to those in FIG. 20 are designated by the same reference numerals as in FIG. 20 and descriptions of them will be omitted hereinafter. First, the torque feedback control process for the U, V and W phases will be described.

A voltage amplitude calculator 127 is configured to calculate a voltage amplitude command, which indicates a command value of the amplitudes of voltage vectors, on the basis of the power running torque command value or the electric power generation torque command value to the rotating electric machine 10 and the electrical angular speed co obtained by differentiating the electrical angle θ with respect to time.

A torque estimator 128*a* is configured to calculate a torque estimated value corresponding to the U, V and W phases on the basis of the d-axis current and q-axis current obtained by the dq converter 112. In addition, the torque estimator 128*a* may calculate the voltage amplitude command on the basis of map information associating the d-axis and q-axis currents with the voltage amplitude command.

A torque feedback controller 129*a* is configured to calculate a voltage phase command, which indicates command values of the phases of the voltage vectors, as a manipulated variable for feedback-controlling the torque estimated value to the power running torque command value or the electric power generation torque command value. More specifically, the torque feedback controller 129*a* calculates, using a PI feedback method, the voltage phase command on the basis of the difference of the torque estimated value from the power running torque command value or the electric power generation torque command value.

An operation signal generator 130*a* is configured to generate the operation signals for the first inverter 101 on the basis of the voltage amplitude command, the voltage phase command and the electrical angle θ. Specifically, the operation signal generator 130*a* first calculates U-phase, V-phase and W-phase command voltages on the basis of the voltage amplitude command, the voltage phase command and the electrical angle θ. Then, the operation signal generator 130*a* generates the operation signals for operating the upper-arm and lower-arm switches Sp and Sn of the U, V and W phases by PWM control based on comparison in amplitude between signals, which are obtained by normalizing the calculated U-phase, V-phase and W-phase command voltages with respect to the power supply voltage, and a carrier signal such as a triangular-wave signal.

In addition, as an alternative, the operation signal generator 130*a* may generate the switch operation signals on the basis of pulse pattern information, the voltage amplitude command, the voltage phase command and the electrical angle θ. The pulse pattern information is map information associating the switch operation signals with the voltage amplitude command, the voltage phase command and the electrical angle θ.

For the X, Y and W phases, there is provided a configuration similar to the above-described configuration provided for the U, V and W phases. Specifically, a torque estimator 128*b* is configured to calculate a torque estimated value corresponding to the X, Y and Z phases on the basis of the d-axis current and q-axis current obtained by the dq converter 122.

A torque feedback controller 129*b* is configured to calculate a voltage phase command as a manipulated variable for feedback-controlling the torque estimated value to the power running torque command value or the electric power generation torque command value. More specifically, the torque feedback controller 129*b* calculates, using a PI feedback method, the voltage phase command on the basis of the difference of the torque estimated value from the power running torque command value or the electric power generation torque command value.

An operation signal generator 130*b* is configured to generate the operation signals for the second inverter 102 on the basis of the voltage amplitude command, the voltage phase command and the electrical angle θ. Specifically, the operation signal generator 130*b* first calculates X-phase, Y-phase and Z-phase command voltages on the basis of the voltage amplitude command, the voltage phase command and the electrical angle θ. Then, the operation signal generator 130*b* generates the operation signals for operating the upper-arm and lower-arm switches Sp and Sn of the X, Y and Z phases by PWM control based on comparison in amplitude between signals, which are obtained by normalizing the calculated X-phase, Y-phase and Z-phase command voltages with respect to the power supply voltage, and a carrier signal such as a triangular-wave signal. The driver 117 is configured to turn on and off the switches Sp and Sn of the inverters 101 and 102 based on the switch operation signals generated by the operation signal generators 130*a* and 130*b*.

In addition, as an alternative, the operation signal generator 130*b* may generate the switch operation signals on the basis of pulse pattern information, the voltage amplitude command, the voltage phase command and the electrical angle θ. The pulse pattern information is map information associating the switch operation signals with the voltage amplitude command, the voltage phase command and the electrical angle θ.

In the rotating electric machine 10, galvanic corrosion may occur in the bearings 21 and 22 due to generation of shaft current. For example, when energization of the stator coil 51 is switched by the switching operation, magnetic flux distortion may occur due to a slight switching-timing deviation (or unbalanced switching), causing galvanic corrosion to occur in the bearings 21 and 22 that support the rotating shaft 11. More specifically, the magnetic flux distortion, which occurs depending on the inductance of the stator 50, induces an axial electromotive force. Due to the axial electromotive force, electrical breakdown may occur in the bearings 21 and 22, allowing galvanic corrosion to progress therein.

Therefore, in the present embodiment, three galvanic corrosion countermeasures are taken which will be described hereinafter. As the first galvanic corrosion countermeasure, the inductance of the stator 50 is lowered with employment of the core-less structure and the magnet unit 42 is configured to make change in the magnet magnetic flux gentle. As the second galvanic corrosion countermeasure, the rotating shaft 11 is supported in a cantilever fashion by the bearings 21 and 22. As the third galvanic corrosion countermeasure, the annular stator coil 51 is molded, together with the stator core 52, in a molding material. Hereinafter, each of the three galvanic corrosion countermeasures will be described in more detail.

First, as the first galvanic corrosion countermeasure, the toothless structure is employed for the stator 50 so that no teeth are interposed between the circumferentially adjacent electrical conductor groups 81. Instead, the sealing member 57, which is formed of a nonmagnetic material, is interposed between the electrical conductor groups 81 (see FIG. 10). Consequently, it becomes possible to lower the inductance of the stator 50. Further, with reduction in the inductance of the stator 50, even if a switching-timing deviation occurs during energization of the stator coil 51, it is possible to suppress occurrence of magnetic flux distortion due to the switching-timing deviation. As a result, it is possible to suppress occurrence of galvanic corrosion in the bearings 21 and 22. In addition, the d-axis inductance is preferably lower than the q-axis inductance.

Moreover, each of the magnets 91 and 92 is configured to have the easy axis of magnetization oriented such that the direction of the easy axis of magnetization is more parallel to the d-axis on the d-axis side than on the q-axis side (see FIG. 9). Consequently, the magnet magnetic flux on the d-axis is intensified and the surface magnetic flux change (i.e., increase or decrease in the magnetic flux) from the q-axis to the d-axis becomes gentle in each magnetic pole. As a result, it becomes possible to suppress occurrence of sharp voltage change due to unbalanced switching, thereby contributing to suppression of galvanic corrosion.

As the second galvanic corrosion countermeasure, in the rotating electric machine 10, both the bearings 21 and 22 are arranged on one axial side of the axial center position of the rotor 40 (see FIG. 2). With this arrangement, it is possible to reduce the influence of galvanic corrosion in comparison with the case of bearings being arranged respectively on opposite axial sides of a rotor. More specifically, in the case of supporting a rotor by bearings arranged respectively on opposite axial sides of the rotor, with generation of high-frequency magnetic flux, a closed circuit may be formed which extends through the rotor, the stator and the bearings (i.e., the bearings arranged respectively on opposite axial sides of the rotor), causing galvanic corrosion to occur in the bearings due to shaft current. In contrast, in the present embodiment, with the rotor 40 supported in a cantilever fashion by the bearings 21 and 22, no closed circuit is formed in the rotating electric machine 10; consequently, occurrence of galvanic corrosion due to shaft current is suppressed.

Moreover, the rotating electric machine 10 has the following configuration for arranging both the bearings 21 and 22 on one axial side of the axial center position of the rotor 40. That is, in the intermediate portion 45 of the magnet holder 41 which radially projects, there is formed a contact prevention portion that extends in the axial direction to prevent contact with the stator 50 (see FIG. 2). Therefore, even if a closed circuit of shaft current is formed through the magnet holder 41, it is possible to increase the length of the closed circuit and thus the circuit resistance. Consequently, it is possible to more reliably suppress occurrence of galvanic corrosion in the bearings 21 and 22.

Furthermore, on one axial side of the rotor 40, the holding member 23 of the bearing unit 20 is fixed to the housing 30; on the other axial side of the rotor 40, the housing 30 and the unit base 61 (i.e., stator holder) are joined to each other (see FIG. 2). With this configuration, it becomes possible to suitably arrange both the bearings 21 and 22 on one side of the rotor 40 in the axial direction of the rotating shaft 11. Moreover, with this configuration, the unit base 61 is connected with the rotating shaft 11 via the housing 30. Consequently, it becomes possible to arrange the unit base 61 at a position electrically separated from the rotating shaft 11. In addition, interposing an insulating member, such as a resin member, between the unit base 61 and the housing 30, the unit base 61 and the rotating shaft 11 are further electrically separated from each other. Consequently, it is possible to more reliably suppress occurrence of galvanic corrosion in the bearings 21 and 22.

In the rotating electric machine 10 according to the present embodiment, the shaft voltage applied to the bearings 21 and 22 is lowered by the one-sided arrangement of the bearings 21 and 22. Moreover, the electric potential difference between the rotor 40 and the stator 50 is reduced. Consequently, it becomes possible to reduce the electric potential difference acting on the bearings 21 and 22 without using electrically conductive grease in the bearings 21 and 22. In general, electrically conductive grease contains fine particles such as carbon, and thus may cause acoustic noise to occur. In this regard, in the present embodiment, non-electrically conductive grease is used in the bearings 21 and 22. Consequently, it becomes possible to suppress generation of acoustic noise in the bearings 21 and 22. In the case of the rotating electric machine 10 being used in, for example, an electrically-driven vehicle such as an electric vehicle, it is necessary to take countermeasures against acoustic noise. According to the present embodiment, it is possible to take suitable countermeasures against acoustic noise.

As the third galvanic corrosion countermeasure, the stator coil 51 is molded, together with the stator core 52, by a molding material, thereby suppressing displacement of the stator coil 51 in the stator 50 (see FIG. 11). In particular, in the rotating electric machine 10 according to the present embodiment, no inter-conductor members (i.e., no teeth) are interposed between the circumferentially adjacent electrical conductor groups 81 of the stator coil 51. Therefore, displacement of the stator coil 51 may occur. In this regard, molding the stator coil 51 together with the stator core 52, it becomes possible to suppress displacement of the electrical conductors forming the stator coil 51. Consequently, it becomes possible to suppress magnetic flux distortion due to displacement of the stator coil 51; thus it also becomes possible to suppress occurrence of galvanic corrosion in the bearings 21 and 22 due to magnetic flux distortion.

Moreover, the unit base 61, which serves as a housing member to fix the stator core 52, is formed of carbon fiber reinforced plastic (CFRP). Consequently, it becomes possible to suppress electric discharge to the unit base 61 in comparison with the case of the unit base 61 being formed of aluminum or the like. As a result, it is possible to more reliably suppress occurrence of galvanic corrosion in the bearings 21 and 22.

In addition, as a further countermeasure for galvanic corrosion of the bearings 21 and 22, at least one of the outer and inner rings 25 and 26 of each of the bearings 21 and 22 may be formed of a ceramic material or an insulating sleeve may be provided outside the outer ring 25.

Hereinafter, other embodiments will be described focusing on the differences thereof from the first embodiment.

Second Embodiment

In the present embodiment, the polar anisotropic structure of the magnet unit 42 of the rotor 40 is modified in comparison with that described in the first embodiment. The polar anisotropic structure according to the present embodiment will be described in detail hereinafter.

Figure 22:
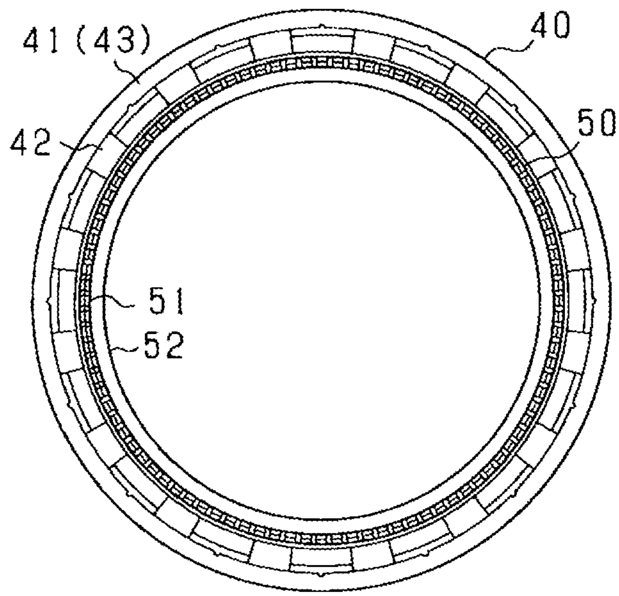
FIG. 22 is a transverse cross-sectional view of a rotor and a stator in a second embodiment.
Figure 23:
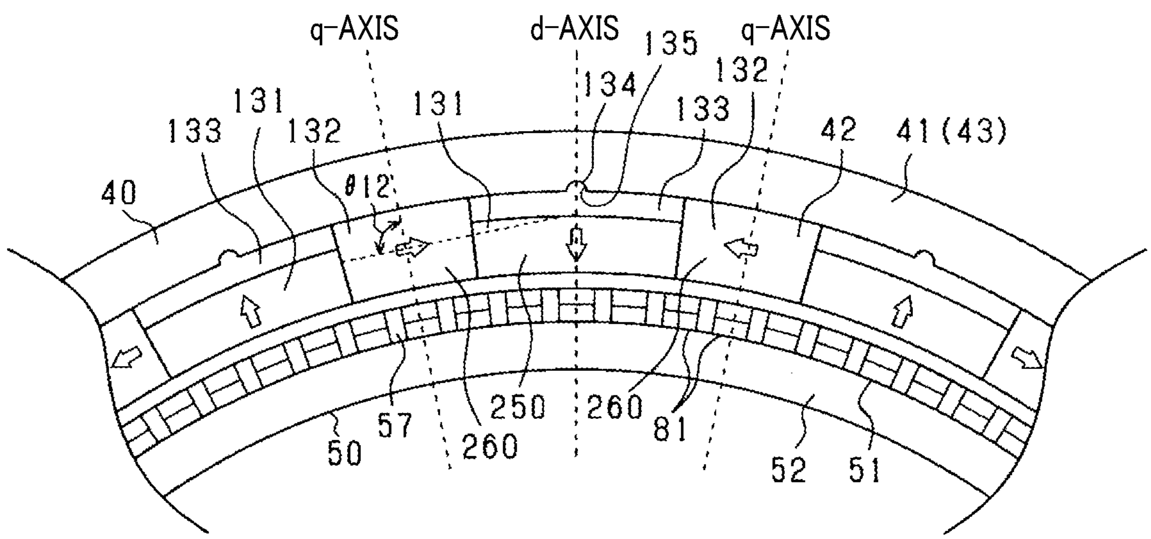
FIG. 23 is an enlarged view of part of FIG. 22.

As shown in FIGS. 22 and 23, in the present embodiment, the magnet unit 42 is configured with a magnet array called a Halbach array. Specifically, the magnet unit 42 includes first magnets 131 each having its magnetization direction (or the direction of the magnetization vector thereof) coincident with a radial direction and second magnets 132 each having its magnetization direction (or the direction of the magnetization vector thereof) coincident with the circumferential direction. The first magnets 131 are arranged at predetermined intervals in the circumferential direction. Each of the second magnets 132 is arranged between one circumferentially-adjacent pair of the first magnets 131. In addition, the first and second magnets 131 and 132 are permanent magnets constituted of rare-earth magnets such as neodymium magnets.

The first magnets 131 are arranged apart from one another in the circumferential direction so that on the side facing the stator 50 (i.e., the radially inner side), the polarities of the first magnets 131 alternate between N and S in the circumferential direction. Moreover, the second magnets 132 are arranged adjacent to the first magnets 131 in the circumferential direction so that the polarities of the second magnets 132 alternate in the circumferential direction. The cylindrical portion 43 is provided to surround the magnets 131 and 132. The cylindrical portion 43, which functions as a back core, may be formed of a soft-magnetic material. In the second embodiment, the relationship of the easy axes of magnetization of the magnet unit 42 to the d-axis and the q-axis on the d-q coordinate system is the same as in the first embodiment.

Moreover, magnetic members 133, each of which is formed a soft-magnetic material, are arranged on the radially outer side of the respective first magnets 131, i.e., on the side of the respective first magnets 131 facing the cylindrical portion 43 of the magnet holder 41. More specifically, the magnetic members 133 may be formed, for example, of a magnetic steel sheet, soft iron or green compact core material. The circumferential length of the magnetic members 133 is set to be equal to the circumferential length of the first magnets 131 (more specifically, the circumferential length of outer peripheral portions of the first magnets 131). In a state of each pair of the first magnets 131 and the magnetic members 133 being integrated into one piece, the radial thickness of the integrated piece is equal to the radial thickness of the second magnets 132. In other words, the radial thickness of the first magnets 131 is smaller than the radial thickness of the second magnets 132 by the radial thickness of the magnetic members 133. The first magnets 131, the second magnets 132 and the magnetic members 133 are fixed to one another by, for example, an adhesive. In the magnet unit 42, the radially outer side of the first magnets 131 is the opposite side to the stator 50. The magnetic members 133 are arranged on the opposite side of the first magnets 131 to the stator 50 (i.e., on the non-stator side of the first magnets 131).

On an outer peripheral portion of each of the magnetic members 133, there is formed a key 134 as a protrusion protruding radially outward, i.e., protruding toward the cylindrical portion 43 of the magnet holder 41. Moreover, in the inner circumferential surface of the cylindrical portion 43, there are formed keyways 135 as recesses for respectively receiving the keys 134 of the magnetic members 133. The protruding shape of the keys 134 conforms to the recessed shape of the keyways 135. The number of the keys 134 formed in the magnetic members 133 is equal to the number of the keyways 135 formed in the cylindrical portion 43. With engagement between the keys 134 and the keyways 135, the displacement of the first and second magnets 131 and 132 relative to the magnet holder 41 in the circumferential direction (or rotational direction) is suppressed. In addition, keys 134 and keyways 135 (i.e., protrusions and recesses) may be arbitrarily formed in the cylindrical portion 43 of the magnet holder 41 and the magnetic members 133. For example, as an alternative, each of the magnetic members 133 may have a keyway 135 formed in the outer peripheral portion thereof; on the inner circumferential surface of the cylindrical portion 43, there may be formed keys 134 to be respectively received in the keyways 135 of the magnetic members 133.

In the magnet unit 42 according to the present embodiment, with the alternate arrangement of the first magnets 131 and the second magnets 132, it becomes possible to increase the magnetic flux density in the first magnets 131. Consequently, it becomes possible to cause one-sided concentration of magnetic flux to occur in the magnetic unit 42, thereby intensifying magnetic flux on the side closer to the stator 50.

Moreover, with the magnetic members 133 arranged on the radially outer side, i.e., on the non-stator side of the first magnets 131, it becomes possible to suppress local magnetic saturation on the radially outer side of the first magnets 131; thus it becomes possible to suppress demagnetization of the first magnets 131 due to magnetic saturation. As a result, it becomes possible to increase the magnetic force of the magnet unit 42. That is, the magnet unit 42 according to the present embodiment can be regarded as being formed by replacing those portions of the first magnets 131 where it is easy for demagnetization to occur with the magnetic members 133.

Figure 24A:
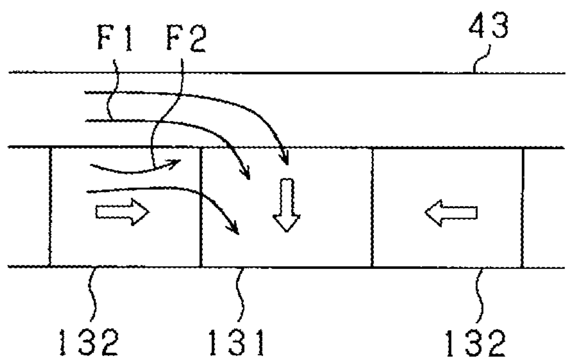
FIGS. 24(*a*) and 24(*b*) are diagrams illustrating flows of magnetic flux in magnet units.
Figure 24B:
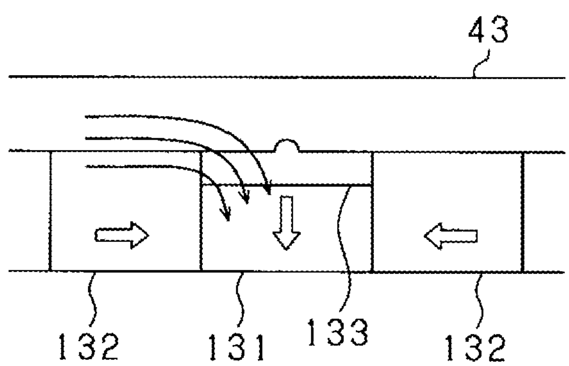

FIGS. 24(*a*) and 24(*b*) illustrate flows of magnetic flux respectively in different magnet units 42. Specifically, FIG. 24(*a*) illustrates the flow of magnetic flux in a magnet unit 42 that has a conventional configuration without magnetic members 133. FIG. 24(*b*) illustrates the flow of magnetic flux in the magnet unit 42 according to the present embodiment which is configured to have the magnetic members 133. In addition, in FIGS. 24(*a*) and 24(*b*), both the cylindrical portion 43 of the magnet holder 41 and the magnet unit 42 are developed to be straight in shape; the lower side corresponds to the stator side whereas the upper side corresponds to the non-stator side.

With the configuration shown in FIG. 24(*a*), the magnetic flux acting surfaces of the first magnets 131 and side surfaces of the second magnets 132 are arranged in contact with the inner circumferential surface of the cylindrical portion 43. Moreover, the magnetic flux acting surfaces of the second magnets 132 are arranged in contact with corresponding side surfaces of the first magnets 131. With the above arrangement, in the cylindrical portion 43, there is generated a resultant magnetic flux of magnetic flux F1, which flows through a magnetic path on the radially outer side of the second magnets 132 to enter the magnetic flux acting surfaces of the first magnets 131, and magnetic flux that flows substantially parallel to the cylindrical portion 43 and attracts magnetic flux F2 of the second magnets 132. Consequently, in the cylindrical portion 43, local magnetic saturation may occur in the vicinities of the contact surfaces between the first magnets 131 and the second magnets 132.

In contrast, with the configuration shown in FIG. 24(*b*), on the opposite side of the first magnets 131 to the stator 50, there are provided the magnetic members 133 between the magnetic flux acting surfaces of the first magnets 131 and the inner circumferential surface of the cylindrical portion 43, allowing magnetic flux to flow through the magnetic members 133. Consequently, it becomes possible to suppress occurrence of magnetic saturation in the cylindrical portion 43, thereby improving the resistance of the magnet unit 42 to demagnetization.

Moreover, with the configuration shown in FIG. 24(*b*), it is possible to eliminate, unlike in FIG. 24(*a*), the magnetic flux F2 which facilitates magnetic saturation. Consequently, it is possible to effectively improve the permeance of the entire magnetic circuit. Furthermore, it is possible to maintain the magnetic circuit characteristics even in a severe high-temperature condition.

In the present embodiment, the magnet magnetic paths through the inside of the magnets are lengthened in comparison with radial magnets in a conventional SPM rotor. Consequently, the magnet permanence is increased, thereby making it possible to increase the magnetic force and thus the torque. Moreover, the magnetic flux is concentrated on the center of the d-axis, thereby making it possible to increase the sine wave matching percentage. In particular, setting the electric current waveform, by PWM control, to be a sine wave or a trapezoidal wave or using 120° excitation switching ICs, it is possible to more effectively increase the torque.

In addition, in the case of the stator core 52 being formed of magnetic steel sheets, the radial thickness of the stator core 52 may be set to be larger than or equal to ½ of the radial thickness of the magnet unit 42. For example, the radial thickness of the stator core 52 may be set to be larger than or equal to ½ of the radial thickness of the first magnets 131 arranged on the magnetic pole centers in the magnet unit 42. Moreover, the radial thickness of the stator core 52 may be set to be smaller than the radial thickness of the magnet unit 42. In this case, since the magnet magnetic flux is about 1 [T] and the saturation flux density of the stator core 52 is equal to 2 [T], setting the radial thickness of the stator core 52 to be larger than or equal to ½ of the radial thickness of the magnet unit 42, it is possible to prevent magnetic flux leakage to the inner peripheral side of the stator core 52.

In magnets with a Halbach structure or a polar anisotropic structure, the magnetic paths are quasi-arc-shaped; therefore it is possible to increase magnetic flux in proportion to the thickness of those magnets which handle the circumferential magnetic flux. With such a configuration, it is considered that the magnetic flux flowing to the stator core 52 does not exceed the circumferential magnetic flux. That is, in the case of using an iron-based metal whose saturation flux density is 2 [T] with respect to the magnet magnetic flux being 1 [T], setting the thickness of the stator core 52 to be larger than or equal to half the thickness of the magnets, it is possible to suitably reduce both the size and weight of the rotating electric machine without causing magnetic saturation of the stator core 52. On the other hand, the magnet magnetic flux is generally lower than or equal to 0.9 [T] since a demagnetizing field from the stator 50 acts on the magnet magnetic flux. Therefore, setting the thickness of the stator core to be larger than or equal to half the thickness of the magnets, it is possible to suitably keep the permeability high.

Hereinafter, modifications will be described where the above-described configurations are partially modified.

(First Modification)

Figure 25:
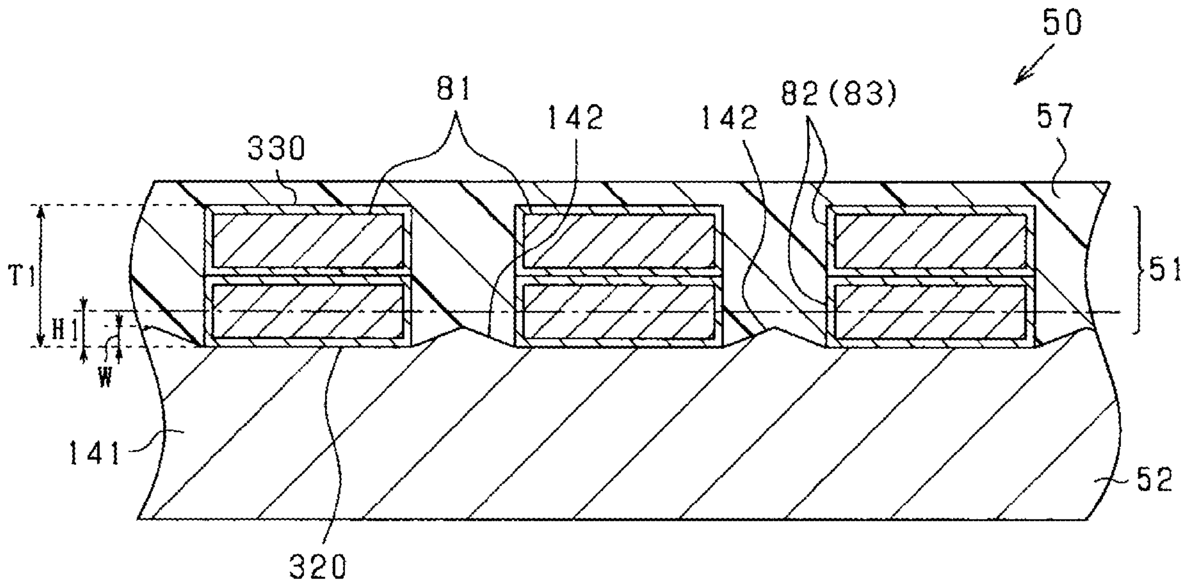
FIG. 25 is a cross-sectional view of a stator in a first modification.

In the above-described embodiments, the outer circumferential surface of the stator core 52 is configured as a smooth curved surface; on the outer circumferential surface of the stator core 52, the electrical conductor groups 81 are arranged at predetermined intervals. As an alternative, as shown in FIG. 25, the stator core 52 may include an annular yoke 141, which is located on the radially opposite side of the stator coil 51 to the rotor 40 (i.e., on the lower side of the stator coil 51 in the figure), and protrusions 142 each of which protrudes from the yoke 141 so as to be located between one circumferentially-adjacent pair of the straight portions 83. That is, the protrusions 142 are formed at predetermined intervals on the radially outer side, i.e., on the rotor 40 side of the yoke 141. The electrical conductor groups 81 forming the stator coil 51 engage with the protrusions 142 in the circumferential direction. That is, the protrusions 142 serve as positioning members for circumferential positioning the electrical conductor groups 81. In addition, the protrusions 142 also correspond to "inter-conductor members".

As shown in FIG. 25, the radial thickness of the protrusions 142 from the yoke 141, i.e., the distance W from inner side surfaces 320 of the straight portions 83, which adjoin the yoke 141, to the tops of the protrusions 142 in the radial direction of the yoke 141 is set to be smaller than ½ of the radial thickness of those of the straight portions 83 radially stacked in layers which radially adjoin the yoke 141 (i.e., smaller than H1 in the figure). In other words, the radial range corresponding to ¾ of T1 may be occupied by the nonmagnetic member (i.e., sealing member 57), where T1 is the dimension (or thickness) of the electrical conductor groups 81 (i.e., the conductive members) in the radial direction of the stator coil 51 (or the stator core 52) (twice the thickness of each of the electrical conductors 82, in other words, the minimum distance from the surfaces 320 of the electrical conductor groups 81 adjoining the stator core 52 to the surfaces 330 of the electrical conductor groups 81 facing the rotor 40). Limiting the thickness of the protrusions 142 as above, it becomes possible to prevent the protrusions 142 from functioning as teeth between the circumferentially-adjacent electrical conductor groups 81 (more specifically, the straight portions 83) and thus prevent magnetic paths from being formed by teeth. In addition, the protrusions 142 are not necessarily provided in all of the gaps formed between the circumferentially-adjacent electrical conductor groups 81. For example, as an alternative, there may be provided only one protrusion 142 which is located in the gap formed between one circumferentially-adjacent pair of the electrical conductor groups 81. As another alternative, there may be provided a plurality of protrusions 142 which are arranged at equal intervals in the circumferential direction so as to be respectively received in every predetermined number of the gaps formed between the circumferentially-adjacent electrical conductor groups 81. The shape of the protrusions 142 may be an arbitrary shape such as a rectangular or arc-like shape.

Moreover, on the outer circumferential surface of the stator core 52, the straight portions 83 may alternatively be provided in a single layer. Accordingly, in a broad sense, the radial thickness of the protrusions 142 from the yoke 141 may be set to be smaller than ½ of the radial thickness of each of the straight portions 83.

In addition, the protrusions 142 may be shaped so as to protrude from the yoke 141 within the range of an imaginary circle which centers on the axis of the rotating shaft 11 and extends through the radial center position of each of the straight portions 83 that radially adjoin the yoke 141. In other words, the protrusions 142 may be shaped so as not to protrude radially outside (i.e., to the rotor 40 side of) the imaginary circle.

With the above configuration, the radial thickness of the protrusions 142 is limited so that the protrusions 142 do not function as teeth between the circumferentially-adjacent straight portions 83. Consequently, it becomes possible to arrange the circumferentially-adjacent straight portions 83 closer to one another than in the case of providing teeth between the circumferentially-adjacent straight portions 83. As a result, it becomes possible to increase the cross-sectional area of each conductor body 82*a*, thereby reducing the amount of heat generated with energization of the stator coil 51. Moreover, since no teeth are provided in the stator 50, it is possible to prevent occurrence of magnetic saturation in the stator core 52, thereby making it possible to increase the energization current of the stator coil 51. In this case, however, it is possible to suitably cope with the problem that the amount of heat generated with energization of the stator coil 51 increases with the energization current. In addition, in the stator coil 51, each of the turn portions 84 has part thereof radially offset to form an interference prevention part. With the interference prevention parts of the turn portions 84, it becomes possible to arrange the turn portions 84 radially apart from each other. Consequently, it becomes possible to improve heat dissipation at the turn portions 84. As above, it becomes possible to improve heat dissipation in the stator 50.

In addition, in the case of the yoke 141 of the stator core 52 being located away from the magnet unit 42 (i.e., the magnets 91 and 92) of the rotor 40 by a predetermined distance or more, the radial thickness of the protrusions 142 is not subjected to H1 shown in FIG. 25. Specifically, when the yoke 141 is located away from the magnet unit 42 by 2 mm or more, the radial thickness of the protrusions 142 may be set to be larger than H1. For example, when the radial thickness of each of the straight portions 83 is larger than 2 mm and each of the electrical conductor groups 81 consists of two radially-stacked electrical conductors 82, the protrusions 142 may be provided within a range from the yoke 141 to the radial center position of the straight portion 83 not adjoining the yoke 141, i.e., to the radial center position of the second electrical conductor 82 counting from the yoke 141. In this case, setting the radial thickness of the protrusions 142 to be not larger than (H1×3/2), it is possible to achieve the above-described advantageous effects by increasing the conductor cross-sectional area in the electrical conductor groups 81.

Figure 26:
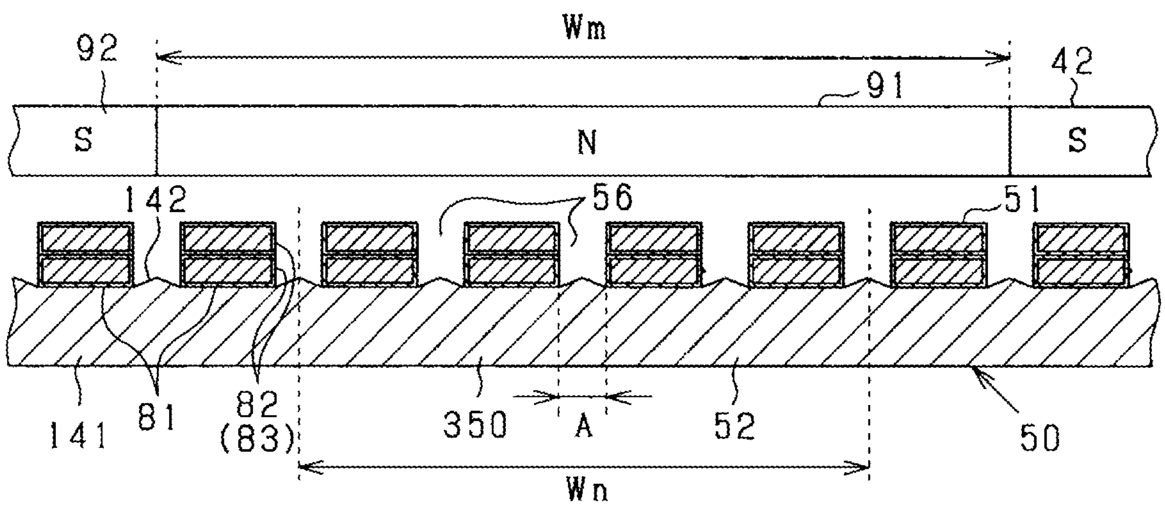
FIG. 26 is a cross-sectional view of another stator in the first modification.

Moreover, the stator core 52 may alternatively have a configuration as shown in FIG. 26. It should be noted that: the sealing resin 57 is omitted from FIG. 26; however, the sealing resin 57 may be included in the configuration shown in FIG. 26. In addition, in FIG. 26, for the sake of simplicity, both the magnet unit 42 and the stator core 52 are shown developed in a straight line.

In the configuration shown in FIG. 26, the stator 50 has, as the inter-conductor members, protrusions 142 each being formed between one circumferentially-adjacent pair of the electrical conductors 82 (i.e., the straight sections 83). The stator 50 also has a circumferentially-extending portion 350 that magnetically functions together with one magnetic pole (N or S pole) of the magnet unit 42 when the stator coil 51 is energized. The portion 350 has a circumferential length Wn. The protrusions 142 are formed of a magnetic material satisfying the following relationship:

$$Wt \times Bs \leq Wm \times Br \tag{1}$$

where Wt is the total width (i.e., the sum of circumferential widths) of the protrusions 142 present in the circumferential range of Wn, Bs is the saturation flux density of the protrusions 142, Wm is the circumferential width of each magnetic pole of the magnet unit 42 and Br is the residual flux density of the magnet unit 42.

In addition, the circumferential range Wn is set to include a plurality of circumferentially-adjacent electrical conductor groups 81 whose energization periods overlap each other. The references (or boundaries) in setting the range Wn may be preferably set to the centers of the gaps 56 formed between the electrical conductor groups 81. For example, in the configuration shown in FIG. 26, the circumferential range Wn is set to include four electrical conductor groups 81 located closest to the magnetic pole center of an N pole in the circumferential direction. The ends (start and end points) of the range Wn are respectively set to the centers of two of all the gaps 56 formed between the electrical conductor groups 81.

Moreover, in the configuration shown in FIG. 26, at each end of the range Wn, half of one protrusion 142 is included in the range Wn. Therefore, it can be considered that in the range Wn, there are included a total of four protrusions 142. Accordingly, the total width Wt of the protrusions 142 included in the range Wn can be calculated as follows: Wt=½A+A+A+A+½A=4A, where A is the width of each of the protrusions 142 (i.e., the dimension of each of the protrusions 142 in the circumferential direction of the stator 50, in other words, the interval between each adjacent pair of the electrical conductor groups 81).

Specifically, in the present embodiment, the three-phase coils of the stator coil 51 are wound in a distributed winding manner. In the stator coil 51, the number of the protrusions 142, i.e., the number of the gaps 56 formed between the electrical conductor groups 81 per magnetic pole of the magnet unit 42 is set to (number of phases×Q), where Q is the number of those of the electrical conductors 82 of each phase which are in contact with the stator core 52. In the case of the electrical conductors 82 being stacked in the radial direction of the rotor 40 to form the electrical conductor groups 81, Q is equal to the number of those electrical conductors 82 of the electrical conductor groups 81 of each phase which are located on the inner peripheral side in the electrical conductor groups 81. In this case, when the phase windings of the three-phase coils of the stator coil 51 are energized in a predetermined sequence, in each magnetic pole, the protrusions 142 corresponding to two phases are excited. Accordingly, in the range of each magnetic pole of the magnet unit 42, the total circumferential width Wt of the protrusions 142 that are excited by energization of the stator coil 51 is equal to (number of excited phases×Q×A=2×2×A), where A is the circumferential width of each of the protrusions 142 (or the circumferential width of each of the gaps 56).

Moreover, upon specifying the total width Wt as above, in the stator core 52, the protrusions 142 are formed of a magnetic material satisfying the above relationship (1). In addition, the total width Wt is also equal to the circumferential width of that portion in each magnetic pole whose relative permeability may become higher than 1. Moreover, giving a margin, the total width Wt may be determined to be the circumferential width of the protrusions 142 in each magnetic pole. More specifically, since the number of the protrusions 142 per magnetic pole of the magnet unit 42 is equal to (number of phases×Q), the circumferential width (i.e., the total circumferential width Wt) of the protrusions 142 in each magnetic pole may be determined to be (number of phases×Q×A=3×2×A=6A).

In addition, the distributed winding manner is such that there is one pole pair of the stator coil 51 for each pole pair period of the magnetic poles (i.e., N and S poles). One pole pair of the stator coil 51 is constituted of two straight portions 83 where electric currents respectively flow in opposite directions and which are electrically connected with each other via one turn portion 84, and the one turn portion 84. Satisfying the above condition, a short pitch winding may be regarded as being equivalent to a full pitch winding wound in the distributed winding manner.

Next, examples of the stator coil 51 being wound in a concentrated winding manner will be illustrated. The concentrated winding manner is such that the width of each magnetic pole pair is different from the width of each pole pair of the stator coil 51. The examples include an example where three electrical conductor groups 81 are provided with respect to each magnetic pole pair, an example where three electrical conductor groups 81 are provided with respect to two magnetic pole pairs, nine electrical conductor groups 81 are provided with respect to four magnetic pole pairs, and an example where nine electrical conductor groups 81 are provided with respect to five magnetic pole pairs.

In the case of the stator coil 51 being wound in the concentrated winding manner, when the phase windings of the three-phase coils of the stator coil 51 are energized in a predetermined sequence, two of the phase windings are excited at the same time. Consequently, the protrusions 142 corresponding to the two exited phase windings are also excited. Accordingly, in the range of each magnetic pole of the magnet unit 42, the circumferential width Wt of the protrusions 142 that are excited by energization of the stator coil 51 is equal to (A×2). Moreover, upon specifying the width Wt as above, the protrusions 142 are formed of a magnetic material satisfying the above relationship (1). In addition, in the case of the stator coil 51 being wound in the concentrated winding manner, the parameter A is represented by the sum of circumferential widths of the protrusions 142 in a region surrounded by the electrical conductor groups 81 of the same phase. Moreover, the parameter Wm is represented by (the entire circumference of the surface of the magnet unit 42 facing the air gap)×(number of phases)÷(distribution number of the electrical conductor groups 81).

In the case of magnets whose BH products are higher than or equal to 20[MGOe (KJ/$m^3$)], such as neodymium magnets, samarium-cobalt magnets or ferrite magnets, Bd is higher than or equal to 1.0 [T]. In the case of iron, Br is higher than or equal to 2.0 [T]. Therefore, in the case of the rotating electric machine being configured as a high-output motor, in the stator core 52, the protrusions 142 may be formed of a magnetic material satisfying the relationship of Wt<½×Wm.

Moreover, in the case of each of the electrical conductors 82 including an outer coat 182 as will be described later, the electrical conductors 82 may be arranged in the circumferential direction of the stator core 52 to have the outer coats 182 thereof in contact with one another. In this case, the parameter Wt may be considered to be equal to 0 or the sum of thicknesses of the outer coats 182 of two adjoining electrical conductors 82.

In the configurations shown in FIGS. 25 and 26, the inter-conductor members (i.e., the protrusions 142) are disproportionately small with respect to the magnet magnetic flux on the rotor 40 side. In addition, the rotor 40 is configured as a low-inductance and flat SPM rotor; thus the rotor 40 has no saliency in terms of magnetic reluctance. With these configurations, it is possible to lower the inductance of the stator 50. Further, with reduction in the inductance of the stator 50, it is possible to suppress occurrence of magnetic flux distortion due to a switching-timing deviation in the stator coil 51. As a result, it is possible suppress occurrence of galvanic corrosion in the bearings 21 and 22.

(Second Modification)

Figure 27:
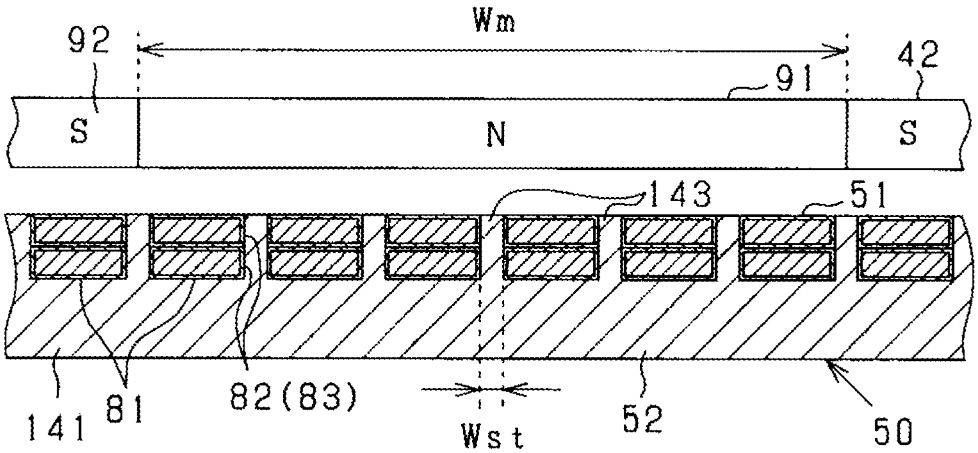
FIG. 27 is a cross-sectional view of a stator in a second modification.

The stator 50, which employs the inter-conductor members satisfying the above relationship (1), may alternatively have a configuration as shown in FIG. 27. In this configuration, tooth-shaped portions 143 are provided, as the inter-conductor members, on the outer circumferential surface (i.e., the upper surface in the figure) of the stator core 52. The tooth-shaped portions 143 each protrude from the yoke 141 and are arranged at predetermined intervals in the circumferential direction. The tooth-shaped portions 143 have a radial thickness equal to the radial thickness of the electrical conductor groups 81. Side surfaces of the tooth-shaped portions 143 are arranged to abut the electrical conductors 82 of the electrical conductor groups 81. Alternatively, there may be formed gaps between the tooth-shaped portions 143 and the electrical conductors 82 in the circumferential direction.

The tooth-shaped portions 143 are limited in circumferential width. That is, there are provided pole teeth (i.e., stator teeth) that are disproportionately thin with respect to the volume of the magnets. With this configuration, the tooth-shaped portions 143 can be reliably saturated by a magnet magnetic flux of 1.8 T or higher, thereby lowering the permeance and thus the inductance.

The magnetic flux on the magnet unit 42 side can be expressed as (Sm×Br), where Sm is the area of the stator-side magnetic flux acting surface per magnetic pole and Br is the residual flux density of the magnet unit 42. On the other hand, supposing that the tooth-shaped portions 143 corresponding to two phases are excited in each magnetic pole by energization of the stator coil 51, then the magnetic flux on the stator 50 side can be expressed as (St×m×2×Bs), where St is the area of the rotor-side surface of each tooth-shaped portion 143 and m is the number of the electrical conductors 82 per phase. In this case, the inductance can be lowered by limiting the dimensions of the tooth-shaped portions 143 so as to satisfy the following relationship:

$$St \times m \times 2 \times Bs < Sm \times Br \qquad (2)$$

In addition, in the case of the tooth-shaped portions 143 having the same axial dimension as the magnet unit 42, the above relationship (2) can be replaced with the following relationship:

$$Wst \times m \times 2 \times Bs < Wm \times Br \qquad (3)$$

where Wm is the circumferential width of the magnet unit 42 per magnetic pole and Wst is the circumferential width of each tooth-shaped portion 143.

More specifically, supposing that Bs=2 T, Br=1 T and m=2, the above relationship (3) can be reduced to the relationship of (Wst<Wm/8). In this case, the inductance can be lowered by setting the circumferential width Wst of each tooth-shaped portion 143 to be smaller than ⅛ of the circumferential width Wm of the magnet unit 42 per magnetic pole. In addition, in the case of m being equal to 1, the circumferential width Wst of each tooth-shaped portion 143 may be set to be smaller than ¼ of the circumferential width Wm of the magnet unit 42 per magnetic pole.

In addition, in the above relationship (3), (Wst×m×2) corresponds to the total circumferential width of the tooth-shaped portions 143 that are excited by energization of the stator coil 51 in the range of each magnetic pole of the magnet unit 42.

In the configuration shown in FIG. 27, the inter-conductor members (i.e., the tooth-shaped portions 143) are disproportionately small with respect to the magnet magnetic flux on the rotor 40 side as in the configurations shown in FIGS. 25 and 26. Consequently, it is possible to lower the inductance of the stator 50. Further, with reduction in the inductance of the stator 50, it is possible to suppress occurrence of magnetic flux distortion due to a switching-timing deviation in the stator coil 51. As a result, it is possible suppress occurrence of galvanic corrosion in the bearings 21 and 22.

(Third Modification)

Figure 28:
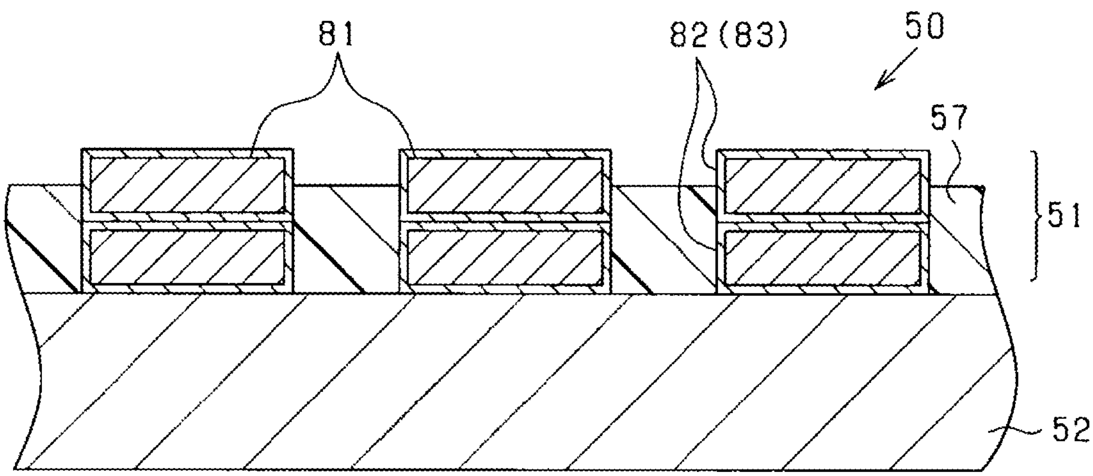
FIG. 28 is a cross-sectional view of a stator in a third modification.

In the above-described embodiments, the sealing member 57 is provided, on the radially outer side of the stator core 52, in a region covering all the electrical conductor groups 81, i.e., in a region whose radial thickness is larger than the radial thickness of each electrical conductor group 81. As an alternative, as shown in FIG. 28, the sealing member 57 may be provided so that the electrical conductors 82 are partially exposed from the sealing member 57. More specifically, those of the electrical conductors 82 which are arranged radially outermost in the electrical conductor groups 81 are partially exposed, on the radially outer side, i.e., on the rotor 40 side, from the sealing member 57. In this case, the radial thickness of the sealing member 57 may be set to be equal to or smaller than the radial thickness of each electrical conductor group 81.

(Fourth Modification)

Figure 29:
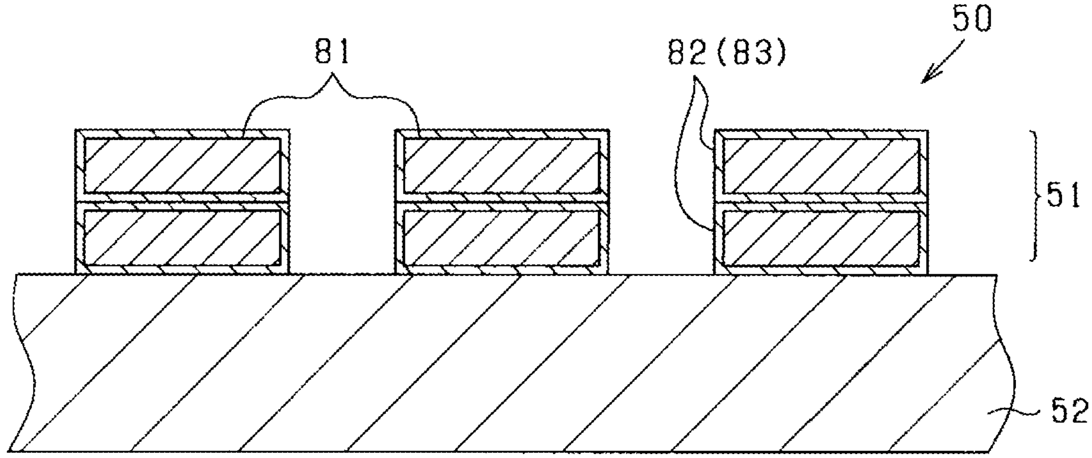
FIG. 29 is a cross-sectional view of a stator in a fourth modification.

As shown in FIG. 29, in the stator core 50, the electrical conductor groups 81 may not be sealed by any sealing member 57. That is, the stator core 50 may have no sealing member 57 employed therein to cover the stator coil 51. In this case, the gaps between the circumferentially-aligned electrical conductor groups 81 are not occupied by any inter-conductor members, remaining void. In other words, no inter-conductor members are provided between the circumferentially-aligned electrical conductor groups 81. In addition, air, which can be regarded as a nonmagnetic material or an equivalent of a nonmagnetic material satisfying Bs=0, may be filled in the gaps.

(Fifth Modification)

In the case of forming the inter-conductor members in the stator 50 with a nonmagnetic material, the nonmagnetic material may be implemented by a non-resin material, for example a nonmagnetic metal material such as SUS 304 which is an austenitic stainless steel.

(Sixth Modification)

The stator 50 may include no stator core 52. In this case, the stator 50 is configured with the stator coil 51 shown in FIG. 12. In addition, in the case of the stator 50 including no stator core 52, the stator coil 51 may be sealed with a sealing material. Alternatively, the stator 50 may include, instead of the stator core 52 formed of a soft-magnetic material, a stator coil holder that is annular in shape and formed of a nonmagnetic material such as a synthetic resin.

(Seventh Modification)

Figure 30:
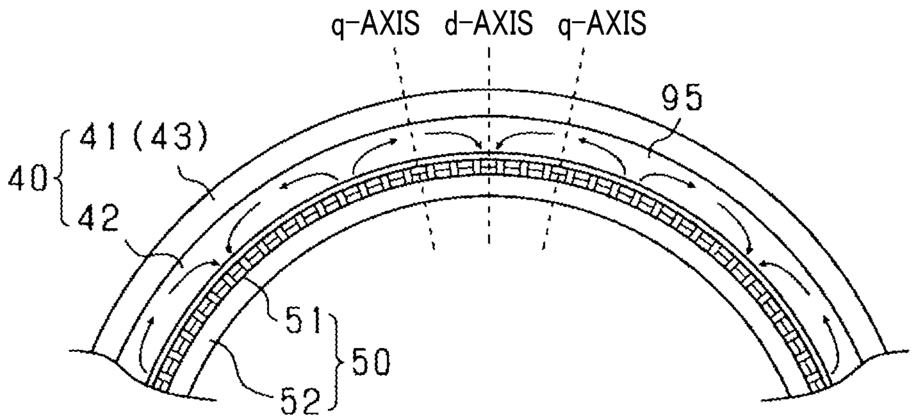
FIG. 30 is a transverse cross-sectional view of a rotor and a stator in a seventh modification.

In the first embodiment, the magnet unit 42 of the rotor 40 is configured with the plurality of magnets 91 and 92 arranged in the circumferential direction. As an alternative, the magnet unit 42 may be configured with an annular magnet which is a permanent magnet. Specifically, as shown in FIG. 30, the annular magnet 95 is fixed to the radially inner periphery of the cylindrical portion 43 of the magnet holder 41. In the annular magnet 95, there are formed a plurality of magnetic poles the polarities of which alternate between N and S in the circumferential direction. Moreover, both the d-axis and the q-axis are defined in the one-piece structured annular magnet 95. Furthermore, in the annular magnet 95, arc-shaped magnet magnetic paths are formed so as to be oriented in a radial direction at the d-axis in each of the magnetic poles and oriented in the circumferential direction at the q-axis between each adjacent pair of the magnetic poles.

In addition, in the annular magnet 95, arc-shaped magnet magnetic paths may be formed such that the easy axis of magnetization is oriented to be parallel to or near parallel to the d-axis in d-axis-side portions, and oriented to be perpendicular to or near perpendicular to the q-axis in q-axis-side portions.

(Eighth Modification)

In this modification, part of the control method of the controller 110 is modified. Accordingly, the differences of this modification from the above-described first embodiment will be mainly described.

Figure 31:
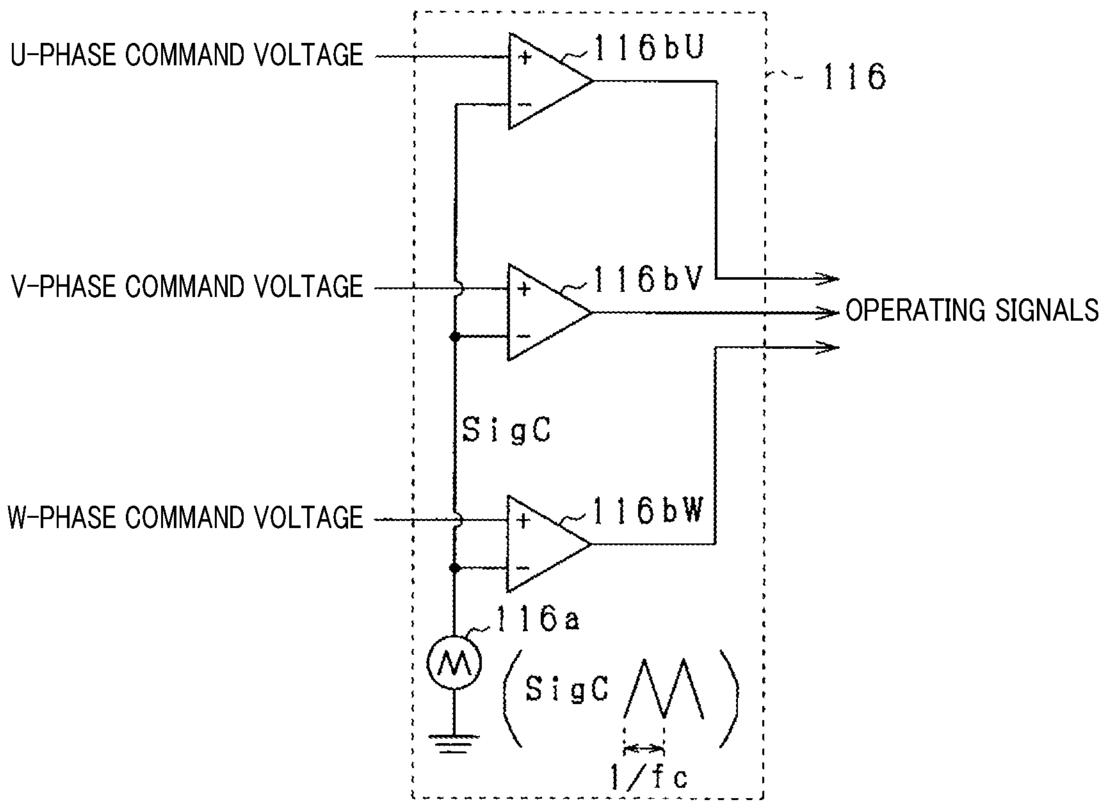
FIG. 31 is a functional block diagram illustrating part of a process performed by an operation signal generator in an eighth modification.

First, the processes performed by the operation signal generators 116 and 126 shown in FIG. 20 and the operation signal generators **130*a* and 130*b* shown in FIG. 21 will be described with reference to FIG. 31. In addition, the processes performed by the operation signal generators 116, 126, 130*a* and 130*b* are basically the same; therefore, only the process performed by the operation signal generator 116** will be described hereinafter.

The operation signal generator 116 includes a carrier signal generator **116*a* and U-phase, V-phase and W-phase comparators 116*b*U, 116*b*V and 116*b*W. In the present embodiment, the carrier signal generator 116*a*** generates and outputs a triangular-wave signal as a carrier signal SigC.

The carrier signal SigC generated by the carrier signal generator **116*a* is inputted to each of the U-phase, V-phase and W-phase comparators 116*b*U, 116*b*V and 116*b*W. Moreover, the U-phase, V-phase and W-phase command voltages calculated by the three-phase converter 115 are respectively inputted to the U-phase, V-phase and W-phase comparators 116***b*U, 116*b*V and 116*b*W. The U-phase, V-phase and W-phase command voltages are each in the form of, for example, a sine wave and offset in phase from each other by 120° in electrical angle.

The U-phase, V-phase and W-phase comparators 116*b*U, 116*b*V and 116*b*W generate, by PWM (Pulse-Width Modulation) control based on comparison in amplitude between the U-phase, V-phase and W-phase command voltages and the carrier signal SigC, the operation signals for operating the upper-arm and lower-arm switches Sp and Sn of the U, V and W phases in the first inverter 101. More specifically, the U-phase, V-phase and W-phase comparators 116*b*U, 116*b*V and 116*b*W generate the operation signals for operating the switches Sp and Sn of the U, V and W phases by the PWM control based on comparison in amplitude between signals, which are obtained by normalizing the U-phase, V-phase and W-phase command voltages with respect to the power supply voltage, and the carrier signal SigC. Then, the driver 117 turns on and off the switches Sp and Sn of the U, V and W phases in the first inverter 101 based on the operation signals generated by the U-phase, V-phase and W-phase comparators 116*b*U, 116*b*V and 116*b*W of the operation signal generator 116.

The controller 110 performs a process of varying the carrier frequency fc of the carrier signal SigC, i.e., varying the switching frequency of the switches Sp and Sn. Specifically, the carrier frequency fc is set to be higher in a low-torque region or a high-rotation region of the rotating electric machine 10 and to be lower in a high-torque region of the rotating electric machine 10. Such a setting is performed for suppressing the controllability of electric current flowing in each phase winding from being lowered.

The inductance of the stator 50 can be lowered by employing a core-less structure for the stator 50. However, with the lowering of the inductance of the stator 50, the electrical time constant of the rotating electric machine 10 is accordingly lowered. Consequently, ripple of electric current flowing in each phase winding of the stator coil 51 may be increased and thus the controllability of the electric current may drop, causing the electric current control to diverge. Moreover, the influence of the controllability drop may become more remarkable when the electric current (e.g., the effective value of the electric current) flowing in each phasing winding is within a low-current region than when the electric current is within a high-current region. To cope with this problem, in this modification, the controller 110 varies the carrier frequency fc.

The process of varying the carrier frequency fc will be described with reference to FIG. 32. This process is repeatedly performed, as the process of the operation signal generator 116, by the controller 110 in a predetermined control cycle.

First, in step S10, the controller 110 determines whether electric current flowing in each phase winding 51*a* is within the low-current region. This determination is made for determining whether the current torque of the rotating electric machine 10 is within the low-torque region. In addition, this determination can be made using, for example, either of the following first and second methods.

[First Method]

According to the first method, a torque estimation value of the rotating electric machine 10 is first calculated on the basis of the d-axis and q-axis currents obtained by the dq converter 112. Then, a determination is made as to whether the calculated torque estimation value is lower than a torque threshold value. If the calculated torque estimation value is lower than the torque threshold value, it is determined that the electric current flowing in each phase winding 51*a* is within the low-current region. In contrast, if the calculated torque estimation value is higher than or equal to the torque threshold value, it is determined that the electric current flowing in each phase winding 51*a* is within the high-current region. In addition, the torque threshold value may be set to, for example, ½ of a starting torque (or locked torque) of the rotating electric machine 10.

[Second Method]

According to the second method, a determination is made as to whether the rotation angle of the rotor 40 detected by the rotation angle detector is greater than or equal to a speed threshold value. If the rotation angle of the rotor 40 is greater than or equal to the speed threshold value, it is determined that the rotational speed of the rotor 40 is within the high-rotation region, i.e., the electric current flowing in each phase winding 51*a* is within the low-current region. In addition, the speed threshold value may be set to, for example, the rotational speed value at which the maximum torque of the rotating electric machine 10 becomes equal to the torque threshold value.

Referring back to FIG. 32, if the determination in step S10 results in a “NO” answer, i.e., if the electric current flowing in each phase winding is within the high-current region, the process proceeds to step S11. In step S11, the controller 110 sets the carrier signal fc to a first frequency fL. Then, the process terminates.

In contrast, if the determination in step S10 results in a “YES” answer, i.e., if the electric current flowing in each phase winding is within the low-current region, the process proceeds to step S12. In step S12, the controller 110 sets the carrier signal fc to a second frequency fH that is higher than the first frequency fL. Then, the process terminates.

As described above, in the present modification, the carrier frequency fc is set to be higher when the electric current flowing in each phase winding is within the low-current region than when the electric current is within the high-current region. Accordingly, the switching frequency of the switches Sp and Sn is set to be higher when the electric current flowing in each phase winding is within the low-current region than when the electric current is within the high-current region. Consequently, when the electric current flowing in each phase winding is within the low-current region, it is possible to suppress increase in ripple of the electric current flowing in each phase winding, thereby suppressing the controllability of the electric current from being lowered.

On the other hand, when the electric current flowing in each phase winding is within the high-current region, the amplitude of the electric current is higher than when the electric current is within the low-current region. Therefore, the increase in ripple of the electric current due to the lowering of the inductance affects the controllability of the electric current less. Accordingly, it is possible to set the carrier frequency fc to be lower when the electric current flowing in each phase winding is within the high-current region than when the electric current is within the low-current region, thereby reducing switching loss in the inverters 101 and 102.

Moreover, the following further modifications may be made in addition to the present modification.

Figure 32:
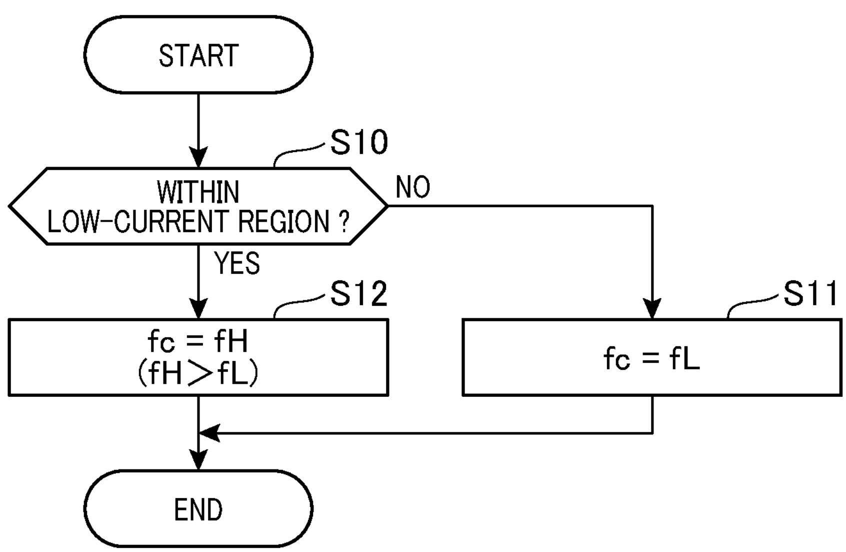
FIG. 32 is a flow chart illustrating a process of varying a carrier frequency.

In the process shown in FIG. 32, in the case of the carrier frequency fc having been set to the first frequency fL, when the determination in step S10 results in a “YES” answer, the carrier frequency fc may be gradually increased from the first frequency fL to the second frequency fH.

In contrast, in the case of the carrier frequency fc having been set to the second frequency fH, when the determination in step S10 results in a "NO" answer, the carrier frequency fc may be gradually decreased from the second frequency fH to the first frequency fL.

The operation signals for operating the switches may be generated by a SVM (Space Vector Modulation) control instead of the PWM control. In this case, it is also possible to apply the above-described process of varying the switching frequency.

(Ninth Modification)

Figures 33A, 33B, 33C:
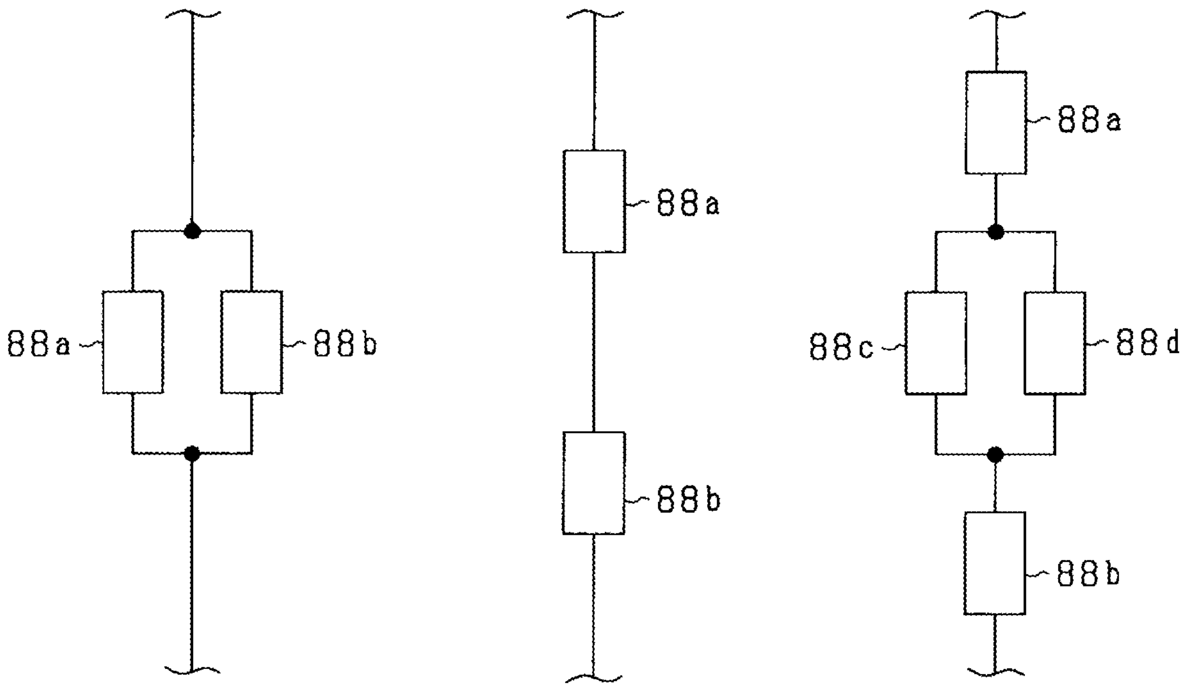
FIGS. 33(*a*)-33(*c*) are diagrams illustrating the manners of connecting electrical conductors forming an electrical conductor group in a ninth modification.

In the above-described embodiments, there are provided two pairs of electrical conductors per phase, which constitute the electrical conductor groups 81. Moreover, as shown in FIG. 33(*a*), first and second electrical conductors 88*a* and 88*b*, each of which consists of one pair of electric conductors, are connected in parallel with each other. As an alternative, as shown in FIG. 33(*b*), the first and second electrical conductors 88*a* and 88*b* may be connected in series with each other.

Figure 34:
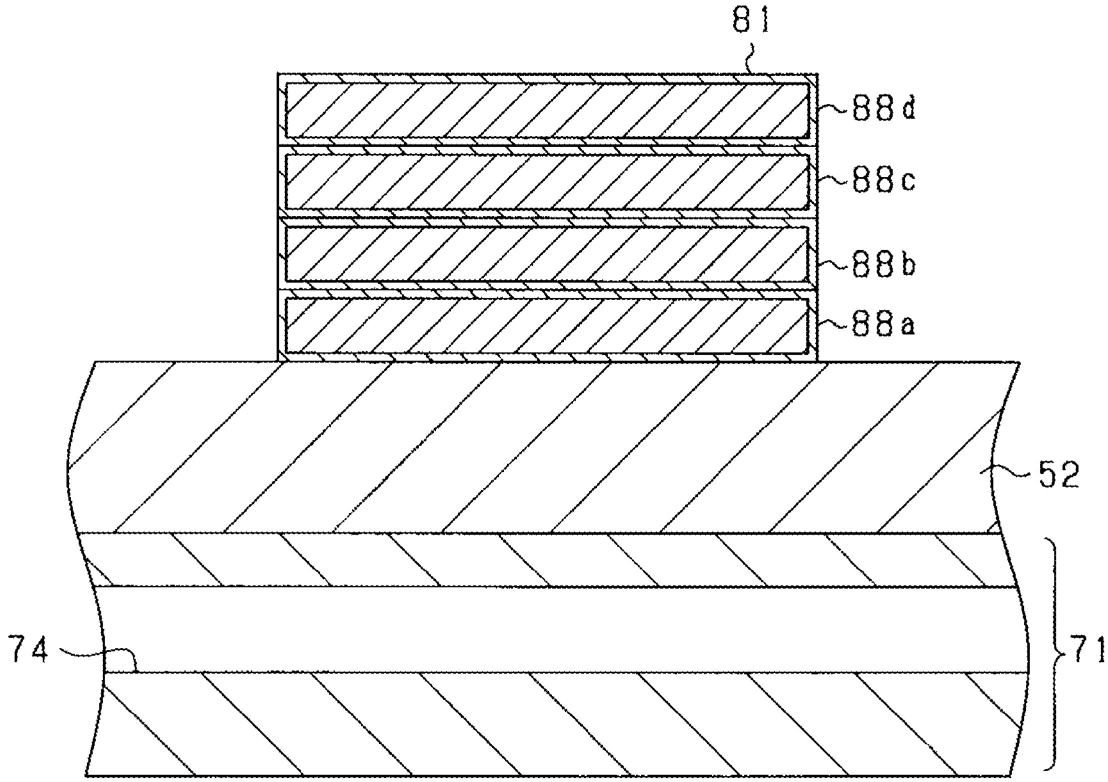
FIG. 34 is a diagram illustrating a configuration of radially stacking four pairs of electrical conductors in the ninth modification.

Moreover, three or more pairs of multi-layer electrical conductors may be radially stacked. For example, FIG. 34 illustrates a configuration where first, second, third and fourth electrical conductors 88*a*, 88*b*, 88*c* and 88*d*, each of which consists of one pair of electric conductors, are radially stacked. More specifically, the first, second, third and fourth electrical conductors 88*a*, 88*b*, 88*c* and 88*d* are arranged in this order from the stator core 52 side so as to be in radial alignment with each other.

Moreover, as shown in FIG. 33(*c*), the third and fourth electrical conductors 88*c* and 88*d* may be connected in parallel with each other to form a parallel-connected unit; further, the first and second electrical conductors 88*a* and 88*b* may be respectively connected to opposite ends of the parallel-connected unit. With the parallel connection, it is possible to lower the electric current density of the parallel-connected electrical conductors, thereby reducing heat generated in these electrical conductors during energization thereof. Furthermore, in the configuration where the hollow cylindrical stator coil is assembled to the housing (i.e., the unit base 61) which has the cooling water passage 74 formed therein, the first and second electrical conductors 88*a* and 88*b*, which are not connected in parallel, are located closer than the parallel-connected third and fourth electrical conductors 88*c* and 88*d* to the stator core 52 that abuts the unit base 61. Consequently, it becomes possible to equalize the cooling performances of the electrical conductors 88*a*-88*d* in the multi-layer conductor structure.

In addition, the radial thickness of the electrical conductor groups 81, which are constituted of the electrical conductors 88*a*-88*d*, may be set to be smaller than the circumferential width per phase in each magnetic pole.

(Tenth Modification)

Figure 35:
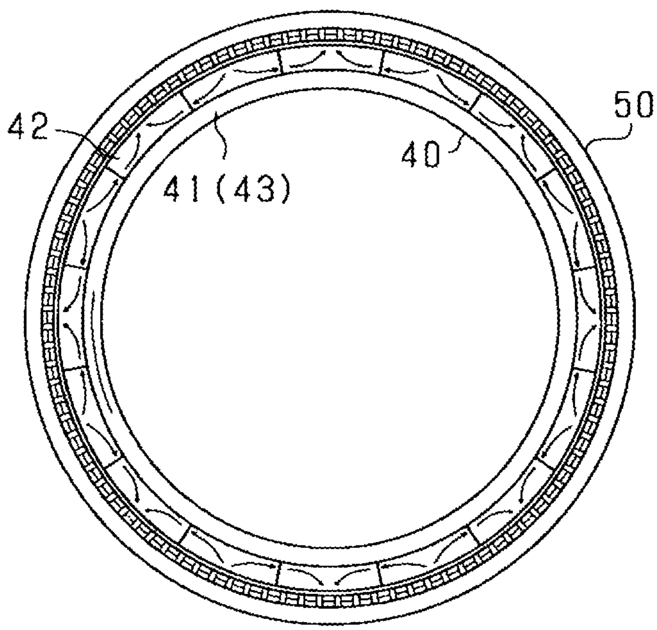
FIG. 35 is a transverse cross-sectional view of both a rotor and a stator of an inner rotor type rotating electric machine in a tenth modification.
Figure 36:
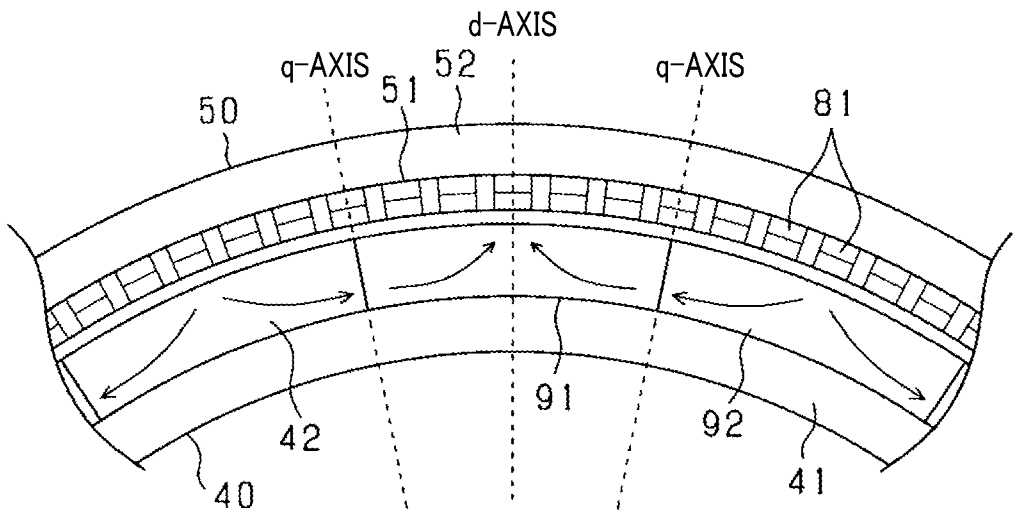
FIG. 36 is an enlarged view of part of FIG. 35.

The rotating electric machine 10 may alternatively be configured to have an inner rotor structure (i.e., inner rotating structure). In this case, in the housing 30, the rotor 40 is arranged radially inside the stator 50. Moreover, in this case, the inverter unit 60 may be provided at either or both of axial ends of the rotor 40 and the stator 50. FIG. 35 is a transverse cross-sectional view of both the rotor 40 and the stator 50. FIG. 36 is an enlarged view of part of FIG. 35.

The configuration of the inner rotor type rotating electric machine 10 shown in FIGS. 35 and 36 is identical to the configuration of the outer rotor type rotating electric machine 10 shown in FIGS. 8 and 9 except for the radial positional relationship between the rotor 40 and the stator 50. Specifically, in the inner rotor type rotating electric machine 10, the stator 50 also includes a stator coil 51 having a flat conductor structure, and a toothless stator core 52. The stator coil 51 is assembled to the radially inner periphery of the stator core 52. Moreover, the stator 50 may have any of the following configurations (A)-(C) as in the case of the outer rotor structure.

(A) In the stator 50, inter-conductor members are provided between the electrical conductor sections in the circumferential direction. The inter-conductor members are formed of a magnetic material satisfying the following relationship: $Wt \times Bs \leq Wm \times Br$, where Wt is the circumferential width of the inter-conductor members in each magnetic pole, Bs is the saturation flux density of the inter-conductor members, Wm is the circumferential width of the magnet unit in each magnetic pole and Br is the residual flux density of the magnet unit.

(B) In the stator 50, inter-conductor members are provided between the electrical conductor sections in the circumferential direction. The inter-conductor members are formed of a nonmagnetic material.

(C) In the stator 50, no inter-conductor members are provided between the electrical conductor sections in the circumferential direction.

Moreover, the configuration of the magnets 91 and 92 of the magnet unit 42 in the inner rotor type rotating electric machine is similar to that in the outer rotor type rotating electric machine. That is, the magnet unit 42 is configured with the magnets 91 and 92 each of which is oriented such that the direction of the easy axis of magnetization is more parallel to the d-axis on the d-axis side than on the q-axis side; the d-axis represents the centers of the magnetic poles while the q-axis represents the boundaries between the magnetic poles. The details of the magnetization directions in the magnets 91 and 92 are the same as described previously. In addition, the magnet unit 42 may alternatively be configured with an annular magnet 95 (see FIG. 30).

Figure 37:
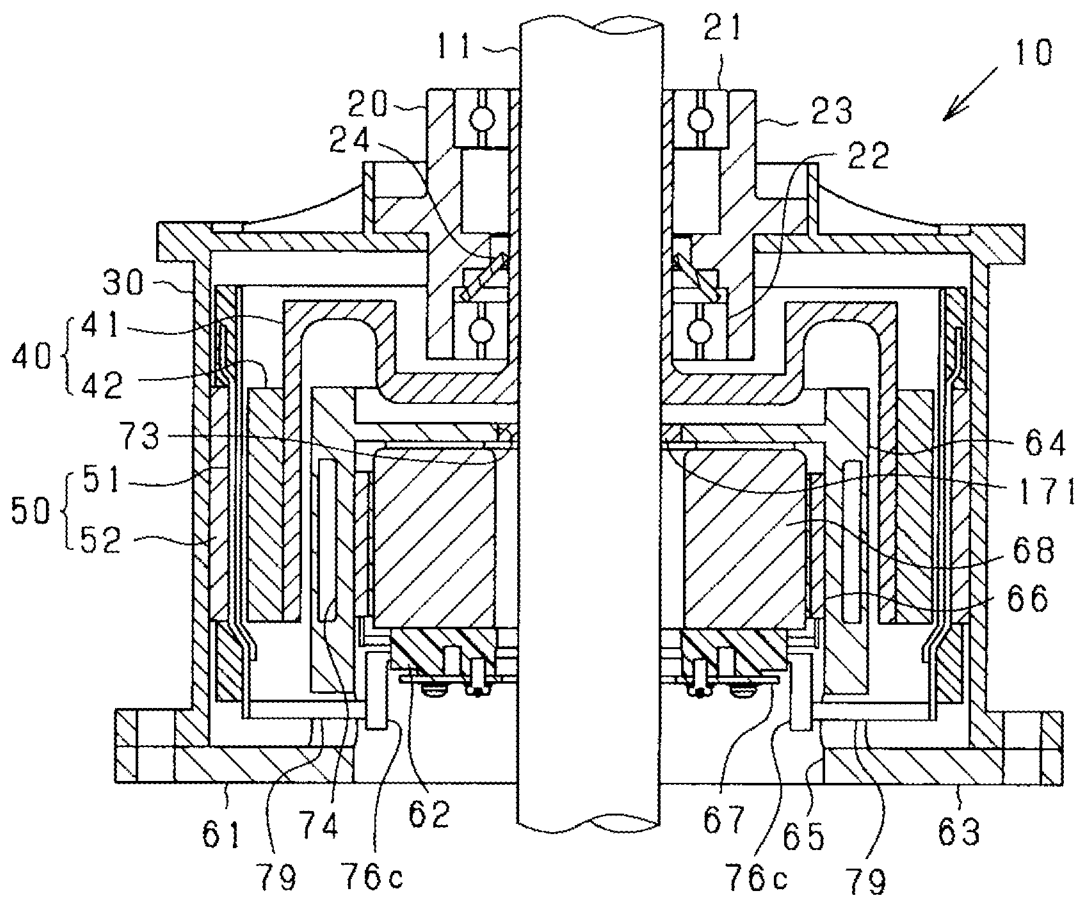
FIG. 37 is a longitudinal cross-sectional view of the inner rotor type rotating electric machine in the tenth modification.

FIG. 37 is a longitudinal cross-sectional view of the inner rotor type rotating electric machine 10, which corresponds to FIG. 2 described above. Hereinafter, the differences of the configuration shown in FIG. 37 from the configuration shown in FIG. 2 will be briefly described. In the inner rotor type rotating electric machine 10 shown in FIG. 37, the annular stator 50 is fixed to the inner periphery of the housing 30. The rotor 40 is rotatably provided inside the stator 50 with a predetermined air gap formed therebetween. The rotor 40 is supported in a cantilever fashion via the bearings 21 and 22 that are arranged on one axial side of the axially center position of the rotor 40 as in the configuration shown in FIG. 2. The inverter unit 60 is provided inside the magnet holder 41 of the rotor 40.

Figure 38:
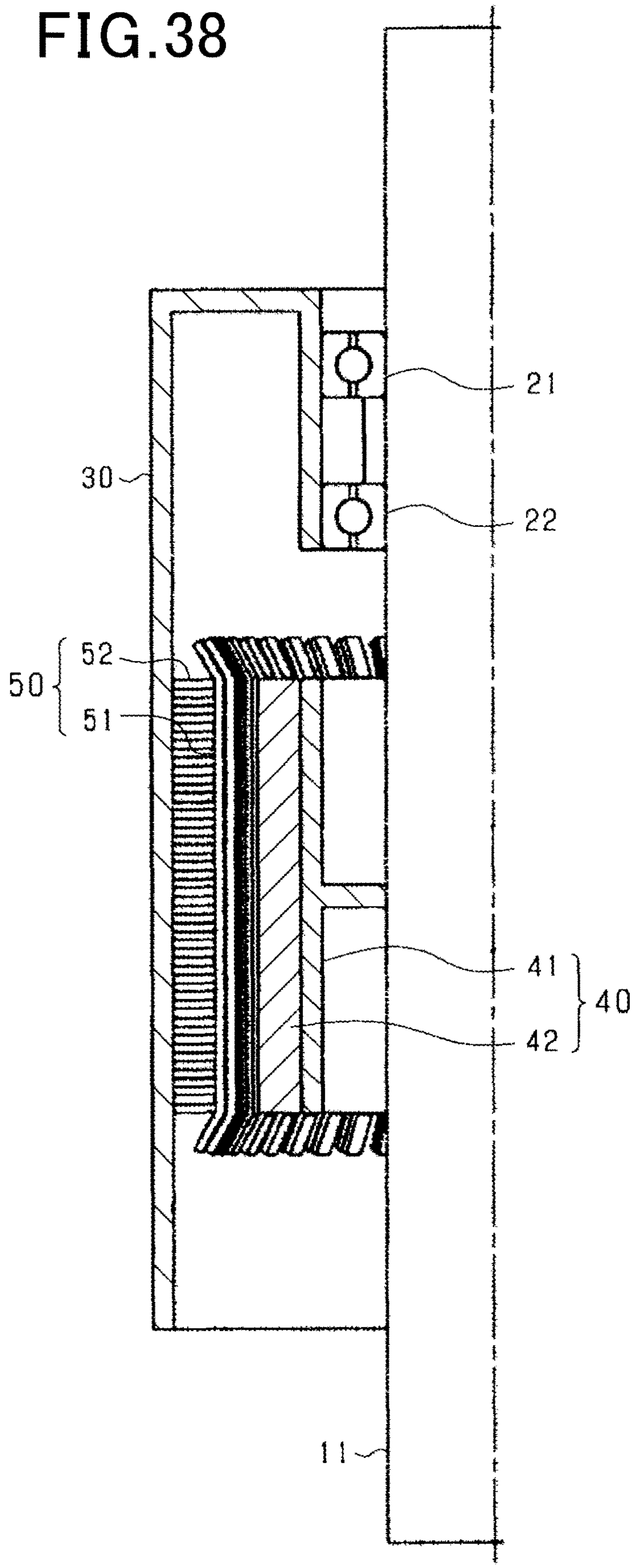
FIG. 38 is a longitudinal cross-sectional view illustrating the overall configuration of another inner rotor type rotating electric machine in the tenth modification.

FIG. 38 shows an alternative configuration of the inner rotor type rotating electric machine 10. In this configuration, in the housing 30, the rotating shaft 11 is rotatably supported directly by the bearings 21 and 22. The rotor 40 is fixed on the rotating shaft 11. The bearings 21 and 22 are arranged on one axial side of the axially center position of the rotor 40 as in the configuration shown in FIG. 2. The rotor 40 includes the magnet holder 41 and the magnet unit 42.

The rotating electric machine 10 shown in FIG. 38 differs from the rotating electric machine 10 shown in FIG. 37 in that no inverter unit 60 is provided radially inside the rotor 40. The magnet holder 41 is located radially inside the magnet unit 42 and connected to the rotating shaft 11. The stator 50 includes the stator coil 51 and the stator core 52. The stator 50 is mounted to the housing 30.

(Eleventh Modification)

Figure 39:
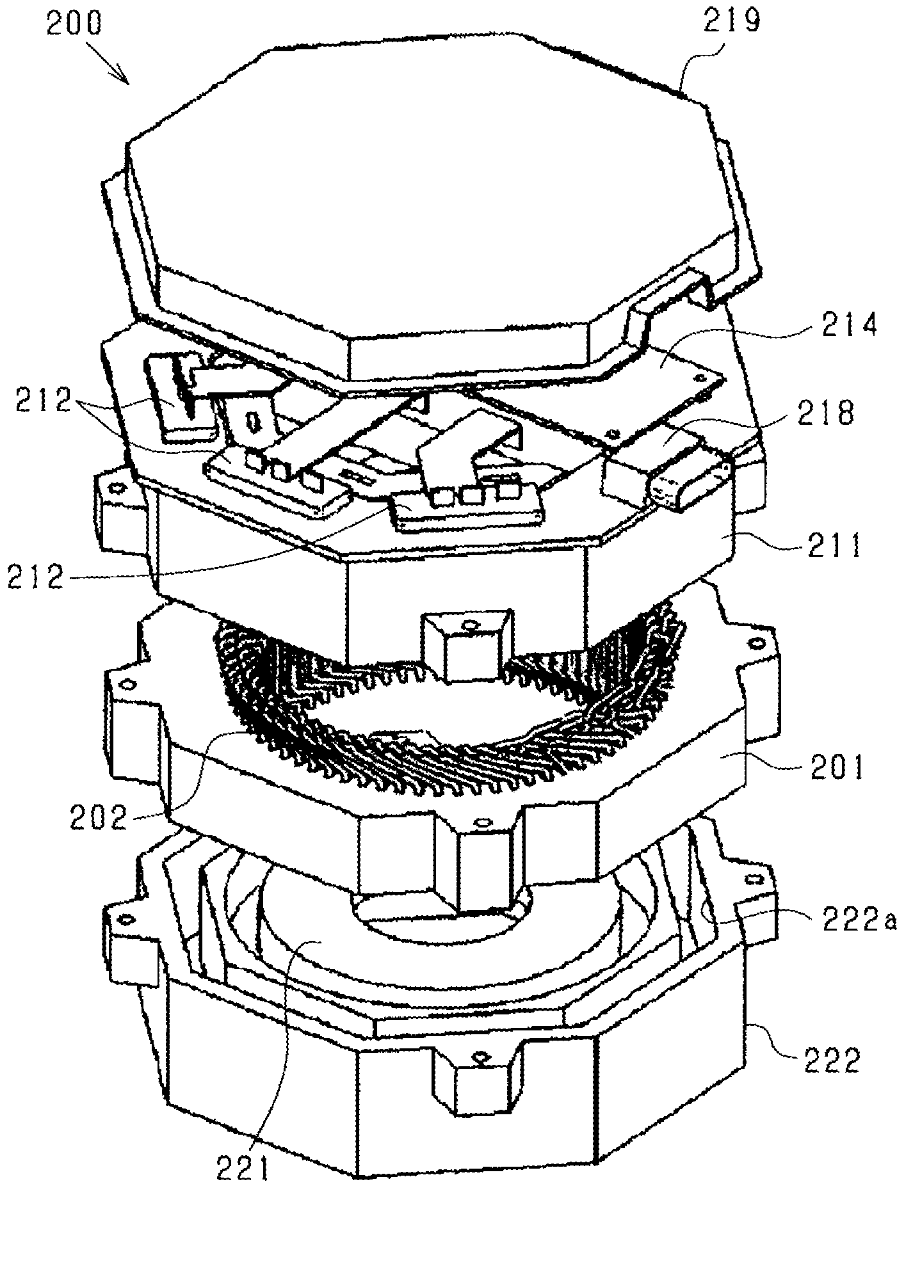
FIG. 39 is a diagram illustrating the configuration of an inner rotor type rotating electric machine in an eleventh modification.
Figure 40:
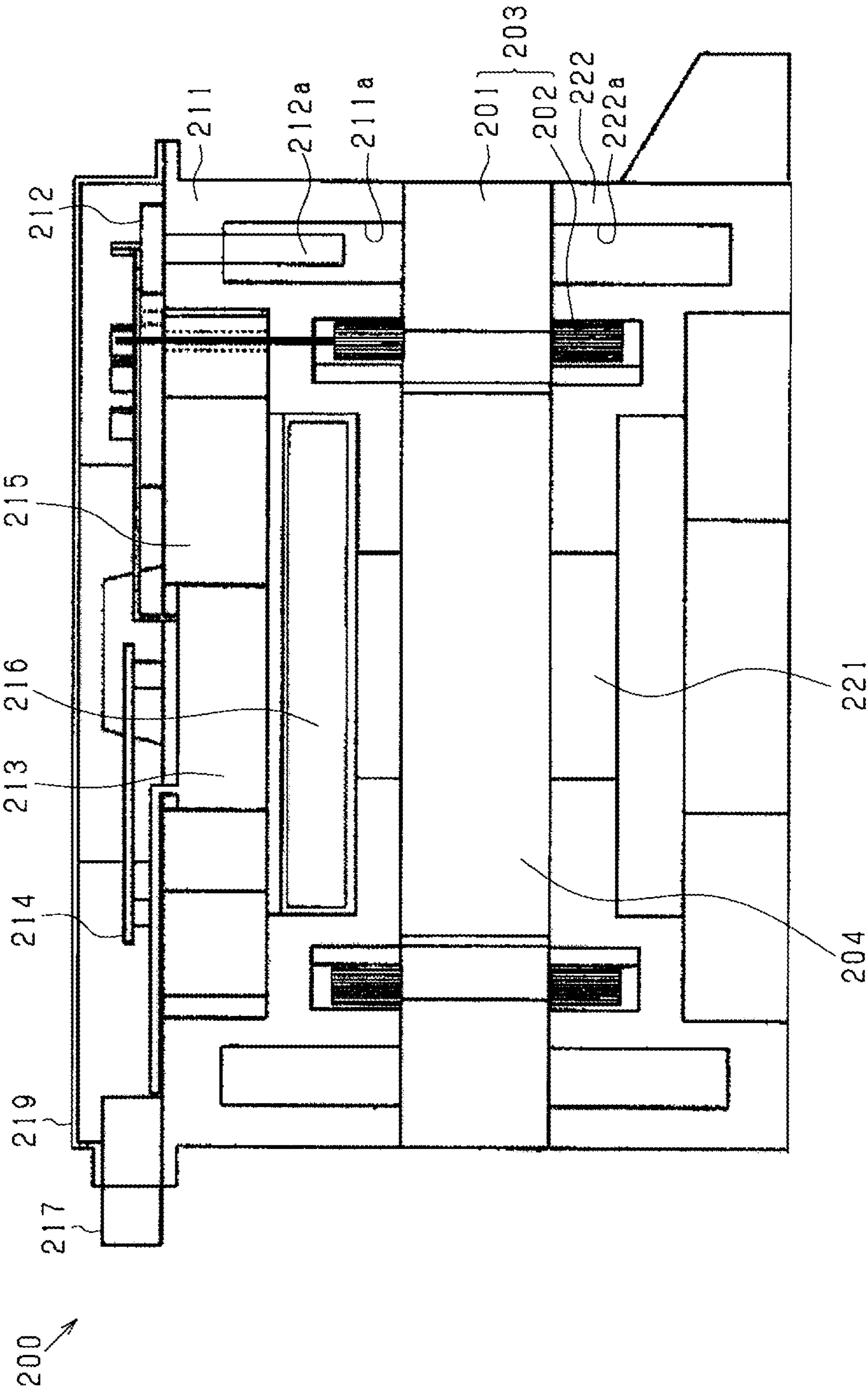
FIG. 40 is a diagram illustrating the configuration of the inner rotor type rotating electric machine in the eleventh modification.

Another alternative configuration of an inner rotor type rotating electric machine will be described. FIG. 39 is an exploded perspective view of an inner rotor type rotating electric machine 200. FIG. 40 is a side cross-sectional view of the inner rotor type rotating electric machine 200. Hereinafter, the vertical direction denotes the vertical direction in FIGS. 39 and 40.

As shown in FIGS. 39 and 40, the rotating electric machine 200 includes a stator 203, which includes an annular stator core 201 and a multi-phase stator coil 202, and a rotor 204 that is rotatably disposed radially inside the stator core 201. The stator 203 functions as an armature while the rotor 204 functions as a field system. The stator core 201 is formed by laminating a plurality of silicon steel sheets. The stator coil 202 is mounted to the stator core 201. The rotor 204 includes, though not shown in the figures, a rotor core and a magnet unit constituted of a plurality of permanent magnets. In the rotor core, there are formed a plurality of magnet insertion holes at equal intervals in the circumferential direction. In each of the magnet insertion holes, there is inserted one of the permanent magnets. The permanent magnets are magnetized so that the magnetization directions of adjacent magnetic poles alternately change. In addition, the arrangement of the permanent magnets of the magnet unit may be the same as or similar to the Halbach array shown in FIG. 23. Alternatively, the permanent magnets of the magnet unit may have polar anisotropic characteristics as shown in FIG. 9 or FIG. 30; the polar anisotropic characteristics are such that the orientation direction (i.e., the magnetization direction) extends in an arc shape between the d-axis at the center of each of the magnetic poles and the q-axis at the boundary between each adjacent pair of the magnetic poles.

The stator 203 may have any of the following configurations (A)-(C).

(A) In the stator 203, inter-conductor members are provided between the electrical conductor sections in the circumferential direction. The inter-conductor members are formed of a magnetic material satisfying the following relationship: $Wt \times Bs \leq Wm \times Br$, where Wt is the circumferential width of the inter-conductor members in each magnetic pole, Bs is the saturation flux density of the inter-conductor members, Wm is the circumferential width of the magnet unit in each magnetic pole and Br is the residual flux density of the magnet unit.

(B) In the stator 203, inter-conductor members are provided between the electrical conductor sections in the circumferential direction. The inter-conductor members are formed of a nonmagnetic material.

(C) In the stator 203, no inter-conductor members are provided between the electrical conductor sections in the circumferential direction.

In the rotor 204, the magnet unit is configured with the permanent magnets where the easy axis of magnetization is oriented such that the direction of the easy axis of magnetization is more parallel to the d-axis on the d-axis side than on the q-axis side.

At one axial end of the rotating electric machine 200, there is arranged an annular inverter case 211 so that a lower end surface of the inverter case 211 abuts an upper end surface of the stator core 201. In the inverter case 211, there are provided: a plurality of power modules 212 forming an inverter circuit; a smoothing capacitor 213 for suppressing voltage/current ripple caused by switching operation of semiconductor switching elements; a control substrate 214 including a controller; current sensors 215 for detecting phase currents; and a resolver stator 216 that is a stator part of a resolver for detecting the rotational speed of the rotor 204. The power modules 212 include the respective semiconductor switching elements, which are implemented by, for example, IGBTs, and diodes.

On a peripheral portion of the inverter case 211, there are provided a power connector 217 connected to a DC circuit of a battery mounted in a vehicle, and a signal connector 218 used for exchange of various signals between the rotating electric machine 200 and a vehicle-side controller. The inverter case 211 is covered by a top cover 219. DC power from the in-vehicle battery is inputted via the power connector 217, converted into AC power by the switching of the power modules 212, and supplied to each phase winding of the stator coil 202.

On an opposite axial side of the stator core 201 to the inverter case 211, there are provided: a bearing unit 221 for rotatably supporting a rotating shaft of the rotor 204; and an annular rear case 222 that receives the bearing unit 221 therein. The bearing unit 221, which includes a pair of bearings, is arranged on one axial side of an axially center position of the rotor 204. It should be noted the bearing unit 221 may alternatively include bearings respectively arranged on opposite axial sides of the stator core 201 to rotatably support the rotating shaft. The rotating electric machine 200 is configured to be mounted to a mounting part, such as a gear case or a transmission case, of the vehicle by bolt-fastening the rear case 222 to the mounting part.

In the inverter case 211, there is formed a coolant passage 211*a* through which a coolant flows. The coolant passage 211*a* is constituted of an annular recess that is formed in the lower end surface of the inverter case 211 and closed by the upper end surface of the stator core 201. Moreover, the coolant passage 211*a* is formed so as to surround a coil end of the stator coil 202. In the coolant passage 211*a*, there are inserted module cases 212*a* of the power modules 212. In the rear case 222, there is formed a coolant passage 222*a* so as to surround another coil end of the stator coil 202. The coolant passage 222*a* is constituted of an annular recess that is formed in the upper end surface of the rear case 222 and closed by the lower end surface of the stator core 201.

(Twelfth Modification)

Figure 41:
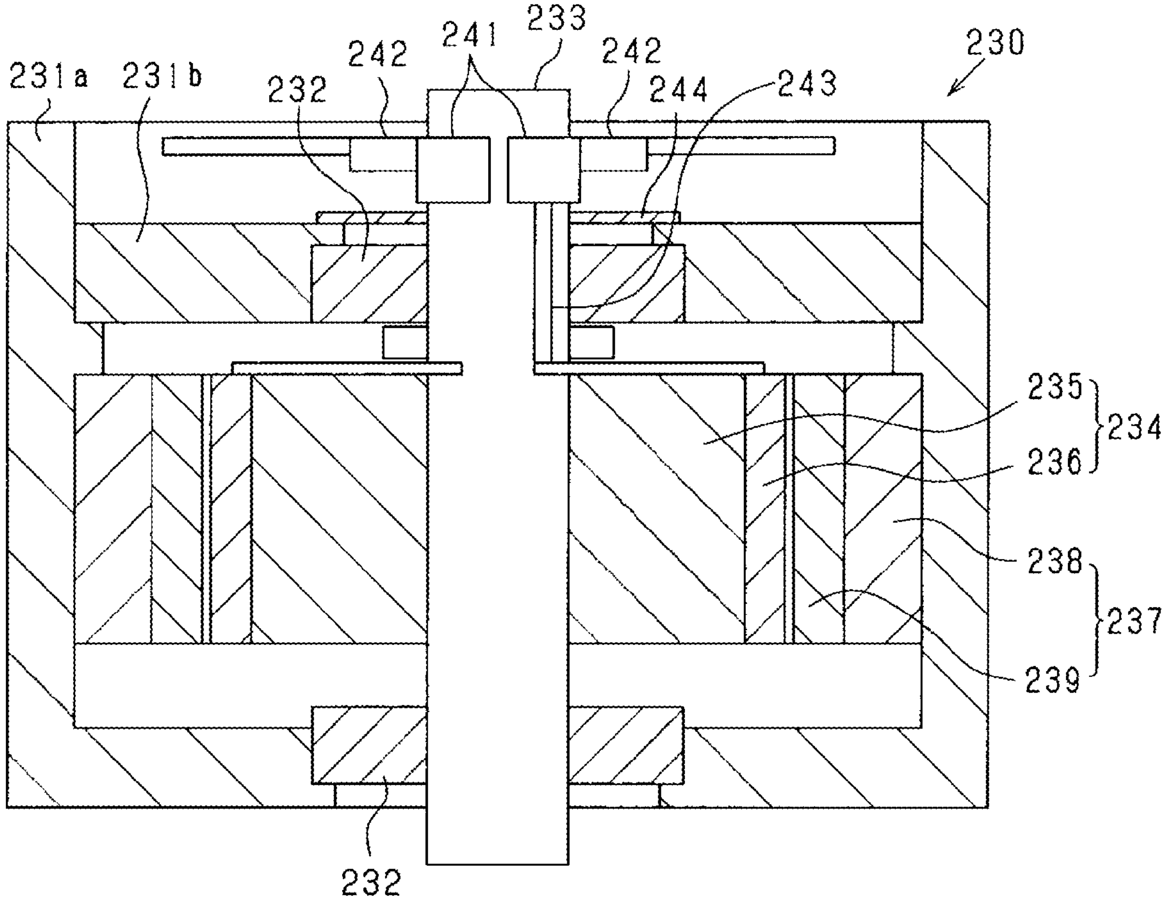
FIG. 41 is a diagram illustrating the configuration of a rotating-armature type rotating electric machine in a twelfth modification.

In the above-described embodiments and modifications, the rotating-field type rotating electric machines are illustrated. In contrast, this modification illustrates a rotating-armature type rotating electric machine 230. FIG. 41 shows the configuration of the rotating-armature type rotating electric machine 230.

In the rotating electric machine 230 shown in FIG. 41, each of housings 231*a* and 231*b* has one bearing 232 fixed thereto. A rotating shaft 233 is rotatably supported by the bearings 232. In addition, the bearings 232 may be implemented by, for example, oil-retaining bearings that are formed by impregnating oil into a porous metal. On the rotating shaft 233, there is fixed a rotor 234 that functions as an armature. The rotor 234 includes a rotor core 235 and a multi-phase rotor coil 236 fixed to an outer periphery of the rotor core 235. In the rotor 234, the rotor core 235 has a slot-less structure and the rotor coil 236 has a flat conductor structure. That is, the rotor coil 236 has a flat structure such that each region per phase is longer in a circumferential direction than in a radial direction.

On a radially outer side of the rotor 234, there is provided a stator 237 that functions as a field system. The stator 237 has a stator core 238 fixed to the housing 231*a* and a magnet unit 239 fixed to an inner periphery of the stator core 238. The magnet unit 239 is configured to include a plurality of magnetic poles whose polarities alternate in the circumferential direction. Similar to the above-described magnet unit 42, the magnet unit 239 is also configured to have the easy axis of magnetization oriented such that the direction of the easy axis of magnetization is more parallel to the d-axis on the d-axis side than on the q-axis side. The magnet unit 239 includes sintered neodymium magnets whose intrinsic coercive force is higher than or equal to 400 [kA/m] and residual flux density is higher than or equal to 1.0 [T].

The rotating electric machine 230 according to the present modification is configured as a two-pole, three-coil, brushed and coreless motor. The rotor coil 236 is divided into three sub-coils, and the magnet unit 239 has two magnetic poles. In addition, brushed motors have, depending on the application, various ratios of the number of poles to the number of coils, such as 2:3, 4:10 and 4:21.

To the rotating shaft 233, there is also fixed a commutator 241. On the radially outer side of the commutator 241, there are arranged a plurality of brushes 242. The commutator 241 is electrically connected to the rotor coil 236 via electrical conductors 243 embedded in the rotating shaft 233. Consequently, DC current flows into and out of the rotor coil 236 via the commutator 241, the brushes 242 and the electrical conductors 243. The commutator 241 is circumferentially divided, according to the number of phases of the rotor coil 236, into a plurality of commutator segments. In addition, the brushes 242 may be electrically connected to a DC power supply, such as a storage battery, via electrical wiring or a terminal block.

On the rotating shaft 233, there is provided, as a sealing member, a resin washer 244 between the commutator 241 and the bearing 232. With the resin washer 244, oil seeping from the bearing 232, which is implemented by an oil-retaining bearing, is suppressed from flowing to the commutator 241 side.

(Thirteenth Modification)

In the rotating electric machines 10 according to the above-described embodiments and modifications, the electrical conductors 82 forming the stator coil 51 may be configured to have a plurality of insulating coats. For example, each of the electrical conductors 82 may be formed by bundling a plurality of wires each having an insulating coat into a wire bundle and then covering the wire bundle with an outer insulating coat. In this case, the insulating coats respectively covering the wires constitute inner insulating coats with respect to the outer insulating coat covering the entire wire bundle. Moreover, it is preferable to configure the outer insulating coat to have higher insulating capability than the inner insulating coats. Specifically, the outer insulating coat may have a larger thickness than the inner insulating coats. For example, the thickness of the outer insulating coat may be set to 100 μm while the thickness of each of the inner insulating coats is set to 40 μm. Moreover, the outer insulating coat may be formed of a material having lower permittivity than the inner insulating coats. That is, the insulating capability of the outer insulating coat may be set to be higher than the insulating capability of the inner insulating coats using at least one of the above methods. In addition, each of the wires may be formed of an aggregate of a plurality of electrically conductive bodies.

Setting the insulating capability of the outer insulating coat to be higher in each of the electrical conductors 82, the rotating electric machine 10 is made to be suitable for use in a high-voltage vehicular system. Moreover, it is possible to suitably drive the rotating electric machine 10 in a low atmospheric pressure high-altitude area.

(Fourteenth Modification)

Figure 42:
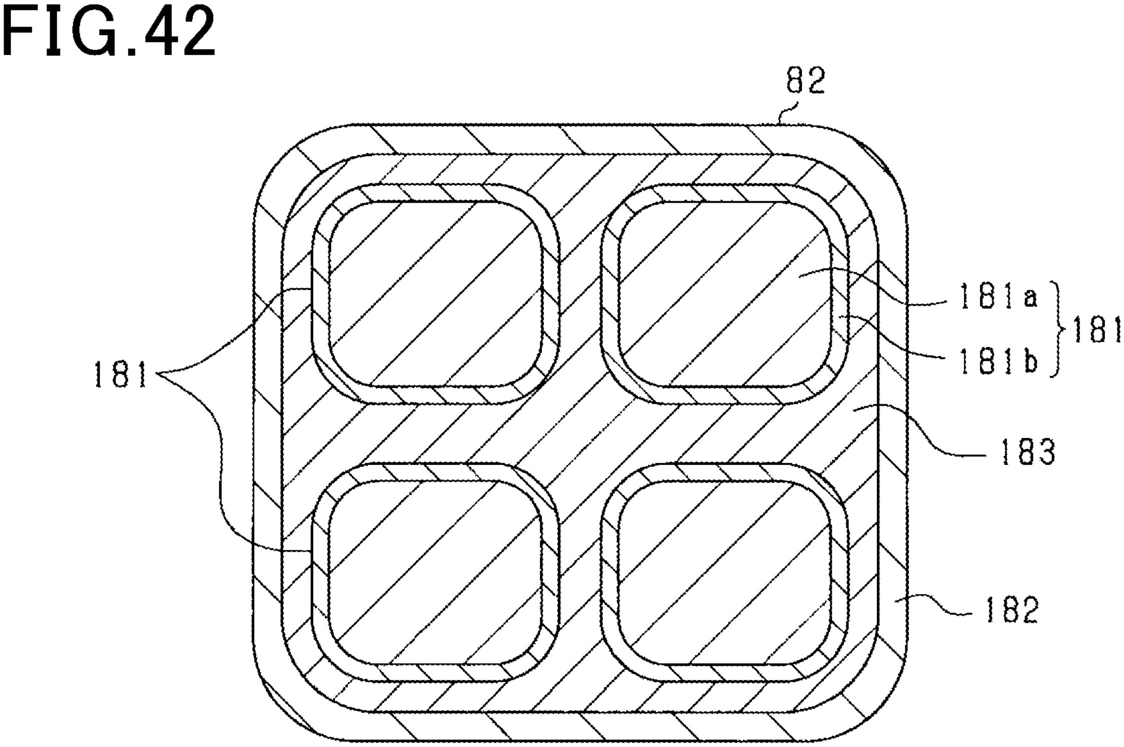
FIG. 42 is a cross-sectional view illustrating the configuration of electrical conductors in a fourteenth modification.

Electrical conductors 82, which have a plurality of insulating coats, may be configured so that an outer insulating coat and an inner insulating coat are different from each other in at least one of coefficient of linear expansion and adhesion strength. FIG. 42 shows the configuration of electrical conductors 82 according to the present modification.

As shown in FIG. 42, in this modification, each of the electrical conductors 82 includes a plurality (e.g., four) of wires 181, a resin-made outer coat 182 (i.e., outer insulating coat) covering all of the plurality of wires 181, and an intermediate layer 183 (i.e., intermediate insulating coat) filled around each of the wires 181 within the outer coat 182. Each of the wires 181 includes a wire body **181*a* formed of copper and a wire coat 181*b* (i.e., inner insulating coat) formed of an insulating material and covering the wire body 181*a*. In the stator coil, the inter-phase insulation is made by the outer coats 182 of the electrical conductors 82. In addition, each of the wires 181** may be formed of an aggregate of a plurality of electrically conductive bodies.

In each of the electrical conductors 82, the intermediate layer 183 has a coefficient of linear expansion higher than a coefficient of linear expansion of the wire coats **181*b* of the wires 181 and lower than a coefficient of linear expansion of the outer coat 182. That is, in each of the electrical conductors 82, the coefficients of linear expansion of the plurality of insulating coats increase from the inner side to the outer side. In general, the coefficient of linear expansion of the outer coat 182 is higher than the coefficient of linear expansion of the wire coats 181*b*. Interposing the intermediate layer 183 between the wire coats 181*b* and the outer coat 182 and setting the coefficient of linear expansion of the intermediate layer 183 as above, the intermediate layer 183 can function as a cushion member to prevent the wire coats 181*b* and the outer coat 182** from being cracked at the same time.

In each of the electrical conductors 82, the wire coat **181*b* is adhered to the wire body 181*a* in each of the wires 181 and the intermediate layer 183 is adhered to both the wire coats 181*b* of the wires 181 and the outer coat 182. Moreover, in each of the electrical conductors 82, the adhesion strengths decrease from the inner side to the outer side. Specifically, the adhesion strength between the wire body 181*a* and the wire coat 181*b* in each of the wires 181 is higher than both the adhesion strength between the wire coats 181*b* of the wires 181 and the intermediate layer 183 and the adhesion strength between the intermediate layer 83 and the outer coat 182. Further, the adhesion strength between the wire coats 181*b* of the wires 181 and the intermediate layer 183 is higher than or equal to the adhesion strength between the intermediate layer 183 and the outer coat 182. In addition, the adhesion strength between two insulating coats can be determined based on the tensile strength required to tear them off from each other. Setting the adhesion strengths in each of the electrical conductors 82** as above, when a temperature difference between the inner and outer sides occurs due to heating or cooling, it is possible to prevent cracking from occurring on both the inner and outer sides at the same time.

In the rotating electric machine, heat generation and temperature change occur mainly as copper loss at the wire bodies **181*a* of the wires 181 in each of the electrical conductors 82 and iron loss in the core. That is, these two types of losses occur at the wire bodies 181*a* of the wires 181 in each of the electrical conductors 82 or outside the electrical conductors 82; there is no heat source in the intermediate layers 183 of the electrical conductors 82. In this case, in each of the electrical conductors 82, with the adhesion strengths set as described above, the intermediate layer 83 can function as a cushion member to prevent the wire coats 181***b* of the wires 181 and the outer coat 182 from being cracked at the same time. Therefore, the rotating electric machine can be suitably used in an environment where it is required to withstand great pressure and temperature changes, such as in a vehicle.

Each of the wires 181 may be enamel-coated. In this case, each of the wires 181 has the wire coat 181*b* formed of a resin such as a PA, PI or PAI resin. The outer coat 182, which is provided outside the wires 181, may also be formed of a resin such as a PA, PI or PAI resin. In this case, it is preferable for the outer coat 182 to have a larger thickness than the wire coats 181*b* of the wires 181. Consequently, it is possible to prevent the insulating coats from being damaged due to the difference in coefficients of linear expansion. On the other hand, in terms of improving the conductor density of the rotating electric machine, it is preferable to form the outer coat 182 with a resin having lower permittivity than the PA, PI or PAI resin, such as a PPS, PEEK, fluorine, polycarbonate, silicone, epoxy, polyethylene naphthalate or LCP resin. In this case, with the smaller or same thickness of the outer coat 182 in comparison with the case of using the PA, PI or PAI resin, it is possible to improve the insulating capability of the outer coat 182, thereby improving the space factors of the electrical conductor sections. In general, the aforementioned resins have higher insulating capability than enamel-formed insulating coats. As a matter of course, the permittivity may be degraded depending on the forming state and impurities. Among the aforementioned resins, a PPS or PEEK resin, whose coefficient of linear expansion is higher than those of enamel-formed insulating coats but lower than those of other resins, is particularly suitable for forming the second-layer outer coat.

Moreover, it is preferable that the adhesion strengths between the two types of insulating coats (i.e., the intermediate insulating coat and the outer insulating coat) provided outside the wires 181 and the enamel-formed insulating coats of the wires 181 are lower than the adhesion strength between the copper wire and the enamel-formed insulating coat in each of the wires 181. Consequently, it is possible to prevent the enamel-formed insulating coats of the wires 181 and the two types of insulating coats provided outside the wires 181 from being damaged at the same time.

In the case of a stator having a water-cooled, liquid-cooled or air-cooled structure, it is basically considered that thermal stress and/or impact stress act first on the outer coat 182. However, even when the wire coats 181*b* of the wires 181 are formed of a different resin from the two types of insulating coats provided outside the wires 181, it is possible to have portions of the wires 181 not adhered to the two types of insulating coats, thereby reducing the aforementioned thermal stress and/or impact stress. Specifically, the outer coat 182 may be formed, using a fluorine, polycarbonate, silicone, epoxy, polyethylene naphthalate or LCP resin, outside the wires 181 with a void space provided between the wires 181 and the outer coat 182. In this case, it is preferable to bond the outer coat 182 and the wire coats 181*b* of the wires 181 to each other using an adhesive which has low permittivity and low coefficient of linear expansion, such as an epoxy adhesive. In this case, it is possible to enhance the mechanical strength, prevent the inner and outer insulating coasts from being damaged due to friction caused by vibration of the electrical conductor sections and prevent the outer insulating coat from being damaged due to the difference in coefficient of linear expansion between the inner and outer insulating coasts.

In addition, in the step of fixing the electrical conductors 82 which is generally performed as a final insulation step of the manufacturing process of the stator, it is preferable to use a resin having excellent formability and similar properties (e.g., permittivity, coefficient of linear expansion, etc.) to the enamel-formed insulating coats, such as an epoxy, PPS, PEEK or LCP resin.

In general, resin potting is performed using a urethane or silicone resin. However, these resins have a coefficient of linear expansion considerably different from those of the other resins used; therefore thermal stress may be induced which may shear these resins. Therefore, these resins are not suitable for applications of 60V or higher on which strict insulation regulations are internationally imposed. In this regard, performing injection molding with an epoxy, PPS, PEEK or LCP resin as the final insulation step, it is possible to satisfy the above requirements.

Other modifications will be described hereinafter.

The radial distance DM from the armature-side surface of the magnet unit 42 to the axis of the rotor may be set to be greater than or equal to 50 mm. Specifically, as shown in, for example, FIG. 4, the radial distance DM from the radially inner surface of the magnet unit 42 (more specifically, the radially inner surfaces of the first and second magnets 91 and 92) to the axis of the rotor 40 may be set to be greater than or equal to 50 mm.

As slot-less rotating electric machines, small-scale rotating electric machines have been known whose outputs are from several tens of watts to several hundreds of watts and which are used for model applications. However, the inventor of the present application has found no examples where large-scale rotating electric machines for industrial applications, whose outputs generally exceed 10 kW, employ a slot-less structure. Therefore, the inventor has investigated the reasons.

Recent mainstream rotating electric machines can be classified into the following four types: brushed motors, squirrel cage induction motors, permanent magnet synchronous motors and reluctance motors.

Brushed motors are supplied with exciting current via brushes. However, in the case of large-scale brushed motors, the sizes of brushes are large and maintenance is troublesome. Therefore, with remarkable developments in semiconductor technologies, large-scale brushed motors have been replaced with brushless motors such as induction motors. On the other hand, some small-scale brushed motors employ a coreless structure due to low inertia and economic benefits.

Squirrel cage induction motors generate torque by having the magnetic field, which is created by a primary-side stator coil, received by a secondary-side rotor core and causing induced current to be concentrated on a squirrel cage-shaped electrical conductor to create a counteracting magnetic field. Therefore, configuring both the rotor and the stator to include no core is not necessarily beneficial in terms of minimization of the sizes and improvement of the efficiencies of squirrel cage induction motors.

Reluctance motors generate torque utilizing the reluctance change in a core. Therefore, in terms of basic principles, it is undesirable to eliminate the core.

Regarding permanent magnet synchronous motors, IPM (Interior Permanent Magnet) motors are the recent mainstream motors. Therefore, unless for special reasons, large-scale permanent magnet synchronous motors are IPM motors in most cases.

IPM motors can generate both magnet torque and reluctance torque. Moreover, IPM motors are operated with the ratio between the generated magnet and reluctance torques suitably adjusted by an inverter control. Therefore, IPM motors are small in size and superior in controllability.

Figure 43:
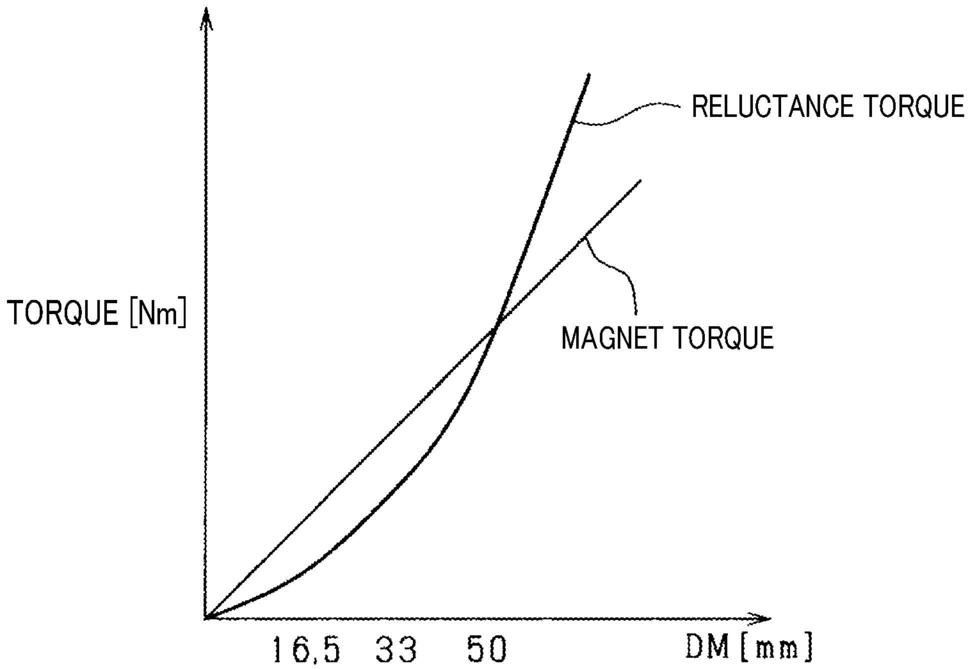
FIG. 43 is a diagram illustrating the relationships between reluctance torque, magnet torque and radial distance DM.

According to an analysis by the inventor of the present application, the relationships between magnet torque, reluctance torque and the radial distance DM from the armature-side surface of the magnet unit 42 to the axis of the rotor (i.e., the radius of the stator core in the case of the rotating electric machine being of an inner rotor type) are as shown in FIG. 43.

The magnet torque has its potential determined by the strength of the magnetic field created by the permanent magnets as shown in the following equation (eq1). In contrast, the reluctance torque has its potential determined by the amplitudes of the inductances, in particular the amplitude of the q-axis inductance as shown in the following equation (eq2).

$$\text{Magnet torque}=k\cdot\Psi\cdot Iq \qquad \text{(eq1)}$$

$$\text{Reluctance torque}=k\cdot(Lq-Ld)\cdot Iq\cdot Id \qquad \text{(eq2)}$$

Here, a comparison is made between the strength of the magnetic field created by the permanent magnets and the amplitudes of the inductances of the coil using the radial distance DM. The strength of the magnetic field created by the permanent magnets, i.e., the amount of magnetic flux Ψ, is proportional to the total surface area of the permanent magnets facing the stator. In the case of the rotor being cylindrical in shape, the total surface area is represented by the surface area of the cylinder. Strictly speaking, due to the presence of N and S poles, the amount of magnetic flux Ψ is proportional to half the surface area of the cylinder. Moreover, the surface area of the cylinder is proportional to both the radius of the cylinder and the length of the cylinder. That is, with the length of the cylinder being constant, the amount of magnetic flux Ψ is proportional to the radius of the cylinder.

Figure 44:
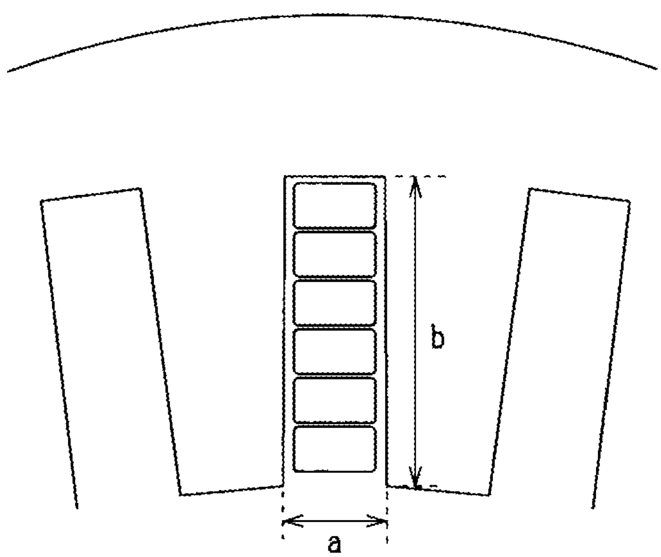
FIG. 44 is a diagram showing teeth.

On the other hand, the inductance Lq of the coil is dependent on, but less sensitive to the core shape. The inductance Lq is proportional to the square of the number of turns of the stator coil, i.e., highly dependent on the number of turns of the stator coil. Moreover, the inductance L can be determined by the following equation: $L=\mu\times N^2\times S/\delta$, where μ is the permeability of the magnetic circuit, N is the number of turns, S is the cross-sectional area of the magnetic circuit and δ is the effective length of the magnetic circuit. The number of turns of the coil depends on the volume of the coil space. In the case of the rotating electric machine being a cylindrical motor, the number of turns depends on the coil space of the stator, i.e., depends on the slot area. As shown in FIG. 44, in the case of the slots having a substantially rectangular shape, the slot area is proportional to the product of the circumferential dimension a and the radial dimension b of each slot (i.e., a×b).

The circumferential dimension of each slot increases in proportion to the diameter of the cylinder. The radial dimension of each slot also increases in proportion to the diameter of the cylinder. Therefore, the slot area is proportional to the square of the diameter of the cylinder. Moreover, as can be seen from above (eq2), the reluctance torque is proportional to the square of the stator current. Therefore, the performance of the rotating electric machine depends on the amplitude of the stator current and thus on the slot area of the stator. As above, with the length of the cylinder being constant, the reluctance torque is proportional to the square of the diameter of the cylinder. The relationships between the magnet torque, the reluctance torque and the radial distance DM are determined based on the above observations and illustrated in FIG. 43.

As can be seen from FIG. 43, the magnet torque linearly increases with the radial distance DM while the reluctance torque quadratically increases with the radial distance DM. When the radial distance DM is relatively small, the magnet torque is dominant. However, with increase in the radial distance DM, the reluctance torque becomes dominant. The inventor of the present application has concluded that the intersection point between the magnet torque and the reluctance torque in FIG. 43 is in the vicinity of DM=50 mm under predetermined conditions. That is, in 10 kW-class electric motors where the stator core radius sufficiently exceeds 50 mm, the current mainstream technique is to utilize the reluctance torque; therefore, it is difficult to eliminate the core. This can be considered to be one of the reasons why the slot-less structure is not employed in large-scale rotating electric machines.

In the case of rotating electric machines including a stator core, magnetic saturation of the stator core is always a problem to be solved. In particular, in radial-gap type rotating electric machines, the rotating shaft has a longitudinal cross section which has one fan-shaped sector per magnetic pole. The magnetic path width decreases in a radially inward direction and the performance limit of the rotating electric machine is determined by the radially inner-side dimensions of the stator teeth forming the slots. Even when high-performance permanent magnets are employed, upon occurrence of magnetic saturation at radially inner portions of the stator teeth, it becomes impossible to sufficiently utilize the high performance of the permanent magnets. To prevent magnetic saturation from occurring at the radially inner portions of the stator teeth, it is necessary to increase the inner diameter of the stator core. However, with increase in the inner diameter of the stator core, the size of the entire rotating electric machine is increased.

For example, in a distributed-winding rotating electric machine which includes a three-phase coil, there are provided, for each magnetic pole, three to six teeth through which magnetic flux flows. However, magnetic flux tends to concentrate on those of the teeth located on the front side in the circumferential direction; i.e., magnetic flux is unevenly distributed to the three to six teeth. In this case, magnetic flux becomes concentrated on some (e.g., one or two) of the three to six teeth; with rotation of the rotor, the magnetically-saturated teeth also move in the circumferential direction, causing slot ripple to occur.

As above, in slot-less rotating electric machines where the radial distance DM is greater than or equal to 50 mm, to prevent occurrence of magnetic saturation, it is desirable to eliminate teeth. However, when teeth are eliminated, magnetic reluctance of the magnetic circuit in the rotor and the stator may increase, thereby lowering the torque of the rotating electric machine. This is because without teeth, the air gap between the rotor and the stator may increase. Therefore, there is room to increase torque in slot-less rotating electric machines where the radial distance DM is greater than or equal to 50 mm. Consequently, significant advantages can be achieved by applying the above-described torque-increasing configurations to slot-less rotating electric machines where the radial distance DM is greater than or equal to 50 mm.

In addition, the radial distance DM from the armature-side surface of the magnet unit to the axis of the rotor may be preferably set to be greater than or equal to 50 mm not only in outer rotor type rotating electric machines but also in inner rotor type rotating electric machines.

In the stator coil 51 of the rotating electric machine 10, the straight portions 83 of the electrical conductors 82 may be arranged in a single layer in the radial direction. Otherwise, in the case of arranging the straight portions 83 of the electrical conductors 82 in a plurality of layers in the radial direction, the number of the layers may be set to any arbitrary number, such as 3, 4, 5 or 6.

In the configuration shown in FIG. 2, the rotating shaft 11 protrudes to both axial sides of the rotating electric machine 10. As an alternative, the rotating shaft 11 may protrude to only one axial side of the rotating electric machine 10. For example, the rotating shaft 11 may have an end portion supported in a cantilever fashion by the bearing unit 20; the remainder of the rotating shaft 11 protrudes, on the opposite axial side of the bearing unit 20 to the inverter unit 60, axially outside the rotating electric machine 10. In this case, the rotating shaft 11 does not protrude inside the inverter unit 60. Consequently, the available internal space of the inverter unit 60, more specifically the available internal space of the cylindrical portion 71 is increased.

In the rotating electric machine 10 configured as described above, non-electrically conductive grease is used in the bearings 21 and 22. As an alternative, electrically conductive grease may be used in the bearings 21 and 22. For example, electrically conductive grease which contains metal particles or carbon particles may be used in the bearings 21 and 22.

The rotating shaft 11 may be rotatably supported by bearings provided at two locations respectively on opposite axial sides of the rotor 40. More specifically, in the configuration shown in FIG. 1, the rotating shaft 11 may alternatively be rotatably supported by bearings provided at two locations respectively on opposite axial sides of the inverter unit 60.

In the rotating electric machine 10 configured as described above, the intermediate portion 45 of the magnet holder 41 of the rotor 40 has both the annular inner shoulder part 49*a* and the annular outer shoulder part 49*b* formed therein. As an alternative, the intermediate portion 45 may be configured to have a flat surface without the shoulder parts 49*a* and 49*b* formed therein.

In the rotating electric machine 10 configured as described above, each of the electrical conductors 82 forming the stator coil 51 has its conductor body 82*a* constituted of a bundle of wires 86. As an alternative, each of the electrical conductors 82 may be configured with a single flat wire which has a rectangular cross-sectional shape. As another alternative, each of the electrical conductors 82 may be configured with a single round wire which has a circular or elliptical cross-sectional shape.

In the rotating electric machine 10 configured as described above, the inverter unit 60 is provided radially inside the stator 50. As an alternative, the inverter unit 60 may not be provided radially inside the stator 50. In this case, the internal space of the stator 50, which was occupied by the inverter unit 60, may remain as a hollow space or be occupied by a different component to the inverter unit 60.

In the rotating electric machine 10 configured as described above, the housing 30 may be omitted from the configuration of the rotating electric machine 10. In this case, both the rotor 40 and the stator 50 may be held by, for example, a wheel or other vehicle components.

Embodiment as Vehicular In-Wheel Motor

Figure 45:
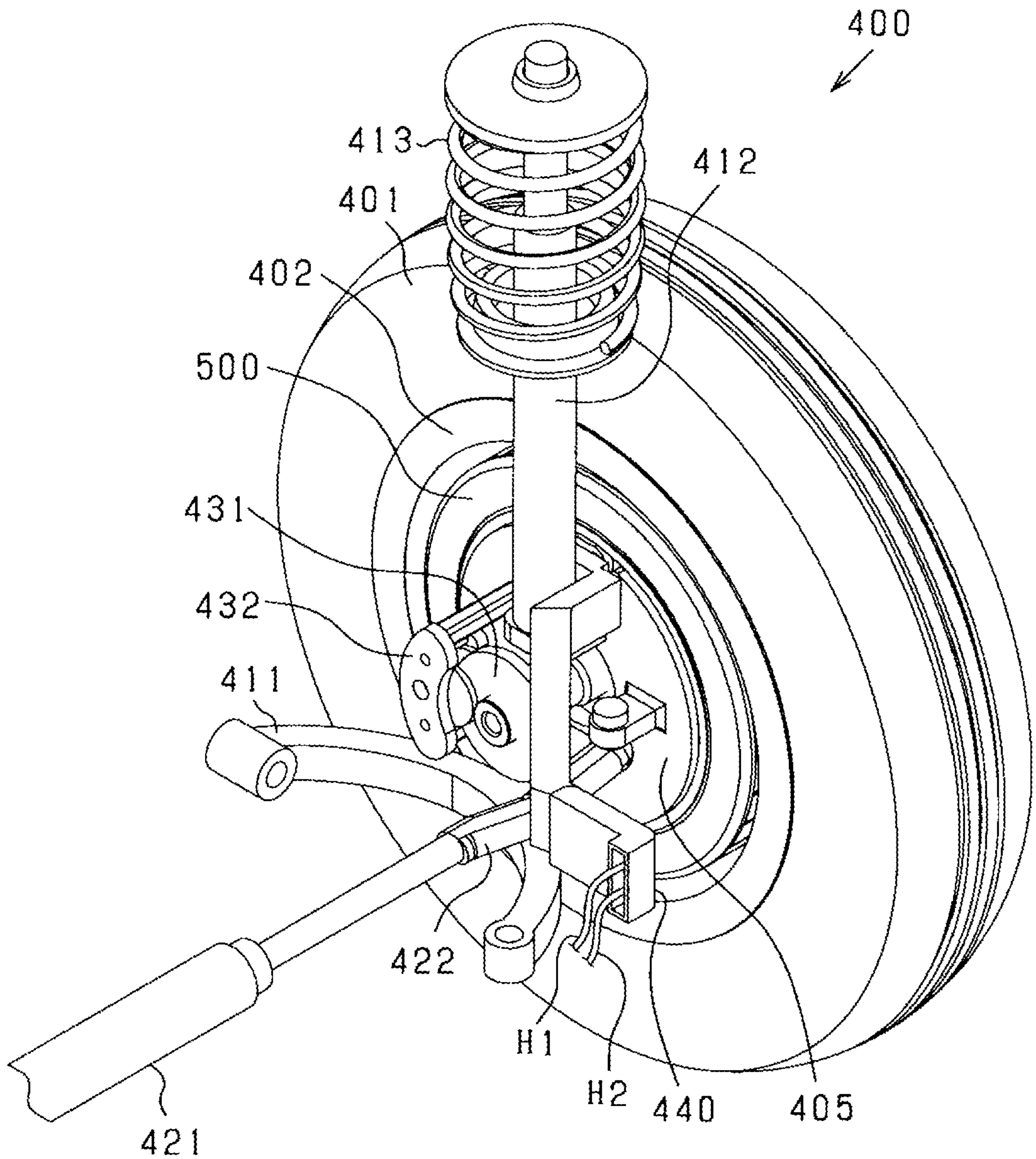
FIG. 45 is a perspective view of a vehicle wheel, which has an in-wheel motor structure, and its peripheral structures.
Figure 46:
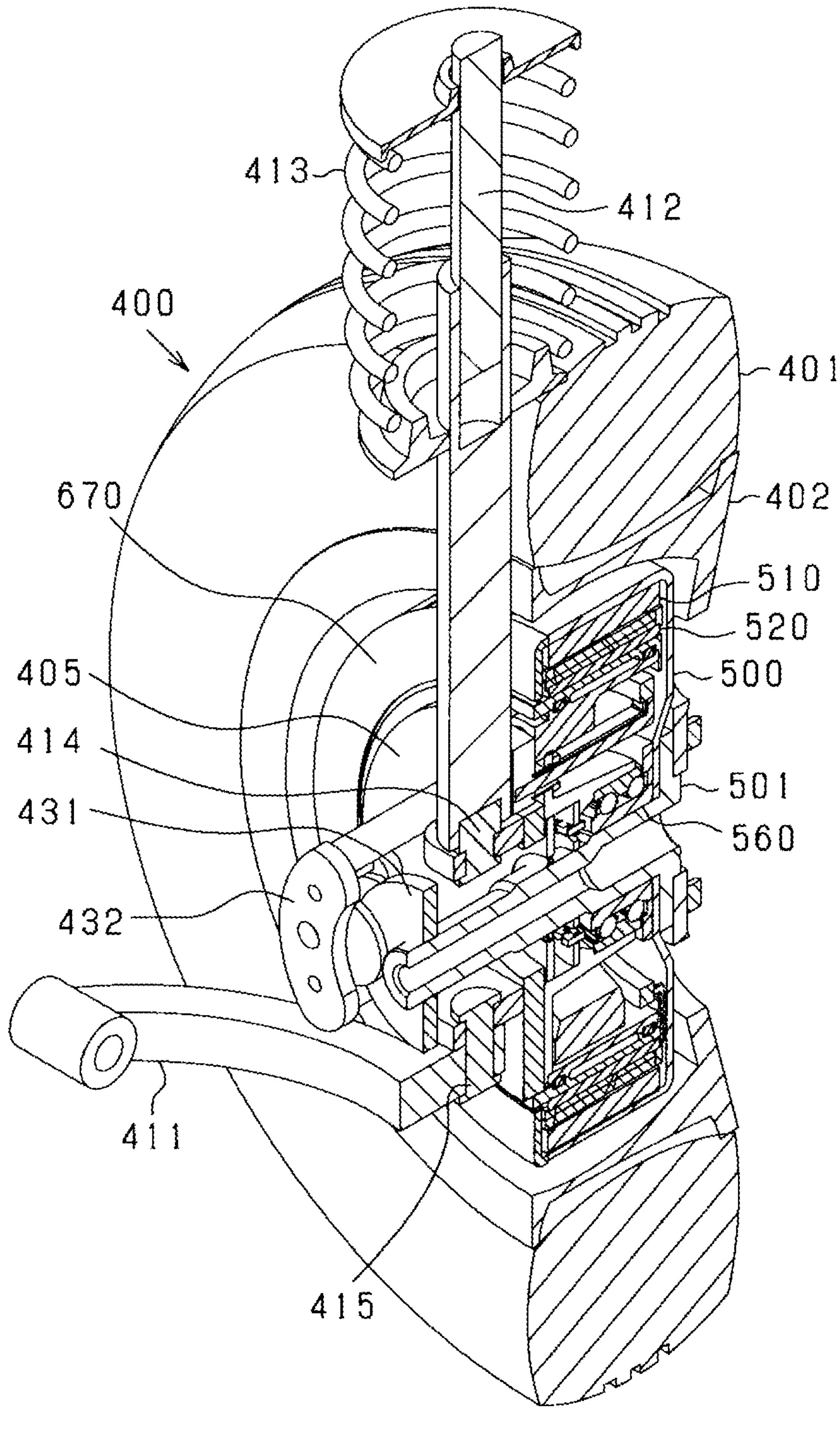
FIG. 46 is a longitudinal cross-sectional view of the vehicle wheel and its peripheral structures.
Figure 47:
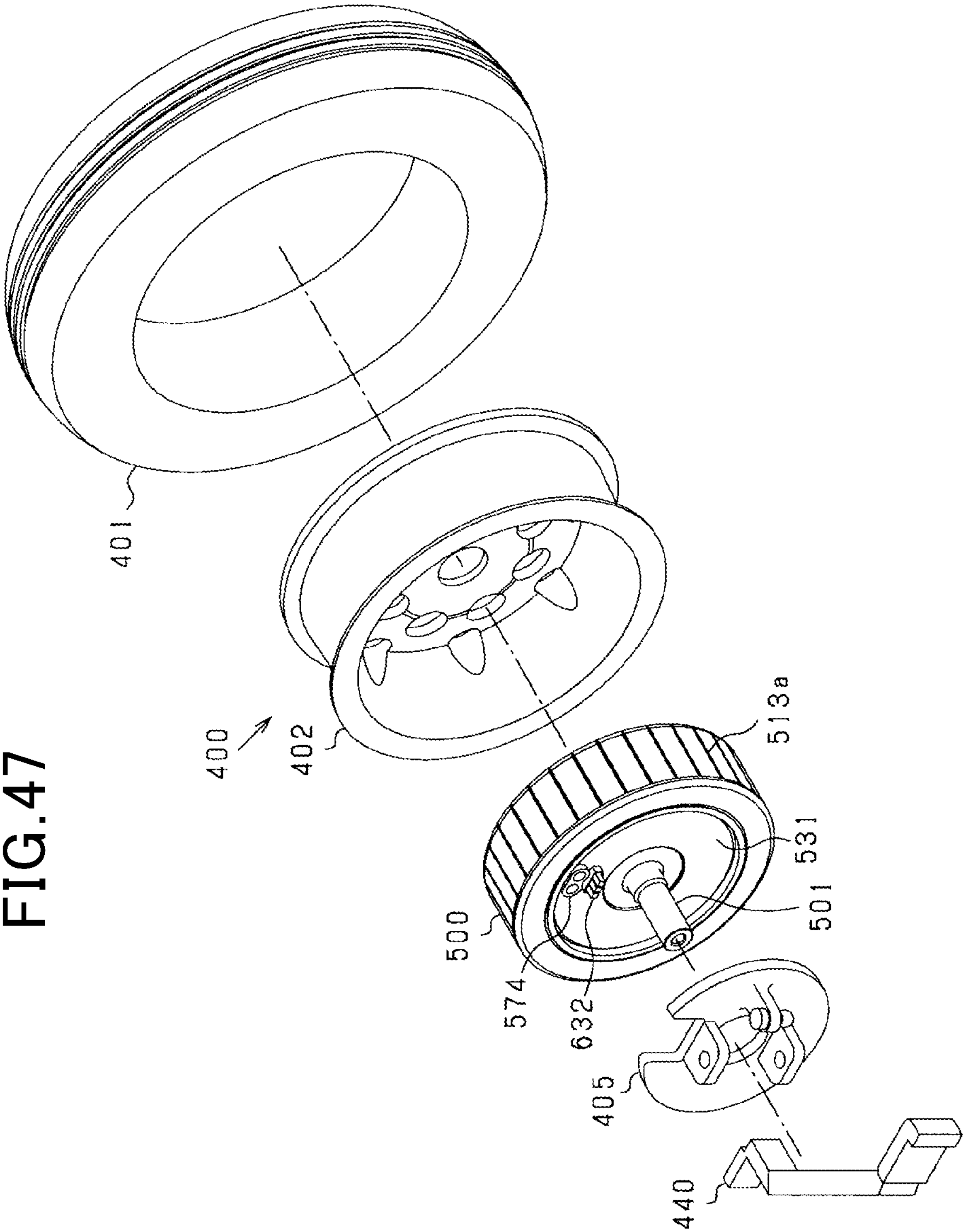
FIG. 47 is an exploded perspective view of the vehicle wheel.

Next, explanation will be given of an embodiment according to which a rotating electric machine is provided as an in-wheel motor that is incorporated in a wheel of a vehicle. FIG. 45 is a perspective view of a wheel 400, which has an in-wheel motor structure, and its peripheral structures. FIG. 46 is a longitudinal cross-sectional view of the wheel 400 and its peripheral structures. FIG. 47 is an exploded perspective view of the wheel 400. It should be noted that each of these figures shows the wheel 400 viewed from the inside of the vehicle. In addition, in the vehicle, the in-wheel motor structure according to the present embodiment may be applied in various modes. For example, in the case of the vehicle having two front wheels and two rear wheels, the in-wheel motor structure according to the present embodiment may be applied to only the two front wheels, only the two rear wheels or all of the four wheels. Moreover, the in-wheel motor structure according to the present embodiment may also be applied to the case of the vehicle having, on at least one of the front and rear sides, only a single wheel. In addition, in these examples, the in-wheel motor is applied as a vehicular drive unit.

As shown in FIGS. 45-47, the wheel 400 includes a tire 401 that is, for example, a well-known pneumatic tire, a rim 402 fixed to the radially inner periphery of the tire 401, and the rotating electric machine 500 fixed to the radially inner periphery of the rim 402. The rotating electric machine 500 has a fixed part that includes a stator, and a rotating part that includes a rotor. The fixed part is fixed to the vehicle body side while the rotating part is fixed to the rim 402. With rotation of the rotating part, the tire 401 and the rim 402 also rotate. In addition, the configuration of the rotating electric machine 500 including the fixed part and the rotating part will be described in detail later.

Moreover, to the wheel 400, there are mounted, as peripheral equipment, a suspension apparatus for holding the wheel 400 with respect to the not-shown vehicle body, a steering apparatus for varying orientation of the wheel 400, and a brake apparatus for performing braking of the wheel 400.

The suspension apparatus is an independent suspension apparatus. The suspension apparatus may be of any suitable type, such as trailing arm type, strut type, wishbone type or multi-link type. In the present embodiment, the suspension apparatus includes a lower arm 411 oriented to extend toward the vehicle body center, and a suspension arm 412 and a spring 413 both of which are oriented to extend in the vertical direction. The suspension arm 412 may be configured as, for example, a shock absorber. It should be noted that the details of the suspension arm 412 are not shown in the figures. Each of the lower arm 411 and the suspension arm 412 is connected to the vehicle body side as well as to a circular base plate 405 that is fixed to the fixed part of the rotating electric machine 500. As shown in FIG. 46, on the rotating electric machine 500 side (or the base plate 405 side), the lower arm 411 and the suspension arm 412 are supported, by supporting shafts 414 and 415, so as to be coaxial with each other.

The steering apparatus may employ, for example, a rack and pinion mechanism, a ball and nut mechanism, hydraulic power steering system or an electric power steering system. In the present embodiment, the steering apparatus includes a rack device 421 and a tie rod 422. The rack device 421 is connected, via the tie rod 422, to the base plate 405 on the rotating electric machine 500 side. In this case, with rotation of a not-shown steering shaft, the rack device 421 operates to cause the tie rod 422 to move in the left-right direction of the vehicle. Consequently, the wheel 400 is turned about the supporting shaft 414 and 415 of the lower arm 411 and the suspension arm 412, changing the orientation of the wheel 400.

It is preferable for the brake apparatus to employ a disc brake or a drum brake. In the present embodiment, the brake apparatus includes a disc rotor 431 fixed to a rotating shaft 501 of the rotating electric machine 500 and a brake caliper 432 fixed to the base plate 405 on the rotating electric machine 500 side. In the brake caliper 432, brake pads are hydraulically actuated to be pressed on the disc rotor 431, generating a braking force by friction. Consequently, with the generated braking force, rotation of the wheel 400 is stopped.

Moreover, to the wheel 400, there are mounted a receiving duct 440 that receives an electrical wiring H1 and a cooling water piping H2 both of which extend from the rotating electric machine 500. The receiving duct 440 extends, from its end on the side of the fixed part of the rotating electric machine 500, along an end face of the rotating electric machine 500 without interfering with the suspension arm 412. The receiving duct 440 is fixed to the suspension arm 412. Consequently, the positional relationship between a connection portion of the suspension arm 412, to which the receiving duct 440 is connected, and the base plate 405 is fixed. As a result, it is possible to suppress stress induced in the electrical wiring H1 and the cooling water piping H2 by, for example, vibration of the vehicle. In addition, the electrical wiring H1 is connected to an in-vehicle power supply and an in-vehicle ECU both of which are not shown in the figures, while the cooling water piping H2 is connected to a radiator that is also not shown in the figures.

Next, the configuration of the rotating electric machine 500 according to the present embodiment will be described in detail. As mentioned above, in the present embodiment, the rotating electric machine 500 is configured as an in-wheel motor. The rotating electric machine 500 has superior operational efficiency and output to a motor of a conventional vehicular drive unit which includes a speed reducer. It should be noted that the rotating electric machine 500 may alternatively be used in other applications provided that a reasonable price can be realized by cost reduction and superior performance can be maintained. In addition, the operational efficiency is an indicator used in a test in a traveling mode for evaluating the fuel economy of the vehicle.

Figure 48:
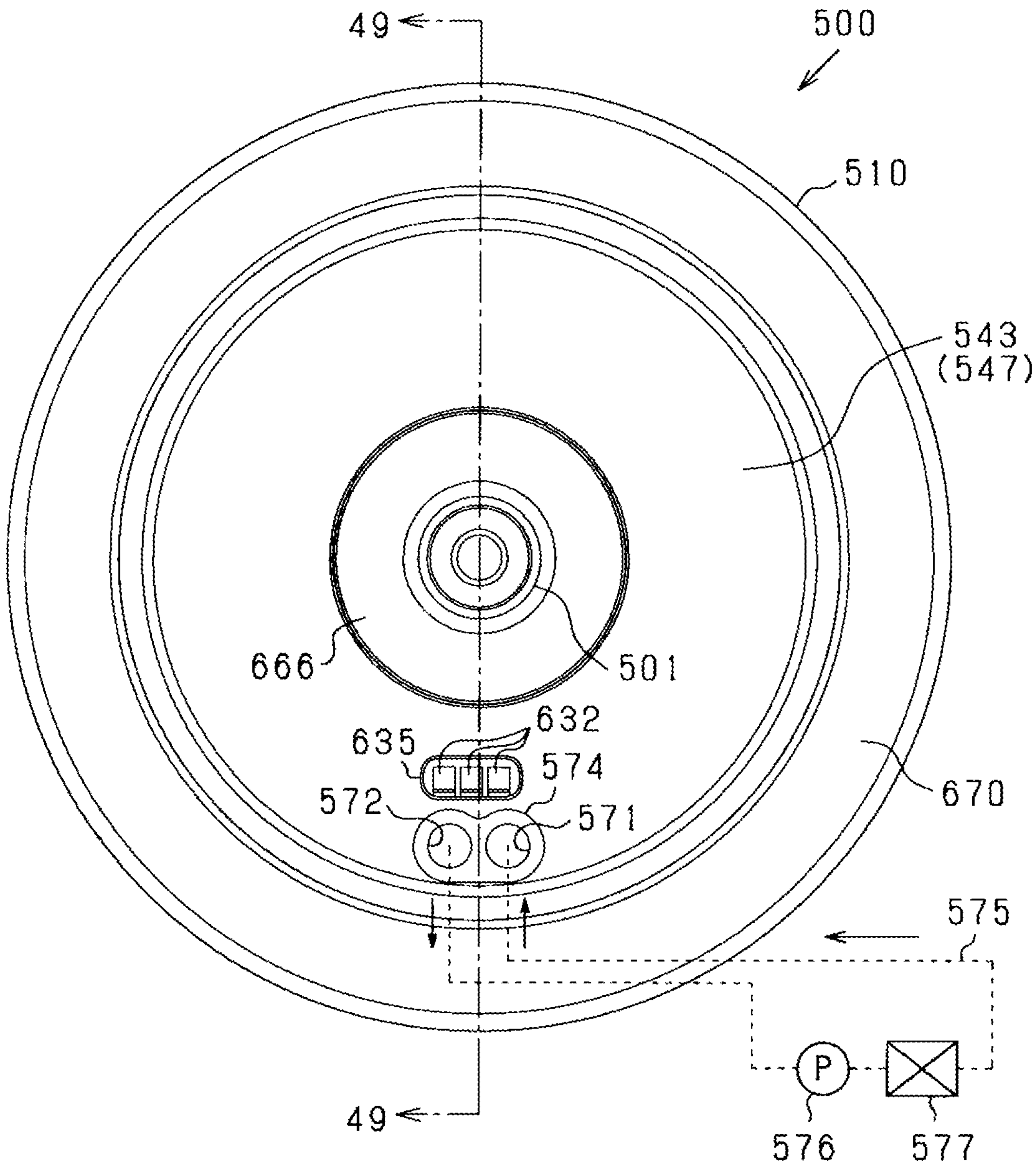
FIG. 48 is a side view, from the protruding side of a rotating shaft, of a rotating electric machine which is provided as an in-wheel motor.
Figure 49:
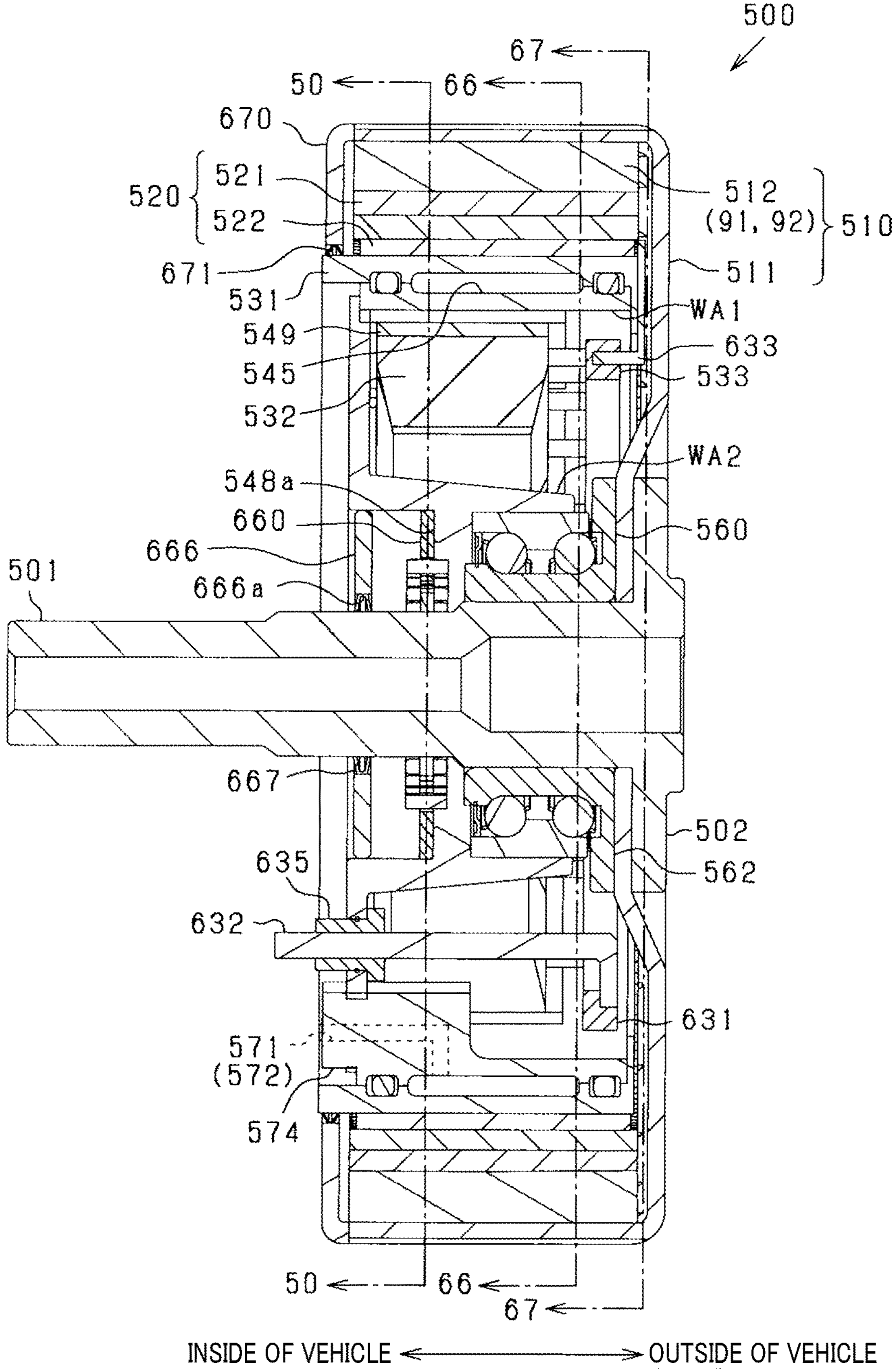
FIG. 49 is a cross-sectional view taken along the line 49-49 in FIG. 48.
Figure 50:
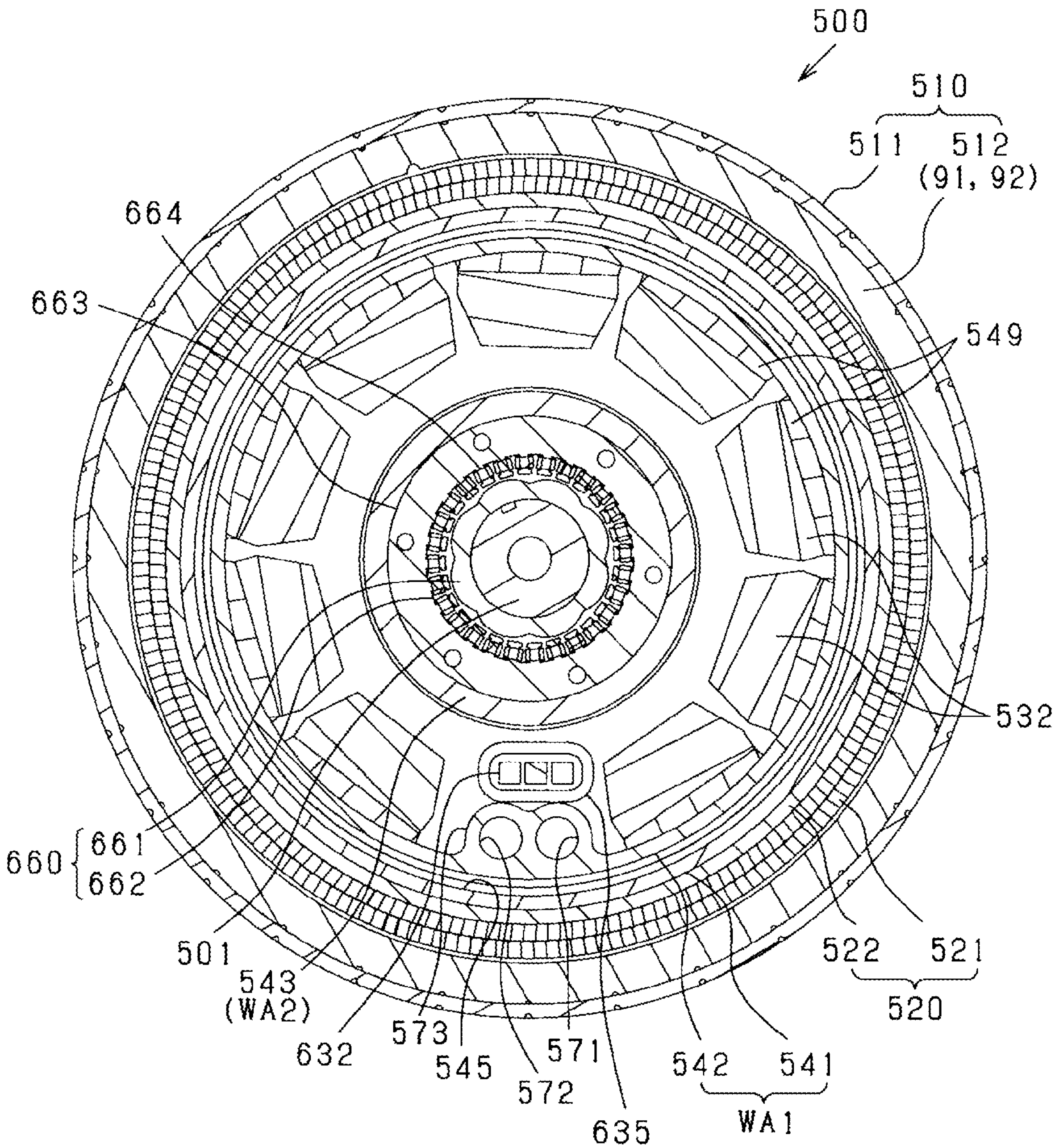
FIG. 50 is a cross-sectional view taken along the line 50-50 in FIG. 49.
Figure 51:
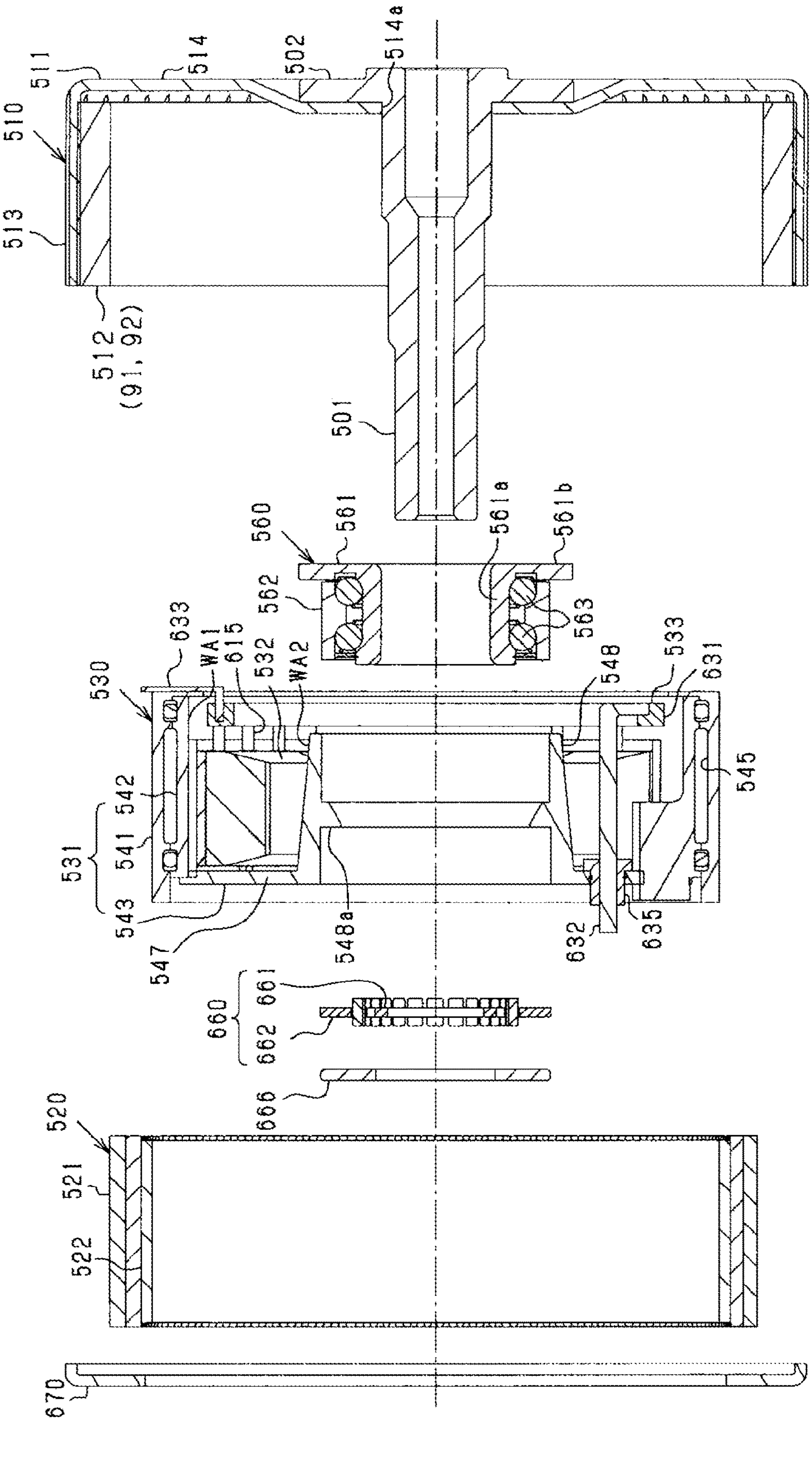
FIG. 51 is an exploded cross-sectional view of the rotating electric machine.

The outline of the rotating electric machine 500 is illustrated in FIGS. 48-51. FIG. 48 is a side view of the rotating electric machine 500 from the protruding side of the rotating shaft 501 (or from the inside of the vehicle). FIG. 49 is a longitudinal cross-sectional view of the rotating electric machine 500 (i.e., a cross-sectional view taken along the line 49-49 in FIG. 48). FIG. 50 is a transverse cross-sectional view of the rotating electric machine 500 (i.e., a cross-sectional view taken along the line 50-50 in FIG. 49). FIG. 51 is an exploded cross-sectional view of the rotating electric machine 500. In the explanation given hereinafter, the direction in which the rotating shaft 501 extends outside the vehicle body in FIG. 51 will be referred to as the axial direction. The directions extending radially from the rotating shaft 501 will be referred to as radial directions. Both directions extending along a circle from an arbitrary point, except the center of rotation of the rotating part, on a centerline will be referred to as the circumferential direction; the centerline is drawn for making the cross section 49 through the center of the rotating shaft 501 in FIG. 48, in other words, through the center of rotation of the rotating part. That is, the circumferential direction denotes both the clockwise direction and the counterclockwise direction with the start point being an arbitrary point in the cross section 49. Moreover, in the state of the rotating electric machine 500 having been mounted along with the wheel 400 to the vehicle, the right side in FIG. 49 corresponds to the outside of the vehicle while the left side in FIG. 49 corresponds to the inside of the vehicle. In addition, in this state, a rotor 510, which will be described later, is located more outward of the vehicle body than a rotor cover 670.

The rotating electric machine 500 according to the present embodiment is an outer rotor type SPM (Surface Permanent Magnet) motor. The rotating electric machine 500 mainly includes the aforementioned rotor 510, a stator 520, an inverter unit 530, a bearing 560 and the aforementioned rotor cover 670. These components are arranged coaxially with the rotating shaft 501 that is formed integrally with the rotor 510. These components are assembled in a predetermined sequence in the axial direction to together constitute the rotating electric machine 500.

In the rotating electric machine 500, the rotor 510 and the stator 520 are each cylindrical-shaped and radially opposed to each other with a predetermined air gap formed therebetween. The rotor 510 rotates, together with the rotating shaft 501, on the radially outer side of the stator 520. In the present embodiment, the rotor 510 functions as a “field system” while the stator 520 functions as an “armature”.

The rotor 510 includes a substantially cylindrical rotor carrier 511 and an annular magnet unit 512 fixed to the rotor carrier 511. The rotating shaft 501 is also fixed to the rotor carrier 511.

The rotor carrier 511 has a cylindrical portion 513. On an inner circumferential surface of the cylindrical portion 513, there is mounted the magnet unit 512. That is, the magnet unit 512 is provided so as to be surrounded by the cylindrical portion 513 of the rotor carrier 511 from the radially outer side. The cylindrical portion 513 of the rotor carrier 511 has an axially opposite pair of first and second ends. The first end is located more outward of the vehicle body than the second end; the second end is located closer than the first end to the base plate 405. At the first end of the cylindrical portion 513, there is formed an end plate 514 of the rotor carrier 511 continuously with the cylindrical portion 513. That is, the cylindrical portion 513 and the end plate 514 are integrally formed into one piece. At the second end of the cylindrical portion 513, there is formed an opening. In addition, the rotor carrier 511 is formed of a material having sufficient mechanical strength, such as a cold-rolled steel sheet (e.g., an SPCC steel sheet or an SPHC steel sheet having a larger thickness than the SPCC steel sheet), forged steel or Carbon Fiber-Reinforced Plastic (CFRP).

The axial length of the rotating shaft 501 is larger than the axial length of the rotor carrier 511. Therefore, the rotating shaft 501 protrudes from the second end (or the opening) of the rotor carrier 511 in the direction toward the inside of the vehicle. On a protruding end portion of the rotating shaft 501, there are mounted other components such as the above-described brake apparatus.

In a central part of the end plate 514 of the rotor carrier 511, there is formed a through-hole 514*a*. The rotating shaft 501 is fixed to the rotor carrier 511 in a state of being inserted in the through-hole 514*a* of the end plate 514. The rotating shaft 501 has a flange 502 formed at an axial end thereof so as to extend nonparallel (or perpendicular) to the axial direction. The rotating shaft 501 is fixed to the rotor carrier 511 with the flange 502 of the rotating shaft 501 in surface contact with an outer surface of the end plate 514 of the rotor carrier 511. In addition, in the wheel 400, the rim 402 is fixed to the rotating shaft 501 by fasteners such as bolts extending from the flange 502 of the rotating shaft 501 in the direction toward the outside of the vehicle.

The magnet unit 512 is constituted of a plurality of permanent magnets that are arranged on the inner circumferential surface of the cylindrical portion 513 of the rotor carrier 511 so as to have their polarities alternately changing in the circumferential direction of the rotor 510. Consequently, the magnet unit 512 has a plurality of magnetic poles arranged in the circumferential direction. The permanent magnets are fixed to the rotor carrier 511 by, for example, bonding. In the present embodiment, the magnet unit 512 has a similar configuration to the magnet unit 42 described with reference to FIGS. 8 and 9 in the first embodiment. Moreover, the permanent magnets of the magnet unit 512 are implemented by sintered neodymium magnets whose intrinsic coercive force is higher than or equal to 400 [kA/m] and residual flux density Br is higher than or equal to 1.0 [T].

Similar to the magnet unit 42 shown in FIG. 9, the magnet unit 512 according to the present embodiment is also constituted of first and second magnets 91 and 92 that are polar anisotropic magnets. The polarity of the first magnets 91 is different from the polarity of the second magnets 92. As described with reference to FIGS. 8 and 9 in the first embodiment, in each of the first and second magnets 91 and 92, the orientation of the easy axis of magnetization on the d-axis side (or in the d-axis-side part) is different from the orientation of the easy axis of magnetization on the q-axis side (or in the q-axis-side parts). On the d-axis side, the orientation of the easy axis of magnetization is close to a direction parallel to the d-axis. In contrast, on the q-axis side, the orientation of the easy axis of magnetization is close to a direction perpendicular to the q-axis. Consequently, depending on the change in the orientation of the easy axis of magnetization, arc-shaped magnetic paths are formed in the magnet. In addition, in each of the first and second magnets 91 and 92, the easy axis of magnetization may be oriented to be parallel to the d-axis on the d-axis side and to be perpendicular to the q-axis on the q-axis side. That is, the magnet unit 512 is configured to have the easy axis of magnetization oriented such that the direction of the easy axis of magnetization is more parallel to the d-axis on the d-axis side than on the q-axis side; the d-axis represents the centers of the magnetic poles while the q-axis represents the boundaries between the magnetic poles.

With the above configuration of the magnets 91 and 92, the magnet magnetic flux on the d-axis is intensified and the magnetic flux change in the vicinity of the q-axis is suppressed. Consequently, it becomes possible to suitably realize the magnets 91 and 92 where the surface magnetic flux gradually changes from the q-axis to the d-axis in each magnetic pole. In addition, the magnet unit 512 may alternatively employ the configuration of the magnet unit 42 shown in FIGS. 22 and 23 or the configuration of the magnet unit 42 shown in FIG. 30.

The magnet unit 512 may have, on the side facing the cylindrical portion 513 of the rotor carrier 511 (i.e., on the radially outer side), a rotor core (or back yoke) that is formed by laminating a plurality of magnet steel sheets in the axial direction. That is, it is possible to employ a configuration where α rotor core is arranged radially inside the cylindrical portion 513 of the rotor carrier 511 and the permanent magnets (i.e., the magnets 91 and 92) are arranged radially inside the rotor core.

Figure 52:
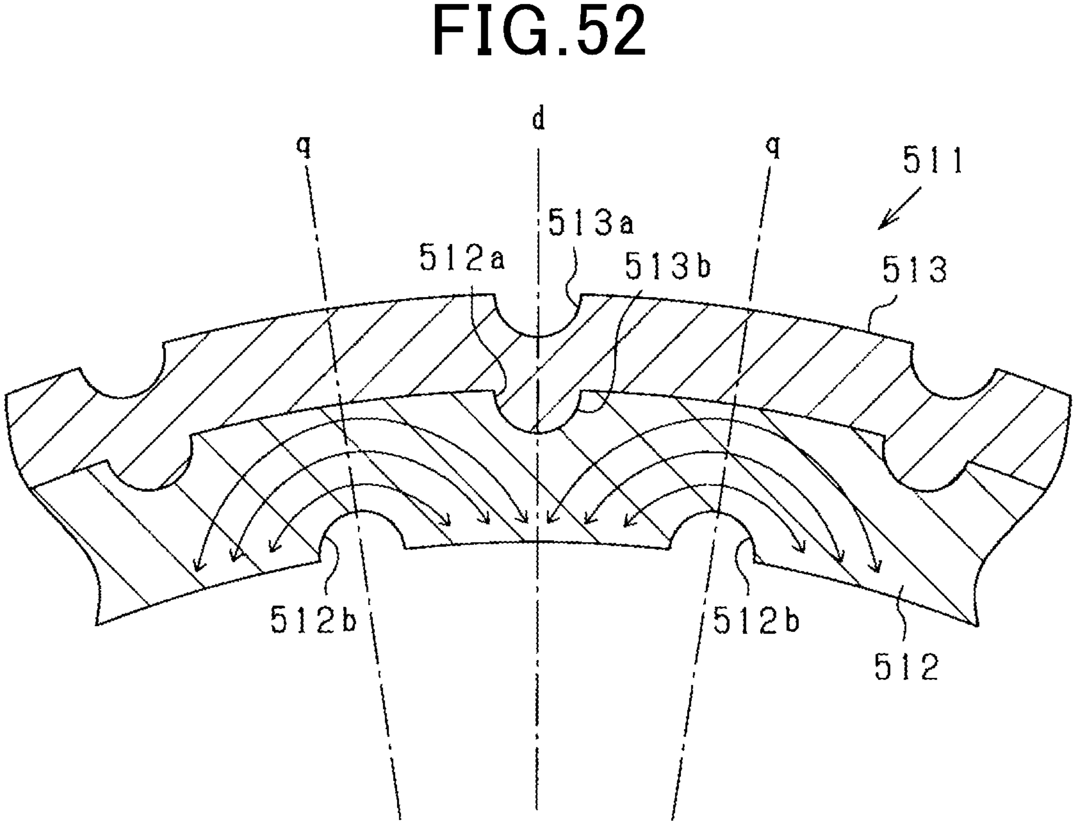
FIG. 52 is a cross-sectional view of part of a rotor of the rotating electric machine.

As shown in FIG. 47, in an outer circumferential surface of the cylindrical portion 513 of the rotor carrier 511, there are formed a plurality of recesses 513*a* that each extend in the axial direction and are spaced at predetermined intervals in the circumferential direction. The recesses 513*a* may be formed by, for example, press working. Moreover, as shown in FIG. 52, on the inner circumferential surface of the cylindrical portion 513 of the rotor carrier 511, there are formed a plurality of protrusions 513*b* each of which is located in radial alignment with one of the recesses 513*a*. On the other hand, in an outer circumferential surface of the magnet unit 512, there are formed a plurality of recesses 512*a* conforming to the protrusions 513*b* of the cylindrical portion 513 of the rotor carrier 511. Each of the protrusions 513*b* is fitted in one of the recesses 512*a*, thereby suppressing circumferential displacement of the magnet unit 512. That is, the protrusions 513*b* of the rotor carrier 511 together function as a rotation stopper of the magnet unit 512. In addition, the protrusions 513*b* may be formed by any suitable method such as the aforementioned press working.

In FIG. 52, the directions of magnet magnetic paths in the magnet unit 512 are indicated with arrows. The magnet magnetic paths extend in arc shapes across the q-axis at the boundaries between the magnetic poles. Moreover, at the d-axis representing the centers of the magnetic poles, the magnet magnetic paths are oriented to be parallel to or near parallel to the d-axis. In an inner circumferential surface of the magnet unit 512, there are formed a plurality of recesses 512*b* each of which is located at one of circumferential positions corresponding to the d-axis. In this case, in the magnet unit 512, the lengths of the magnet magnetic paths on the closer side to the stator 520 (i.e., the lower side in the figure) are different from those on the further side from the stator 520 (i.e., the upper side in the figure). More specifically, the lengths of the magnet magnetic paths on the closer side to the stator 520 are shorter than those on the further side from the stator 520. The recesses 512*b* are formed at those locations in the magnet unit 512 where the magnet magnetic paths become shortest. That is, in consideration of the fact that it is difficult to generate sufficient magnet magnetic flux at those locations in the magnet unit 512 where the magnet magnetic paths are short, the magnets are cut off at those locations where the magnet magnetic flux is weak.

The effective magnetic flux density Bd of the magnets increases with the length of the magnetic circuit through the inside of the magnets. Moreover, the permeance coefficient Pc increases with the effective magnetic flux density Bd of the magnets. With the configuration shown in FIG. 52, it is possible to achieve reduction in the amount of magnetic material used for forming the magnets while suppressing decrease in the permeance coefficient Pc that is an indicator of the effective magnetic flux density Bd of the magnets. In addition, on the B-H coordinate system, the intersection point between the permeance straight-line dependent on the shapes of the magnets and the demagnetization curve represents the operating point; the magnetic flux density at the operating point represents the effective magnetic flux density Bd of the magnets. In the present embodiment, the rotating electric machine 500 is configured to reduce the amount of iron used in the stator 520. With such configuration, the method of setting the magnetic circuit across the q-axis is very effective.

Moreover, the recesses 512*b* of the magnet unit 512 can be utilized as air passages extending in the axial direction. Consequently, it is possible to improve the air cooling performance.

Figure 53:
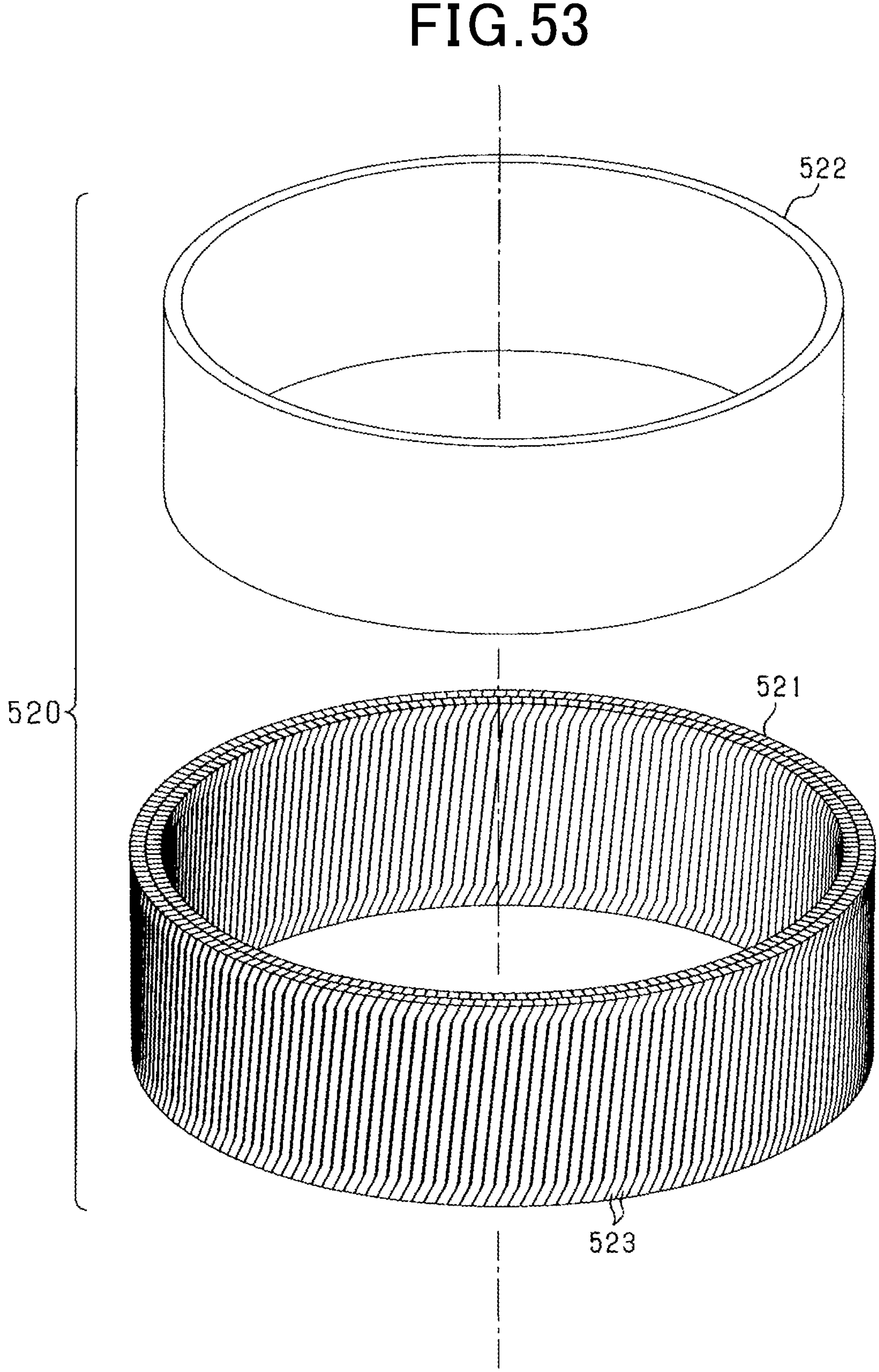
FIG. 53 is an exploded perspective view of a stator of the rotating electric machine.

Next, the configuration of the stator 520 will be described. The stator 520 includes a stator coil 521 and a stator core 522. FIG. 53 is a perspective view showing the stator coil 521 and the stator core 522 in a state of being separated from each other.

The stator coil 521 is substantially hollow cylindrical (or annular) in shape. The stator coil 521 is a multi-phase coil comprised of a plurality of phase windings. The stator core 522 is assembled, as a base member, to the radially inner periphery of the stator coil 521. More particularly, in the present embodiment, the stator coil 521 is a three-phase coil comprised of U, V and W phase windings. Each phase winding is constituted of two radially-stacked layers of electrical conductors 523. Similar to the stator 50 described in the first embodiment, the stator 520 according to the present embodiment also has both a slot-less structure and a flat conductor structure. That is, the stator 520 has a configuration that is the same as or similar to the configuration of the stator 50 shown in FIGS. 8-16.

The configuration of the stator core 522 is similar to the configuration of the stator core 52 described in the first embodiment. Specifically, the stator core 522 is formed by laminating a plurality of magnetic steel sheets in the axial direction. The stator core 522 has a hollow cylindrical shape with a predetermined radial thickness. The stator coil 521 is assembled to the radially outer periphery (i.e., the rotor 510-side periphery) of the stator core 522. The outer circumferential surface of the stator core 522 is a smooth cylindrical surface. After the assembly of the stator 520, the electrical conductors 523 forming the stator coil 521 are arranged on the outer circumferential surface of the stator core 522 in alignment with each other in the circumferential direction. In addition, the stator core 522 functions as a back core.

Moreover, the stator 520 may have any of the following configurations (A)-(C).

(A) In the stator 520, inter-conductor members are provided between the electrical conductors 523 in the circumferential direction. The inter-conductor members are formed of a magnetic material satisfying the following relationship: $Wt \times Bs \leq Wm \times Br$, where Wt is the circumferential width of the inter-conductor members in each magnetic pole, Bs is the saturation flux density of the inter-conductor members, Wm is the circumferential width of the magnet unit 512 in each magnetic pole and Br is the residual flux density of the magnet unit 512.

(B) In the stator 520, inter-conductor members are provided between the electrical conductors 523 in the circumferential direction. The inter-conductor members are formed of a nonmagnetic material.

(C) In the stator 520, no inter-conductor members are provided between the electrical conductors 523 in the circumferential direction.

With any of the above configurations, the inductance of the stator 520 can be lowered in comparison with a conventional stator where teeth of a stator core are interposed between the circumferentially adjacent electrical conductor sections of the stator coil to form magnetic paths. More specifically, the inductance of the stator 520 can be lowered to be lower than or equal to 1/10 of the inductance of the conventional stator. Moreover, with the lowering of the inductance, the impedance of the stator 520 can also be lowered, thereby increasing the torque of the rotating electric machine 500 and thus the output power of the rotating electric machine 500 with respect to the input power. Consequently, the rotating electric machine 500 can output more power than a rotating electric machine which includes an IPM (Interior Permanent Magnet) rotor and outputs torque by utilizing a voltage of an impedance component (in other words, utilizing reluctance torque).

In the present embodiment, the stator coil 521 is molded together with the stator core 522 by a molding material (or insulating member) that is implemented by a resin or the like. Consequently, the molding material is interposed between the circumferentially adjacent electrical conductors 523. That is, the stator 520 according to the present embodiment has the configuration (B) among the aforementioned configurations (A)-(C). In addition, the electrical conductors 523 are arranged so that circumferential side surfaces of circumferentially adjacent electrical conductors 523 abut one another or face one another with minute gaps formed therebetween. Therefore, the stator 520 may alternatively have the above configuration (C). On the other hand, in the case of employing the above configuration (A), protrusions may be formed on the outer circumferential surface of the stator core 522 according to the orientation of the electrical conductors 523 with respect to the axial direction, i.e., according to the skew angles when the stator coil 521 has a skew structure.

Figure 54A:
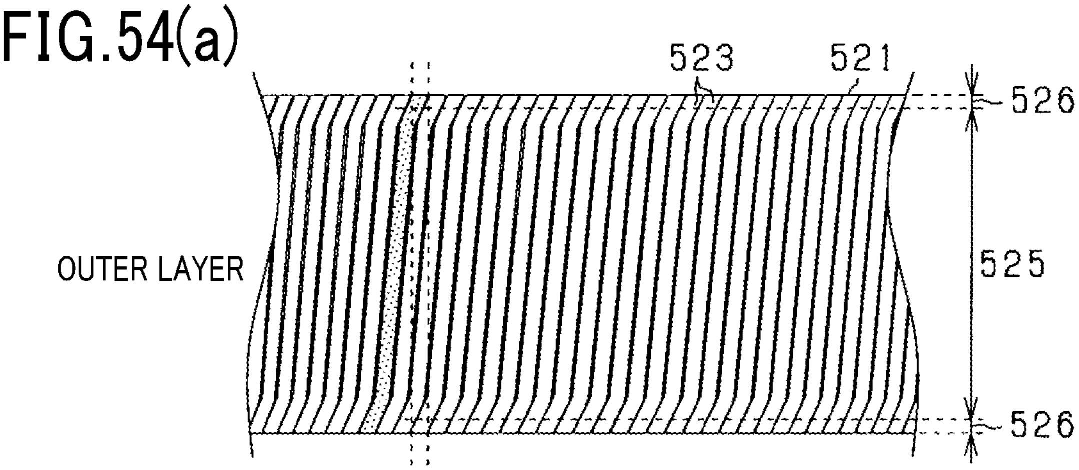
FIGS. 54(*a*) and 54(*b*) are each a developed view of a stator coil of the stator on a plane.
Figure 54B:
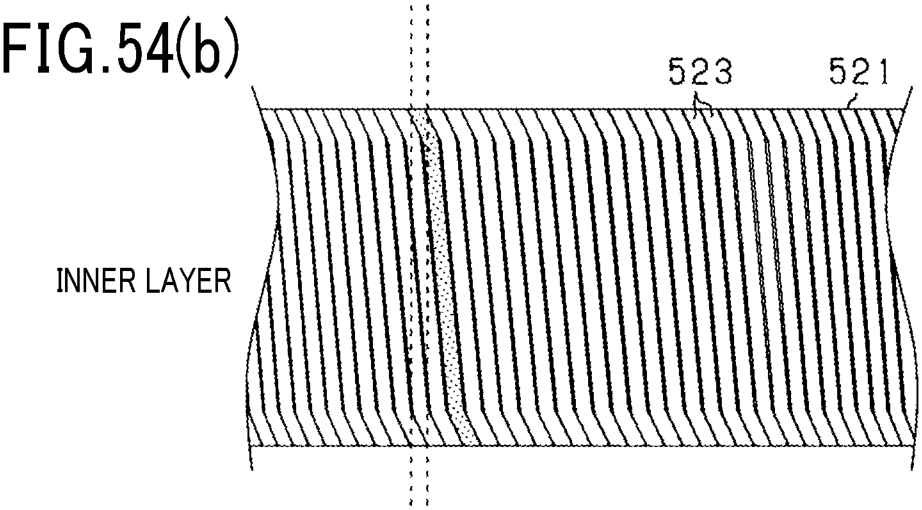

Next, the configuration of the stator coil 521 will be described with reference to FIGS. 54(*a*) and 54(*b*). In addition, FIGS. 54(*a*) and 54(*b*) are each a developed view of the stator coil 521 on a plane. FIG. 54(*a*) shows the electrical conductors 523 located at the radially outer layer while FIG. 54(*b*) shows the electrical conductors 523 located at the radially inner layer.

In the present embodiment, the stator coil 521 is wound in a distributed winding manner into an annular shape. The electrical conductors 523 forming the stator coil 521 are arranged in two radially-stacked layers. Moreover, the electrical conductors 523 located at the radially outer layer (see FIG. 54(*a*)) are skewed in a different direction from the electrical conductors 523 located at the radially inner layer (see FIG. 54(*b*). The electrical conductors 523 are electrically insulated from each other. Each of the electrical conductors 523 may be constituted of a bundle of wires 86 (see FIG. 13). The electrical conductors 523 are arranged in pairs in the circumferential direction; each pair consists of two circumferentially adjacent electrical conductors 523 that belong to the same phase and are energized in the same direction. Every two pairs of electrical conductors 523 (i.e., every four electrical conductors 523), which are located respectively at the radially inner and radially outer layers and in radial alignment with each other, constitute one electrical conductor section. In addition, one electrical conductor section is provided per phase in each magnetic pole.

It is preferable that the radial thickness of each of the electrical conductor sections is set to be smaller than the total circumferential width of the electrical conductor sections per phase in each magnetic pole, thereby realizing a flat conductor structure of the stator coil 521. Specifically, in the stator coil 521, each of the electrical conductor sections may be comprised of a plurality of (e.g., a total of eight) electrical conductors 523 of the same phase which are arranged in two layers in the radial direction and four locations in the circumferential direction. Moreover, on a transverse cross section of the stator coil 521 as shown in FIG. 50, the circumferential width of each electrical conductor 523 may be set to be larger than the radial thickness of each electrical conductor 523. In addition, the stator coil 521 according to the present embodiment may alternatively have the same configuration as the stator coil 51 shown in FIG. 12. However, in this case, it is necessary to secure in the rotor carrier 511 a space for receiving a coil end of the stator coil.

In the stator coil 521, the electrical conductors 523 are arranged in the circumferential direction so that in the coil side part 525 of the stator coil 521 which radially overlaps the stator core 522, each of the electrical conductors 523 extends obliquely at a predetermined angle with respect to the axial direction. Moreover, the stator coil 521 is reversed (or folded back) axially inward at the two coil ends 526 of the stator coil 521, which are located axially outside the stator core 522, so as to realize continuous connection of the electrical conductors 523. In addition, the axial ranges of the coil side part 525 and coil ends 526 of the stator coil 521 are shown in FIG. 54(*a*). The electrical conductors 523 located at the radially inner layer and the electrical conductors 523 located at the radially outer layer are connected with one another at the coil ends 526 of the stator coil 521. Consequently, the locations of the electrical conductors 523 are alternately changed between the radially inner layer and the radially outer layer each time the stator coil 521 is axially reversed (or folded back) at either of the coil ends 526. That is, the stator coil 521 is configured so that for each circumferentially continuous (or connected) pair of the electric conductors 523, the two electrical conductors 523 of the pair are located respectively at the radially inner layer and the radially outer layer and the directions of electric currents flowing respectively in the two electrical conductors 523 of the pair are opposite to each other.

Figure 55:
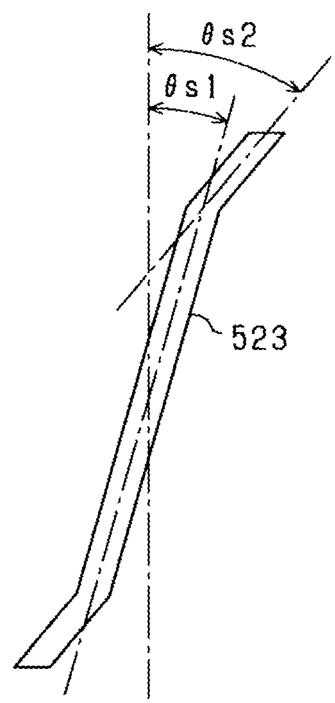
FIG. 55 is a diagram illustrating skew angles of electrical conductors forming the stator coil.

Moreover, in the stator coil 521, two types of skew are performed on each electrical conductor 523 so that the skew angle of axial end parts of each electrical conductor 523 is different from the skew angle of an axial central part of each electrical conductor 523. Specifically, as shown in FIG. 55, in each of the electrical conductors 523, the skew angle θs1 of the axial central part is different from, more particularly smaller than the skew angle θs2 of the two axial end parts. Each of the axial end parts of the electrical conductors 523 is defined within an axial range including one of the coil ends 526 of the stator coil 521 and part of the coil side part 525 of the stator coil 521. The skew angle θs1 represents an oblique angle with which the axial central part of each electrical conductor 523 extends obliquely with respect to the axial direction; the skew angle θs2 represents an oblique angle with which the two axial end parts of each electrical conductor 523 extend obliquely with respect to the axial direction. In addition, the skew angle θs1 of the axial central part of each electrical conductor 523 may be set within such a suitable range as to reduce harmonic components of magnetic flux generated by energization of the stator coil 521.

Setting the skew angle θs1 to be smaller than the skew angle θs2, it is possible to increase the winding factor of the stator coil 521 while reducing the sizes of the coil ends 526. In other words, it is possible to secure a desired winding factor while reducing the axial lengths of the coil ends 526, i.e., the lengths by which the coil ends 526 axially protrude from the stator core 522. As a result, it is possible to increase the torque of the rotating electric machine 500 while minimizing the size of the same.

Here, the suitable range of the skew angle θs1 will be described. In the case of the stator coil 521 having X electrical conductors 523 arranged in each magnetic pole, the Xth order harmonic component may be generated by energization of the stator coil 521. X=2×S×m, where S is the number of phases and m is the number of pole pairs. The inventor of the present application have recognized that since the Xth order harmonic component corresponds to the resultant of the (X−1)th order and (X+1)th order harmonic components, the Xth order harmonic component can be reduced by reducing at least one of the (X−1)th order and (X+1)th order harmonic components. Base on this recognition, the inventor has found that the Xth order harmonic component can be reduced by setting the skew angle θs1 within the range of 360°/(X+1) to 360°/(X−1) in electrical angle.

For example, when S=3 and m=2, X=12. In this case, to reduce the twelfth order harmonic component, the skew angle θs1 is set within the range of 360°/13 to 360°/11 in electrical angle. That is, the skew angle θs1 is set within the range of 27.7° to 32.7° in electrical angle.

Setting the skew angle θs1 as above, it is possible to increase the amount of magnet magnetic flux alternating between N and S and crossing the axial central parts of the electrical conductors 523, thereby increasing the winding factor of the stator coil 521.

The skew angle θs2 of the two axial end parts of each electrical conductor 523 is set to be larger than the above-described skew angle θs1 and smaller than 90° in electrical angle. That is, θs1<θs2<90°.

In the stator coil 521, the electrical conductors 523 located at the radially inner layer and the electrical conductors 523 located at the radially outer layer can be connected to one another by welding or bonding ends of the electrical conductors 523 or by bending the electrical conductor material. At one of the two coil ends 526 (i.e., on one axial side) of the stator coil 521, ends of the phase windings of the stator coil 521 are electrically connected to the electric power converter (or the inverter unit 530) via busbars. Therefore, one of the following configurations may be employed where the connection between the electrical conductors 523 at the busbar-side coil end 526 is different from the connection between the electrical conductors 523 at the anti-busbar-side coil end 526.

As the first configuration, at the busbar-side coil end 526, the electrical conductors 523 are connected to one another by welding; at the anti-busbar-side coil end 526, the electrical conductors 523 are connected to one another by a method other than welding, for example by bending the electrical conductor material. At the busbar-side coil end 526, the ends of the phase windings of the stator coil 521 are connected to the busbars by welding. Therefore, connecting the electrical conductors 523 at the busbar-side coil end 526 also by welding, it is possible to perform both the connection of the ends of the phase windings to the busbars and the connection of the electrical conductors 523 at the busbar-side coil end 526 in a single step, thereby improving the productivity.

As the second configuration, at the busbar-side coil end 526, the electrical conductors 523 are connected to one another by a method other than welding; at the anti-busbar-side coil end 526, the electrical conductors 523 are connected to one another by welding. If the electrical conductors 523 are connected to one another by welding at the busbar-side coil end 526, it is necessary to secure sufficient clearances between the busbars and the busbar-side coil end 526 so as to prevent interference between the busbars and the welds formed between the electrical conductors 523. In contrast, with the second configuration, it is possible to reduce the clearances between the busbars and the busbar-side coil end 526. Consequently, it is possible to relax constraints on the axial length of the stator coil 521 and the busbars.

As the third configuration, the electrical conductors 523 are connected to one another by welding at both the coil ends 526. In this case, it is possible to reduce the length of the electrical conductor material; it is also possible to improve the productivity since no bending step is necessary.

As the fourth configuration, the electrical conductors 523 are connected to one another by a method other than welding at both the coil ends 526. In this case, it is possible to minimize the number of welds formed in the stator coil 521, thereby suppressing occurrence of insulation peeling during the welding step.

In the process of manufacturing the annular stator coil 521, it is possible to first form planar band-shaped windings and then roll the planar band-shaped windings into the annular shape. In this case, after forming the planar band-shaped windings, the electrical conductors of the windings may be welded at either or both of the coil ends 526 as necessary. Moreover, in rolling the planar band-shaped windings into the annular shape, a cylindrical jig may be used which has the same outer diameter as the stator core 522. In this case, the planar band-shaped windings are rolled around the cylindrical jig into the annular shape. Alternatively, the planar band-shaped windings may be rolled directly on the stator core 522.

Furthermore, the configuration of the stator coil 521 may be modified as follows.

For example, in the stator coil 521 shown in FIGS. 54(*a*) and 54(*b*), the skew angle of the two axial end parts of each electrical conductor 523 may be set to be equal to the skew angle of the axial central part of each electrical conductor 523.

Moreover, in the stator coil 521 shown in FIGS. 54(*a*) and 54(*b*), each pair of ends of circumferentially adjacent electrical conductors 523 of the same phase may be connected with a bridging wire that extends perpendicular to the axial direction.

In the stator coil 521, the number of radially-stacked layers of the electrical conductors 523 may be set to 2×n, where n is a natural number. That is, the number of radially-stacked layers of the electrical conductors 523 may be set to other positive even numbers than 2, such as 4 or 6.

Figure 56:
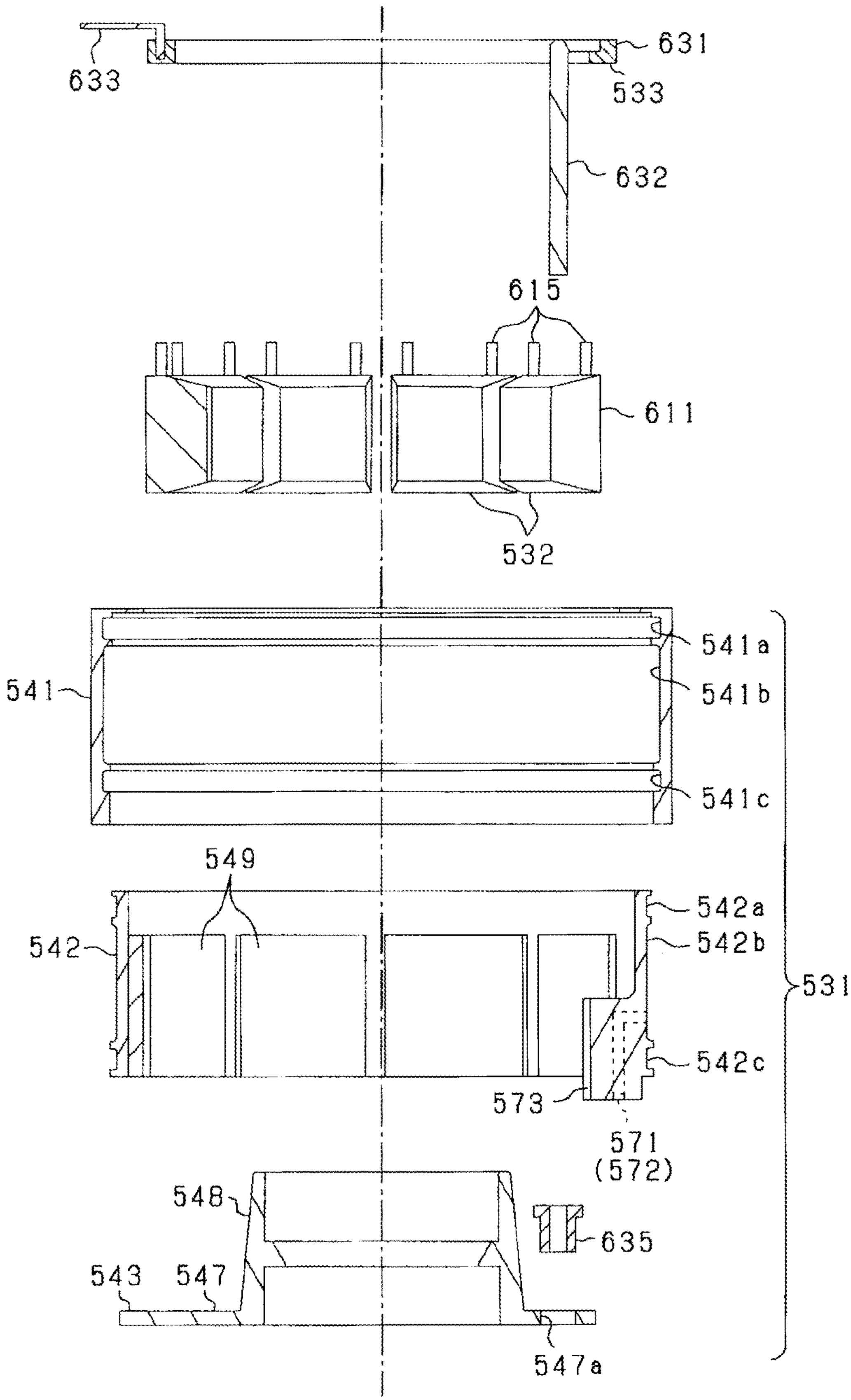
FIG. 56 is an exploded cross-sectional view of an inverter unit of the rotating electric machine.
Figure 57:
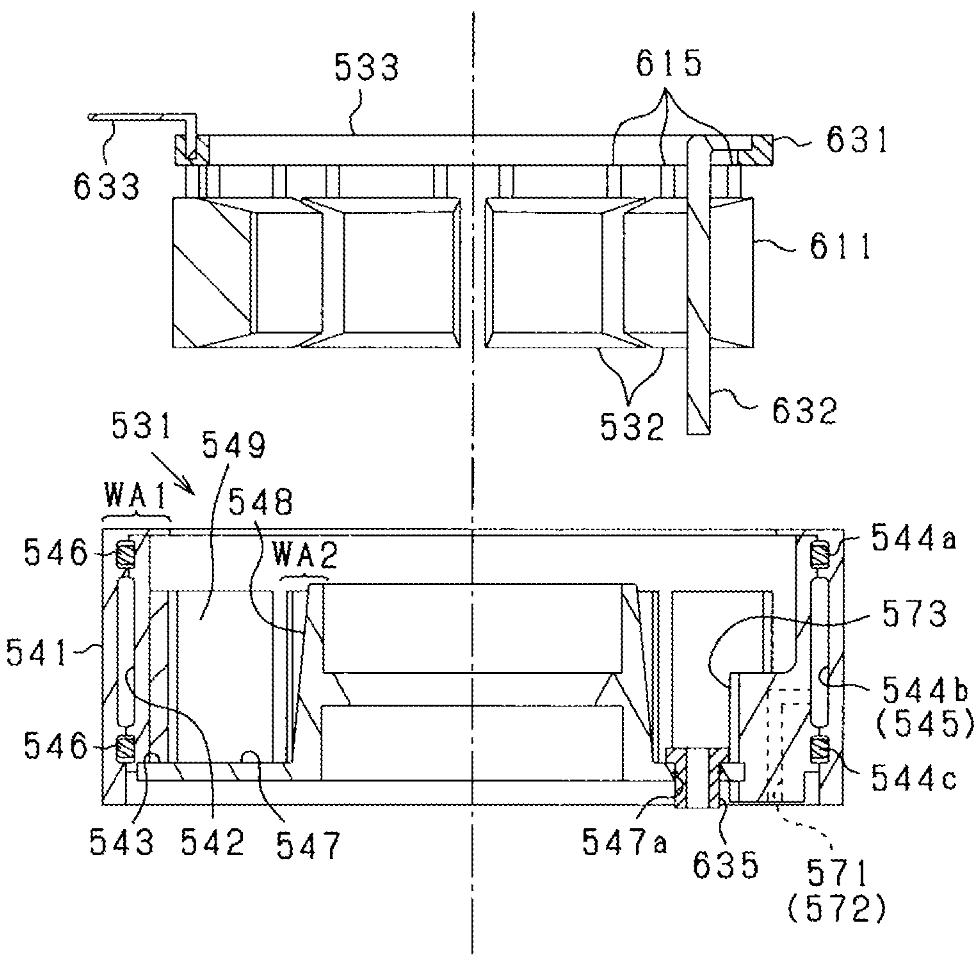
FIG. 57 is another exploded cross-sectional view of the inverter unit.

Next, the inverter unit 530, which is an electric power conversion unit, will be described with reference to FIGS. 56 and 57. FIG. 56 is an exploded cross-sectional view of the inverter unit 530. FIG. 57 is another exploded cross-sectional view of the inverter unit 530, where components of the inverter unit 530 are assembled into two subassemblies.

The inverter unit 530 includes an inverter housing 531, a plurality of electrical modules 532 assembled to the inverter housing 531, and a busbar module 533 for electrically connecting the electrical modules 532.

The inverter housing 531 includes a hollow cylindrical outer wall member 541, a hollow cylindrical inner wall member 542 having an outer diameter smaller than an inner diameter of the outer wall member 541 and arranged radially inside the outer wall member 541, and a boss-forming member 543 fixed to one axial end of the inner wall member 542. All of these members 541-543 are formed of an electrically conductive material, such as Carbon Fiber-Reinforced Plastic (CFRP). The inverter housing 531 is formed by assembling the outer wall member 541 and the inner wall member 542 to radially overlap each other and assembling the boss-forming member 543 to one axial end (i.e., the lower end in FIGS. 56 and 57) of the inner wall member 542. The inverter housing 531 in the assembled state is shown in FIG. 57.

To the radially outer periphery of the outer wall member 541 of the inverter housing 531, there is fixed the stator core 522 (see FIGS. 49 and 50). Consequently, the stator 520 and the inverter unit 530 are integrated into one piece.

As shown in FIG. 56, the outer wall member 541 has a plurality of recesses 541*a*, 541*b* and 541*c* formed in an inner circumferential surface thereof. The inner wall member 542 has a plurality of recesses 542*a*, 542*b* and 542*c* formed in an outer circumferential surface thereof. Upon the outer wall member 541 and the inner wall member 542 being assembled to each other, three hollow portions 544*a*, 544*b* and 544*c* are formed between the two members 541 and 542 (see FIG. 57). Of the three hollow portions 544*a*-544*c*, the center hollow portion 544*b* constitutes a cooling water passage 545 through which cooling water flows as a coolant. The remaining two hollow portions 544*a* and 544*c* are located respectively on opposite axial sides of the hollow portion 544*b* (or cooling water passage 545). In each of the hollow portions 544*a* and 544*c*, there is received one seal member 546 (see FIG. 57). Consequently, the hollow portion 544*b* (or cooling water passage 545) is hermetically sealed by the seal members 546 received in the hollow portions 544*a* and 544*c*. The cooling water passage 545 will be described in more detail later.

The boss-forming member 543 includes an annular end plate 547 and a boss portion 548 that axially protrudes from a radially inner periphery of the annular end plate 547 toward the inside of the inverter housing 531. The boss portion 548 has a hollow cylindrical shape. Referring back to FIG. 51, the inner wall member 542 has an axially opposite pair of first and second ends; the second end is located closer than the first end to the vehicle body. The boss-forming member 543 is fixed to the second end (i.e., the left end in FIG. 51) of the inner wall member 542. In addition, in the wheel 400 shown in FIGS. 45-47, the base plate 405 is fixed to the inverter housing 531 (more specifically, the end plate 547 of the boss-forming member 543 of the inverter housing 531).

The inverter housing 531 is configured to have a double circumferential wall formed around the central axis of the inverter housing 531. Of the double circumferential wall, the radially outer circumferential wall is constituted of both the outer wall member 541 and the inner wall member 542 while the radially inner circumferential wall is constituted of the boss portion 548 of the boss-forming member 543. In addition, in the explanation given hereinafter, the outer circumferential wall constituted of both the outer wall member 541 and the inner wall member 542 will be referred to as the "outer circumferential wall WA1"; the inner circumferential wall constituted of the boss portion 548 of the boss-forming member 543 will be referred to as the "inner circumferential wall WA2".

In the inverter housing 531, there is formed an annular space between the outer circumferential wall WA1 and the inner circumferential wall WA2. In the annular space, the electrical modules 532 are arranged along the circumferential direction. Moreover, the electrical modules 532 are fixed to the inner circumferential surface of the inner wall member 542 by, for example, bonding or screw fastening. In addition, in the present embodiment, the inverter housing 531 corresponds to a "housing member" and the electrical modules 532 correspond to "electrical components".

On the radially inner side of the inner circumferential wall WA2 (or the boss portion 548), there is received the bearing 560 by which the rotating shaft 501 is rotatably supported. In the present embodiment, the bearing 560 is configured as a hub bearing which is provided in a central part of the wheel 400 to rotatably support the wheel 400. The bearing 560 is axially located so as to radially overlap the rotor 510, the stator 520 and the inverter unit 530. In the rotating electric machine 500 according to the present embodiment, with reduction in the thickness of the magnet unit 512 of the rotor 510 and employment of both the slot-less structure and the flat conductor structure in the stator 520, the radial thickness of the magnetic circuit part is reduced, thereby making it possible to expand the hollow space on the radially inner side of the magnetic circuit part. Consequently, it becomes possible to arrange the magnetic circuit part, the inverter unit 530 and the bearing 560 in radial alignment with each other. In addition, the boss portion 548 constitutes a bearing holding portion that holds the bearing 560 on the radially inner side thereof.

The bearing 560 may be implemented by, for example, a radial ball bearing. The bearing 560 includes an inner ring 561, an outer ring 562 having an inner diameter larger than an outer diameter of the inner ring 561 and arranged radially outside the inner ring 561, and a plurality of balls 563 arranged between the inner ring 561 and the outer ring 562. The bearing 560 is fixed to the inverter housing 531 by assembling the outer ring 562 to the boss-forming member 543. The inner ring 561 of the bearing 560 is fixed to the rotating shaft 501. In addition, each of the inner ring 561, the outer ring 562 and the balls 563 is formed of a metal material such as carbon steel.

The inner ring 561 of the bearing 560 has a cylindrical portion 561*a* for receiving the rotating shaft 501 and a flange 561*b* formed at one axial end of the cylindrical portion 561*a* so as to extend nonparallel (or perpendicular) to the axial direction. The flange 561*b* is configured to abut the end plate 514 of the rotor carrier 511 from the axially inner side. In a state of the bearing 560 having been assembled to the rotating shaft 501, the rotor carrier 511 is held with its end plate 514 axially sandwiched between the flange 502 of the rotating shaft 501 and the flange 561*b* of the inner ring 561 of the bearing 560. The angles made by the flange 502 of the rotating shaft 501 and the flange 561*b* of the inner ring 561 of the bearing 560 with the axial direction are equal (more particularly, both right angles in the present embodiment).

With the inner ring 561 of the bearing 560 supporting the end plate 514 of the rotor carrier 511 from the axially inner side, it is possible to keep the angle made by the end plate 514 of the rotor carrier 511 with the axial direction at a suitable angle, thereby maintaining high parallelism between the magnet unit 512 and the rotating shaft 501. Consequently, though the rotor carrier 511 is configured to radially expand, it is still possible to secure high resistance thereof to vibration.

Next, the electrical modules 532 received in the inverter housing 531 will be described.

The electrical modules 532 are obtained by dividing electrical components, such as semiconductor switching elements and smoothing capacitors, into a plurality of groups and modularizing each of the groups. The electrical modules 532 include switch modules (or power modules) 532A, which include the respective semiconductor switching elements, and capacitor modules 532B each including one smoothing capacitor.

As shown in FIGS. 49 and 50, on the inner circumferential surface of the inner wall member 542 of the inverter housing 531, there are fixed a plurality of spacers 549 each having a flat surface. On the flat surface of each of the spacers 549, there is mounted one of the electrical modules 532. More specially, the inner circumferential surface of the inner wall member 542 of the inverter housing 531 is a smooth cylindrical surface whereas mounting surfaces of the electrical modules 532 are each a flat surface. Therefore, the spacers 549 each having a flat surface are first arranged on and fixed to the inner circumferential surface of the inner wall member 542 of the inverter housing 531 and then the mounting surfaces of the electrical modules 532 are respectively arranged on and fixed to the flat surfaces of the spacers 549.

It is not essential to interpose the spacers 549 between the inner wall member 542 of the inverter housing 531 and the electrical modules 532. For example, as an alternative, the inner circumferential surface of the inner wall member 542 of the inverter housing 531 may be constituted of a plurality of flat surfaces to which the electrical modules 532 are respectively directly mounted. As another alternative, the mounting surfaces of the electrical modules 532 may be each formed as a curved surface, thereby allowing the electrical modules 532 to be directly mounted to the inner circumferential surface of the inner wall member 542 of the inverter housing 531. As yet another alternative, the electrical modules 532 may be fixed to the inverter housing 531 without abutting the inner circumferential surface of the inner wall member 542 of the inverter housing 531. For example, the electrical modules 532 may alternatively be fixed to the end plate 547 of the boss-forming member 543 of the inverter housing 531. As still another alternative, of the electrical modules 532, only the capacitor modules 532B may be fixed to the inverter housing 531 without abutting the inner circumferential surface of the inner wall member 542 of the inverter housing 531 while the switch modules 532A are fixed to abut the inner circumferential surface of the inner wall member 542.

In addition, in the case of interposing the spacers 549 between the inner wall member 542 of the inverter housing 531 and the electrical modules 532, the outer circumferential wall WA1 and the spacers 549 together correspond to a "tubular portion". In contrast, in the case of no spacers 549 being employed, the outer circumferential wall WA1 alone corresponds to the "tubular portion".

As described previously, in the outer circumferential wall WA1 of the inverter housing 531, there is formed the cooling water passage 545 through which cooling water flows as a coolant. Consequently, the electrical modules 532 can be cooled by the cooling water flowing through the cooling water passage 545. In addition, as the coolant, cooling oil may be employed instead of cooling water. The cooling water passage 545 is formed over the entire circumference of the outer circumferential wall WA1 into an annular shape. Cooling water flows in the cooling water passage 545 from the upstream side to the downstream side, cooling the electrical modules 532. In the present embodiment, the cooling water passage 545 is annular-shaped and arranged to radially overlap the electrical modules 532 and surround the electrical modules 532 from the radially outer side of them.

In the inner wall member 542 of the inverter housing 531, there are also formed both an inflow passage 571 via which the cooling water flows into the cooling water passage 545 and an outflow passage 572 via which the cooling water flows out of the cooling water passage 545. Specifically, as described previously, in the present embodiment, the electrical modules 532 are fixed to the inner circumferential surface of the inner wall member 542. The electrical modules 532 are arranged in the circumferential direction with gaps formed therebetween. Moreover, one of the gaps formed between the circumferentially adjacent electrical modules 532 is considerably wider than the remaining gaps. In this wider gap, there is arranged a protruding portion 573 of the inner wall member 542 which protrudes radially inward. Both the inflow passage 571 and the outflow passage 572 are formed in the protruding portion 573 of the inner wall member 542 in circumferential alignment with each other.

Next, the arrangement of the electrical modules 532 in the inverter housing 531 will be described with reference to FIG. 58. In addition, FIG. 58 is a longitudinal cross-sectional view similar to FIG. 50.

Figure 58:
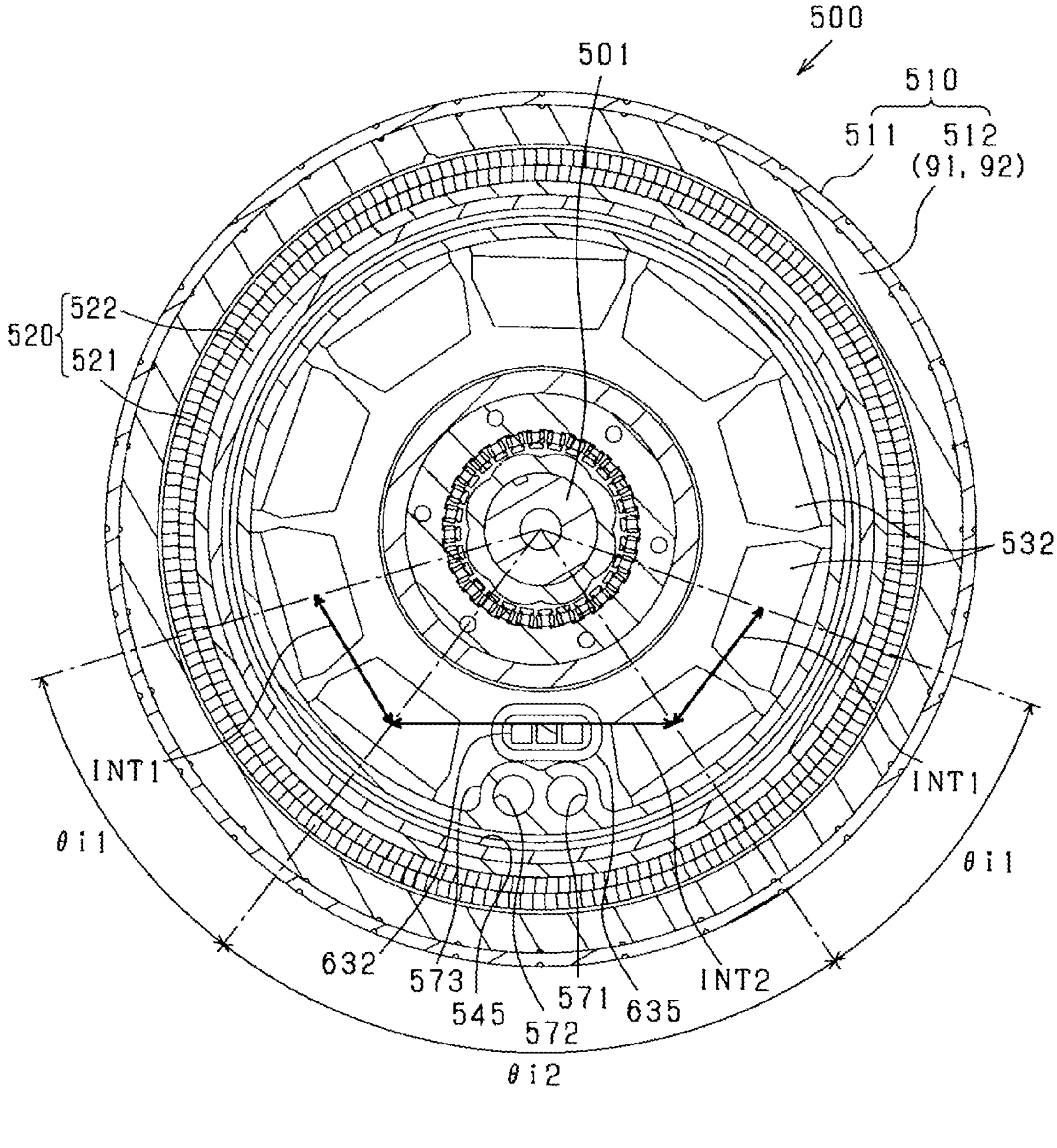
FIG. 58 is a cross-sectional view illustrating the arrangement of electrical modules in an inverter housing of the inverter unit.

As shown in FIG. 58, the electrical modules 532 are arranged at predetermined intervals in the circumferential direction. The predetermined intervals between the electrical modules 532 include first intervals INT1 and a second interval INT2 that is wider than the first intervals INT1. Each of the predetermined intervals is represented by, for example, a circumferential distance between center positions of one circumferentially-adjacent pair of the electrical modules 532. Moreover, each of the first intervals INT1 is provided between one circumferentially-adjacent pair of the electrical modules 532 between which no protruding portion 573 is interposed. In contrast, the second interval INT2 is provided between the circumferentially-adjacent pair of the electrical modules 532 between which the protruding portion 573 of the inner wall member 542 is interposed. In addition, the protruding portion 573 is located at, for example, the center of the second interval INT2.

The intervals INT1 and INT2 may be defined on the same circle whose center is on the central axis of the rotating shaft 501. In this case, each of the intervals is represented by the circumferential distance (or the length of arc) on the circle between the center positions of one circumferentially-adjacent pair of the electrical modules 532. Alternatively, each of the intervals may be represented by the angular range $\theta i1$ or $\theta i2$ between the center positions of one circumferentially-adjacent pair of the electrical modules 532. In this case, $\theta i1$ represents the first intervals INT1 while $\theta i2$ represents the second interval INT2 ($\theta i1 < \theta i2$).

In addition, the first intervals INT1 may alternatively be eliminated (or set to zero). In this case, the electrical components 532 are arranged in the circumferential direction in contact with one another.

Referring back to FIG. 48, in the end plate 547 of the boss-forming member 543 of the inverter housing 531, there is provided a cooling water port 574 where ends of the inflow passage 571 and the outflow passage 572 are formed. Both the inflow passage 571 and the outflow passage 572 are configured to be included in a cooling water circulation path 575 through which the cooling water circulates. The cooling water circulation path 575 also includes cooling water pipes, a cooling water pump 576 and a heat dissipation device 577. In operation, with the drive of the cooling water pump 576, the cooling water circulates through the cooling water circulation path 575. In addition, the cooling water pump 576 is implemented by an electric pump. The heat dissipation device 577 is implemented by, for example, a radiator configured to dissipate heat of the cooling water to the atmosphere.

As shown in FIG. 50, the stator 520 is arranged on the radially outer side of the outer circumferential wall WA1 of the inverter housing 531 while the electrical modules 532 are arranged on the radially inner side of the outer circumferential wall WA1. Consequently, heat generated in the stator 520 is transmitted to the outer circumferential wall WA1 from the radially outer side while heat generated in the electrical modules 532 is transmitted to the outer circumferential wall WA1 from the radially inner side. As a result, the stator 520 and the electrical modules 532 can be cooled at the same time by the cooling water flowing through the cooling water passage 545. That is, it is possible to effectively dissipate heat generated in these components of the rotating electric machine 500.

Next, the electrical configuration of an electric power converter will be described with reference to FIG. 59.

Figure 59:
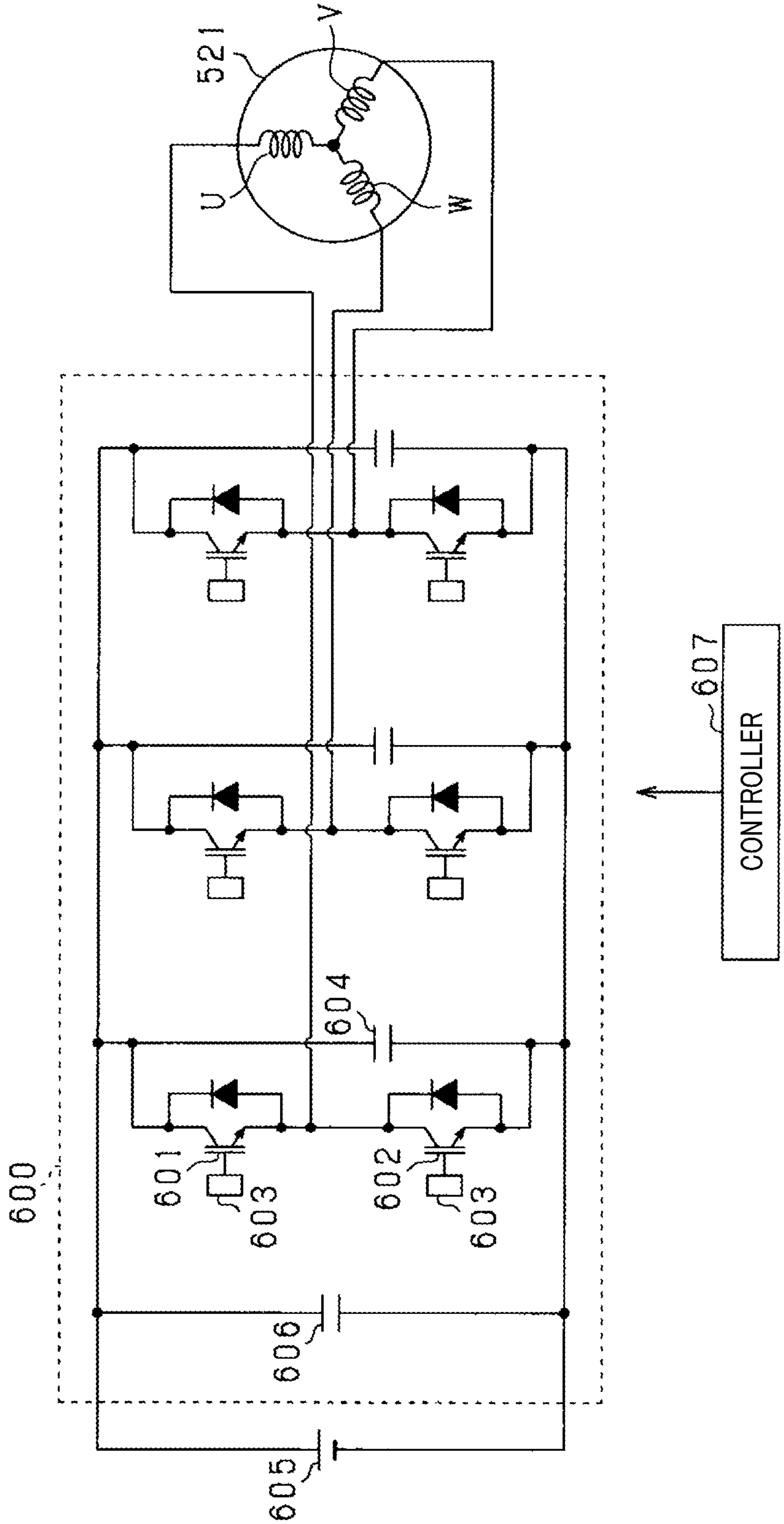
FIG. 59 is a circuit diagram illustrating the electrical configuration of an inverter formed in the inverter unit.

As shown in FIG. 59, in the present embodiment, the stator coil 521 is comprised of the U, V, and W phase windings. An inverter 600 is electrically connected with the stator coil 521. In the inverter 600, there is formed a full bridge circuit having a plurality of pairs of upper and lower arms. The number of pairs of the upper and lower arms is equal to the number of the phase windings of the stator coil 521. The full bridge circuit includes, for each of the U, V and W phases, one serially-connected unit consisting of an upper-arm switch 601 and a lower-arm switch 602. Each of the switches 601 and 602 is turned on and off by a corresponding drive circuit 603, so as to supply alternating current to a corresponding one of the U, V, and W phase windings. Each of the switches 601 and 602 is configured with a semiconductor switching element such as a MOSFET or an IGBT. Moreover, each serially-connected unit, which corresponds to one of the U, V and W phases and consists of one upper-arm switch 601 and one lower-arm switch 602, has a charge supply capacitor 604 connected in parallel therewith to supply electric charge required for the on/off operation of the switches 601 and 602.

Operation of the inverter 600 is controlled by a controller 607. The controller 607 includes a microcomputer which is configured with a CPU and various memories. Based on various types of detected information on the rotating electric machine 500 and power running drive and electric power generation requests, the controller 607 performs energization control by turning on and off the switches 601 and 602 of the inverter 600. More specifically, the controller 607 controls the on/off operation of each of the switches 601 and 602 by, for example, PWM control at a predetermined switching frequency (or carrier frequency) or a rectangular wave control. The controller 607 may be either a built-in controller incorporated in the rotating electric machine 500 or an external controller provided outside the rotating electric machine 500.

In the present embodiment, the electrical time constant of the rotating electric machine 500 is lowered with reduction in the inductance of the stator 520. When the electrical time constant is lowered, it is preferable to increase the switching frequency (or carrier frequency) and the switching speed. In this regard, with the charge supply capacitor 604 connected in parallel with the serially-connected unit of each phase, the wiring inductance is lowered. Consequently, even with the increased switching speed, it is still possible to suitably cope with surge.

The inverter 600 has its high potential-side terminal connected to a positive terminal of a DC power supply 605 and its low potential-side terminal connected to a negative terminal of the DC power supply 605 (or ground). Moreover, between the high potential-side and low potential-side terminals of the inverter 600, there are further connected smoothing capacitors 606 in parallel with the DC power supply 605.

Figure 60:
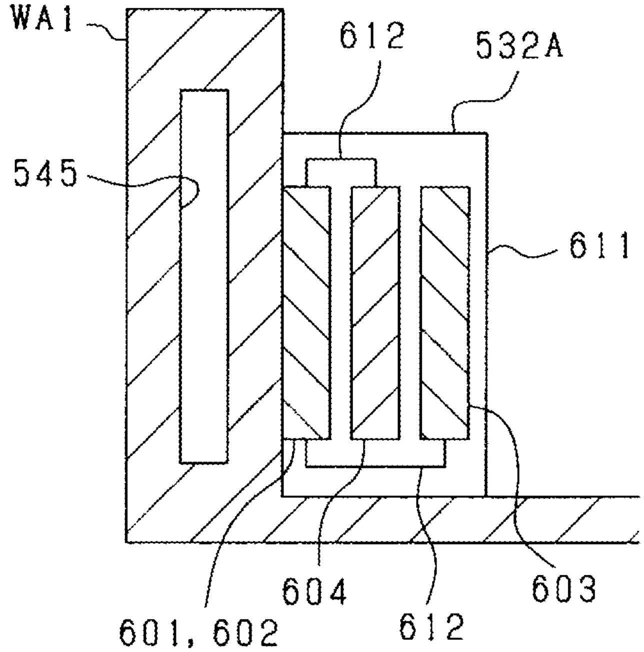
FIG. 60 is a cross-sectional view illustrating a configuration example of switch modules of the inverter unit.

Each of the switch modules 532A includes those components corresponding to one phase which include the upper-arm and lower-arm switches 601 and 602 (i.e., semiconductor switching elements), the drive circuit 603 (more specifically, electrical elements constituting the drive circuit 603) and the charge supply capacitor 604. On the other hand, each of the capacitor modules 532B includes one of the smoothing capacitors 606. FIG. 60 shows a specific configuration example of the switch modules 532A.

As shown in FIG. 60, each of the switch modules 532A includes a module case 611 as a receiving case. In the module case 611, there are received those components corresponding to one phase which include the upper-arm and lower-arm switches 601 and 602, the drive circuit 603 and the charge supply capacitor 604. In addition, the drive circuit 603 is configured as a dedicated IC or circuit board.

The module case 611 is formed of an electrically-insulative material such as a resin. The module case 611 is fixed to the outer circumferential wall WA1 of the inverter housing 531 with a side surface of the module case 611 abutting the inner circumferential surface of the inner wall member 542 of the inverter housing 531. A molding material (e.g., resin) is filled in the module case 611. Moreover, in the module case 611, electrical connection between the switches 601 and 602 and the drive circuit 603 and between the switches 601 and 602 and the charge supply capacitor 604 is made by wirings 612. In addition, each of the switch modules 532A is mounted to the outer circumferential wall WA1 of the inverter housing 531 via the corresponding spacer 549. However, for the sake of simplicity, the corresponding spacer 549 is not shown in FIG. 60.

In the state of each of the switch modules 532A being fixed to the outer circumferential wall WA1 of the inverter housing 531, the cooling performance in the switch module 532A increases with decrease in the distance from the outer circumferential wall WA1, i.e., with decrease in the distance from the cooling water passage 545. Therefore, in each of the switch modules 532A, the upper-arm and lower-arm switches 601 and 602, the drive circuit 603 and the charge supply capacitor 604 are arranged taking into account the above-described cooling performance therein. More specifically, the amounts of heat generated by these components decrease in the order of the switches 601 and 602, the charge supply capacitor 604 and the drive circuit 603. Therefore, as shown in FIG. 60, these components are sequentially arranged from the outer circumferential wall WA1 side in the order of the switches 601 and 602, the charge supply capacitor 604 and the drive circuit 603. In addition, the contact surface of each of the switch modules 532A may be smaller than the contactable surface provided in the inner circumferential surface of the inner wall member 542 of the inverter housing 531.

In addition, though not shown in the figures, each of the capacitor modules 532B also includes a module case that has the same shape and size as the module cases 611 of the switch modules 532A. In the module case of each of the capacitor modules 532B, there is received one of the smoothing capacitors 606. Similar to the switch modules 532A, the capacitor modules 532B are also fixed to the outer circumferential wall WA1 of the inverter housing 531 with a side surface of the module case thereof abutting the inner circumferential surface of the inner wall member 542 of the inverter housing 531.

On the radially inner side of the outer circumferential wall WA1 of the inverter housing 531, the switch modules 532A and the capacitor modules 532B are not necessarily arranged on the same circle (or at the same radial position). For example, the switch modules 532A may be arranged radially inside or radially outside the capacitor modules 532B.

During operation of the rotating electric machine 500, heat exchange is made between the switch modules 532A and the capacitor modules 532B and the cooling water flowing through the cooling water passage 545 via the inner wall member 542 of the inverter housing 531. Consequently, the switch modules 532A and the capacitor modules 532B are cooled.

Figure 61A:
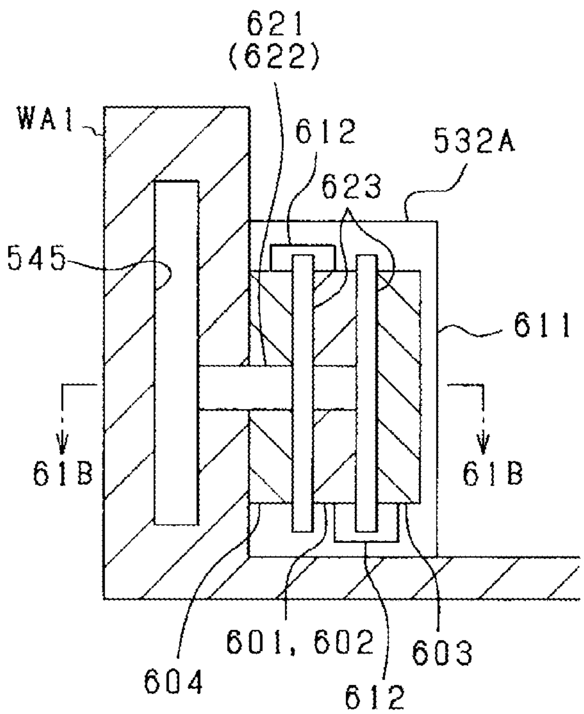
FIGS. 61(*a*) and 61(*b*) are cross-sectional views illustrating a first exemplary water-cooling structure of the switch modules of the inverter unit.
Figure 61B:
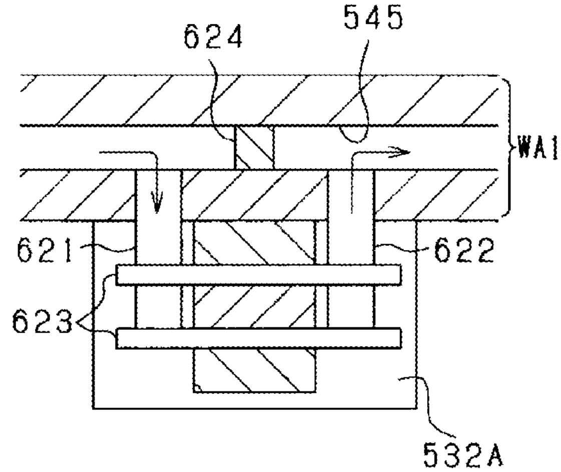

Each of the electrical modules 532 may alternatively be configured so that the cooling water flows from the cooling water passage 545 into the electrical module 532, thereby cooling the components of the electrical module 532. FIGS. 61(*a*) and 61(*b*) together show a first exemplary water-cooling structure of the switch modules 532A. FIG. 61(*a*) is a longitudinal cross-sectional view of one of the switch modules 532A taken along a direction crossing the outer circumferential wall WA1 of the inverter housing 531. FIG. 61(*b*) is a cross-sectional view taken along the line 61B-61B in FIG. 61(*a*).

As shown in FIGS. 61(*a*) and 61(*b*), the first exemplary water-cooling structure includes a pair of cooling water pipes 621 and 622 and at least one radiator 623. The cooling water pipe 621 is an inflow pipe via which the cooling water flows from the cooling water passage 545 formed in the outer circumferential wall WA1 of the inverter housing 531 into the at least one radiator 623. In contrast, the cooling water pipe 622 is an outflow pipe via which the cooling water flows out of the at least one radiator 623, returning to the cooling water passage 545 formed in the outer circumferential wall WA1. The at least one radiator 623 is provided according to the cooling targets. In the example shown FIGS. 61(*a*) and 61(*b*), there are provided two radiators 623 that are radially spaced from and aligned with each other. The cooling water is supplied to the radiators 623 via the inflow and outflow cooling water pipes 621 and 622. Each of the radiators 623 is configured to be, for example, hollow inside. It should be noted that each of the radiators 623 may have inner fins formed therein.

In the case of the number of the radiators 623 being equal to two, there are the following three locations in the switch module 532A to arrange the electrical components (i.e., the cooling targets): (1) a location on the outer circumferential wall WA1 side of the radiators 623; (2) a location between the radiators 623; and (3) a location on the opposite side of the radiators 623 to the outer circumferential wall WA1. The cooling performance at these locations decreases in the order of (2), (1) and (3). That is, the cooling performance is highest at the location (2) between the radiators 623 and lowest at the location (3) which is furthest from the outer circumferential wall WA1 (or the cooling water passage 545) and adjoins only one of the radiators 623. Therefore, of the electrical components of the switch module 532A, the switches 601 and 602 are arranged at the location (2); the charge supply capacitor 604 is arranged at the location (1); and the drive circuit 603 is arranged at the location (3). In addition, as an alternative, though not shown in the figures, the drive circuit 603 may be arranged at the location (1) and the charge supply capacitor 604 may be arranged at the location (3).

In any of the above-described cases, in the module case 611, electrical connection between the switches 601 and 602 and the drive circuit 603 and between the switches 601 and 602 and the charge supply capacitor 604 is made by the wirings 612. Moreover, with the switches 601 and 602 interposed between the drive circuit 603 and the charge supply capacitor 604, the extending direction of the wiring 612 that extends from the switches 601 and 602 to the drive circuit 603 is opposite to the extending direction of the wiring 612 that extends from the switches 601 and 602 to the charge supply capacitor 604.

As shown in FIG. 61(*b*), the pair of inflow and outflow cooling water pipes 621 and 622 are arranged in the circumferential direction (or the flow direction of the cooling water in the cooling water passage 545) so as to be respectively located on the upstream and downstream sides with respect to the flow of the cooling water in the cooling water passage 545. The cooling water flows into the radiators 623 via the inflow cooling water pipe 621 located on the upstream side, and then flows out of the radiators 623 via the outflow cooling water pipe 622 located on the downstream side. In addition, to facilitate the flow of the cooling water into the radiators 623, a flow regulator 624 may be arranged, in the cooling water passage 545, between the inflow and outflow cooling water pipes 621 and 622 in the circumferential direction to regulate the flow of the cooling water through the cooling water passage 545. The flow regulator 624 may be configured to block the cooling water passage 545 or to reduce the cross-sectional area of the cooling water passage 545.

Figure 62A:
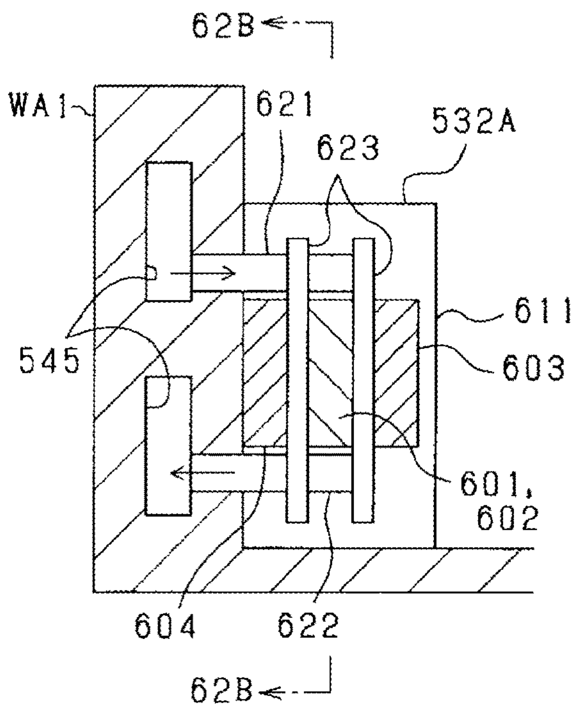
FIGS. 62(*a*)-62(*c*) are cross-sectional views illustrating a second exemplary water-cooling structure of the switch modules of the inverter unit.
Figure 62B:
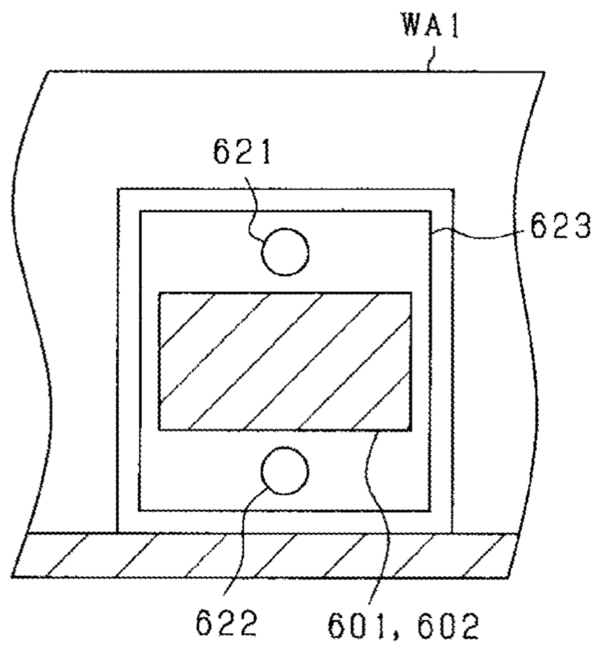
Figure 62C:
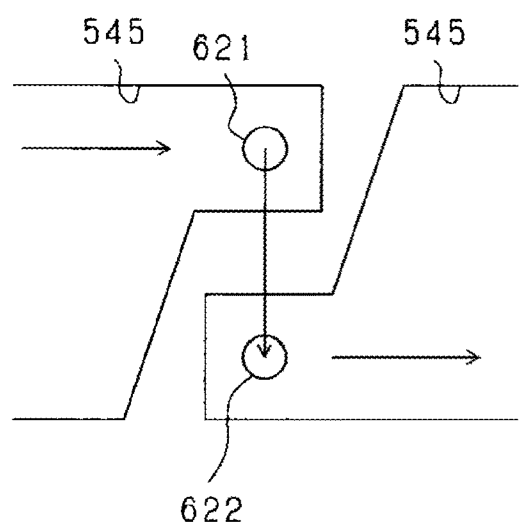

FIGS. 62(*a*)-62(*c*) together show a second exemplary water-cooling structure of the switch modules 532A. FIG. 62(*a*) is a longitudinal cross-sectional view of one of the switch modules 532A taken along a direction crossing the outer circumferential wall WA1 of the inverter housing 531. FIG. 61(*b*) is a cross-sectional view taken along the line 62B-62B in FIG. 62(*a*).

As shown in FIGS. 62(*a*) and 62(*b*), in the second exemplary water-cooling structure, the inflow and outflow cooling water pipes 621 and 622 are arranged in the axial direction, more specifically, spaced from and aligned with each other in the axial direction. Moreover, as shown in FIG. 62(*c*), the cooling water passage 545 is partitioned into two parts that are separated from each other in the axial direction and respectively communicate with the inflow and outflow cooling water pipes 621 and 622. The two parts of the cooling water passage 545 are fluidically connected with each other via the inflow cooling water pipe 621, the radiators 623 and the outflow cooling water pipe 622.

Moreover, the switch modules 532A may alternatively be cooled by the following water-cooling structure.

Figure 63A:
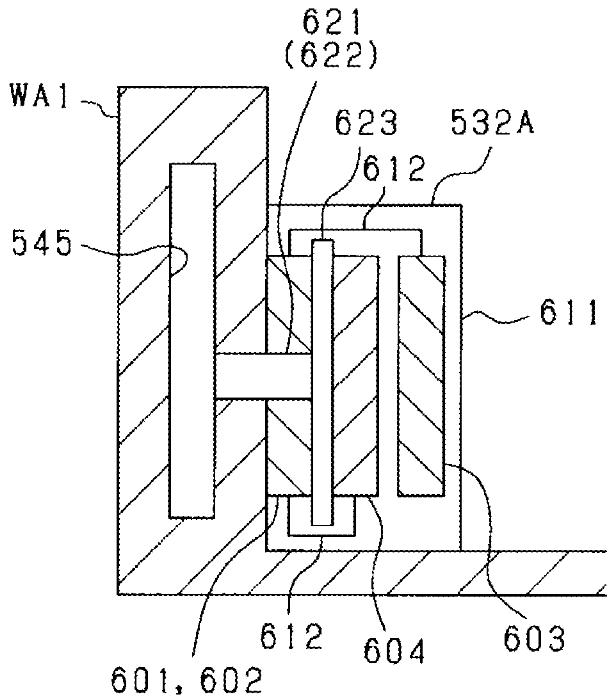
FIGS. 63(*a*) and 63(*b*) are cross-sectional views illustrating a third exemplary water-cooling structure of the switch modules of the inverter unit.
Figure 63B:
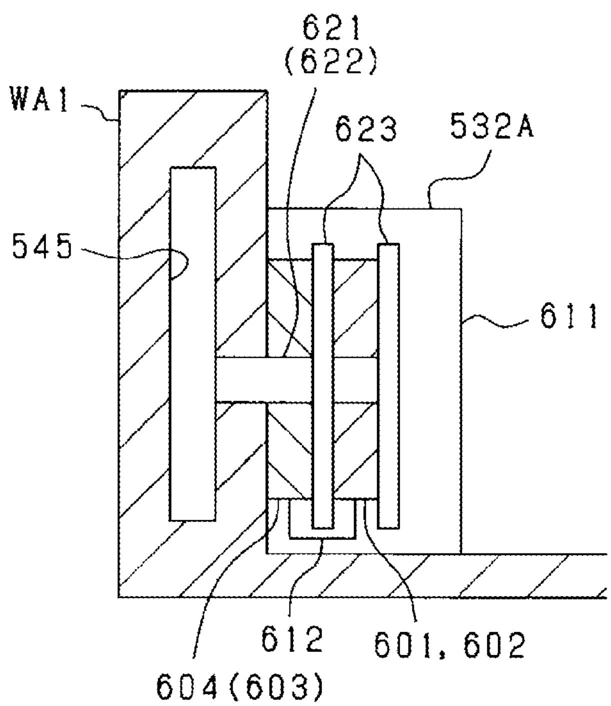

FIG. 63(*a*) shows a third exemplary water-cooling structure of the switch modules 532A. In this water-cooling structure, the number of the radiators 623 is reduced to one from two in the example shown in FIGS. 61(*a*) and 61(*b*). Consequently, with the single radiator 623, there are the following three locations in the switch module 532A where the electrical components (i.e., the cooling targets) can be arranged: (1) a location on the outer circumferential wall WA1 side of the radiator 623; (2) a location on the opposite side of the radiator 623 to the outer circumferential wall WA1 and immediately adjacent to the radiator 623; and (3) a location on the opposite side of the radiator 623 to the outer circumferential wall WA1 and apart from the radiator 623. The cooling performance at these locations decreases in the order of (1), (2) and (3). Therefore, of the electrical components of the switch module 532A, the switches 601 and 602 are arranged at the location (1); the charge supply capacitor 604 is arranged at the location (2); and the drive circuit 603 is arranged at the location (3).

As described above, in the present embodiment, each of the switch modules 532A is configured to have all of the upper-arm and lower-arm switches 601 and 602, the drive circuit 603 and the charge supply capacitor 604 received in the module case 611. As an alternative, each of the switch modules 532A may be configured to have the upper-arm and lower-arm switches 601 and 602 and only one of the drive circuit 603 and the charge supply capacitor 604 received in the module case 611.

FIG. 63(*b*) shows a fourth exemplary water-cooling structure of the switch modules 532A. In this water-cooling structure, there are provided two radiators 623 as in the example shown in FIGS. 61(*a*) and 61(*b*). Therefore, the switches 601 and 602 are arranged at the location between the radiators 623, where the cooling performance is highest. One of the drive circuit 603 and the charge supply capacitor 604 (i.e., the drive circuit 603 or the charge supply capacitor 604) is arranged at the location on the outer circumferential wall WA1 side of the radiators 623. As another alternative, the switches 601 and 602 and the drive circuit 603 may be integrated into a semiconductor module and the semiconductor module may be arranged at the location between the radiators 623 while the charge supply capacitor 604 is arranged at the location on the outer circumferential wall WA1 side of the radiators 623.

In addition, in the fourth exemplary water-cooling structure shown in FIG. 63(*b*), the charge supply capacitor 604 may be provided at either or both of the location on the outer circumferential wall WA1 side of the radiators 623 and the location on the opposite side of the radiators 623 to the outer circumferential wall WA1.

In the present embodiment, of the electrical modules 532, only the switch modules 532A have a water-cooling structure formed therein. However, similar to the switch modules 532A, the capacitor modules 532B may also have a water-cooling structure formed therein.

Figure 64:
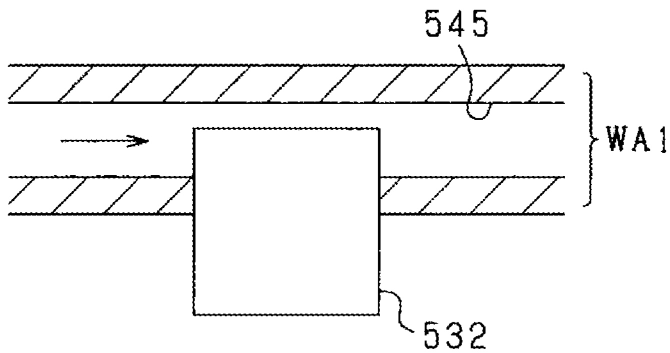
FIG. 64 is a cross-sectional view illustrating an exemplary water-cooling structure of electrical modules of the inverter unit.

Moreover, each of the electrical modules 532 may be arranged to have its outer surface directly exposed to the cooling water, thereby being cooled by the cooling water. For example, as shown in FIG. 64, each of the electrical modules 532 may be embedded into the outer circumferential wall WA1 to have its outer surface directly exposed to the cooling water flowing through the cooling water passage 545. Moreover, in the example shown in FIG. 64, only part of each of the electrical modules 532 is immersed in the cooling water. As an alternative, the radial dimension of the cooling water passage 545 may be increased to have the whole of each of the electrical modules 532 immersed in the cooling water. Furthermore, fins may be provided in the immersed module case 611 (or immersed part of the module case 611) of each of the electrical modules 532, thereby further improving the cooling performance.

In the present embodiment, the electrical modules 532 include the switch modules 532A and the capacitor modules 532B as described above. However, the amount of heat generated by the switch modules 532A is different from the amount of heat generated by the capacitor modules 532B. Therefore, it is preferable to arrange the electrical modules 532 in the inverter housing 531 taking into account the above fact.

Figure 65:
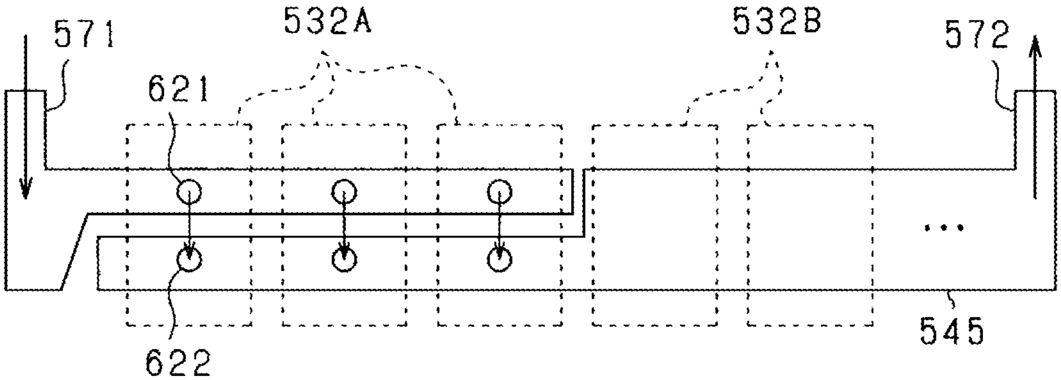
FIG. 65 is a diagram illustrating an exemplary arrangement of the electrical modules with respect to a cooling water passage in the inverter unit.

For example, as shown in FIG. 65, all of the switch modules 532A may be arranged adjacent to one another in the circumferential direction and located on the upstream side of the cooling water passage 545, i.e., on the closer side to the inflow passage 571. In this case, the cooling water flowing into the cooling water passage 545 from the inflow passage 571 first cools the switch modules 532A and then cools the capacitor modules 532B located on the downstream side. In addition, in the example shown in FIG. 65, in each of the switch modules 532, the inflow and outflow cooling water pipes 621 and 622 are spaced from and aligned with each other in the axial direction as in the example shown in FIGS. 62(*a*) and 62(*b*). As an alternative, the inflow and outflow cooling water pipes 621 and 622 may be spaced from and aligned with each other in the circumferential direction as in the example shown in FIGS. 61(*a*) and 61(*b*).

Figure 66:
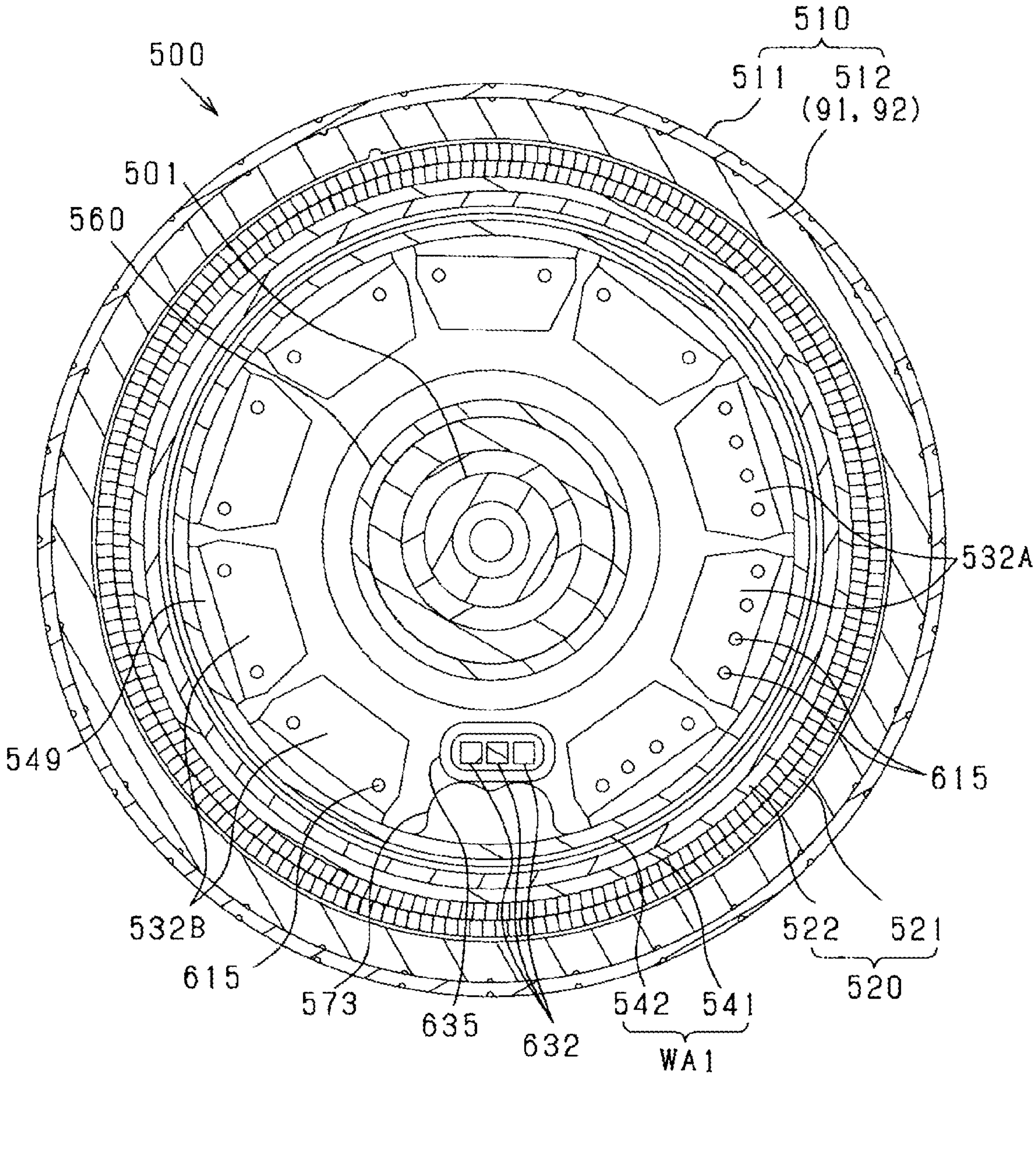
FIG. 66 is a cross-sectional view taken along the line 66-66 in FIG. 49.
Figure 67:
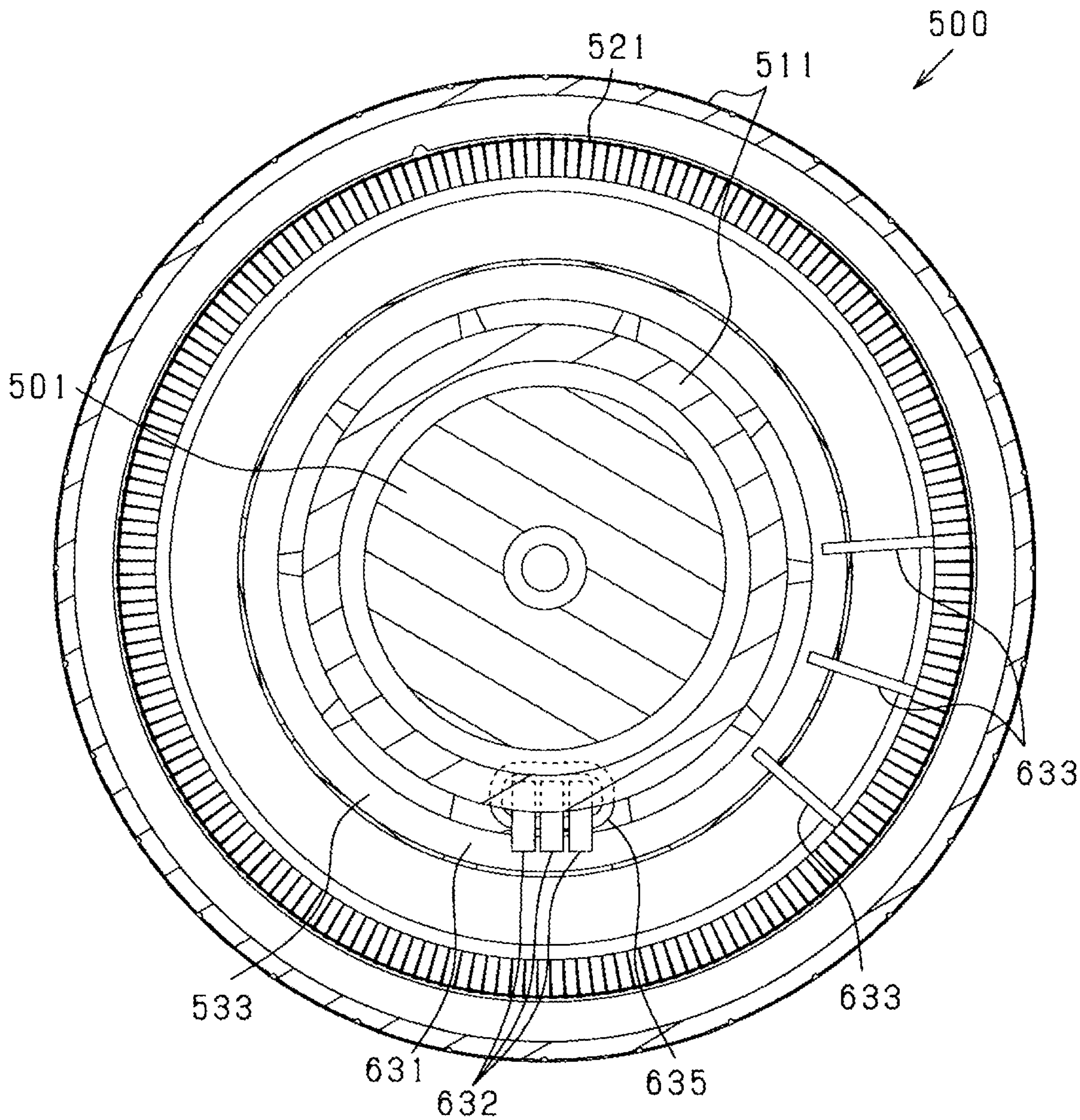
FIG. 67 is a cross-sectional view taken along the line 67-67 in FIG. 49.
Figure 68:
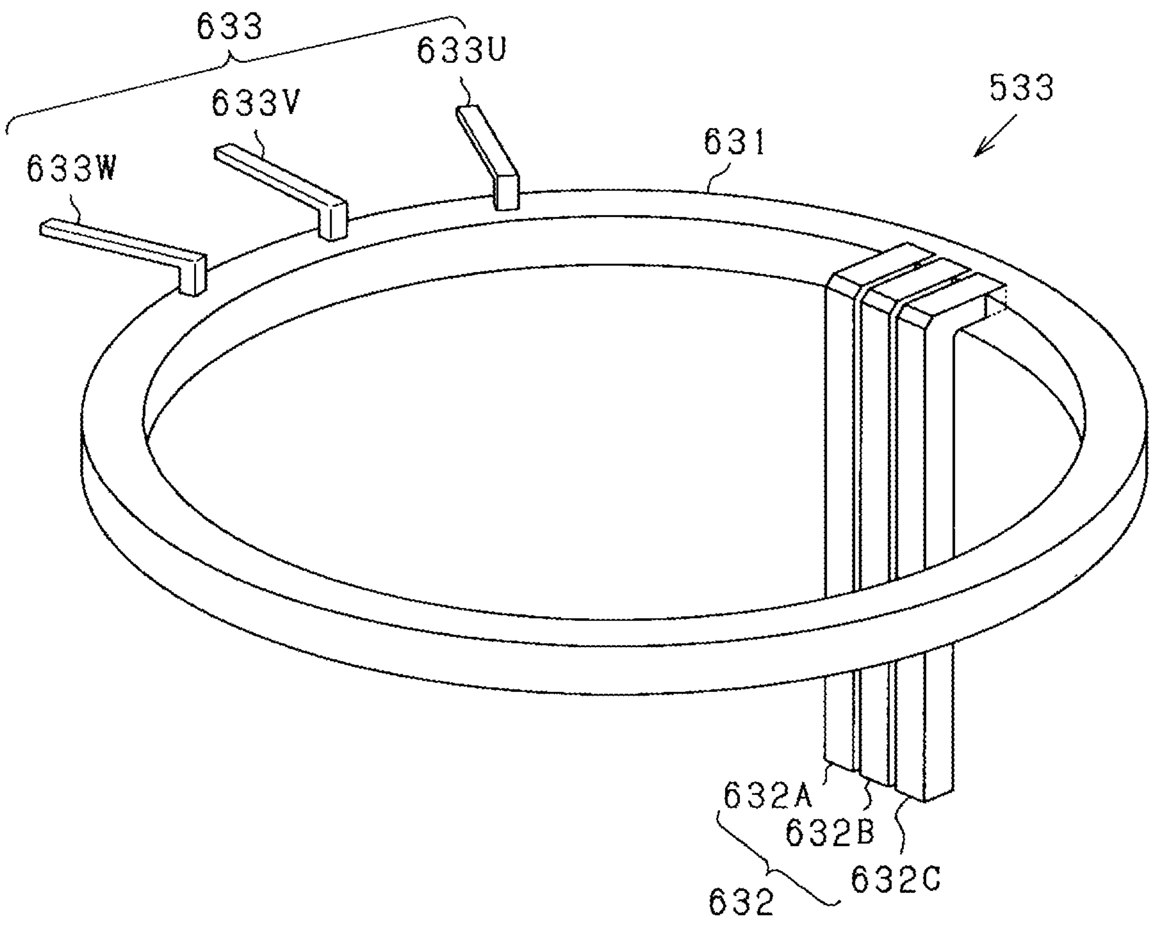
FIG. 68 is a perspective view of a busbar module of the inverter unit.

Next, electrical connection between the electrical modules 532 and the busbar module 533 will be described with reference to FIGS. 66-68. In addition, FIG. 66 is a cross-sectional view taken along the line 66-66 in FIG. 49. FIG. 67 is a cross-sectional view taken along the line 67-67 in FIG. 49. FIG. 68 is a perspective view of the busbar module 533.

As shown in FIG. 66, in the inverter housing 531, at a location circumferentially adjacent to the protruding portion 573 of the inner wall member 542 of the inverter housing 531 (i.e., the protruding portion 573 where both the inflow passage 571 and the outflow passage 572 are formed), three switch modules 532A are arranged adjacent to one another in the circumferential direction. Following the switch modules 532A, six capacitor modules 532B are arranged adjacent to one another in the circumferential direction. More specifically, the space radially inside the outer circumferential wall WA1 of the inverter housing 531 is equally divided into ten (i.e., the number of the electrical modules+1) regions in the circumferential direction. Of the ten regions, each of nine regions has one of the electrical modules 532 arranged therein; the remaining region has the protruding portion 573 of the inner wall member 542 received therein. In addition, the three switch modules 532A respectively correspond to the U, V and W phases.

Referring again to FIGS. 56 and 57 together with FIG. 66, each of the electrical modules 532 (i.e., switch modules 532A and capacitor modules 532B) has a plurality of module terminals 615 axially extending from the module case 611 thereof. The module terminals 615 are module input/output terminals via which electrical input/output of the electrical module 532 is made. The module terminals 615 are formed to extend from the module case 611 toward the inside of the rotor carrier 511 (or the outside of the vehicle) in the axial direction (see FIG. 51).

Each of the module terminals 615 of the electrical modules 532 is connected with the busbar module 533. The number of the module terminals 615 provided in each of the switch module 532A is different from the number of the module terminals 615 provided in each of the capacitor modules 532B. More particularly, in the present embodiment, the number of the module terminals 615 provided in each of the switch module 532A is equal to four while the number of the module terminals 615 provided in each of the capacitor modules 532B is equal to two.

As shown in FIG. 68, the busbar module 533 has an annular main body 631, three external connection terminals 632 each axially extending from the annular main body 631 so as to be connected to the DC power supply 605 or an external ECU (Electronic Control Unit), and three winding connection terminals 633 to be respectively connected to the phase windings of the stator coil 521. In addition, the busbar module 533 corresponds to a "terminal module".

The annular main body 631 is located radially inside the outer circumferential wall WA1 of the inverter housing 531 and on one axial side of the electrical modules 532. The annular main body 631 includes an annular insulating member formed of an electrically-insulative material (e.g., resin) and a plurality of busbars embedded in the insulating member. The busbars are connected with the module terminals 615 of the electrical modules 532, the external connection terminals 632 and the phase windings of the stator coil 521. The configuration of the busbars will be described in detail later.

The external connection terminals 632 include a high potential-side power terminal 632A connected to the positive terminal of the DC power supply 605, a low potential-side power terminal 632B connected to the negative terminal of the DC power supply 605, and a signal terminal 632C connected to the external ECU. The external connection terminals 632 (i.e., 632A-632C) are arranged in alignment with each other in the circumferential direction and extend in the axial direction on the radially inner side of the annular main body 631. As shown in FIG. 51, after the assembly of the inverter unit 530, each of the external connection terminals 632 has one end axially protruding from the end plate 547 of the boss-forming member 543 of the inverter housing 531. More specifically, as shown in FIGS. 56 and 57, in the end plate 547 of the boss-forming member 543, there are formed insertion holes 547*a*. Each of the insertion holes 547*a* has a hollow cylindrical grommet 635 inserted therein. The external connection terminals 632 extend respectively through the insertion holes 547*a* with the respective grommets 635 inserted therein. In addition, the grommets 635 function as hermetic connectors.

The winding connection terminals 633 are formed to extend from the annular main body 631 radially outward, so as to be respectively connected to ends of the phase windings of the stator coil 521. The winding connection terminals 633 include a U-phase winding connection terminal 633U connected to one end of the U-phase winding of the stator coil 521, a V-phase winding connection terminal 633V connected to one end of the V-phase winding of the stator coil 521, and a W-phase winding connection terminal 633W connected to one end of the W-phase winding of the stator coil 521. Moreover, current sensors 634 (see FIG. 70) may be provided to detect electric currents (i.e., U-phase current, V-phase current and W-phase current) respectively flowing through the winding connection terminals 633 and the phase windings of the stator coil 521.

In addition, the current sensors 634 may be arranged outside the electrical modules 532 and close to the respect winding connection terminals 633, or arranged inside the electrical modules 532.

Figure 69:
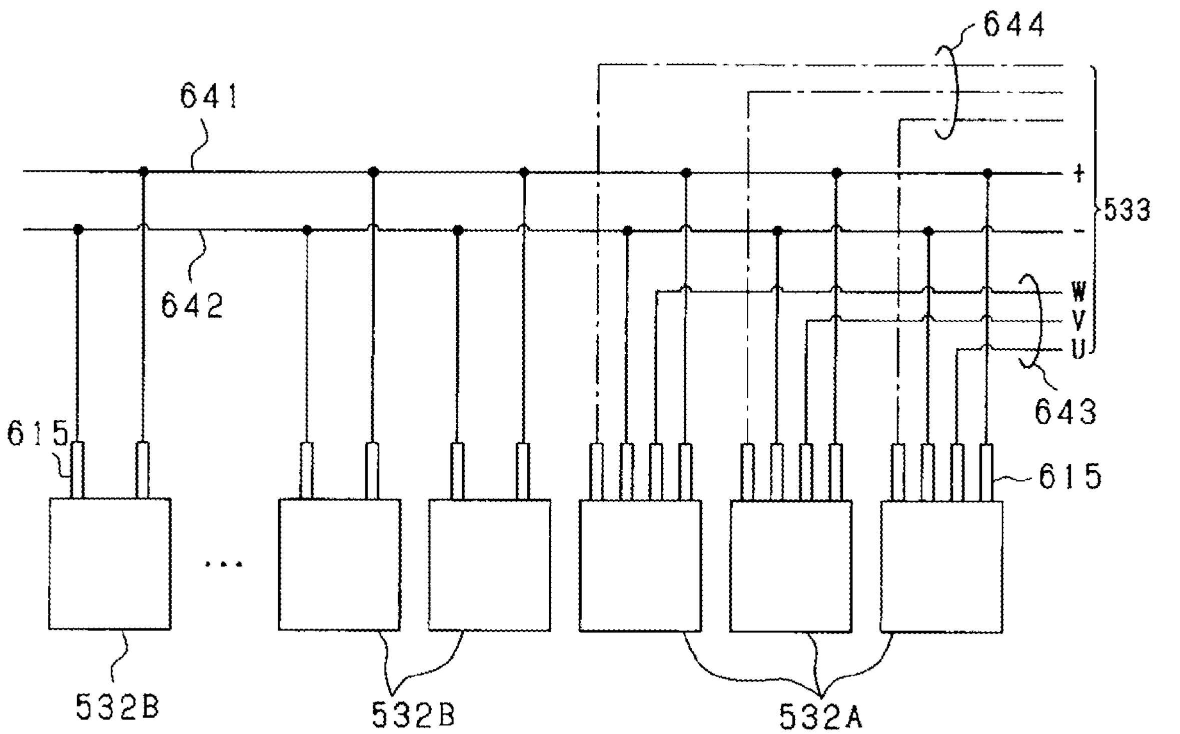
FIG. 69 is a developed view of the electrical modules on a plane illustrating electrical connection between the electrical modules and the busbar module.
Figure 70:
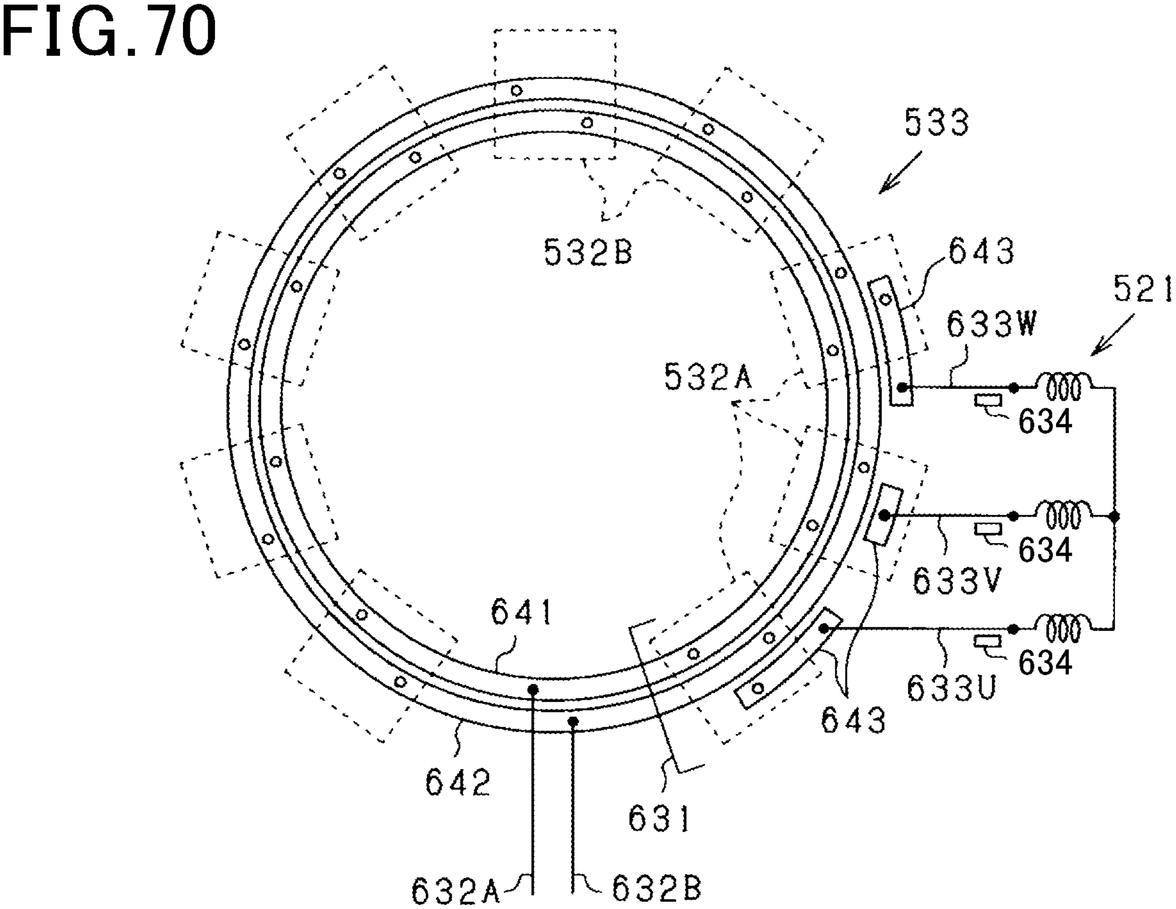
FIG. 70 is a diagram illustrating the electrical connection between the electrical modules, which are arranged in an annular shape, and the busbar module.

Hereinafter, electrical connection between the electrical modules 532 and the busbar module 533 will be described in more detail with reference to FIGS. 69 and 70. FIG. 69 is a developed view of the electrical modules 532 on a plane illustrating electrical connection between the electrical modules 532 and the busbar module 533. FIG. 70 is a schematic view illustrating electrical connection between the electrical modules 532, which are arranged in an annular shape, and the busbar module 533. In addition, in FIG. 69, electric power transmission paths are shown with solid lines while signal transmission paths are shown with one-dot chain lines. On the other hand, in FIG. 70, only the electric power transmission paths are shown with solid lines, omitting the signal transmission paths.

The busbar module 533 includes a first busbar 641, a second busbar 642 and three third busbars 643 as electric power transmission busbars. The first busbar 641 is connected with the high potential-side power terminal 632A. The second busbar 642 is connected with the low potential-side power terminal 632B. The three third busbars 643 are respectively connected with the U-phase, V-phase and W-phase winding connection terminals 633U, 633V and 633W.

It is particularly easy for heat to be generated in the winding connection terminals 633 and the third busbars 643 by operation of the rotating electric machine 500. Therefore, a terminal block (not shown) may be provided between the winding connection terminals 633 and the third busbars 643 and arranged to abut the inverter housing 531 that has the cooling water passage 545 formed therein. Alternatively, the winding connection terminals 633 and the third busbars 643 may be crank-shaped and arranged to abut the inverter housing 531 that has the cooling water passage 545 formed therein.

With either of the above configurations, it is possible to dissipate heat generated in the winding connection terminals 633 and the third busbars 643 to the cooling water flowing through the cooling water passage 545.

In addition, in the example shown in FIG. 70, each of the first busbar 641 and the second busbar 642 is annular-shaped. However, each of the first busbar 641 and the second busbar 642 may have other shapes, such as a substantially C-shape with two separate circumferential ends. Moreover, in the example shown in FIG. 70, the U-phase, V-phase and W-phase winding connection terminals 633U, 633V and 633W are respectively connected to the U-phase, V-phase and W-phase switch modules 532A via the third busbars 643. As an alternative, the U-phase, V-phase and W-phase winding connection terminals 633U, 633V and 633W may be respectively directly connected to the U-phase, V-phase and W-phase switch modules 532A (more specifically, to the corresponding module terminals 615), omitting the third busbars 643.

On the other hand, each of the switch modules 532A has four module terminals 615, i.e., a positive terminal, a negative terminal, a winding connection terminal and a signal terminal. The positive terminal is connected to the first busbar 641. The negative terminal is connected to the second busbar 642. The winding connection terminal is connected to a corresponding one of the third busbars 643.

Moreover, the busbar module 533 further includes three fourth busbars 644 as signal transmission busbars. The signal terminals of the U-phase, V-phase and W-phase switch modules 532A are respectively connected to the three fourth busbars 644, and all of the fourth busbars 644 are connected to the signal terminal 632C.

In the present embodiment, control signals are inputted from the external ECU to the switch modules 532A via the signal terminal 632C. Consequently, the switches 601 and 602 of the switch modules 532A are turned on and off according to the control signals inputted via the signal terminal 632C. That is, in the present embodiment, the external ECU corresponds to the controller 607 shown in FIG. 59. Therefore, the switch modules 532A are connected to the signal terminal 632C without any built-in controller of the rotating electric machine 500 connected therebetween. As an alternative, it is possible to employ a controller built in the rotating electric machine 500 and have control signals inputted from the built-in controller to the switch modules 532A. This alternative configuration is shown in FIG. 71.

Figure 71:
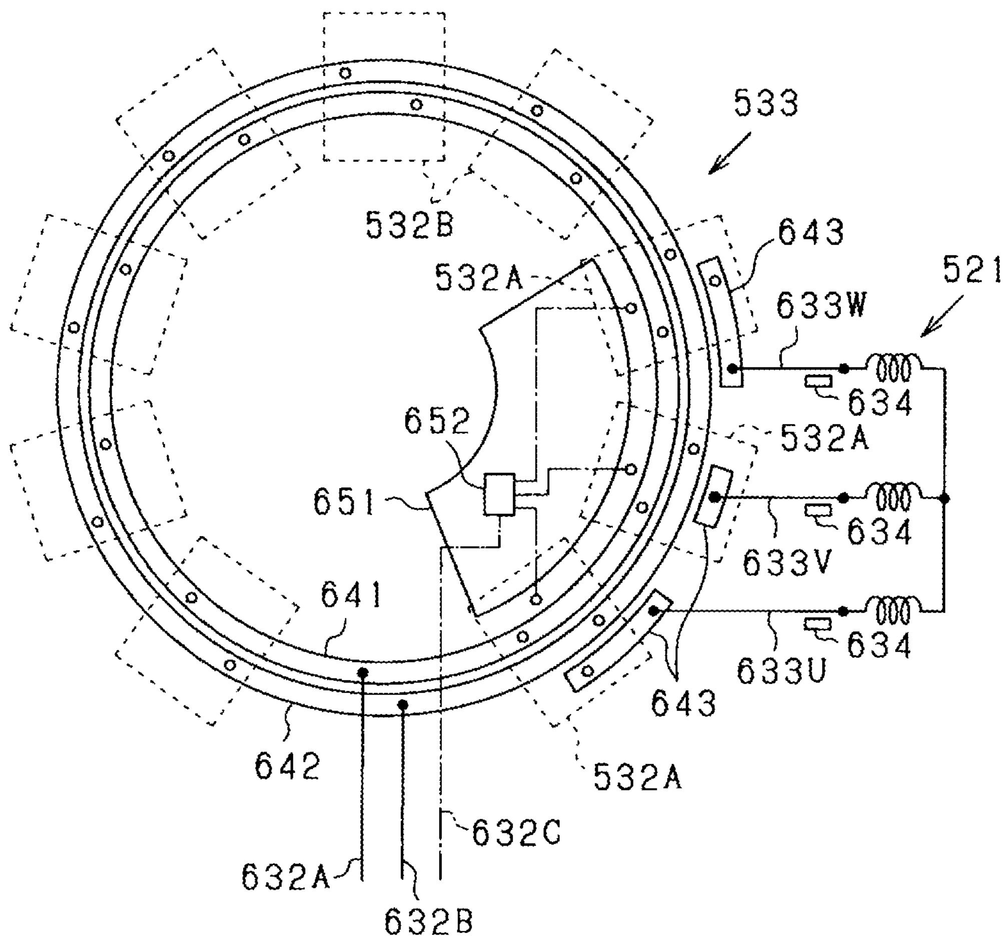
FIG. 71 is a diagram illustrating a modification of the electrical connection between the electrical modules and the busbar module.
Figure 72A:
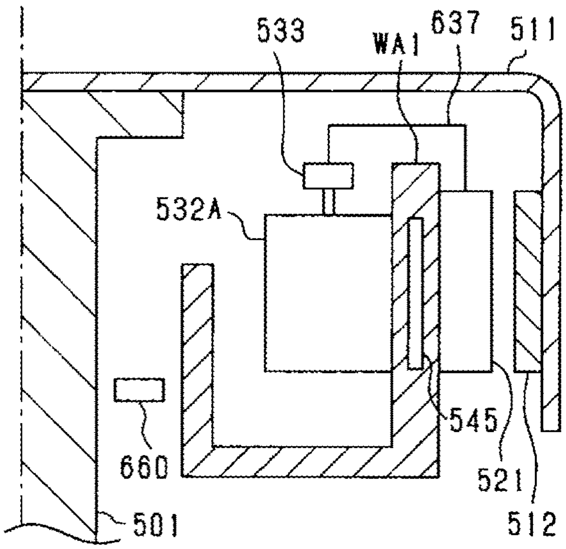
FIGS. 72(*a*)-72(*d*) are cross-sectional views illustrating a first modification of the in-wheel motor.
Figure 72B:
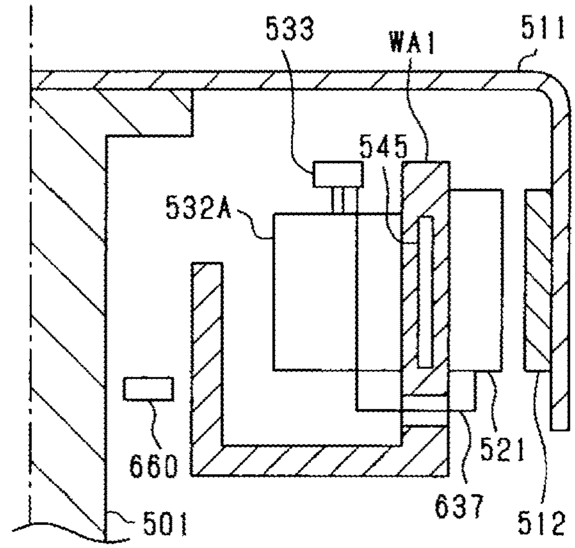
Figure 72C:
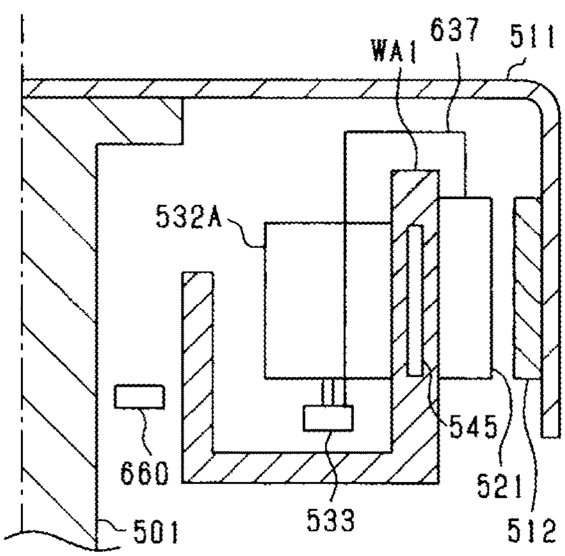
Figure 72D:
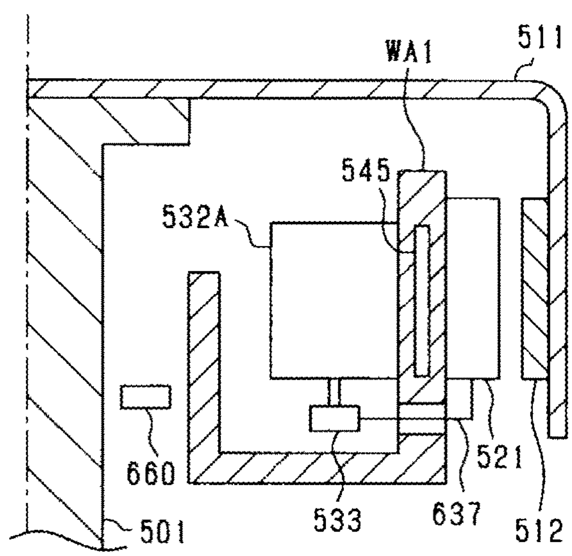

In the configuration shown in FIG. 71, the rotating electric machine 500 includes a control substrate 651 on which a controller 652 is mounted. The controller 652 is connected with each of the switch modules 532A as well as with the signal terminal 632C. The controller 652 receives a command signal from an external ECU, which is an upper-level control apparatus, via the signal terminal 632C; the command signal is indicative of a command on power running drive or electric power generation. Then, according to the command signal, the controller 652 generates and outputs controls signals (or operation signals) to the switch modules 532A, thereby turning on and off the switches 601 and 602 of the switch modules 532A.

In the inverter unit 530, the control substrate 651 shown in FIG. 71 may be arranged more outside with respect to the vehicle (i.e., closer to the bottom of the rotor carrier 511) than the busbar module 533. Alternatively, the control substrate 651 may be arranged between the electrical modules 532 and the end plate 547 of the boss-forming member 543 of the inverter housing 531. In addition, the control substrate 651 may be arranged so that at least part of the control substrate 651 overlaps the electrical modules 532 in the axial direction.

Each of the capacitor modules 532B has, as shown in FIG. 69, two module terminals 615, i.e., a positive terminal and a negative terminal. The positive terminal is connected to the first busbar 641. The negative terminal is connected to the second busbar 642.

As shown in FIGS. 49 and 50, in the inverter housing 531, as described previously, the protruding portion 573 of the inner wall member 542 is located between one circumferentially-adjacent pair of the electrical modules 532. The protruding portion 573 has both the inflow passage 571 and the outflow passage 572 formed therein. The external connection terminals 632 are arranged radially adjacent to the protruding portion 573. In other words, the external connection terminals 632 are circumferentially located at the same angular position as the protruding portion 573. More particularly, in the present embodiment, the external connection terminals 632 are located radially inside the protruding portion 573. Moreover, when viewed from the inside of the vehicle, the cooling water port 574 and the external connection terminals 632 are located in radial alignment with each other on the end plate 547 of the boss-forming member 543 of the inverter housing 531 (see FIG. 48).

By arranging the protruding portion 573 and the external connection terminals 632 in circumferential alignment with the electrical modules 532 as above, it becomes possible to minimize the size of the inverter unit 530 and thus the size of the entire rotating electric machine 500.

Referring back to FIGS. 45 and 47, the cooling water piping H2 is connected to the cooling water port 574 while the electrical wiring H1 is connected to the external connection terminals 632. In this connected state, both the electrical wiring H1 and the cooling water piping H2 are received in the receiving duct 440.

In the inverter housing 531 according to the present embodiment, as shown in FIG. 50, at a location circumferentially adjacent to the external connection terminals 632, the three switch modules 532A are arranged adjacent to one another in the circumferential direction. Further, following the switch modules 532A, the six capacitor modules 532B are arranged adjacent to one another in the circumferential direction. As an alternative, the three switch modules 532A may be arranged at a location furthest from the external connection terminals 632, i.e., at a location on the opposite side of the rotating shaft 501 to the external connection terminals 632. As another alternative, the switch modules 532A may be arranged in a distributed manner such that each of the switch modules 532A is interposed between one pair of the capacitor modules 532B in the circumferential direction.

Arranging the switch modules 532A at the location furthest from the external connection terminals 632 (i.e., at the location on the opposite side of the rotating shaft 501 to the external connection terminals 632), it is possible to suppress malfunction due to mutual inductance between the external connection terminals 632 and the switch modules 532A.

Next, the configuration of a resolver 660, which is provided as a rotation angle sensor in the rotating electric machine 500, will be described.

As shown in FIGS. 49-51, in the present embodiment, the resolver 660 is arranged in the inverter housing 531 to detect the electrical angle θ of the rotating electric machine 500. The resolver 660 is, for example, of an electromagnetic induction type. The resolver 660 includes a resolver rotor 661 fixed on the rotating shaft 501 and a resolver stator 662 that is arranged radially outside the resolver rotor 661 to face the resolver rotor 661. The resolver rotor 661 is annular plate-shaped and has the rotating shaft 501 inserted therein so as to be coaxial with the rotating shaft 501. The resolver stator 662 includes an annular stator core 663 and a stator coil 664 wound on a plurality of teeth formed in the stator core 663. The stator coil 664 is comprised of an excitation coil corresponding to one phase and a pair of output coils respectively corresponding to two phases.

The excitation coil of the stator coil 664 is excited, by an excitation signal in the form of a sine wave, to generate magnetic flux that crosses the output coils. The relationship of relative arrangement between the excitation coil and the output coils cyclically changes with the rotation angle of the resolver rotor 661 (i.e., the rotation angle of the rotating shaft 501). Accordingly, the amount of magnetic flux generated by the excitation coil and crossing the output coils also cyclically changes with the rotation angle of the resolver rotor 661. In the present embodiment, the excitation coil and the output coils are arranged so that voltages generated respectively in the output coils are offset in phase from each other by $\pi/2$. Consequently, the output voltages of the output coils are in the form of modulated waves that are obtained by modulating the excitation signal respectively with modulating waves of $\sin\theta$ and $\cos\theta$. More specifically, the modulated waves can be respectively represented by $(\sin\theta\times\sin\Omega t)$ and $(\cos\theta\times\sin\Omega t)$, where $\sin\Omega t$ represents the excitation signal.

The resolver 660 further includes a resolver digital converter. The resolver digital converter calculates the electrical angle $\theta$ on the basis of the modulated waves and the excitation signal. The resolver 660 is connected with the signal terminal 632C, and the calculation results of the resolver digital converter are outputted to the external ECU via the signal terminal 632C. In addition, in the case of the rotating electric machine 500 having the built-in controller 652 as shown in FIG. 71, the calculation results of the resolver digital converter are inputted to the built-in controller 652.

Next, the assembly structure of the resolver 660 in the inverter housing 531 will be described.

As shown in FIGS. 49 and 51, the boss portion 548 of the boss-forming member 543 of the inverter housing 531 is hollow cylindrical-shaped. On the inner circumferential surface of the boss portion 548, there is formed a protrusion 548*a* that protrudes in a direction perpendicular to the axial direction. The resolver stator 662 is arranged to abut the protrusion 548*a* in the axial direction and fixed to the protrusion 548*a* by screws or the like. In the hollow space of the boss portion 548, the bearing 560 is arranged on one axial side of the protrusion 548*a* while the resolver 660 is arranged on the other axial side of the protrusion 548*a*.

Moreover, in the hollow space of the boss portion 548, there is mounted, on the opposite axial side of the resolver 660 to the protrusion 548*a*, an annular plate-shaped housing cover 666 to close the receiving space of the resolver 660 (i.e., that part of the hollow space of the boss portion 548 where the resolver 666 is received). The housing cover 666 is formed of an electrically conductive material, such as Carbon Fiber-Reinforced Plastic (CFRP). In a central part of the housing cover 666, there is formed a through-hole 666*a* through which the rotating shaft 501 extends. In the through-hole 666*a*, there is provided a seal member 667 to block the gap between the inner wall surface of the through-hole 666*a* and the outer circumferential surface of the rotating shaft 501. Consequently, the receiving space of the resolver 660 is hermetically sealed by the seal member 667. In addition, the seal member 667 may be implemented by, for example, a sliding seal formed of a resin material.

The receiving space of the resolver 660 is surrounded by the inner circumferential surface of the hollow cylindrical boss portion 548 and closed by the bearing 560 and the housing cover 666 respectively at opposite axial ends thereof. That is, the resolver 660 is enclosed by electrically conductive members. Consequently, it becomes possible to suppress influence of electromagnetic noise on the resolver 660.

Moreover, in the present embodiment, as described previously, the inverter housing 531 has the double circumferential wall consisting of the outer circumferential wall WA1 and the inner circumferential wall WA2 (see FIG. 57). The stator 520 is arranged radially outside the double circumferential wall (i.e., radially outside the outer circumferential wall WA1). The electrical modules 532 are arranged between the outer circumferential wall WA1 and the inner circumferential wall WA2. The resolver 660 is arranged radially inside the double circumferential wall (i.e., radially inside the inner circumferential wall WA2). The inverter housing 531 is formed of an electrically conductive material. Therefore, the stator 520 and the resolver 660 are separated by an electrically conductive partition wall (more particularly, by the electrically-conductive double circumferential wall in the present embodiment). Consequently, it becomes possible to effectively suppress occurrence of magnetic interference between the stator 520 (or the magnetic circuit) and the resolver 660.

Next, the rotor cover 670, which is provided at the open end of the rotor carrier 511, will be described.

As shown in FIGS. 49 and 51, the rotor carrier 511 is open at one axial end thereof. The rotor cover 670 is substantially annular plate-shaped and mounted to the open end of the rotor carrier 511. The rotor cover 670 is fixed to the rotor carrier 511 by, for example, welding, bonding or screw fastening. The rotor cover 670 has its inner diameter set to be smaller than the diameter of the inner circumferential surface of the rotor carrier 511, so as to suppress axial displacement of the magnet unit 512. Moreover, the rotor cover 670 has its outer diameter set to be equal to the outer diameter of the rotor carrier 511 and its inner diameter set to be slightly larger than the outer diameter of the inverter housing 531. In addition, the outer diameter of the inverter housing 531 is equal to the inner diameter of the stator 520.

As described previously, the stator 520 is fixed on the radially outer side of the inverter housing 531. At the joint where the stator 520 and the inverter housing 531 are joined to each other, part of the inverter housing 531 axially protrudes from the stator 520. The rotor cover 670 is mounted to surround the protruding part of the inverter housing 531. Moreover, a seal member 671 is provided between the inner circumferential surface of the rotor cover 670 and the outer circumferential surface of the protruding part of the inverter housing 531, so as to block the gap therebetween. Consequently, the receiving space of the magnet unit 512 and the stator 520 is hermetically sealed by the seal member 671. In addition, the seal member 671 may be implemented by, for example, a sliding seal formed of a resin material.

According to the present embodiment, it is possible to achieve the following advantageous effects.

In the rotating electric machine 500 according to the present embodiment, on the radially inner side of the magnetic circuit part which is constituted of the magnet unit 512 and the stator coil 521, there is arranged the outer circumferential wall WA1 of the inverter housing 531. Moreover, in the outer circumferential wall WA1, there is formed the cooling water passage 545. Furthermore, on the radially inner side of the outer circumferential wall WA1, there are arranged the electrical modules 532 in the circumferential direction along the outer circumferential wall WA1. With the above configuration, it becomes possible to arrange the magnetic circuit part, the cooling water passage 545 and the inverter 600 (or electric power converter) in a radially stacked manner, thereby realizing efficient part arrangement while minimizing the axial length of the rotating electric machine 500. Moreover, it also becomes possible to effectively cool the electrical modules 532 forming the inverter 600. As a result, it becomes possible to realize high efficiency and a small size of the rotating electric machine 500.

In the present embodiment, the electrical modules 532 (i.e., the switch modules 532A and the capacitor modules 532B), which include heat-generating components such as semiconductor switching elements and the capacitors, are arranged in contact with the inner circumferential surface of the outer circumferential wall WA1 of the inverter housing 531. Consequently, heat generated in the electrical modules 532 can be transmitted to the outer circumferential wall WA1 and dissipated by heat exchange in the outer circumferential wall WA1. As a result, it becomes possible to effectively cool the electrical modules 532.

In the present embodiment, in each of the switch modules 532A, the switches 601 and 602 are interposed between the two radiators 623. Moreover, at least one of a location on the opposite side of one of the two radiators 623 to the switches 601 and 602 and a location on the opposite side of the other of the two radiators 623 to the switches 601 and 602, there is arranged the capacitor 604. Consequently, it becomes possible to effectively cool the capacitor 604 while effectively cooling the switches 601 and 602.

In the present embodiment, in each of the switch modules 532A, the switches 601 and 602 are interposed between the two radiators 623. Moreover, the drive circuit 603 is arranged on the opposite side of one of the two radiators 623 to the switches 601 and 602 while the capacitor 604 is arranged on the opposite side of the other of the two radiators 623 to the switches 601 and 602. Consequently, it becomes possible to effectively cool both the drive circuit 603 and the capacitor 604 while effectively cooling the switches 601 and 602.

In the present embodiment, each of the switch modules 532A is configured so that the cooling water flows from the cooling water passage 545 into the switch module 532A, cooling the components (e.g., the switches 601 and 602) of the switch module 532A. Consequently, each of the switch modules 532A can be cooled by the cooling water flowing in the switch module 532A as well as by the cooling water flowing in the cooling water passage 545. As a result, it becomes possible to more effectively cool each of the switch modules 532A.

In the present embodiment, the cooling water flows into the cooling water passage 545 via the inflow passage 571, and flows out of the cooling water passage 545 via the outflow passage 572. Moreover, in the cooling water passage 545, the switch modules 532A are arranged on the upstream side closer to the inflow passage 571 while the capacitor modules 532B are arranged on the downstream side closer to the outflow passage 572. With the above arrangement, since the temperature of the cooling water flowing through the cooling water passage 545 is lower on the upstream side than on the downstream side, it is possible to preferentially cool the switch modules 532A.

In the present embodiment, one of the intervals between the circumferentially adjacent electrical modules 532 (i.e., the second interval INT2) is set to be wider than the remaining intervals (i.e., the first intervals INT1). In this wider interval, there is arranged the protruding portion 573 of the inner wall member 542 which has both the inflow passage 571 and the outflow passage 572 formed therein. Consequently, it becomes possible to suitably form both the inflow passage 571 and the outflow passage 572 on the radially inner side of the outer circumferential wall WA1. More specifically, to improve the cooling performance, it is necessary to secure high flow rate of the cooling water. Accordingly, it is necessary to set the opening areas of the inflow passage 571 and the outflow passage 572 to be large. In this regard, with the above arrangement of the protruding portion 573 in the wider interval (i.e., the second interval INT2), it becomes possible to suitably form, on the radially inner side of the outer circumferential wall WA1, both the inflow passage 571 and the outflow passage 572 having sufficiently large opening areas.

In the present embodiment, the external connection terminals 632 of the busbar module 533 are arranged, on the radially inner side of the outer circumferential wall WA1, in radial alignment with the protruding portion 573 of the inner wall member 542. That is, the external connection terminals 632 are arranged, together with the protruding portion 573, in the wider interval (i.e., the second interval INT2). Consequently, it becomes possible to suitably arrange the external connection terminals 632 without causing interference between the external connection terminals 632 and the electrical modules 532.

In the rotating electric machine 500 according to the present embodiment, the stator 520 is fixed on the radially outer side of the outer circumferential wall WA1 while the electrical modules 532 are arranged on the radially inner side of the outer circumferential wall WA1. Consequently, heat generated in the stator 520 is transmitted to the outer circumferential wall WA1 from the radially outer side while heat generated in the electrical modules 532 is transmitted to the outer circumferential wall WA1 from the radially inner side. As a result, the stator 520 and the electrical modules 532 can be cooled at the same time by the cooling water flowing through the cooling water passage 545. That is, it is possible to effectively dissipate heat generated in these components of the rotating electric machine 500.

In the rotating electric machine 500 according to the present embodiment, the electrical modules 532 arranged on the radially inner side of the outer circumferential wall WA1 of the inverter housing 531 and the stator coil 521 arranged on the radially outer side of the outer circumferential wall WA1 are electrically connected via the winding connection terminals 633 of the busbar module 533. Moreover, the winding connection terminals 633 are located axially apart from the cooling water passage 545. Consequently, though there is interposed between the electrical modules 532 and the stator coil 521 the annular cooling water passage 545 formed in the outer circumferential wall WA1, it still becomes possible to suitably connect the electrical modules 532 and the stator coil 521.

In the rotating electric machine 500 according to the present embodiment, torque limitation due to magnetic saturation occurring in the stator core 522 is suppressed by reducing in size or eliminating teeth of the stator core 522 interposed between the circumferentially adjacent electrical conductors 523 forming the stator coil 521. Moreover, torque reduction is suppressed by configuring the electrical conductors 523 to be flat and thin in shape. Furthermore, for the same outer diameter of the rotating electric machine 500, it becomes possible to expand the region radially inside the magnetic circuit part by reducing the radial thickness of the stator 520. Consequently, it becomes possible to suitably arrange, in the expanded region, the outer circumferential wall WA1 in which the cooling water passage 545 is formed and the electrical modules 532.

In the rotating electric machine 500 according to the present embodiment, magnet magnetic flux is concentrated on the d-axis side in the magnet unit 512 and thus the magnet magnetic flux at the d-axis is intensified, thereby achieving torque improvement. Moreover, with reduction in the radial thickness of the magnet unit 512, it becomes possible to further expand the region radially inside the magnetic circuit part. Consequently, it becomes possible to more suitably arrange, in the further expanded region, the outer circumferential wall WA1 in which the cooling water passage 545 is formed and the electrical modules 532.

In addition, it also becomes possible to suitably arrange, in the expanded region radially inside the magnetic circuit part, the bearing 560 and the resolver 660.

In the present embodiment, the rotating electric machine 500 is used, as an in-wheel motor, in the vehicle wheel 400. The wheel 400 is mounted to the vehicle body via the base plate 405, which is fixed to the inverter housing 531, and a mounting mechanism such as the suspension apparatus. With reduction in the size of the rotating electric machine 500, it becomes possible to reduce the space required for mounting the wheel 400 to the vehicle body. Consequently, it becomes possible to expand the arrangement region of other components of the vehicle, such as the battery, and/or expand the vehicle compartment space.

Hereinafter, modifications of the in-wheel motor will be described.

(First Modification of In-Wheel Motor)

In the rotating electric machine 500 according to the previous embodiment, the electrical modules 532 and the busbar module 533 are arranged on the radially inner side of the outer circumferential wall WA1 of the inverter housing 531 while the stator 520 is arranged on the radially outer side of the outer circumferential wall WA1. Moreover, the winding connection terminals 633 of the busbar module 533 radially extend across the outer circumferential wall WA1 to connect the busbar module 533 to the phase windings of the stator coil 521. In the rotating electric machine 500, the relative position of the busbar module 533 to the electrical modules 532 may be arbitrarily set. Moreover, the location of guiding winding connection members (e.g., the winding connection terminals 633) may also be arbitrarily set.

For example, regarding the relative position of the busbar module 533 to the electrical modules 532, either of the following arrangements may be employed:

(α1) arranging the busbar module 533 in the axial direction more outside with respect to the vehicle (i.e., closer to the bottom of the rotor carrier 511) than the electrical modules 532; or (α2) arranging the busbar module 533 in the axial direction more inside with respect to the vehicle (i.e., further from the bottom of the rotor carrier 511) than the electrical modules 532.

On the other hand, regarding the location of guiding the winding connection members, either of the following arrangements may be employed:

(β1) arranging the winding connection members to be guided at a location more outside with respect to the vehicle (i.e., closer to the bottom of the rotor carrier 511) than the electrical modules 532; or (β2) arranging the winding connection members to be guided at a location more inside with respect to the vehicle (i.e., further from the bottom of the rotor carrier 511) than the electrical modules 532.

Hereinafter, four arrangement examples of the electrical modules 532, the busbar module 533 and the winding connection members will be described with reference to FIGS. 72(*a*)-72(*d*). In FIGS. 72(*a*)-72(*d*), the reference numeral 637 designates the winding connection members connecting the busbar module 533 to the phase windings of the stator coil 521. The winding connection members 637 correspond to the winding connection terminals 633 described in the previous embodiment. In addition, in each of FIGS. 72(*a*)-72(*d*), the vertically upper side corresponds to the outside of the vehicle while the vertically lower side corresponds to the inside of the vehicle.

In the example shown in FIG. 72(*a*), regarding the relative position of the busbar module 533 to the electrical modules 532, the above arrangement (α1) is employed; regarding the location of guiding the winding connection members 637, the above arrangement (β1) is employed. That is, in this example, both the connection between the electrical modules 532 and the busbar module 533 and the connection between the stator coil 521 and the busbar module 533 are made at a location more outside with respect to the vehicle (i.e., closer to the bottom of the rotor carrier 511) than the electrical modules 532. In addition, this example corresponds to the configuration of the rotating electric machine 500 shown in FIG. 49.

According to the example shown in FIG. 72(*a*), it is possible to provide the cooling water passage 545 in the outer circumferential wall WA1 without the necessity of considering interference with the winding connection members 637. Moreover, it is also possible to easily connect the stator coil 521 and the busbar module 533 with the winding connection members 637.

In the example shown in FIG. 72(*b*), regarding the relative position of the busbar module 533 to the electrical modules 532, the above arrangement (α1) is employed; regarding the location of guiding the winding connection members 637, the above arrangement (β2) is employed. That is, in this example, the connection between the electrical modules 532 and the busbar module 533 is made at a location more outside with respect to the vehicle (i.e., closer to the bottom of the rotor carrier 511) than the electrical modules 532, while the connection between the stator coil 521 and the busbar module 533 is made at a location more inside with respect to the vehicle (i.e., further from the bottom of the rotor carrier 511) than the electrical modules 532.

According to the example shown in FIG. 72(*b*), it is possible to provide the cooling water passage 545 in the outer circumferential wall WA1 without the necessity of considering interference with the winding connection members 637.

In the example shown in FIG. 72(*c*), regarding the relative position of the busbar module 533 to the electrical modules 532, the above arrangement (α2) is employed; regarding the location of guiding the winding connection members 637, the above arrangement (β1) is employed. That is, in this example, the connection between the electrical modules 532 and the busbar module 533 is made at a location more inside with respect to the vehicle (i.e., further from the bottom of the rotor carrier 511) than the electrical modules 532, while the connection between the stator coil 521 and the busbar module 533 is made at a location more outside with respect to the vehicle (i.e., closer to the bottom of the rotor carrier 511) than the electrical modules 532.

In the example shown in FIG. 72(*d*), regarding the relative position of the busbar module 533 to the electrical modules 532, the above arrangement (a2) is employed; regarding the location of guiding the winding connection members 637, the above arrangement (β2) is employed. That is, in this example, both the connection between the electrical modules 532 and the busbar module 533 and the connection between the stator coil 521 and the busbar module 533 are made at a location more inside with respect to the vehicle (i.e., further from the bottom of the rotor carrier 511) than the electrical modules 532.

According to the examples shown in FIGS. 72(*c*) and 72(*d*), when electrical components (e.g., a fan motor) are added to the rotating electric machine 500, with the busbar module 533 arranged more inside with respect to the vehicle (i.e., further from the bottom of the rotor carrier 511) than the electrical modules 532, it is easy to perform the wiring of the added electrical components. Moreover, the distance between the busbar module 533 and the resolver 660 is shortened, thereby facilitating the wiring therebetween.

(Second Modification of In-Wheel Motor)

In the rotating electric machine 500 according to the previous embodiment, the rotating shaft 501, the rotor carrier 511 and the inner ring 561 of the bearing 560 together constitute a rotating body that rotates during operation of the rotating electric machine 500. Moreover, the resolver rotor 661, which is annular plate-shaped, is mounted to the rotating body as shown in FIGS. 49 and 50. In this modification, alternative mounting structures of the resolver rotor 661 to the rotating body will be described with reference to FIGS. 73(*a*)-73(*c*).

Figure 73A:
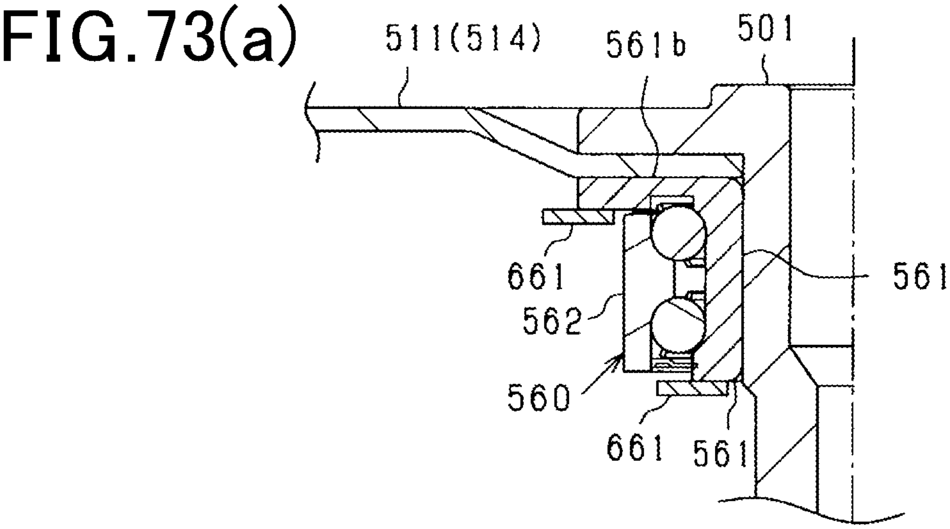
FIGS. 73(*a*)-73(*c*) are cross-sectional views illustrating a second modification of the in-wheel motor.
Figure 73B:
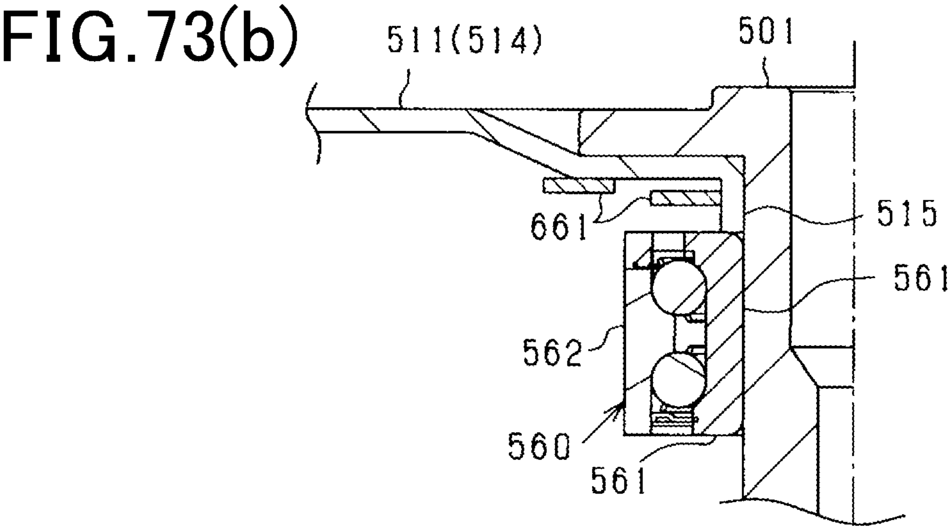
Figure 73C:
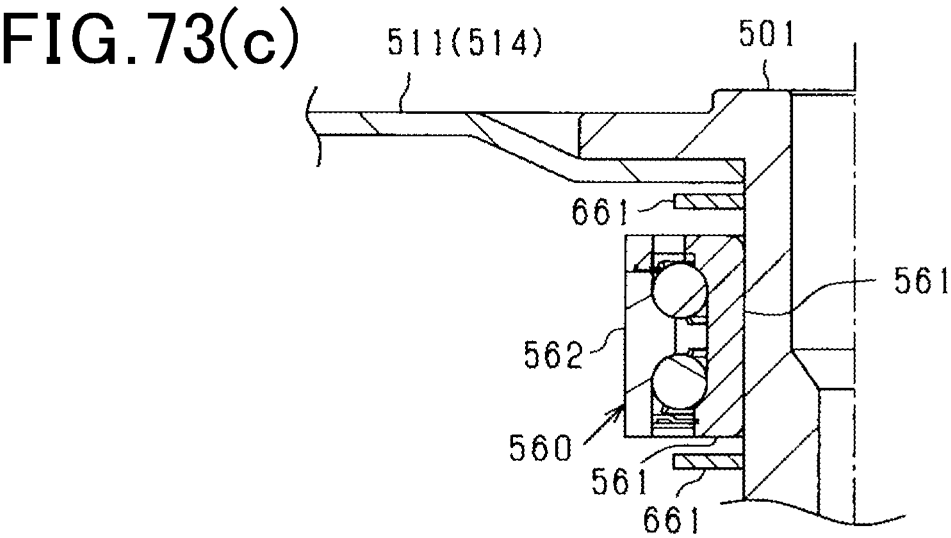

In each of the mounting structures shown in FIGS. 73(*a*)-73(*c*), the resolver 660 is provided in a space enclosed by the rotor carrier 511 and the inverter housing 531, thereby being protected from foreign substances such as water and dust. Moreover, in the mounting structure shown in FIG. 73(*a*), the bearing 560 has the same configuration as shown in FIG. 49. In contrast, in the mounting structures shown in FIGS. 73(*b*) and 73(*c*), the bearing 560 has a configuration different from that shown in FIG. 49 and is located apart from the end plate 514 of the rotor carrier 511. Furthermore, in each of FIGS. 73(*a*)-73(*c*), there are illustrated two alternative locations where the resolver rotor 661 can be mounted. In addition, though not shown in the figures, the resolver stator 662 is fixed to the boss portion 548 of the boss-forming member 543 of the inverter housing 531; the boss portion 548 may be formed to extend to the vicinity of the radially outer periphery of the resolver rotor 661.

In the mounting structure shown in FIG. 73(*a*), the resolver rotor 661 is mounted to the inner ring 561 of the bearing 560. More specifically, the resolver rotor 661 is mounted to either an axial end face of the flange 561*b* of the inner ring 561 or an axial end face of the cylindrical portion 561*a* of the inner ring 561.

In the mounting structure shown in FIG. 73(*b*), the resolver rotor 661 is mounted to the rotor carrier 511. More specifically, the resolver rotor 661 is mounted to either the inner surface of the end plate 514 of the rotor carrier 511 or the outer circumferential surface of a cylindrical portion 515 of the rotor carrier 511. That is, in this mounting structure, the rotor carrier 511 is configured to further have the cylindrical portion 515 extending from a radially inner edge of the end plate 514 along the rotating shaft 501. In addition, in the case of the resolver rotor 661 being mounted to the outer circumferential surface of the cylindrical portion 515, the resolver rotor 661 is located between the end plate 514 of the rotor carrier 511 and the bearing 560.

In the mounting structure shown in FIG. 73(*c*), the resolver rotor 661 is mounted to the rotating shaft 501. More specifically, the resolver rotor 661 is mounted to either a portion of the rotating shaft 501 between the end plate 514 of the rotor carrier 511 and the bearing 560 or a portion of the rotating shaft 501 on the opposite side of the bearing 560 to the end plate 514 of the rotor carrier 511.

(Third Modification of In-Wheel Motor]

The rotating electric machine 500 according to the previous embodiment includes the inverter housing 531 and the rotor cover 670 that are configured as shown in FIGS. 49 and 51. In this modification, alternative configurations of the inverter housing 531 and the rotor cover 670 will be described with reference to FIGS. 74(*a*) and 74(*b*). The configuration shown in FIG. 74(*a*) is similar to that shown in FIGS. 49 and 51. On the other hand, the configuration shown in FIG. 74(*b*) is different from that shown in FIGS. 49 and 51.

Figure 74A:
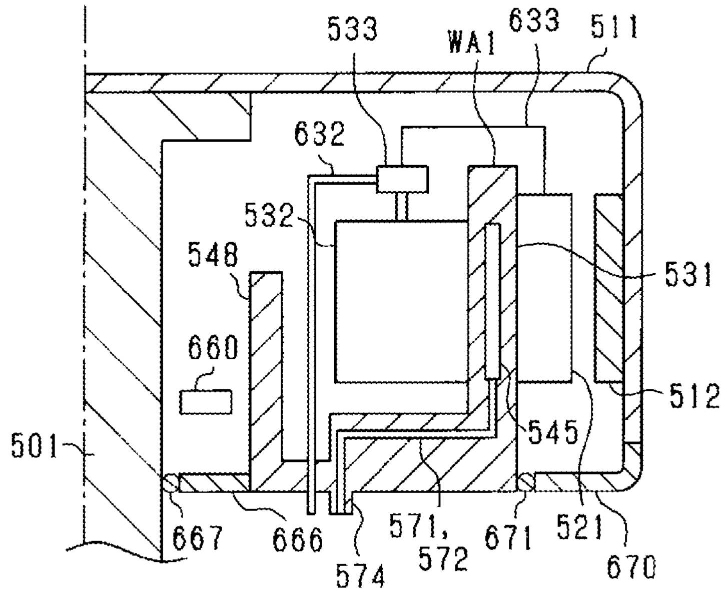
FIGS. 74(*a*) and 74(*b*) are cross-sectional views illustrating a third modification of the in-wheel motor.
Figure 74B:
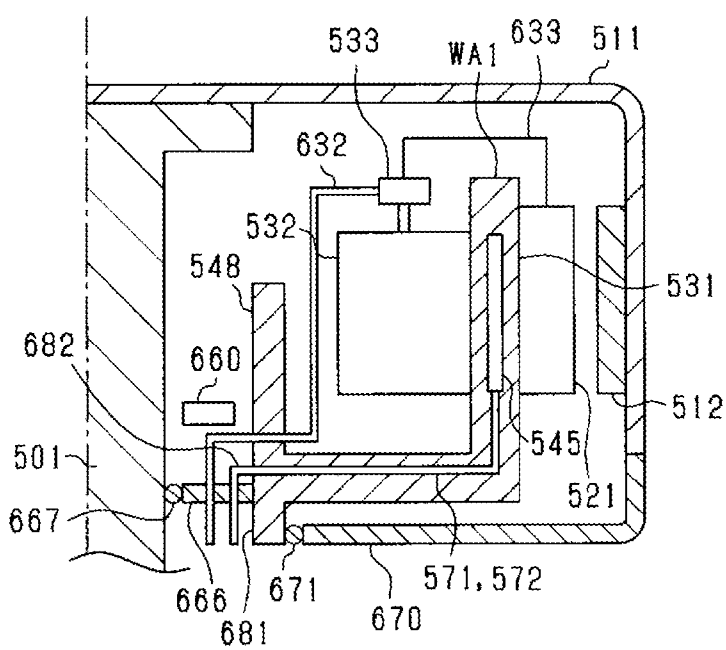

Specifically, in the configuration shown in FIG. 74(*a*), the rotor cover 670, which is substantially annular plate-shaped and fixed to the open end of the rotor carrier 511, is arranged to surround the outer circumferential wall WA1 of the inverter housing 531. That is, the rotor cover 670 is configured to have its inner circumferential surface radially facing the outer circumferential surface of the outer circumferential wall WA1. The seal member 671 is provided between the inner circumferential surface of the rotor cover 670 and the outer circumferential surface of the outer circumferential wall WA1 to block the gap therebetween. Moreover, in the hollow space of the boss portion 548 of the inverter housing 531, there is mounted the housing cover 666 to close the receiving space of the resolver 660. The seal member 667 is provided between the housing cover 666 and the rotating shaft 501 to block the gap therebetween. The external connection terminals 632 of the busbar module 533 penetrate the inverter housing 531 to extend toward the inside of the vehicle (i.e., downward in FIG. 74A).

Furthermore, in the inverter housing 531, there are formed the inflow passage 571 and the outflow passage 572, both of which communicate with the cooling water passage 545, and the cooling water port 574 that includes ends of the inflow passage 571 and the outflow passage 572.

In contrast, in the configuration shown in FIG. 74(*b*), in the inverter housing 531 (more specifically, the boss-forming member 543 thereof), there is formed an annular protrusion 681 that extends toward the protruding side of the rotating shaft 501 (or toward the inside of the vehicle). The rotor cover 670 is provided to surround the annular protrusion 681 of the inverter housing 531. That is, the inner circumferential surface of the rotor cover 670 and the outer circumferential surface of the annular protrusion 681 radially face each other, with the seal member 671 provided therebetween. Moreover, the external connection terminals 632 of the busbar module 533 first penetrate the boss portion 548 of the inverter housing 531 to extend radially inward (i.e., leftward in FIG. 74(*b*)) to the hollow space of the boss portion 548 and then penetrate the housing cover 666 to axially extend toward the inside of the vehicle (i.e., downward in FIG. 74(*b*)).

Furthermore, in the inverter housing 531, there are formed the inflow passage 571 and the outflow passage 572 both of which communicate with the cooling water passage 545. The inflow passage 571 and the outflow passage 572 first extend radially inward from the cooling water passage 545 to the hollow space of the boss portion 548 and then extend, via relay passages 682, axially toward the inside of the vehicle (i.e., downward in FIG. 74(*b*)) penetrating the housing cover 666. In addition, those portions of the inflow passage 571 and the outflow passage 572 which protrude outside from the housing cover 666 constitute the cooling water port 574.

With each of the configurations shown in FIGS. 74(*a*) and 74(*b*), it is possible to allow the rotor carrier 511 and the rotor cover 670 to suitably rotate relative to the inverter housing 531 while keeping the internal space defined by the rotor carrier 511 and the rotor cover 670 hermetic.

In particular, in the configuration shown in FIG. 74(*b*), the inner diameter of the rotor cover 670 is reduced in comparison with the configuration shown in FIG. 74(*a*). Consequently, at a location more inside with respect to the vehicle (i.e., further from the bottom of the rotor carrier 511) than the electrical modules 532, the inverter housing 531 and the rotor cover 670 overlap each other in the axial direction, thereby suppressing occurrence of problems in the electrical modules 532 due to electromagnetic noise. Moreover, with the reduction in the inner diameter of the rotor cover 670, the sliding diameter of the seal member 671 is accordingly reduced, thereby suppressing mechanical loss at the rotational sliding parts.

(Fourth Modification of In-Wheel Motor)

Hereinafter, an alternative configuration of the stator coil 521 will be described with reference to FIG. 75.

Figure 75:
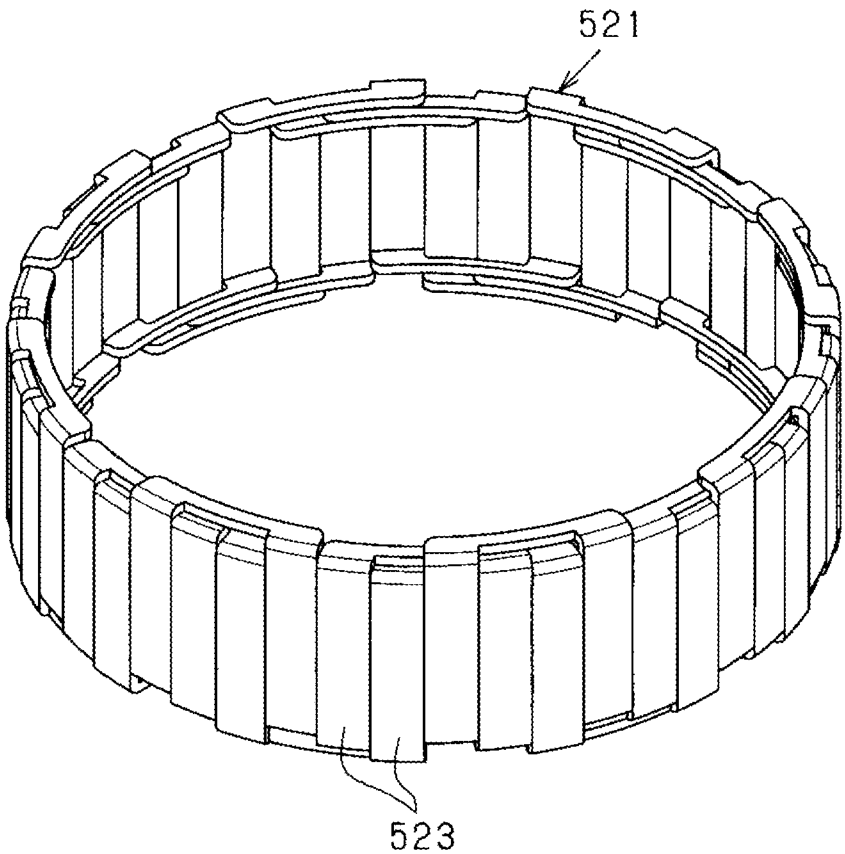
FIG. 75 is a perspective view of a stator coil according to a fourth modification of the in-wheel motor.

As shown in FIG. 75, in this modification, the stator coil 521 is formed of electrical conductors 523 each of which has a rectangular cross section and is wave-wound to have the longer sides of the cross section extending in the circumferential direction. Moreover, in each of the electrical conductors 523, straight portions of the electrical conductor 523, which are included in the coil side part 525 of the stator coil 521, are spaced from each other in the circumferential direction at predetermined intervals; the straight portions are connected with one another by turn portions of the electrical conductor 523 which are included in the coil ends 526 of the stator coil 521. Furthermore, in the coil side part 525 of the stator coil 521, the straight portions of the electrical conductors 523 are arranged to have each facing pair of circumferential side surfaces of the straight portions abutting each other or separated by a minute clearance.

Moreover, in this modification, each of the electrical conductors 523 is radially bent at the coil ends of the stator coil 521. More specifically, each of the electrical conductors 523 is radially bent at right angles to have the turn portions offset radially inward from the straight portions by the radial thickness of the electrical conductors 523. Consequently, it becomes possible to prevent interference between the electrical conductors 523 forming the U-phase, V-phase and W-phase windings of the stator coil 521. In addition, all the straight portions of the electrical conductors 523 have the same axial length.

In assembling the stator core 522 to the stator coil 521 to form the stator 520, the stator coil 521 is first formed in a substantially C-shape to have two circumferential ends separated from each other. After assembling the stator core 522 to the radially inner periphery of the stator coil 521, the separated circumferential ends are joined to each other, thereby transforming the stator coil 521 into an annular shape.

As an alternative, the stator core 522 may be divided in the circumferential direction into a plurality (e.g., three or more) of stator core segments. In assembling the stator core 522 to the stator coil 521 to form the stator 520, the stator core segments may be assembled to the radially inner periphery of the annular-shaped stator coil 521, together constituting the stator core 522.

(Other Modifications of In-Wheel Motor)

As shown in FIG. 50, in the rotating electric machine 500 according to the previous embodiment, the inflow passage 571 and the outflow passage 572 are together provided at a single location in the circumferential direction. As an alternative, the inflow passage 571 and the outflow passage 572 may be respectively provided at two different locations in the circumferential direction. For example, the inflow passage 571 and the outflow passage 572 may be offset from each other by 180° in the circumferential direction. In addition, in the rotating electric machine 500 according to the previous embodiment, there are provided only one inflow passage 571 and only one outflow passage 572. Alternatively, in the rotating electric machine 500, there may be provided a plurality of inflow passages 571 and/or a plurality of outflow passages 572.

In the rotating electric machine 500 according to the previous embodiment, the rotating shaft 501 is configured to protrude outside the wheel 400 on only one axial side of the wheel 400. As an alternative, the rotating shaft 501 may be configured to protrude outside the wheel 400 on both axial sides of the wheel 400. This alternative configuration is particularly suitable for use in the case of the vehicle having only a single front wheel or a single rear wheel.

The rotating electric machine 500 according to the previous embodiment is configured as an outer rotor type rotating electric machine. Alternatively, the rotating electric machine 500 may be configured as an inner rotor type rotating electric machine.

(Fifteenth Modification)

Figure 76:
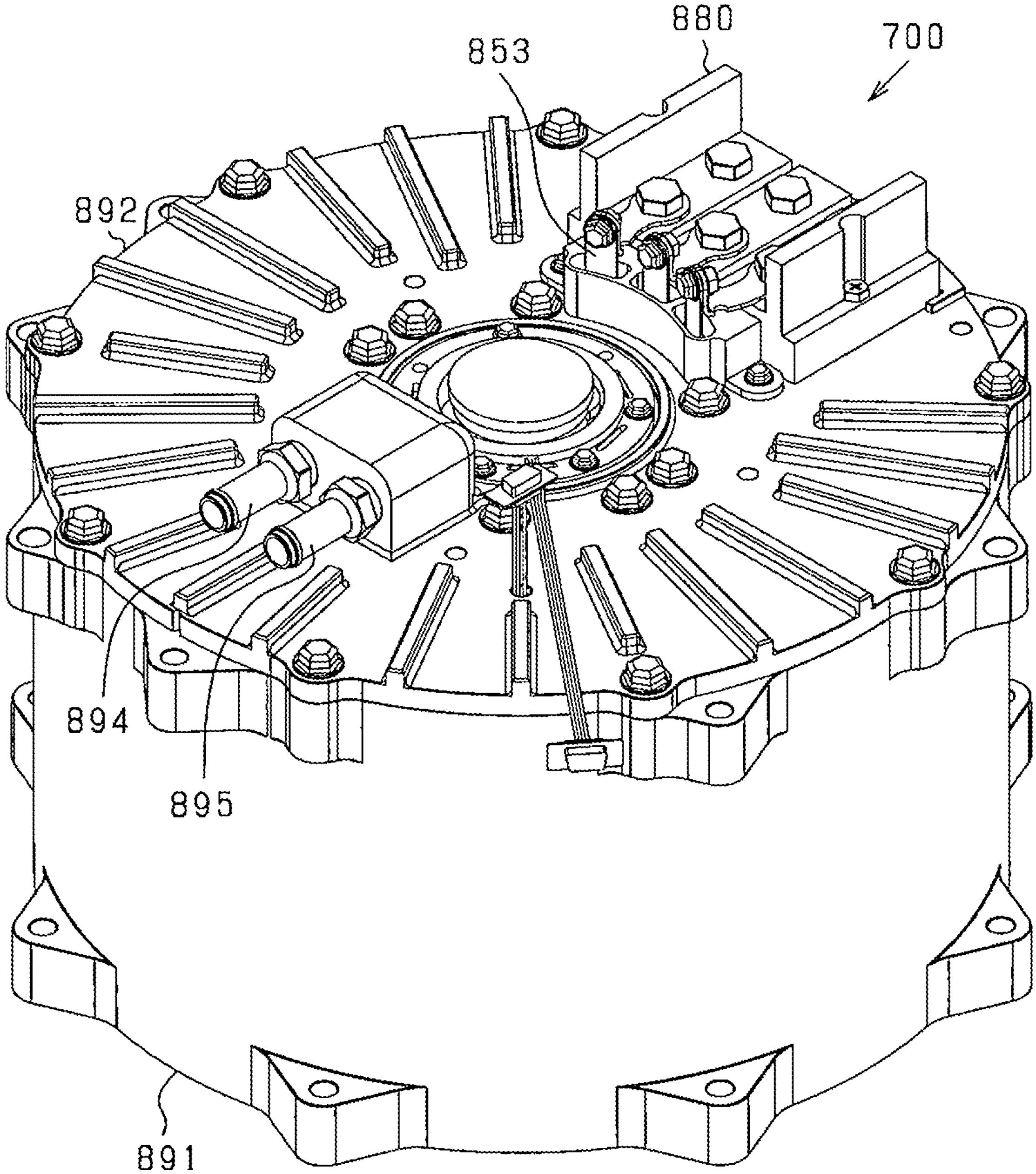
FIG. 76 is a perspective view showing an overview of a rotating electric machine in a fifteenth modification.
Figure 77:
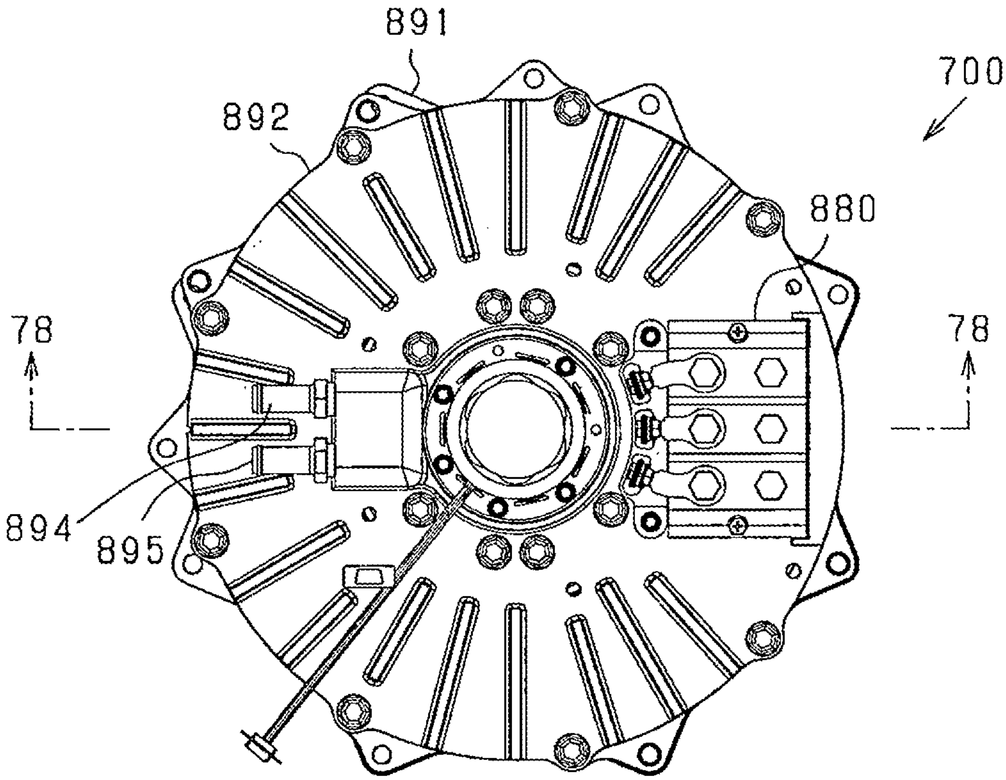
FIG. 77 is a plan view of the rotating electric machine in the fifteenth modification.
Figure 78:
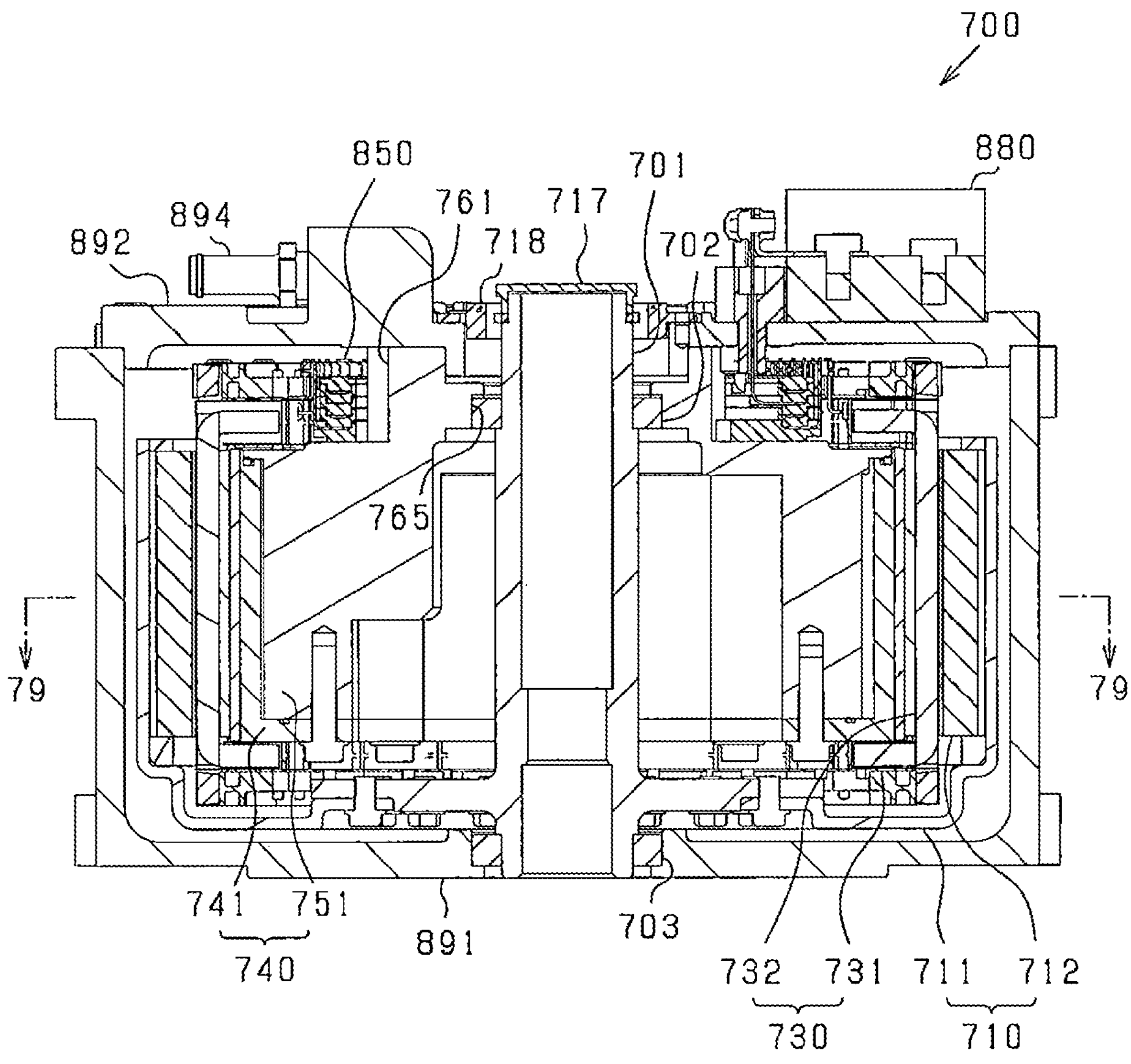
FIG. 78 is a longitudinal cross-sectional view of the rotating electric machine in the fifteenth modification.
Figure 79:
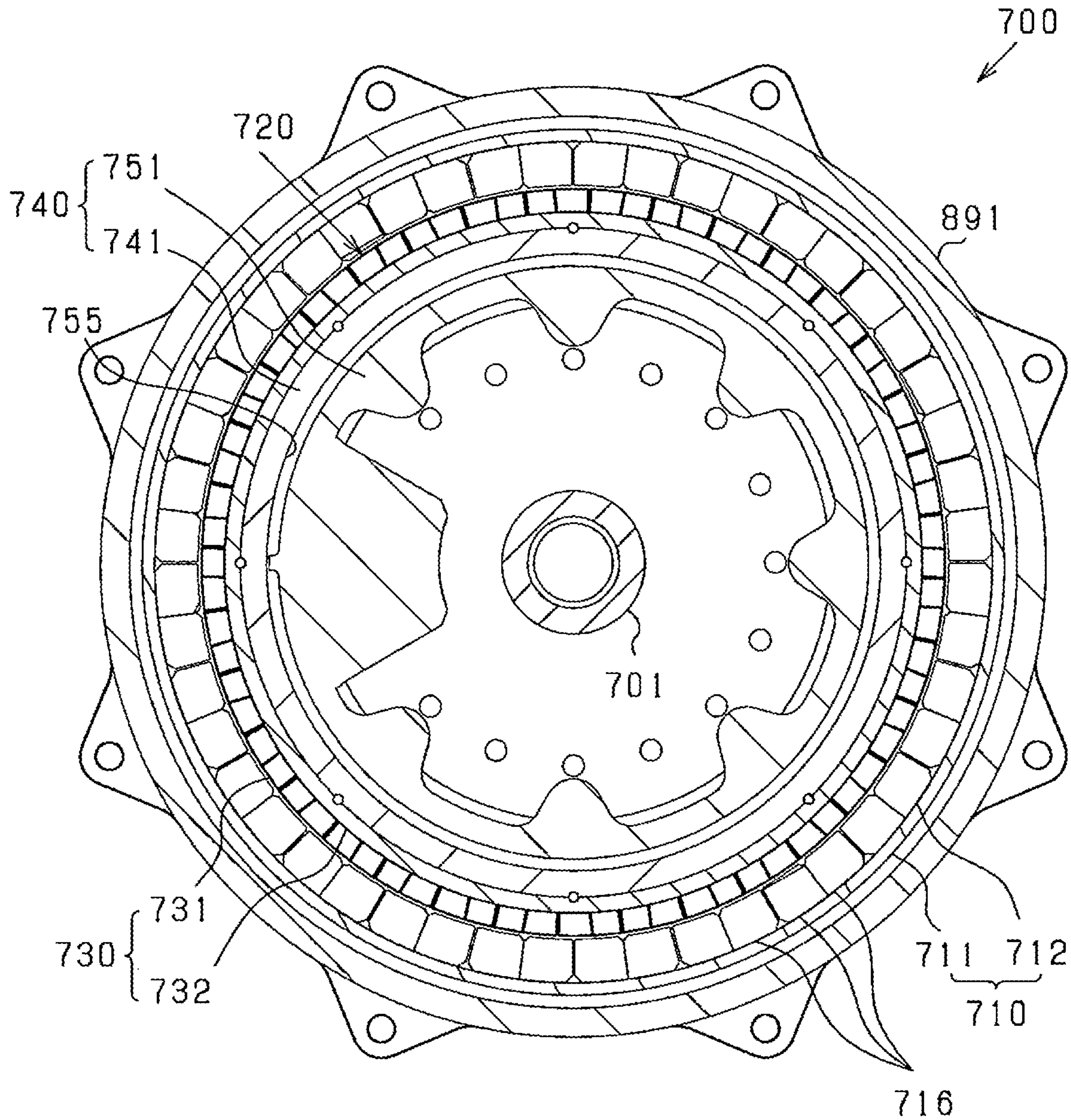
FIG. 79 is a transverse cross-sectional view of the rotating electric machine in the fifteenth modification.
Figure 80:
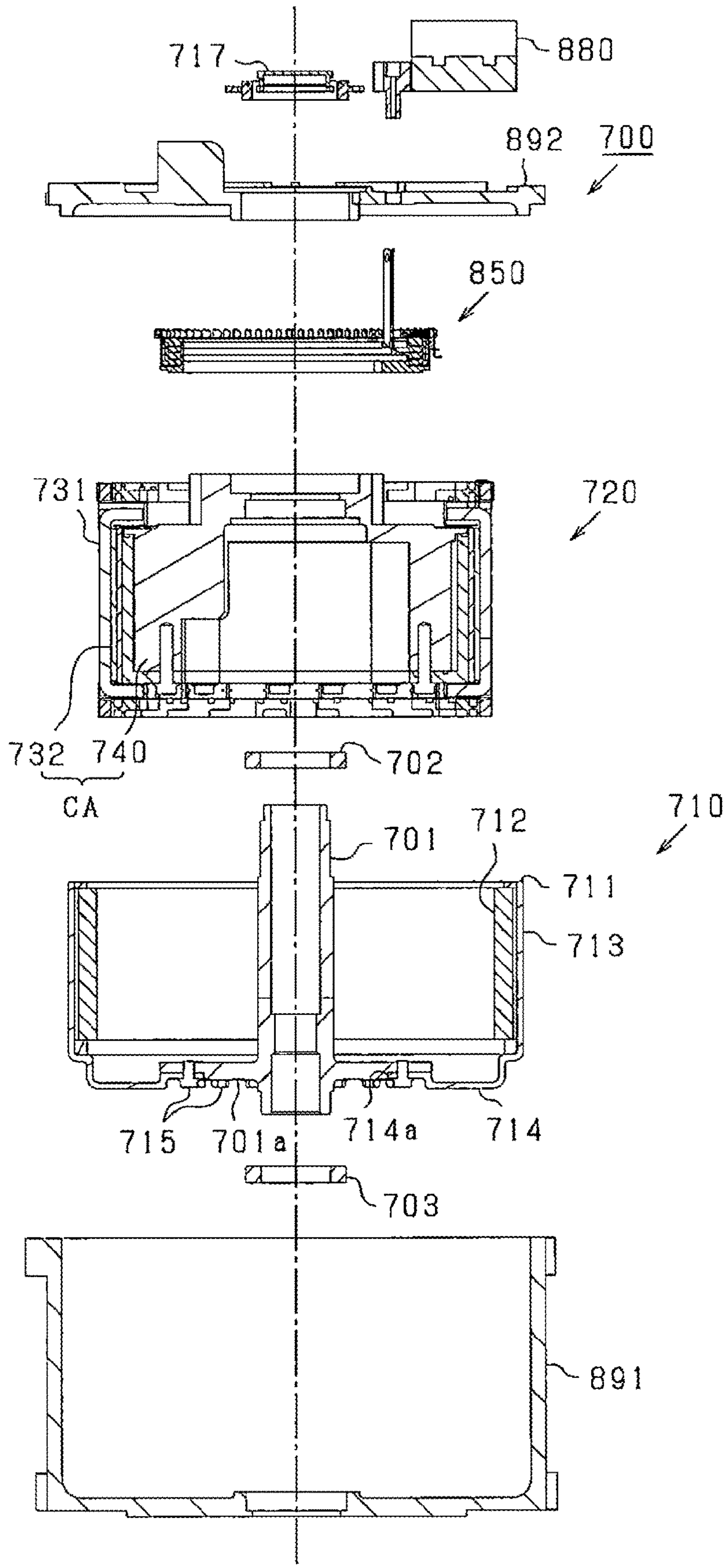
FIG. 80 is an exploded cross-sectional view of the rotating electric machine in the fifteenth modification.

A rotating electric machine 700 according to the fifteenth modification will be described hereinafter. The rotating electric machine 700 is designed to be used as, for example, a vehicle drive unit. The outline of the rotating electric machine 700 is illustrated in FIGS. 76-80. FIG. 76 is a perspective view showing an overview of the rotating electric machine 700. FIG. 77 is a plan view of the rotating electric machine 700. FIG. 78 is a longitudinal cross-sectional view (i.e., cross-sectional view taken along the line 78-78 in FIG. 77) of the rotating electric machine 700. FIG. 79 is a transverse cross-sectional view (i.e., cross-sectional view taken along the line 79-79 in FIG. 78) of the rotating electric machine 700. FIG. 80 is an exploded cross-sectional view showing components of the rotating electric machine 700 in an exploded manner.

The rotating electric machine 700 is an outer rotor type SPM (Surface Permanent Magnet) rotating electric machine. The rotating electric machine 700 mainly includes a rotating electric machine main body, which is composed of a rotor 710, a stator unit 720 and a busbar module 850, and a housing 891 and a housing cover 892 that are provided to together surround the rotating electric machine main body. These components are each arranged coaxially with a rotating shaft 701 that is provided integrally with the rotor 710. These components are assembled in a predetermined sequence in an axial direction of the rotating shaft 701 to together constitute the rotating electric machine 700. The rotating shaft 701 is supported by a pair of bearings 702 and 703 provided respectively in the stator unit 720 and the housing 891; the rotating shaft 701 is rotatable in the supported state. In addition, the bearings 702 and 703 are implemented by, for example, radial ball bearings each of which includes an inner ring, an outer ring and a plurality of balls disposed between the inner and outer rings. With rotation of the rotating shaft 701, for example, an axle of the vehicle rotates. The rotating electric machine 700 can be mounted to the vehicle by fixing the housing 891 to a vehicle body frame or the like.

In the rotating electric machine 700, the stator unit 720 is provided so as to surround the rotating shaft 701; and the rotor 710 is arranged radially outside the stator unit 720. The stator unit 720 includes a stator 730 and a stator holder 740 assembled to the radially inner periphery of the stator 730. The rotor 710 and the stator 730 are radially opposed to each other with a predetermined air gap formed therebetween. The rotor 710 rotates, along with the rotating shaft 701, on the radial outer side of the stator 730. In the present modification, the rotor 710 functions as a "field system" and the stator 730 functions as an "armature".

As shown in FIG. 80, the rotor 710 has a substantially cylindrical rotor carrier 711 and an annular magnet unit 712 fixed to the rotor carrier 711. The rotor carrier 711 has a cylindrical tubular portion 713 and an end plate portion 714 provided at one axial end of the tubular portion 713. The tubular portion 713 and the end plate portion 714 are integrally formed to together constitute the rotor carrier 711. The rotor carrier 711, which functions as a magnet holding member, has the magnet unit 712 fixed in an annular shape on the radially inner side of the tubular portion 713. In a central part of the end plate portion 714, there is formed a through-hole 714*a*. The rotating shaft 701 is fixed, in a state of being inserted in the through-hole 714*a*, to the end plate portion 714 by fasteners 715 such as bolts. More specifically, the rotating shaft 701 has a flange 701*a* formed to extend in a direction intersecting (or perpendicular to) the axial direction. The rotating shaft 711 is fixed to the rotor carrier 711 with the flange 701*a* of the rotating shaft 701 in surface contact with the end plate portion 714 of the rotor carrier 711.

As shown in FIG. 79, the magnet unit 712 has a plurality of magnets 716 arranged in a circumferential direction of the rotor 710 so as to have their polarities alternately changing in the circumferential direction. Consequently, in the magnet unit 712, there are formed a plurality of magnetic poles along the circumferential direction. The magnet unit 712 corresponds to a "magnet section". The magnet unit 712 has the same basic configuration as the magnet unit 42 described in the first embodiment with reference to FIGS. 8 and 9. Moreover, the magnets 716 are implemented by sintered neodymium permanent magnets whose intrinsic coercive force is higher than or equal to 400 [kA/m] and residual flux density Br is higher than or equal to 1.0 [T].

In the magnet unit 712, each of the magnets 716 is a polar anisotropic magnet. Moreover, each of the magnetic poles is formed of a circumferentially-adjacent pair of the magnets 716. That is, the circumferentially-adjacent pairs of the magnets 716 forming the magnetic poles respectively correspond to the first and second magnets 91 and 92 shown in FIGS. 8 and 9; the polarity of the first magnets 91 is different from the polarity of the second magnets 92. Similar to the magnets 91 and 92 shown in FIGS. 8 and 9, in each circumferentially-adjacent pair of the magnets 716 forming one of the magnetic poles, the orientation of the easy axis of magnetization on the d-axis side (or in the d-axis-side part) is different from the orientation of the easy axis of magnetization on the q-axis side (or in the q-axis-side parts). On the d-axis side, the direction of the easy axis of magnetization is close to a direction parallel to the d-axis. In contrast, on the q-axis side, the direction of the easy axis of magnetization is close to a direction perpendicular to the q-axis. Consequently, depending on the change in the orientation of the easy axis of magnetization, arc-shaped magnetic paths are formed in the magnets. In addition, in each circumferentially-adjacent pair of the magnets 716 forming one of the magnetic poles, on the d-axis side, the easy axis of magnetization may be oriented to be parallel to the d-axis; on the q-axis side, the easy axis of magnetization may be oriented to be perpendicular to the q-axis. That is, the magnet unit 712 is configured to have the easy axis of magnetization oriented such that the direction of the easy axis of magnetization is more parallel to the d-axis on the d-axis side than on the q-axis side; the d-axis represents the centers of the magnetic poles while the q-axis represents the boundaries between the magnetic poles. It should be noted that the magnet unit 712 may alternatively employ the configuration of the magnet unit 42 shown in FIGS. 22 and 23 or the configuration of the magnet unit 42 shown in FIG. 30.

As shown in FIG. 78, a cap 717 is mounted to an end portion (i.e., upper end portion in the FIG. 78) of the rotating shaft 701 on the opposite side to the location where the rotor carrier 711 is joined to the rotating shaft 701. Moreover, a resolver 718, which is a rotation angle sensor, is provided on the opposite side to a distal end of the cap 717. The resolver 718 includes a resolver rotor fixed on the rotating shaft 701 and a resolver stator arranged radially outside the resolver rotor to face the resolver rotor. The resolver rotor is annular plate-shaped and has the rotating shaft 701 inserted therein so as to be coaxial with the rotating shaft 701. The resolver stator includes a stator core and a stator coil and is fixed to the housing cover 892.

Figure 81:
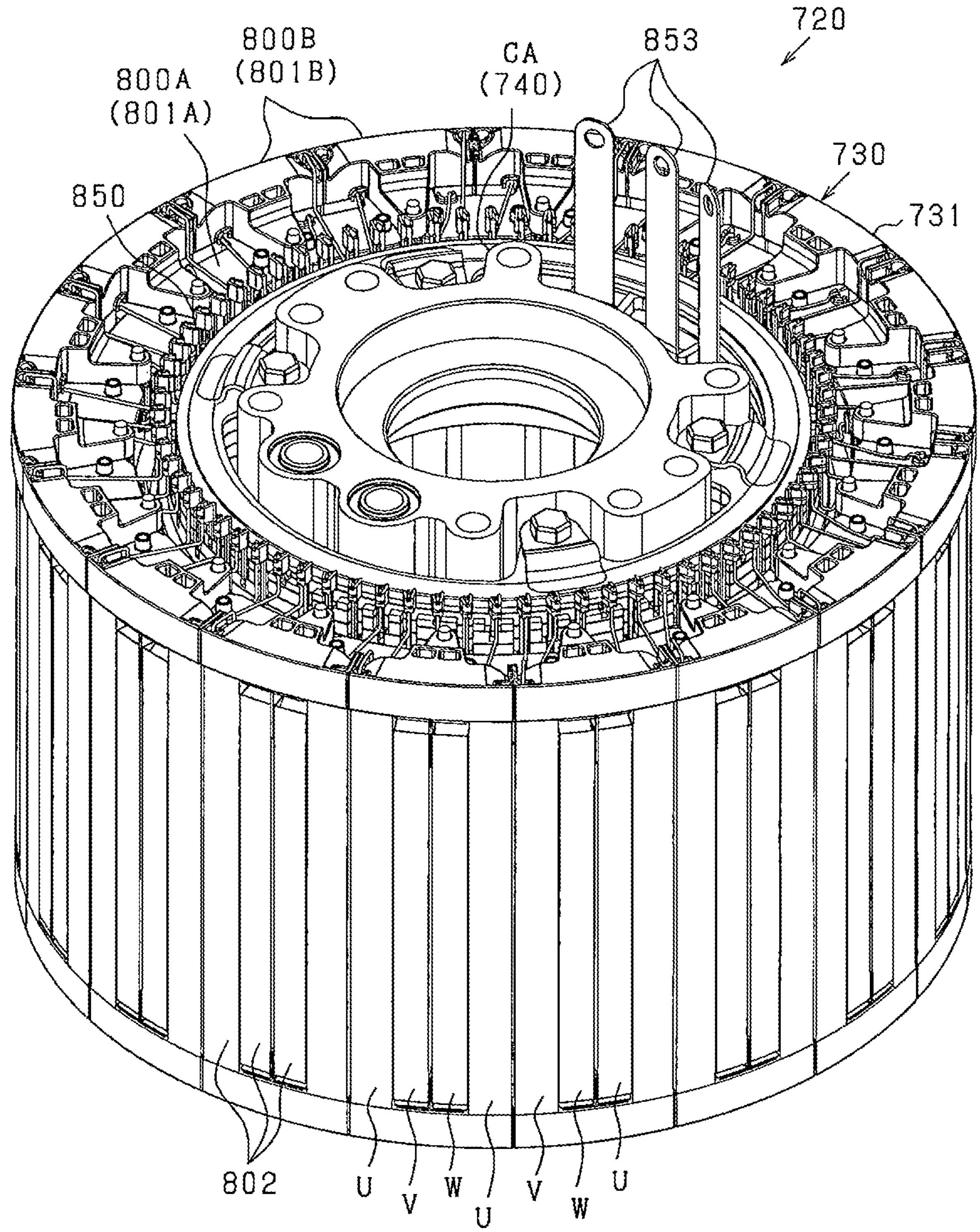
FIG. 81 is a perspective view of a stator unit in the fifteenth modification.
Figure 82:
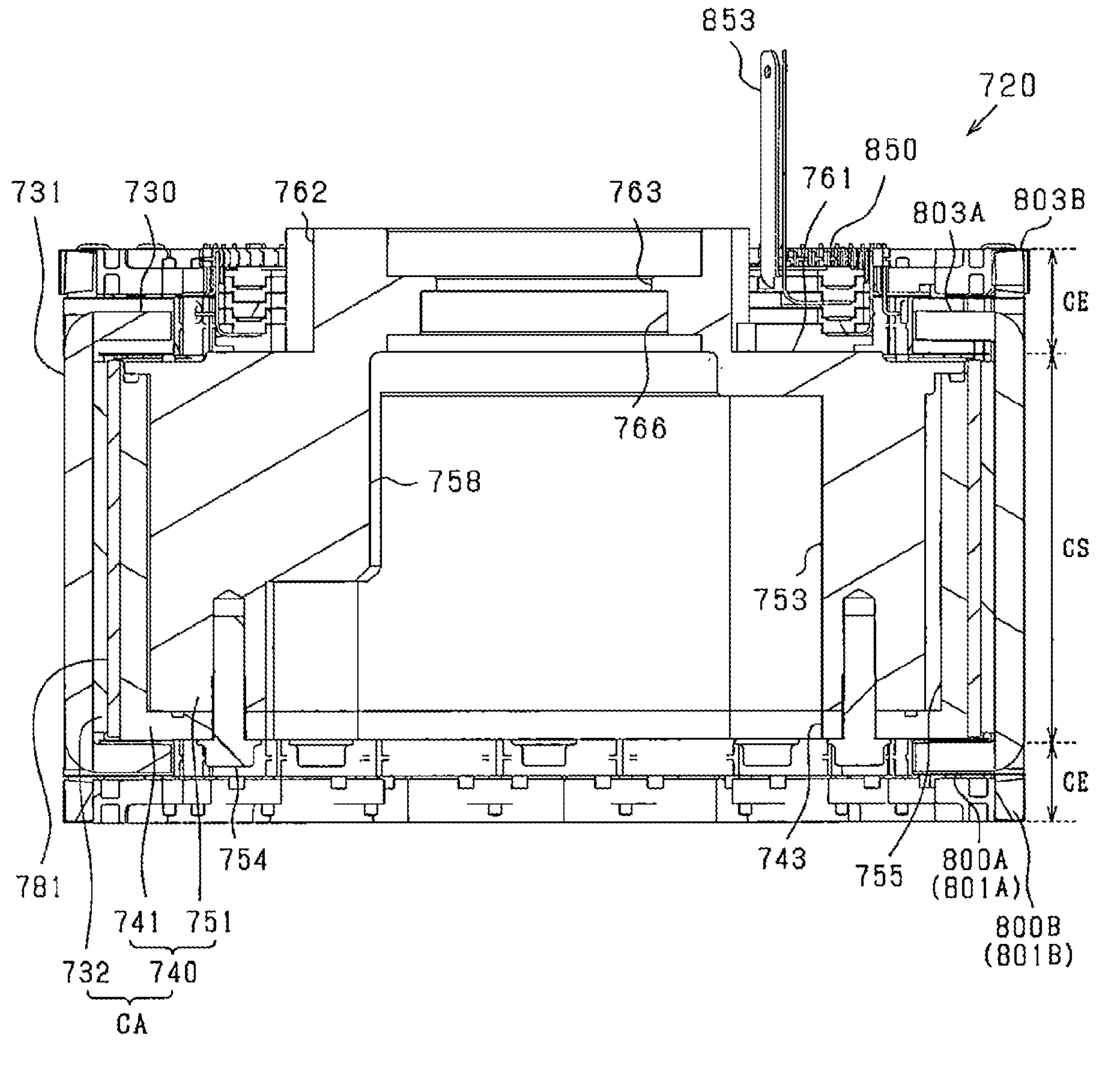
FIG. 82 is a longitudinal cross-sectional view of the stator unit in the fifteenth modification.

Next, the configuration of the stator unit 720 will be described. FIG. 81 is a perspective view of the stator unit 720. FIG. 82 is a longitudinal cross-sectional view of the stator unit 720, which is taken at the same position as FIG. 78.

The stator unit 720 includes the stator 730 and the stator holder 740 arranged radially inside the stator 730. Further, the stator 730 includes a stator coil 731 and a stator core 732. Moreover, the stator core 732 and the stator holder 740 are integrated into a core assembly CA. A plurality of partial windings 801, which constitute the stator coil 731, are assembled to the core assembly CA. In addition, in the present modification, the stator coil 731 corresponds to an "armature coil"; the stator core 732 corresponds to an "armature core"; the stator holder 740 corresponds to an "armature holding member"; and the core assembly CA corresponds to a "support member".

Figure 83:
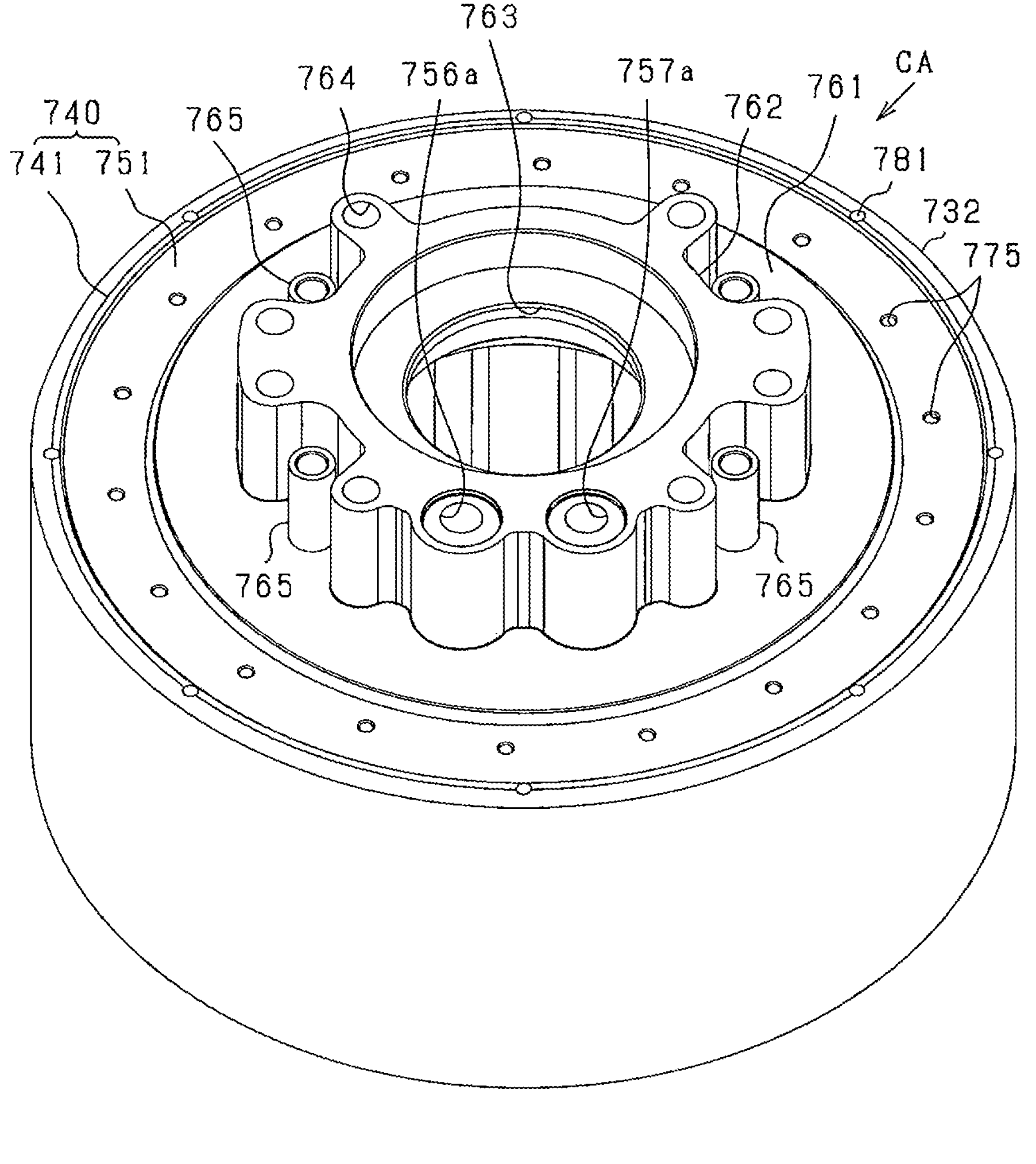
FIG. 83 is a perspective view, from one axial side, of a core assembly in the fifteenth modification.
Figure 84:
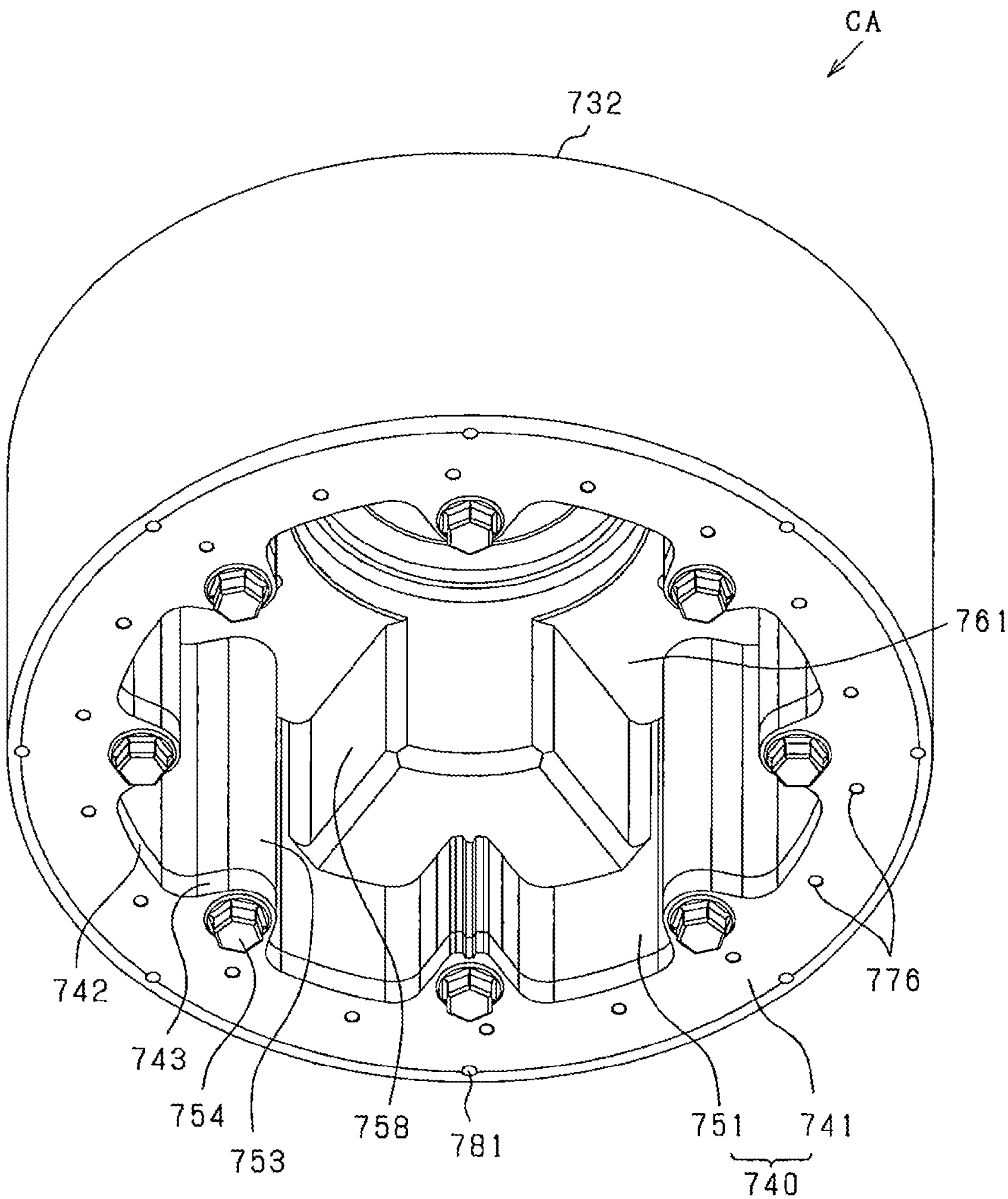
FIG. 84 is a perspective view, from the other axial side, of the core assembly in the fifteenth modification.
Figure 85:
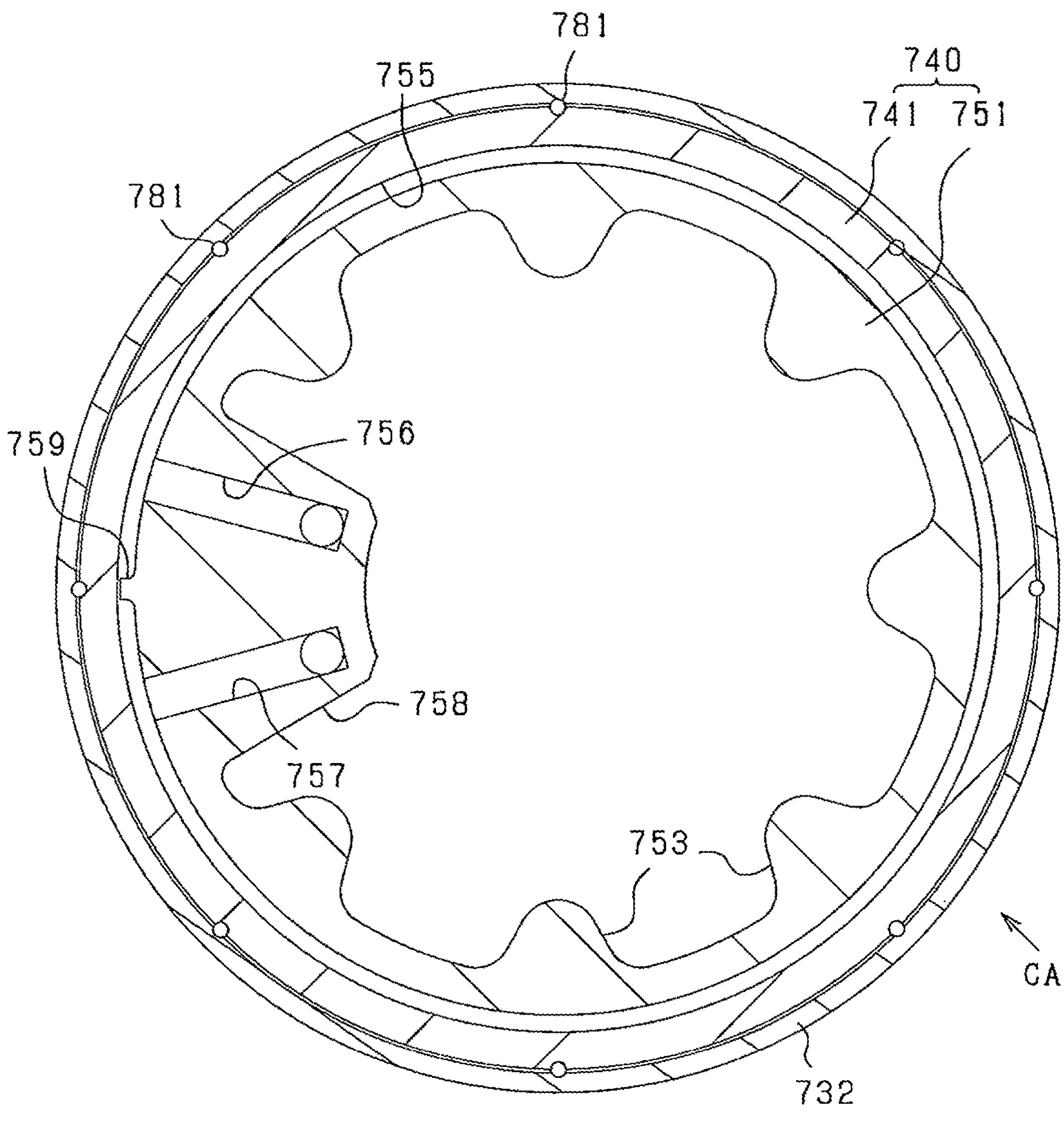
FIG. 85 is a transverse cross-sectional view of the core assembly in the fifteenth modification.
Figure 86:
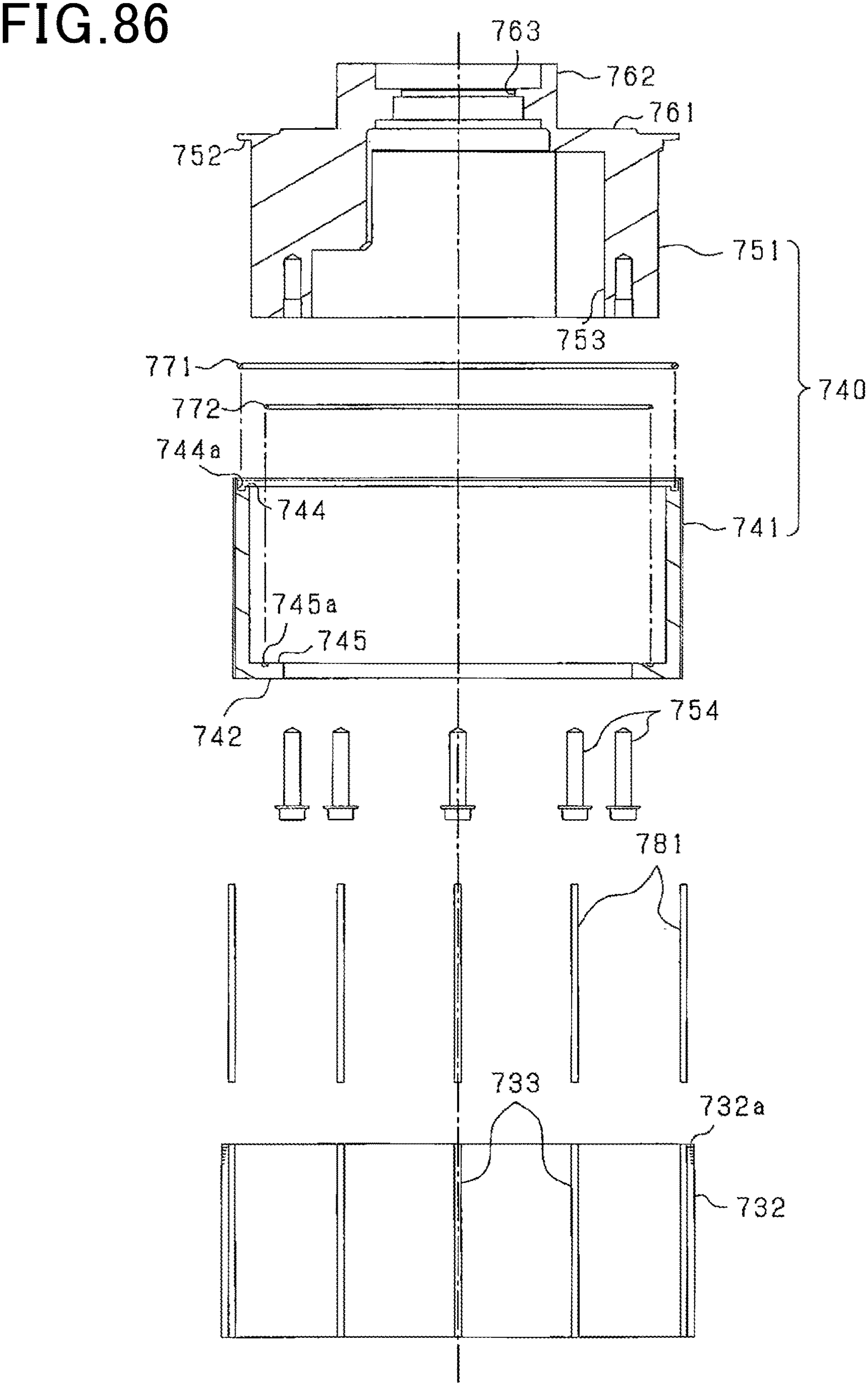
FIG. 86 is an exploded cross-sectional view of the core assembly in the fifteenth modification.

First, the core assembly CA will be described. FIG. 83 is a perspective view, from one axial side, of the core assembly CA. FIG. 84 is a perspective view, from the other axial side, of the core assembly CA. FIG. 85 is a transverse cross-sectional view of the core assembly CA. FIG. 86 is an exploded cross-sectional view of the core assembly CA.

As described above, the core assembly CA is composed of the stator core 732 and the stator holder 740 assembled to the radially inner periphery of the stator core 732. In other words, the stator core 732 is integrally assembled to the outer circumferential surface of the stator holder 740.

The stator core 732 is constituted of a core sheet laminate in which a plurality of core sheets 732*a* are laminated in the axial direction; the core sheets 732*a* are formed of a magnetic material such as a magnetic steel sheet. The stator core 732 has a cylindrical shape with a predetermined radial thickness. The stator coil 731 is provided on the radially outer side (i.e., the rotor 710 side) of the stator core 732. The stator core 732 has an outer circumferential surface that is a curved surface without unevenness. The stator core 732 functions as a back yoke. The stator core 732 is obtained by axially laminating the core sheets 732*a* that are formed, for example by blanking, into an annular shape. In addition, the stator core 732 may alternatively have a helical core structure. In this case, the cylindrical stator core 732 may be obtained by annularly winding a strip of core sheet while laminating the annularly-wound turns of the strip in the axial direction.

In the present modification, the stator 730 has a slot-less structure (or toothless structure) without teeth for forming slots. Moreover, the stator 730 may have any of the following configurations (A)-(C).

(A) In the stator 730, inter-conductor members are provided between the electrical conductor sections (i.e., intermediate conductor portions 802 to be described later) in the circumferential direction. The inter-conductor members are formed of a magnetic material satisfying the following relationship: $Wt \times Bs \leq Wm \times Br$, where Wt is the circumferential width of the inter-conductor members in each magnetic pole, Bs is the saturation flux density of the inter-conductor members, Wm is the circumferential width of the magnets 716 in each magnetic pole and Br is the residual flux density of the magnets 716.

(B) In the stator 730, inter-conductor members are provided between the electrical conductor sections (i.e., the intermediate conductor portions 802) in the circumferential direction. The inter-conductor members are formed of a nonmagnetic material.

(C) In the stator 730, no inter-conductor members are provided between the electrical conductor sections (i.e., the intermediate conductor portions 802) in the circumferential direction.

As shown in FIG. 86, the stator holder 740 includes an outer cylinder member 741 and an inner cylinder member 751, which are assembled together with the outer cylinder member 741 located on the radially outer side and the inner cylinder member 751 located on the radially inner side. Each of these members 741 and 751 may be formed of a metal, such as aluminum or cast iron, or Carbon Fiber-Reinforced Plastic (CFRP).

The outer cylinder member 741 is a hollow cylindrical member having both an outer circumferential surface and an inner circumferential surface formed as perfect cylindrical surfaces. At one axial end of the outer cylinder member 741, there is formed an annular flange 742 that extends radially inward. Moreover, on the radially inner periphery of the flange 742, there are formed, at predetermined intervals in the circumferential direction, a plurality of protrusions 743 extending radially inward (see FIG. 84). Furthermore, at one axial end and the other axial end of the outer cylinder member 741, there are respectively formed facing surfaces 744 and 745 each of which faces the inner cylinder member 751 in the axial direction. Further, in the facing surfaces 744 and 745, there are respectively formed annular grooves **744*a* and 745*a*** each of which extends in an annular shape.

The inner cylinder member 751 is a hollow cylindrical member having an outer diameter smaller than the inner diameter of the outer cylinder member 741. The inner cylinder member 751 has an outer circumferential surface formed as a perfect cylindrical surface concentric with the outer cylinder member 741. At one axial end of the inner cylinder member 751, there is formed an annular flange 752 that extends radially outward. The inner cylinder member 751 is assembled to the outer cylinder member 741 so as to abut both the facing surfaces 744 and 745 of the outer cylinder member 741 in the axial direction. As shown in FIG. 84, the outer cylinder member 741 and the inner cylinder member 751 are assembled to each other by fasteners 754 such as bolts. Specifically, on the radially inner periphery of the inner cylinder member 751, there are formed, at predetermined intervals in the circumferential direction, a plurality of protrusions 753 extending radially inward. The protrusions 743 of the outer cylinder member 741 and the protrusions 753 of the inner cylinder member 751 are fastened together by the fasteners 754 with the protrusions 743 superposed respectively on axial end faces of the protrusions 753.

As shown in FIG. 85, after the outer cylinder member 741 and the inner cylinder member 751 are assembled to each other, there is an annular gap formed between the inner circumferential surface of the outer cylinder member 741 and the outer circumferential surface of the inner cylinder member 751. The annular gap constitutes a coolant passage 755 through which coolant such as cooling water flows. The coolant passage 755 is formed in an annular shape along the circumferential direction of the stator holder 740. More specifically, on the radially inner periphery of the inner cylinder member 751, there is formed a passage forming portion 758 that protrudes radially inward. In the passage forming portion 758, there are formed both an inlet-side passage 756 and an outlet-side passage 757. Each of these passages 756 and 757 opens on the outer circumferential surface of the inner cylinder member 751. Moreover, on the outer circumferential surface of the inner cylinder member 751, there is formed a partition wall 759 that partitions the coolant passage 755 into an inlet-side part and an outlet-side part. Consequently, the coolant flowing in from the inlet-side passage 756 flows through the coolant passage 755 in the circumferential direction, and then flows out from the outlet-side passage 757.

Each of the inlet-side passage 756 and the outlet-side passage 757 has one end portion extending radially to open on the outer circumferential surface of the inner cylinder member 751 and the other end portion extending axially to open on an axial end face of the inner cylinder member 751. In FIG. 83, there are shown both an inlet opening **756*a* leading to the inlet-side passage 756 and an outlet opening 757*a* leading to the outlet-side passage 757. In addition, the inlet-side passage 756 and the outlet-side passage 757 communicate respectively with an inlet port 894 and an outlet port 895 (see FIG. 76) both of which are mounted to the housing cover 892; the coolant flows in and flows out through these ports 894 and 895**.

At the joint portions between the outer cylinder member 741 and the inner cylinder member 751, there are respectively provided sealing members 771 and 772 (see FIG. 86) to suppress leakage of the coolant from the coolant passage 755. Specifically, the sealing members 771 and 772 may be implemented by, for example, O-rings. The sealing members 771 and 772 are received respectively in the annular grooves **744*a* and 745*a* of the outer cylinder member 741 and kept in a state of being compressed between the outer cylinder member 741 and the inner cylinder member 751**.

As shown in FIG. 83, the inner cylinder member 751 has an end plate portion 761 at one axial end thereof. On the end plate portion 761, there is formed a hollow cylindrical boss portion 762 that extends in the axial direction. The boss portion 762 is formed so as to surround an insertion hole 763 through which the rotating shaft 701 is inserted inside the inner cylinder member 751. In the boss portion 762, there are formed a plurality of fastening portions 764 for fixing the housing cover 892. Moreover, on the end plate portion 761, there are formed, on the radially outer side of the boss portion 762, a plurality of pillar portions 765 that extend in the axial direction. As will be described in detail later, the pillar portions 765 serve as fixing portions for fixing the busbar module 850. Furthermore, the boss portion 762 serves as a bearing holding member for holding the bearing 702. Specifically, the bearing 702 is fixed to a bearing fixing portion 766 formed on the radially inner periphery of the boss portion 762 (see FIG. 78).

As shown in FIGS. 83 and 84, in the outer cylinder member 741 and the inner cylinder member 751, there are formed recesses 775 and 776 for fixing a plurality of coil modules 800 which will be described later.

Specifically, as shown in FIG. 83, on an axial end face of the inner cylinder member 751, more specifically, on an axially-outer end face of the end plate portion 761 around the boss portion 762, there are formed a plurality of recesses 775 at equal intervals in the circumferential direction. Moreover, as shown in FIG. 84, on an axial end face of the outer cylinder member 741, more specifically, on an axially-outer end face of the flange 742, there are formed a plurality of recesses 776 at equal intervals in the circumferential direction. Furthermore, the recesses 775 are formed so as to be aligned on an imaginary circle concentric with the core assembly CA; and the recesses 776 are also formed so as to be aligned on an imaginary circle concentric with the core assembly CA. In addition, the recesses 775 are formed at the same circumferential positions as the recesses 776; the intervals between the recesses 775 are equal to the intervals between the recesses 776; and the number of the recesses 775 is equal to the number of the recesses 776.

In order to secure the assembly strength, the stator core 732 is assembled to the stator holder 740 with a radial compressive force induced with respect to the stator holder 740. Specifically, the stator core 732 is fixedly fitted, by shrink fitting or press fitting, to the stator holder 740 with a predetermined interference therebetween. In other words, the stator core 732 and the stator holder 740 are assembled together with a radial stress induced by one of them to the other. Moreover, the torque of the rotating electric machine 700 may be increased by, for example, increasing the outer diameter of the stator 730. In this case, the tightening force of the stator core 732 is increased to strengthen the joining of the stator core 732 to the stator holder 740. However, with increase in the compressive stress (in other words, the residual stress) of the stator core 732, the stator core 732 may become damaged.

In view of the above, in the present modification, in the configuration where the stator core 732 and the stator holder 740 are fixedly fitted to each other with the predetermined interference therebetween, there are provided restricting members between portions of the stator core 732 and the stator holder 740 radially facing each other. The restricting members engage with the stator core 732 in the circumferential direction, thereby restricting circumferential displacement of the stator core 732. Specifically, as shown in FIGS. 83-85, a plurality of engaging members 781, which constitute the restricting members, are radially interposed between the stator core 732 and the outer cylinder member 741 of the stator holder 740 and arranged at predetermined intervals in the circumferential direction. Consequently, with the engaging members 781, it becomes possible to suppress relative displacement between the stator core 732 and the stator holder 740 in the circumferential direction.

Figure 87A:
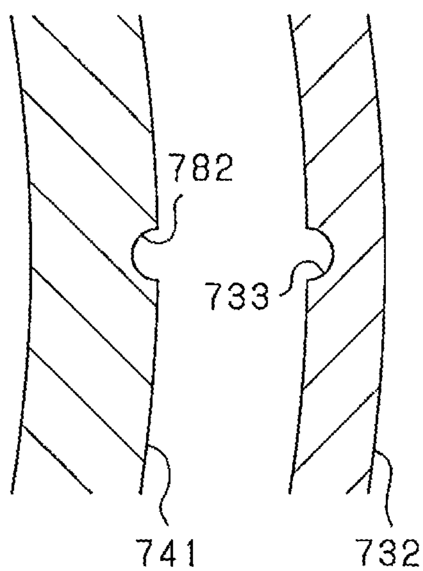
FIGS. 87(*a*) and 87(*b*) are transverse cross-sectional views of a stator core and an outer cylinder member in the fifteenth modification.
Figure 87B:
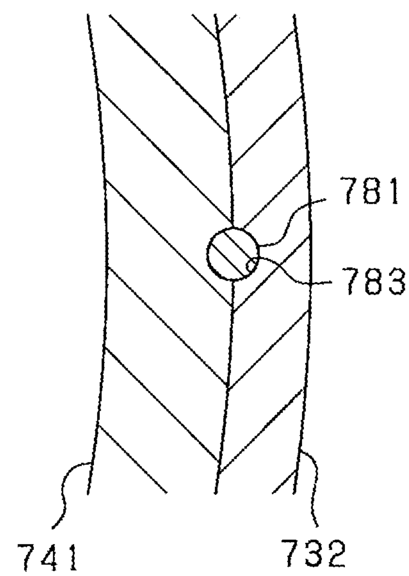

More specifically, as shown in FIG. 87(*a*), semicircular recesses 733 are formed in the inner circumferential surface of the stator core 732; and semicircular recesses 782 are formed in the outer circumferential surface of the outer cylinder member 741 of the stator holder 740. All of the recesses 733 and 782 are formed to have the same size. Moreover, the recesses 733 are formed at the same intervals in the circumferential direction as the recesses 782. In the stator core 732, each of the recesses 733 is formed over the entire axial range from one axial end face to the other axial end face of the stator core 732. Similarly, in the outer cylinder member 741 of the stator holder 740, each of the recesses 782 is formed over the entire axial range from one axial end face to the other axial end face of the outer cylinder member 741.

As shown in FIG. 87(*b*), each of the engaging members 781 is rod-shaped and has a circular cross section. In a state where the recesses 733 of the stator core 732 are located at the same circumferential positions as the recesses 782 of the outer cylinder member 741, the engaging members 781 are inserted respectively into through-holes 783 each of which is constituted of a radially-aligned pair of the recesses 733 and 782. That is, the recesses 733 and 782 are formed in the radially-facing surfaces of the stator core 732 and the outer cylinder member 741; the recesses 733 are located at the same circumferential positions as the recesses 782; and each of the engaging members 781 is assembled into a radially-aligned pair of the recesses 733 and 782.

In the above configuration, the stator core 732 and the stator holder 740 (more specifically, the outer cylinder member 741) are fixedly fitted to each other with the predetermined interference therebetween; and relative circumferential displacement between the stator core 732 and the stator holder 740 is restricted by the engaging members 781. Consequently, even if the interference between the stator core 732 and the stator holder 740 is relatively small, it will still be possible to suppress circumferential displacement of the stator core 732 relative to the stator holder 740. Moreover, since the desired displacement-suppressing effect can be achieved even if the interference is relatively small, it becomes possible to prevent the stator core 732 from being damaged due to an excessively large interference between the stator core 732 and the stator holder 740. As a result, it becomes possible to suitably suppress displacement of the stator core 732.

Furthermore, with the engaging members 781 assembled into the recesses 733 and 782 formed in the stator core 732 and the outer cylinder member 741, it becomes possible to have the engaging members 781 engage with the stator core 732 and the outer cylinder member 741 in a state of straddling them, thereby restricting circumferential displacement of the stator core 732. That is, it becomes possible to suitably suppress circumferential displacement of the stator core 732 using members different from the stator core 732 and the outer cylinder member 741.

It is preferable that a filler, such as a synthetic resin or varnish, is filled in spaces around the engaging members 781 between the portions of the stator core 732 and the outer cylinder member 741 radially facing each other. In this case, since the spaces around the engaging members 781 are filled with the filler, occurrence of rattling or the like can be suppressed.

In addition, the cross-sectional shapes of the recesses 733 and 782 and the engaging members 781 are arbitrary, and may be rectangular instead of circular.

In manufacturing the core assembly CA, after forming the stator holder 740 by integrating the outer cylinder member 741 and the inner cylinder member 751 into one piece, the engaging members 781 are assembled into the recesses 782 of the outer cylinder member 741. Then, the stator core 732 is assembled to the radially outer periphery of the outer cylinder member 741 by shrink fitting or the like.

On the radially inner side of the inner cylinder member 751, there is formed an annular internal space so as to surround the rotating shaft 701. In the internal space, there may be arranged, for example, electrical components constituting an inverter that is an electric power converter. The electrical components may be, for example, electrical modules each of which is formed by packaging a semiconductor switching element or a capacitor. By arranging the electrical modules in contact with the inner circumferential surface of the inner cylinder member 751, it becomes possible to cool the electrical modules with the coolant flowing through the coolant passage 755. It should be noted that the internal space formed on the radially inner side of the inner cylinder member 751 may be expanded by eliminating the protrusions 753 or reducing the protruding height of the protrusions 753.

Next, the configuration of the stator coil 731 will be described in detail. FIGS. 81 and 82 show the stator coil 731 in a state of having been assembled to the core assembly CA. As shown in FIGS. 81 and 82, the partial windings 801 constituting the stator coil 731 are assembled to the radially outer periphery of the core assembly CA (i.e., the radially outer periphery of the stator core 732) so as to be aligned with each other in the circumferential direction.

The stator coil 731 includes a plurality of phase windings and is formed into a hollow cylindrical (or an annular) shape by arranging the phase windings in a predetermined sequence in the circumferential direction. In the present modification, the stator coil 731 is configured as a three-phase coil which includes U-phase, V-phase and W-phase windings.

As shown in FIG. 82, the stator 730 has, in the axial direction, a part thereof corresponding to a coil side part CS that radially faces the magnet unit 712 of the rotor 710, and parts thereof corresponding respectively to coil ends CE that are located respectively on opposite axial sides of the coil side part CS. In addition, the stator core 732 is provided in the axial range corresponding to the coil side part CS.

Each of the phase windings of the stator coil 731 is constituted of a plurality of partial windings 801 (see FIG. 88); the partial windings 801 are individually provided as coil modules 800. That is, each of the coil modules 800 has one of the partial windings 801 of the phase windings provided integrally therein. The number of the coil modules 800 constituting the stator coil 731 is set according to the number of the magnetic poles of the rotor 710. In the coil side part CS of the stator coil 731, the electrical conductor sections of the plurality of phases are arranged in a predetermined sequence and in alignment with each other in the circumferential direction by arranging the coil modules 800 (i.e., the partial windings 801) of the plurality of phases in the predetermined sequence and in alignment with each other in the circumferential direction. In FIG. 81, there is shown the arrangement sequence of the electrical conductor sections of the U, V and W phases in the coil side part CS of the stator coil 731. In addition, in the present modification, the number of the magnetic poles is set to 24; however, the number of the magnetic poles may be arbitrarily set.

Figure 88:
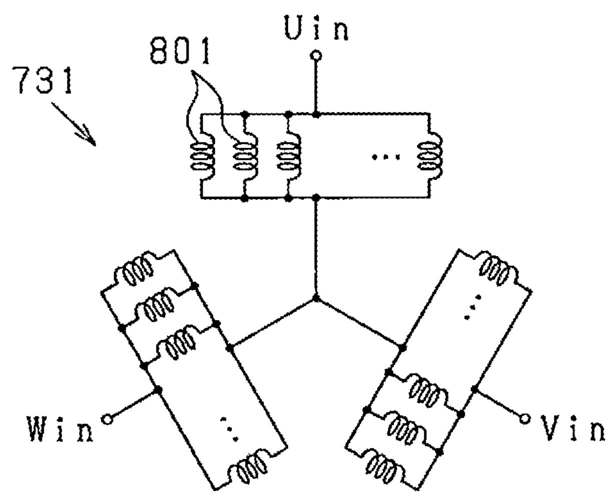
FIG. 88 is an electric circuit diagram illustrating the electrical connection between partial windings in each of three phase windings of a stator coil in the fifteenth modification.

In the stator coil 731, each of the phase windings is formed by connecting the partial windings 801 of the phase winding, which are included in the respective coil modules 800, in parallel or in series with each other. FIG. 88 is an electric circuit diagram illustrating the electrical connection between the partial windings 801 in each of the three phase windings of the stator coil 731. In FIG. 88, each of the phase windings has the partial windings 801 thereof connected in parallel with each other.

As shown in FIG. 82, the coil modules 800 are assembled to the radially outer periphery of the stator core 732. As described above, the stator coil 731 has the coil side part CS radially facing the magnet unit 712 of the rotor 710 and the coil ends CE located respectively on opposite axial sides of the coil side part CS. The coil modules 800 are assembled to the stator core 732 so that opposite axial end portions of each of the coil modules 800 protrude axially outward respectively from opposite axial end faces of the stator core 732 (i.e., protrude respectively to opposite axial sides of the stator core 732 where the coil ends CE are respectively located).

In the present modification, the coil modules 800 include two types of coil modules, i.e., first coil modules 800A and second coil modules 800B. Accordingly, the partial windings 801 include two types of partial windings, i.e., first partial windings 801A included respectively in the first coil modules 800A and second partial windings 801B included respectively in the second coil modules 800B. Each of the first partial windings 801A of the first coil modules 800A is bent radially inward (i.e., to the stator core 732 side) at the coil ends CE. In contrast, each of the second partial windings 801B of the second coil modules 800B extends straight in the axial direction without being bent radially inward at the coil ends CE.

Figure 89:
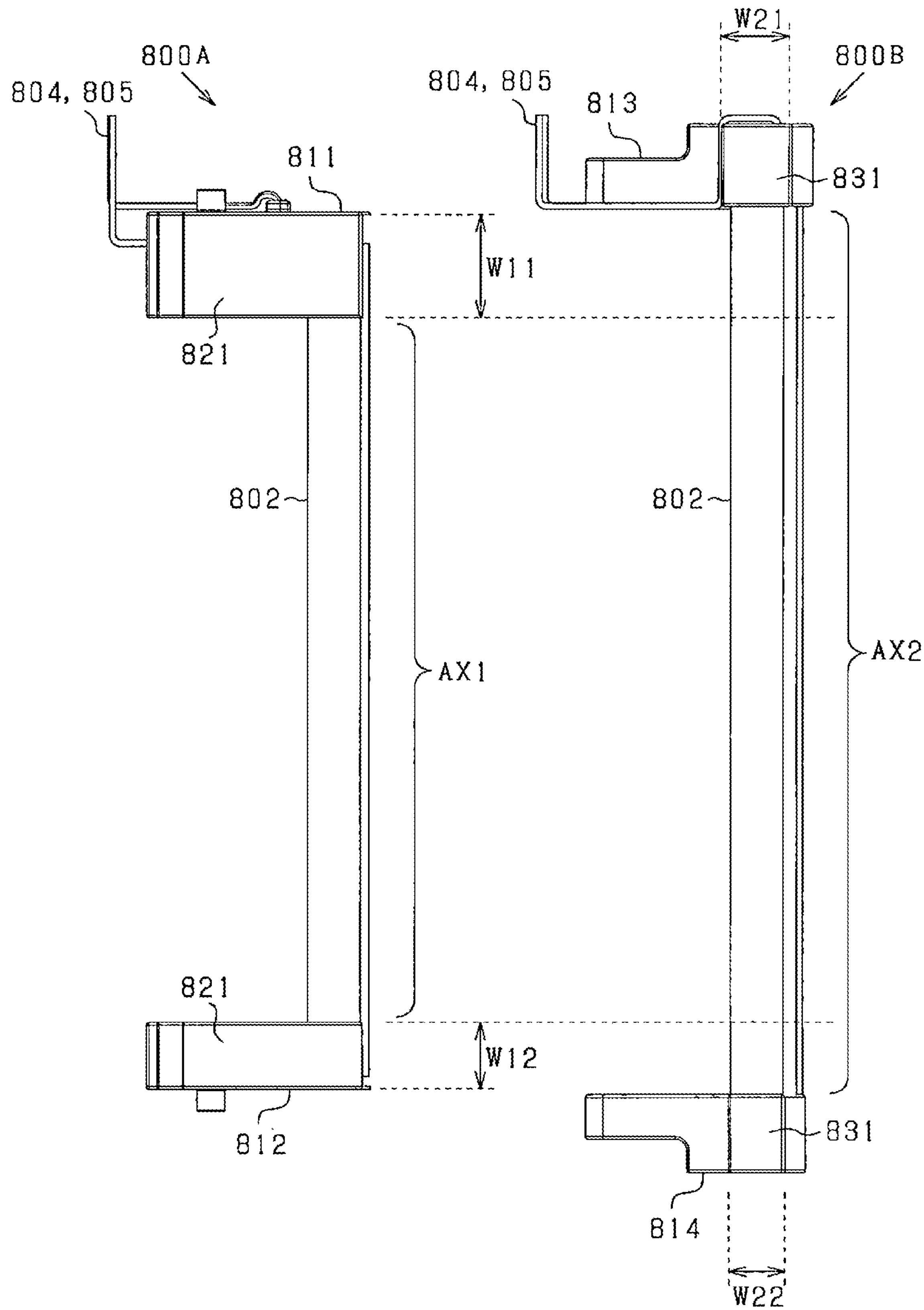
FIG. 89 is a side view comparatively showing a first coil module and a second coil module side by side in the fifteenth modification.
Figure 90:
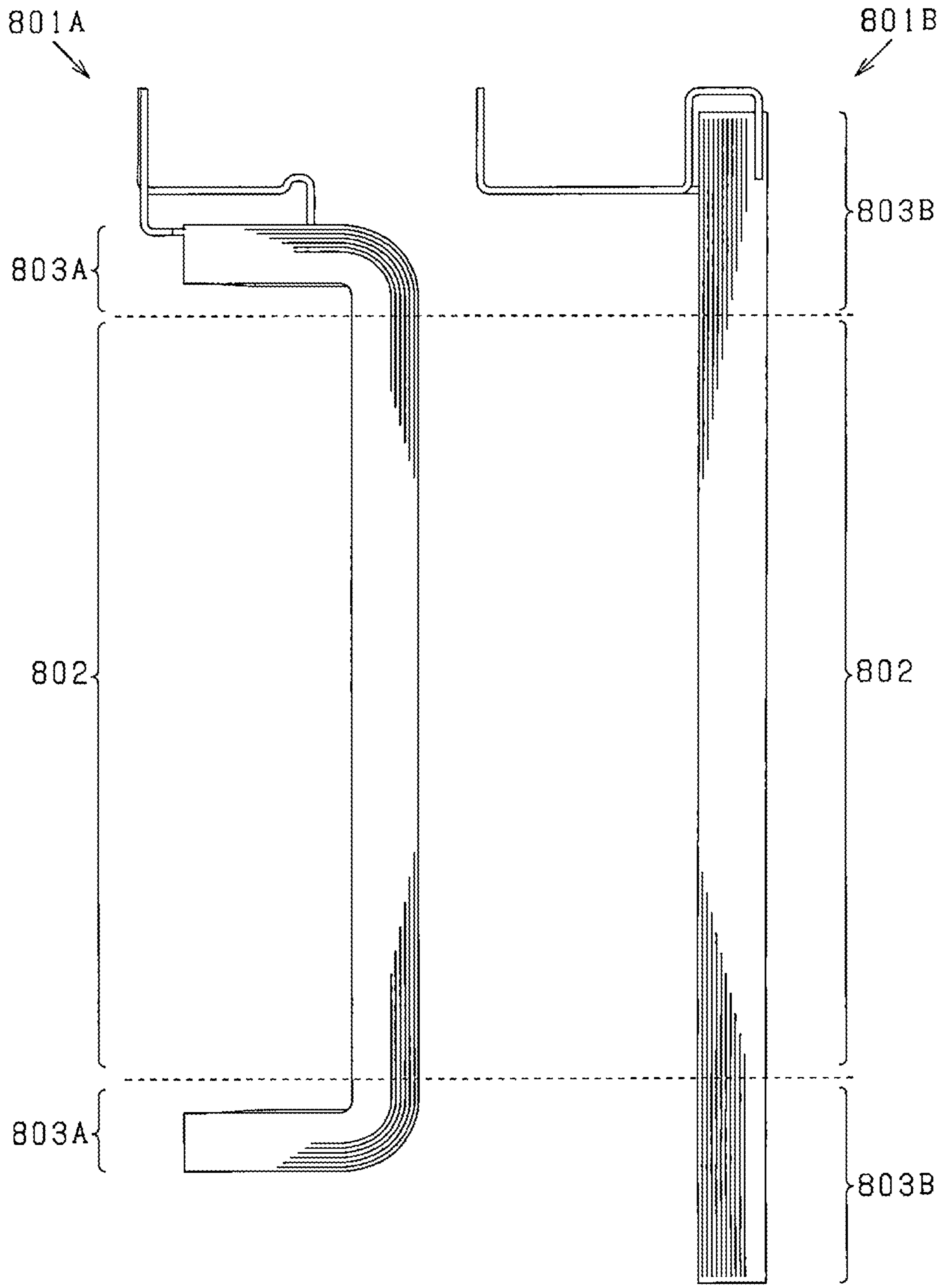
FIG. 90 is a side view comparatively showing a first partial winding and a second partial winding side by side in the fifteenth modification.

FIG. 89 is a side view comparatively showing one of the first coil modules 800A and one of the second coil modules 800B side by side. FIG. 90 is a side view comparatively showing one of the first partial windings 801A and one of the second partial windings 801B side by side. As shown in FIG. 89, the axial length of the first coil modules 800A is different from the axial length of the second coil modules 800B; axial end portions of the first coil modules 800A are different in shape from axial end portions of the second coil modules 800B. Accordingly, as shown in FIG. 90, the axial length of the first partial windings 801A is different from the axial length of the second partial windings 801B; axial end portions of the first partial windings 801A are different in shape from axial end portions of the second partial windings 801B. Specifically, each of the first partial windings 801A has a substantially C-shape in a side view, whereas each of the second partial windings 801B has a substantially I-shape in a side view. Moreover, each of the first partial windings 801A has a pair of insulating covers 811 and 812 mounted respectively on opposite axial end portions thereof, whereas each of the second partial windings 801B has a pair of insulating covers 813 and 814 mounted respectively on opposite axial end portions thereof. In addition, in the present modification, the pair of insulating covers 811 and 812 corresponds to a pair of "first insulating covers" and constitutes a "first mounting member" for mounting the first partial winding 801A to the core assembly CA; the pair of insulating covers 813 and 814 corresponds to a pair of "second insulating covers" and constitutes a "second mounting member" for mounting the second partial winding 801B to the core assembly CA. The configurations of the insulating covers 811-814 will be described in detail later.

Next, the configurations of the first and second coil modules 800A and 800B will be described in detail.

Figure 91A:
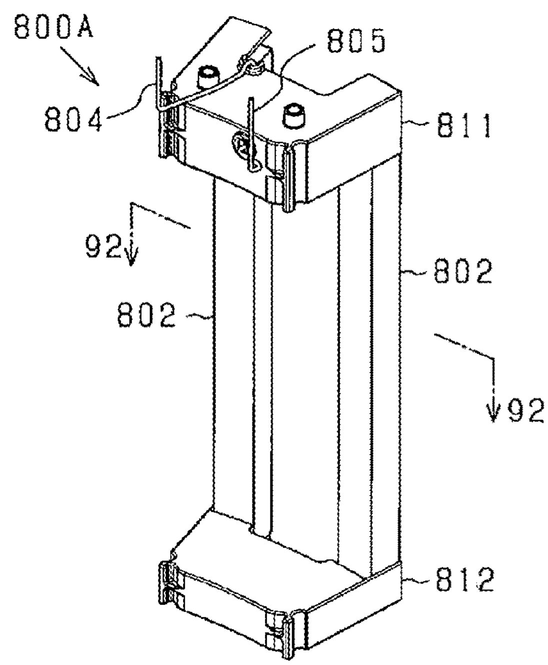
FIGS. 91(*a*) and 91(*b*) are perspective views illustrating the configuration of the first coil module in the fifteenth modification.
Figure 91B:
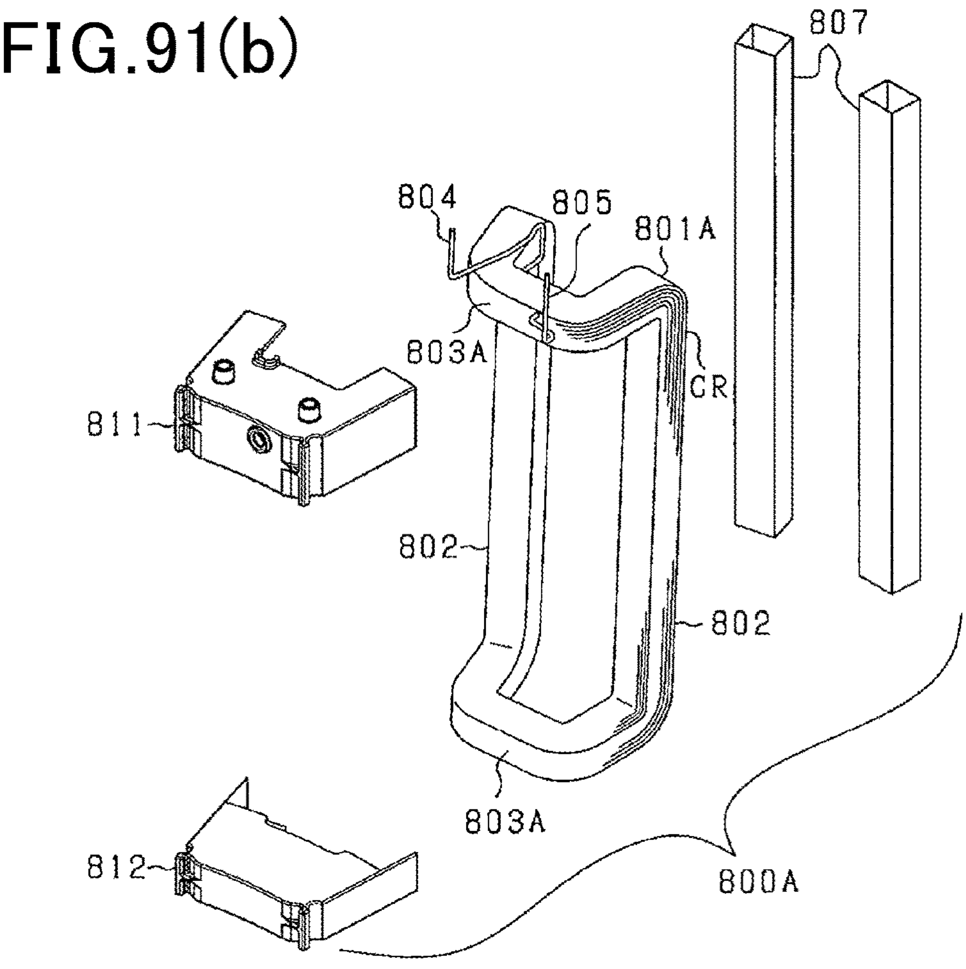
Figure 92:
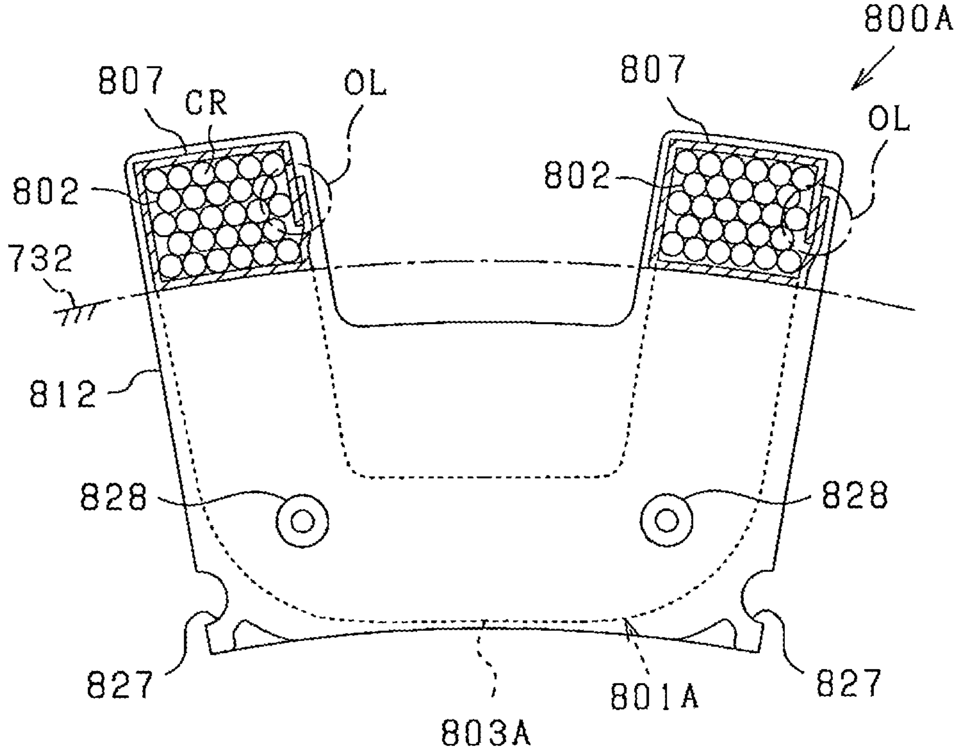
FIG. 92 is a cross-sectional view taken along the line 92-92 in FIG. 91(*a*)

First, the configuration of each of the first coil modules 800A will be described. FIG. 91(*a*) is a perspective view illustrating the configuration of each of the first coil modules 800A. FIG. 91(*b*) is a perspective view showing the components of each of the first coil modules 800A in an exploded manner. FIG. 92 is a cross-sectional view taken along the line 92-92 in FIG. 91(*a*).

As shown in FIGS. 91(*a*) and 91(*b*), each of the first coil modules 800A has the first partial winding 801A formed by winding an electrical conductor wire CR multiply (or as a plurality of turns) and the insulating covers 811 and 812 mounted respectively on opposite axial end portions of the first partial winding 801A. The insulating covers 811 and 812 are formed of an electrically-insulative material such as a synthetic resin.

The first partial winding 801A has a pair of intermediate conductor portions 802 extending straight and parallel to each other, and a pair of bridging portions 803 connecting the pair of intermediate conductor portions 802 respectively on opposite axial sides of the pair of intermediate conductor portions 802. The first partial winding 801A is formed into a ring shape by the pair of intermediate conductor portions 802 and the pair of bridging portions 803. The pair of intermediate conductor portions 802 are formed apart from each other by a predetermined multiple of one coil-pitch, so as to allow the intermediate conductor portions 802 of the partial windings 801 of the other phases to be arranged therebetween in the circumferential direction. More particularly, in the present modification, the pair of intermediate conductor portions 802 are formed apart from each other by two coil-pitches and have one intermediate conductor portion 802 of one partial winding 801 of each of the other two phases arranged therebetween in the circumferential direction.

The pair of bridging portions 803 are formed in the same shape respectively on opposite axial sides of the pair of intermediate conductor portions 802. Each of the bridging portions 803 constitutes a portion of a corresponding one of the coil ends CE (see FIG. 82). Moreover, each of the bridging portions 803 is bent in a direction perpendicular to the pair of intermediate conductor portions 802, i.e., in a direction perpendicular to the axial direction.

In addition, the first partial windings 801A of the first coil modules 800A are different in the shape of the bridging portions 803 from the second partial windings 801B of the second coil modules 800B. In consideration of this difference, hereinafter, the bridging portions 803 of the first partial windings 801A will also be referred to as the "first bridging portions 803A" and the bridging portions 803 of the second partial windings 801B will also be referred to as the "second bridging portions 803B" (see FIG. 90).

Each of the intermediate conductor portions 802 of the partial windings 801 is provided as one of coil side conductor portions that are arranged one by one in the circumferential direction at the coil side part CS. On the other hand, each of the bridging portions 803 of the partial windings 801 is provided as a coil end conductor portion that connects, at a corresponding one of the coil ends CE, a pair of the intermediate conductor portions 802 of the same phase located respectively at two different circumferential positions.

As shown in FIG. 92, each of the first partial windings 801A is formed, by winding the electrical conductor wire CR multiply, so as to have a substantially rectangular transverse cross section. FIG. 92 shows a transverse cross section of one of the first coil modules 800A at the intermediate conductor portions 802 of the first partial winding 801A. As seen from FIG. 92, in the intermediate conductor portions 802 of the first partial winding 801A, the electrical conductor wire CR is wound multiply (or as a plurality of turns) so that parts (or turns) of the electrical conductor wire CR (or the first partial winding 801A) extend parallel to each other and are aligned with one another circumferentially and radially. That is, each of the first partial windings 801A is formed to have a substantially rectangular transverse cross section with parts of the electrical conductor wire CR both circumferentially aligned in a plurality of rows and radially-aligned in a plurality of rows in the intermediate conductor portions 802. On the other hand, in distal end parts of the first bridging portions 803A, due to the radial bending of the first partial winding 801A, the electrical conductor wire CR is wound multiply (or as a plurality of turns) so that parts (or turns) of the electrical conductor wire CR extend parallel to each other and are aligned with one another axially and radially. In addition, in the present modification, the electrical conductor wire CR is multiply wound in a concentric-winding manner. However, the electrical conductor wire CR may alternatively be multiply wound in other winding manners, such as in an alpha winding manner.

In each of the first partial windings 801A, both end portions of the electrical conductor wire CR are led out from only one of the two first bridging portions 803A (i.e., from the upper first bridging portion 803A in FIG. 91(*b*)); the end portions respectively constitute winding end portions 804 and 805 of the first partial winding 801A. Moreover, the winding end portions 804 and 805 respectively represent the winding start end and the winding finish end of the electrical conductor wire CR. In addition, one of the winding end portions 804 and 805 is connected to an electric current input/output terminal, whereas the other of the winding end portions 804 and 805 is connected to a neutral point.

Moreover, in each of the first partial windings 801A, each of the intermediate conductor portions 802 is covered with a sheet-like insulating coat 807. In addition, in FIG. 91(*a*), there is shown one of the first coil modules 800A in a state where the intermediate conductor portions 802 are covered with and thus present inside the corresponding insulating coats 807; however, for the sake of convenience, the intermediate conductor portions 802 covered with the corresponding insulating coats 807 are still designated by the reference numeral 802 (the same applies to FIG. 95(*b*) as well).

Figure 93:
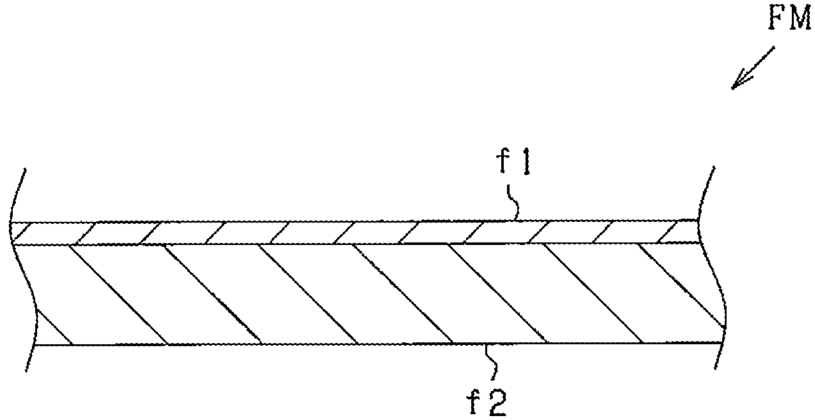
FIG. 93 is a cross-sectional view illustrating the cross-sectional structure of a film material in the fifteenth modification.

Each of the insulating coats 807 is formed by winding a film material FM around the corresponding intermediate conductor portion 802. The film material FM has an axial length not smaller than the axial length of an insulation covering range of the corresponding intermediate conductor portion 802. The film material FM may be implemented by, for example, a PEN (polyethylene naphthalate) film. More specifically, as shown in FIG. 93, the film material FM includes a film substrate f1 and a foamable adhesive layer f2 provided on one of two major surfaces of the film substrate f1. The film material FM is wound around the corresponding intermediate conductor portion 802 in such a manner as to be bonded by the adhesive layer f2 to the corresponding intermediate conductor portion 802. In addition, the adhesive layer f2 may alternatively be implemented by a non-formable adhesive.

As shown in FIG. 92, each of the intermediate conductor portions 802 has a substantially rectangular transverse cross section with parts of the electrical conductor wire CR aligned with one another circumferentially and radially. Moreover, each of the intermediate conductor portions 802 has the film material FM wound therearound so as to have end portions of the film material FM overlapping each other in the circumferential direction. The film material FM is a rectangular sheet whose longitudinal dimension is longer than the axial length of the intermediate conductor portion 802 and whose lateral dimension is longer than the length of one circumference of the intermediate conductor portion 802. The film material FM is wound, in a state of being folded according to the cross-sectional shape of the intermediate conductor portion 802, around the intermediate conductor portion 802. After the film material FM is wound around the intermediate conductor portion 802, the gap between the electrical conductor wire CR of the intermediate conductor portion 802 and the film substrate f1 is filled by the foaming of the adhesive layer f2. Further, the end portions of the film material FM, which overlap each other in the circumferential direction, are bonded together by the adhesive layer f2.

For each of the intermediate conductor portions 802, the corresponding insulating coat 807 is provided so as to cover all of two circumferential side surfaces and two radial side surfaces of the intermediate conductor portion 802. Moreover, the corresponding insulating coat 807 has an overlap part OL where the end portions of the film material FM overlap each other in the circumferential direction; the overlap part OL is located on a part of the intermediate conductor portion 802 which faces one of the intermediate conductor portions 802 of the partial windings 801 of the other phases, i.e., on one of the two circumferential side surfaces of the intermediate conductor portion 802. In the present modification, for the pair of intermediate conductor portions 802 of each of the partial windings 801, the overlap parts OL of the corresponding insulating coats 807 are located on the same side in the circumferential direction.

In each of the first partial windings 801A, the corresponding insulating coats 807 are provided in a range extended from the intermediate conductor portions 802 to parts of the first bridging portions 803A that are located respectively on opposite axial sides of the intermediate conductor portions 802 and covered respectively with the insulating covers 811 and 812 (i.e., to parts of the first partial winding 801A which are located respectively inside the insulating covers 811 and 812). More specifically, referring to FIG. 89, in each of the first coil modules 800A, the first partial winding 801A is covered with neither of the insulating covers 811 and 812 in a range of AX1; and the corresponding insulating coats 807 are provided in a range extended both upward and downward than the range of AX1.

Next, the configurations of the insulating covers 811 and 812 will be described.

In each of the first partial windings 801A, the insulating cover 811 is mounted on that first bridging portion 803A of the first partial winding 801A which is located on one axial side, whereas the insulating cover 812 is mounted on that first bridging portion 803A of the first partial winding 801A which is located on the other axial side. The configuration of the insulating cover 811 is illustrated in FIGS. 94(*a*) and 94(*b*), which are perspective views of the insulating cover 811 respectively from two different directions.

Figure 94A:
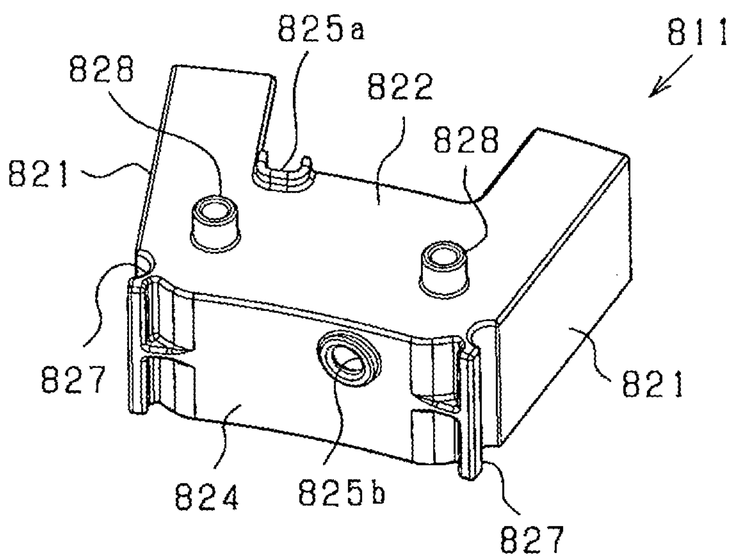
FIGS. 94(*a*) and 94(*b*) are perspective views illustrating the configuration of an insulating cover of the first coil module in the fifteenth modification.
Figure 94B:
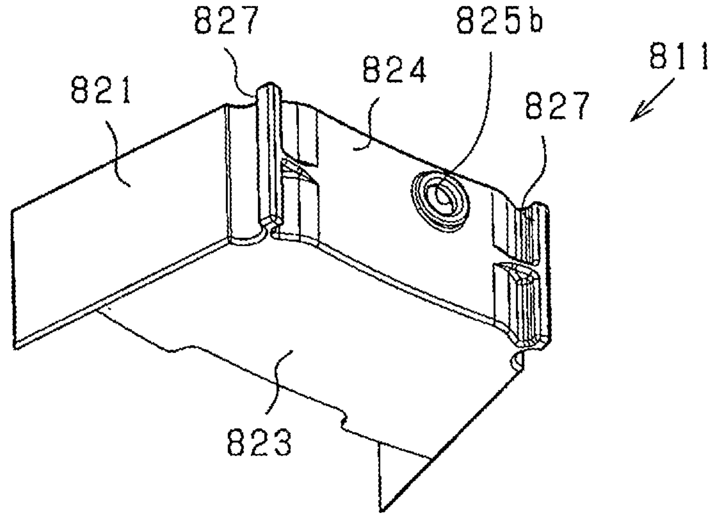

As shown in FIGS. 94(*a*) and 94(*b*), the insulating cover 811 has a pair of side walls 821 respectively on opposite sides in the circumferential direction, an outer wall 822 on the axially outer side, an inner wall 823 on the inner side in the axial direction, and a front wall 824 on the radially inner side. These walls 821-824 are each plate-shaped, and connected to each other in a three-dimensional shape such that the insulating cover 811 opens only on the radially outer side. Each of the side walls 821 is provided so as to extend, after the assembly of the coil modules 800 to the core assembly CA, toward the axis of the core assembly CA. After all the first coil modules 800A are arranged in alignment with each other in the circumferential direction, for each circumferentially-adjacent pair of the first coil modules 800A, a pair of the side walls 821 of the insulating covers 811 of the pair of the first coil modules 800A circumferentially face each other in a state of being in contact with or in close proximity to each other. Consequently, it becomes possible to suitably arrange all the first coil modules 800A in an annular shape while securing electrical insulation between each circumferentially-adjacent pair of the first coil modules 800A.

In the insulating cover 811, the outer wall 822 has an opening 825*a* for leading out (or taking out) the winding end portion 804 of the first partial winding 801A; and the front wall 824 has an opening 825*b* for leading out the winding end portion 805 of the first partial winding 801A. In addition, the winding end portion 804 of the first partial winding 801A is led out from the opening 825*a* of the outer wall 822 in the axial direction, whereas the winding end portion 805 of the first partial winding 801A is led out from the opening 825*b* of the front wall 824 in the radial direction.

Moreover, in the insulating cover 811, a pair of recesses 827 are formed respectively in the pair of side walls 821 and at the positions of the circumferential ends of the front wall 824, i.e., the positions where the front wall 824 intersects the pair of side walls 821; each of the recesses 827 is semicircular in cross-sectional shape and extends in the axial direction. Further, a pair of protrusions 828 are formed on the outer wall 822 and respectively on opposite sides of a centerline of the insulating cover 811 in the circumferential direction so as to be symmetrical with respect to the centerline; each of the protrusions 828 extends in the axial direction.

The explanation of the recesses 827 of the insulating cover 811 is supplemented here. As shown in FIG. 92, each of the first bridging portions 803A of the first partial windings 801A has such a curved shape as to be convex radially inward, i.e., toward the core assembly CA. Consequently, between each circumferentially-adjacent pair of the first bridging portions 803A of the first partial windings 801A, there is formed a gap whose width increases in the direction toward the distal ends of the first bridging portions 803A, i.e., in the radially inward direction. In view of the above, in the present modification, the recesses 827 are respectively formed, in the side walls 821, at positions outside the curved parts of the first bridging portions 803A by utilizing the gaps between the first bridging portions 803A located adjacent to one another in the circumferential direction.

In addition, each of the first partial windings 801A may have a temperature detector (e.g., thermistor) provided therein. In this case, the insulating cover 811 may further have formed therein an opening for leading out a signal line extending from the temperature detector. Consequently, the temperature detector could be suitably received in the insulating cover 811.

The insulating cover 812 provided on the other axial side has substantially the same configuration as the insulating cover 811. Therefore, hereinafter, the insulating cover 812 will be described briefly without referring to the drawings. Similar to the insulating cover 811, the insulating cover 812 has a pair of side walls 821 respectively on opposite sides in the circumferential direction, an outer wall 822 on the axially outer side, an inner wall 823 on the inner side in the axial direction, and a front wall 824 on the radially inner side. Moreover, in the insulating cover 812, a pair of semicircular recesses 827 are formed respectively in the pair of side walls 821 and at the positions of the circumferential ends of the front wall 824. Further, a pair of protrusions 828 are formed on the outer wall 822. On the other hand, unlike the insulating cover 811, the insulating cover 812 has no openings for leading out the winding end portions 804 and 805 of the first partial winding 801A.

The insulating covers 811 and 812 differ from each other in the axial height (i.e., the width of the pair of side walls 821 and the front wall 824 in the axial direction). Specifically, as shown in FIG. 89, the axial height W11 of the insulating cover 811 and the axial height W12 of the insulating cover 812 are set to satisfy the relationship of W11>W12. More specifically, when the electrical conductor wire CR is wound multiply, it is necessary to switch the winding turns of the electrical conductor wire CR (or to lane-change the electrical conductor wire CR) in a direction perpendicular to the winding direction (or circumferential direction); thus, the winding width may be increased due to the switching. In addition, of the insulating covers 811 and 812, the insulating cover 811 is a cover which covers the first bridging portion 803A that includes the winding start end and the winding finish end of the electrical conductor wire CR. At the first bridging portion 803A that includes the winding start end and the winding finish end of the electrical conductor wire CR, the winding margin (or overlapping margin) of the electrical conductor wire CR and thus the winding width may become larger than at the other portions of the first partial winding 801A. Taking this fact into account, the axial height W11 of the insulating cover 811 is set to be larger than the axial height W12 of the insulating cover 812. Consequently, unlike in the case of setting the axial heights W11 and W12 of the insulating covers 811 and 812 to be equal to each other, it becomes possible to prevent the number of turns of the electrical conductor wire CR from being limited by the insulating covers 811 and 812.

Next, the configuration of each of the second coil modules 800B will be described.

Figure 95A:
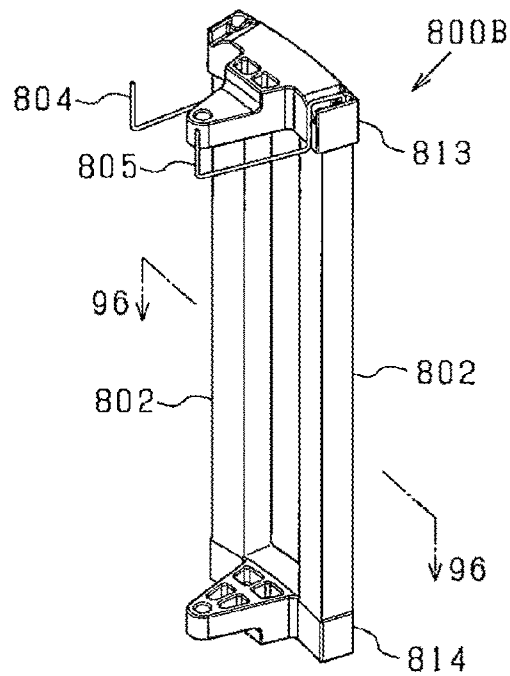
FIGS. 95(*a*) and 95(*b*) are perspective views illustrating the configuration of the second coil module in the fifteenth modification.
Figure 95B:
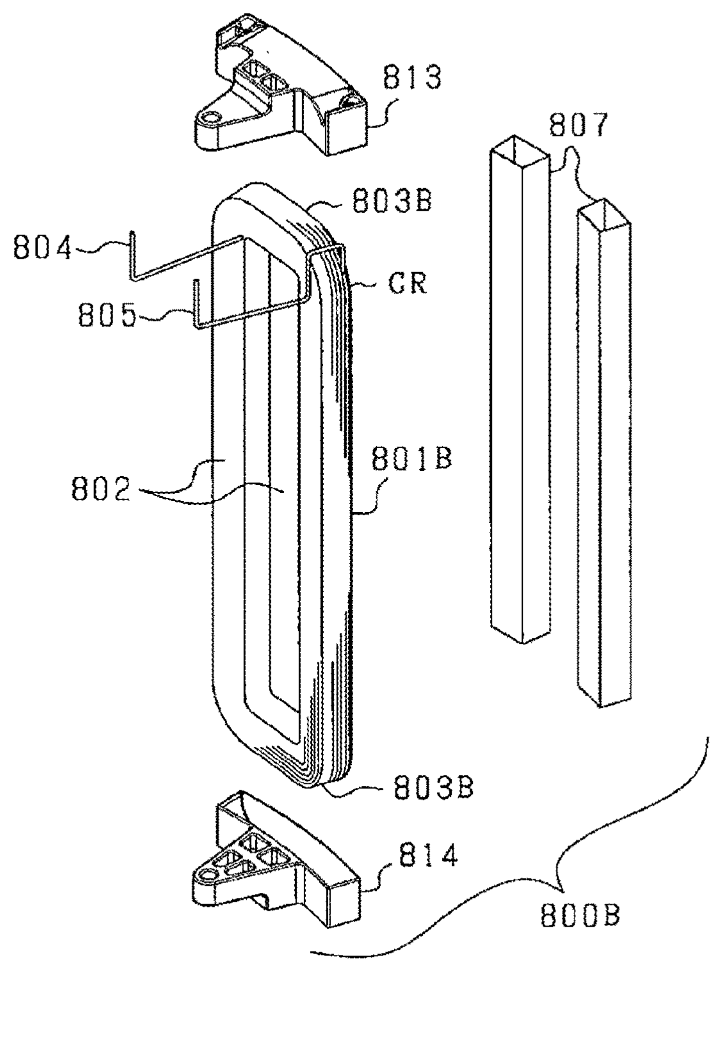
Figure 96:
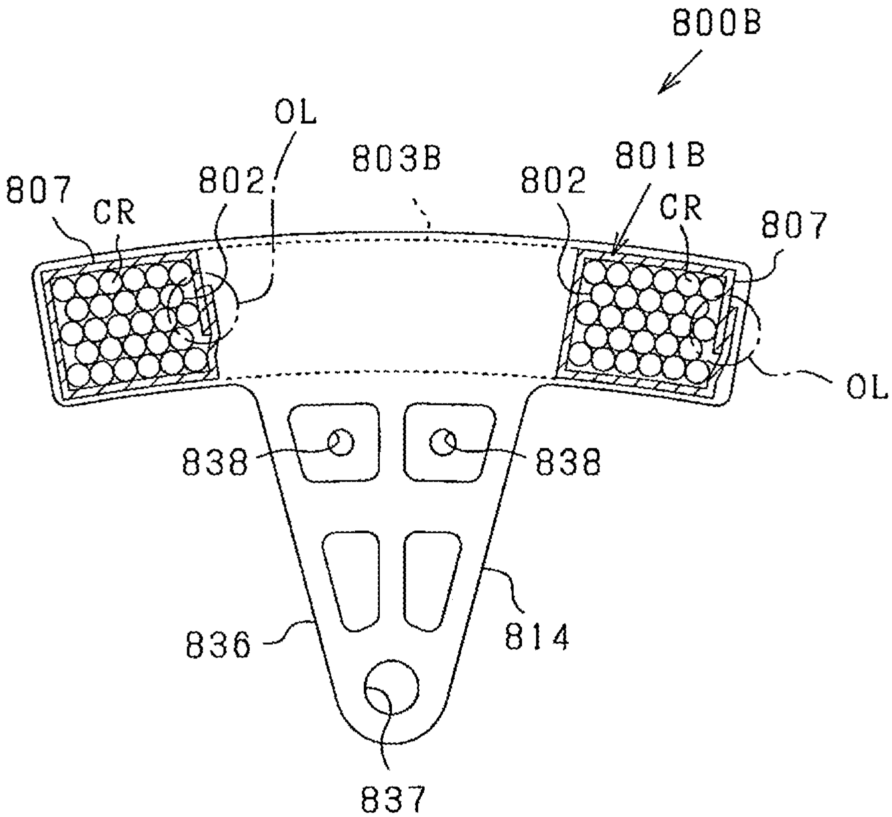
FIG. 96 is a cross-sectional view taken along the line 96-96 in FIG. 95(*a*)

FIG. 95(*a*) is a perspective view illustrating the configuration of each of the second coil modules 800B. FIG. 95(*b*) is a perspective view showing the components of each of the second coil modules 800B in an exploded manner. FIG. 96 is a cross-sectional view taken along the line 96-96 in FIG. 95(*a*).

As shown in FIGS. 95(*a*) and 95(*b*), each of the second coil modules 800B has the second partial winding 801B formed by winding the electrical conductor wire CR multiply (or as a plurality of turns) and the insulating covers 813 and 814 mounted respectively on opposite axial end portions of the second partial winding 801B. The insulating covers 813 and 814 are formed of an electrically-insulative material such as a synthetic resin.

The second partial winding 801B has a pair of intermediate conductor portions 802 extending straight and parallel to each other, and a pair of second bridging portions 803B connecting the pair of intermediate conductor portions 802 respectively on opposite axial sides of the pair of intermediate conductor portions 802. The second partial winding 801B is formed into a ring shape by the pair of intermediate conductor portions 802 and the pair of second bridging portions 803B. The intermediate conductor portions 802 of the second partial winding 801B have the same configuration as the intermediate conductor portions 802 of the first partial winding 801A described above. On the other hand, the second bridging portions 803B of the second partial winding 801B have a different configuration from the first bridging portions 803A of the first partial winding 801A described above. That is, unlike the first bridging portions 803A of the first partial winding 801A, the second bridging portions 803B of the second partial winding 801B extend straight in the axial direction from the intermediate conductor portions 802 without being radially bent. The difference between the first and second partial windings 801A and 801B is clearly shown in FIG. 90.

In the second partial winding 801B, both end portions of the electrical conductor wire CR are led out from only one of the two second bridging portions 803B (i.e., from the upper second bridging portion 803B in FIG. 95(*b*)); the end portions respectively constitute winding end portions 804 and 805 of the second partial winding 801B. Moreover, the winding end portions 804 and 805 respectively represent the winding start end and the winding finish end of the electrical conductor wire CR. In addition, one of the winding end portions 804 and 805 is connected to an electric current input/output terminal, whereas the other of the winding end portions 804 and 805 is connected to the neutral point.

In the second partial winding 801B, each of the intermediate conductor portions 802 is covered with a sheet-like insulating coat 807. Each of the insulating coats 807 is formed by winding a film material FM around the corresponding intermediate conductor portion 802. The film material FM has an axial length not smaller than the axial length of an insulation covering range of the corresponding intermediate conductor portion 802.

The configuration of the insulating coats 807 is substantially the same for the first and second partial windings 801A and 801B. That is, as shown in FIG. 96, in the second partial winding 801B, each of the intermediate conductor portions 802 has the film material FM wound therearound so as to have end portions of the film material FM overlapping each other in the circumferential direction. For each of the intermediate conductor portions 802, the corresponding insulating coat 807 is provided so as to cover all of two circumferential side surfaces and two radial side surfaces of the intermediate conductor portion 802. Moreover, the corresponding insulating coat 807 has an overlap part OL where the end portions of the film material FM overlap each other in the circumferential direction; the overlap part OL is located on a part of the intermediate conductor portion 802 which faces one of the intermediate conductor portions 802 of the partial windings 801 of the other phases, i.e., on one of the two circumferential side surfaces of the intermediate conductor portion 802. In the present modification, for the pair of intermediate conductor portions 802 of the second partial winding 801B, the overlap parts OL of the corresponding insulating coats 807 are located on the same side in the circumferential direction.

In the second partial winding 801B, the corresponding insulating coats 807 are provided in a range extended from the intermediate conductor portions 802 to parts of the second bridging portions 803B that are located respectively on opposite axial sides of the intermediate conductor portions 802 and covered respectively with the insulating covers 813 and 814 (i.e., to parts of the second partial winding 801B which are located respectively inside the insulating covers 813 and 814). More specifically, referring to FIG. 89, in each of the second coil modules 800B, the second partial winding 801B is covered with neither of the insulating covers 813 and 814 in a range of AX2; and the corresponding insulating coats 807 are provided in a range extended both upward and downward than the range of AX2.

As described above, in the present modification, in each of the first and second partial windings 801A and 801B, the corresponding insulating coats 807 are provided in a range including parts of the bridging portions 803A or 803B of the partial winding. That is, in each of the first and second partial windings 801A and 801B, the corresponding insulating coats 807 are provided on parts of the bridging portions 803A or 803B which extend straight respectively from the intermediate conductor portions 802 as well as on the intermediate conductor portions 802. However, since the axial length of the first partial windings 801A is different from the axial length of the second partial windings 801B, the axial range of the corresponding insulating coats 807 is accordingly different between the first partial windings 801A and the second partial windings 801B.

Next, the configurations of the insulating covers 813 and 814 will be described.

In each of the second partial windings 801B, the insulating cover 813 is mounted on that second bridging portion 803B of the second partial winding 801B which is located on one axial side, whereas the insulating cover 814 is mounted on that second bridging portion 803B of the second partial winding 801B which is located on the other axial side. The configuration of the insulating cover 813 is illustrated in FIGS. 97(*a*) and 97(*b*), which are perspective views of the insulating cover 813 respectively from two different directions.

Figure 97A:
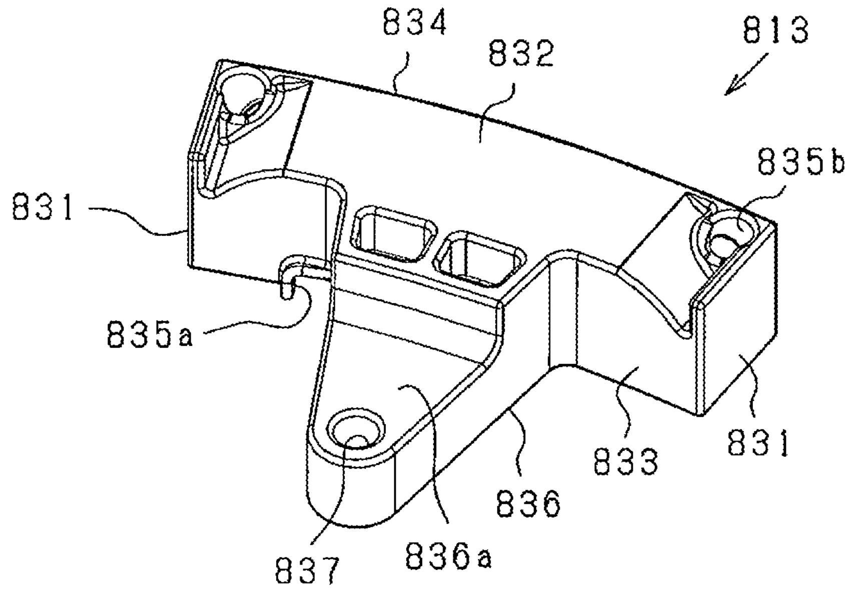
FIGS. 97(*a*) and 97(*b*) are perspective views illustrating the configuration of an insulating cover of the second coil module in the fifteenth modification.
Figure 97B:
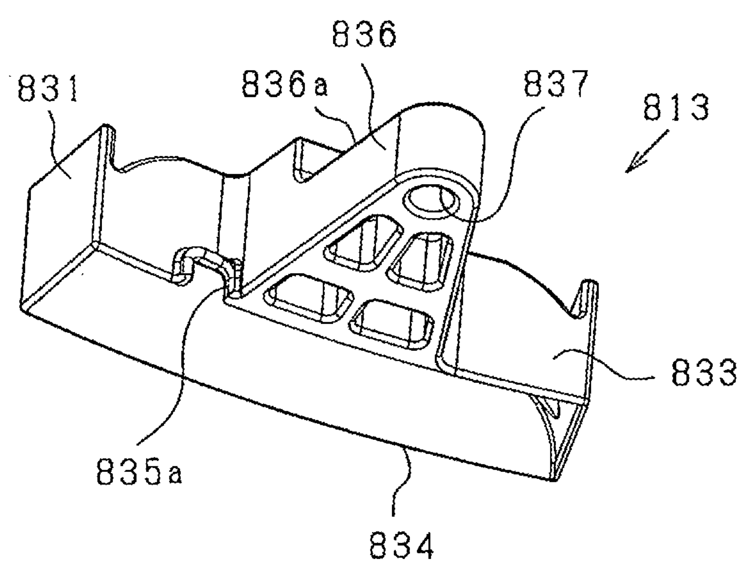

As shown in FIGS. 97(*a*) and 97(*b*), the insulating cover 813 has a pair of side walls 831 respectively on opposite sides in the circumferential direction, an outer wall 832 on the axially outer side, a front wall 833 on the radially inner side and a rear wall 834 on the radially outer side. These walls 831-834 are each plate-shaped, and connected to each other in a three-dimensional shape such that the insulating cover 813 opens only on the axially inner side. Each of the side walls 831 is provided so as to extend, after the assembly of the coil modules 800 to the core assembly CA, toward the axis of the core assembly CA. After all the second coil modules 800B are arranged in alignment with each other in the circumferential direction, for each circumferentially-adjacent pair of the second coil modules 800B, a pair of the side walls 831 of the insulating covers 813 of the pair of the second coil modules 800B circumferentially face each other in a state of being in contact with or in close proximity to each other. Consequently, it becomes possible to suitably arrange all the second coil modules 800B in an annular shape while securing electrical insulation between each circumferentially-adjacent pair of the second coil modules 800B.

In the insulating cover 813, the front portion 833 has an opening 835*a* for leading out (or taking out) the winding end portion 804 of the second partial winding 801B; and the outer wall 832 has an opening 835*b* for leading out the winding end portion 805 of the second partial winding 801B.

On the front wall 833 of the insulating cover 813, there is formed a protruding portion 836 that protrudes radially inward. Specifically, the protruding portion 836 is formed, at the center position between the two ends of the insulating cover 813 in the circumferential direction, so as to protrude radially inward from the second bridging portion 803B of the second partial winding 801B. The protruding portion 836 has such a tapered shape as to taper radially inward in a plan view. In a distal end part of the protruding portion 836, there is formed a through-hole 837 that extends in the axial direction. In addition, the configuration of the protruding portion 836 may be arbitrary, provided that it protrudes radially inward from the second bridging portion 803B of the second partial winding 801B and has through-hole 837 formed at the center position between the two ends of the insulating cover 813 in the circumferential direction. However, considering a state of the insulating cover 813 overlapping the insulating covers 811 of the first coil modules 800A located axially inside the insulating cover 813, it is preferable for the insulating cover 813 to be formed with a small circumferential width so as to avoid interference with the winding end portions 804 and 805.

The axial thickness of the protruding portion 836 is reduced stepwise at the distal end part thereof on the radially inner side. The through-hole 837 is formed in a lower step part 836*a* of the protruding portion 836 which has a reduced axial thickness. After the second coil module 800B is assembled to the core assembly CA, the height from the axial end face of the inner cylinder member 751 is smaller at the lower step part 836*a* than at the second bridging portion 803B of the second partial winding 801B.

Moreover, as shown in FIG. 96, in the protruding portion 836, there are also formed through-holes 838 that penetrate the protruding portion 836 in the axial direction. Consequently, it becomes possible to fill, in a state of the insulating covers 811 and 813 overlapping each other in the axial direction, an adhesive between the insulating covers 811 and 813 through the through-holes 838.

The insulating cover 814 provided on the other axial side has substantially the same configuration as the insulating cover 813. Therefore, hereinafter, the insulating cover 814 will be described briefly without referring to the drawings. Similar to the insulating cover 813, the insulating cover 814 has a pair of side walls 831 respectively on opposite sides in the circumferential direction, an outer wall 832 on the axially outer side, a front wall 833 on the radially inner side and a rear wall 834 on the radially outer side. Moreover, the insulating cover 814 also has a protruding portion 836 formed on the front wall 833 to protrude radially inward, and a through-hole 837 formed in a distal end part of the protruding portion 836. On the other hand, unlike the insulating cover 813, the insulating cover 814 has no openings for leading out the winding end portions 804 and 805 of the second partial winding 801B.

The insulating covers 813 and 814 differ from each other in the radial width of the pair of side walls 831. Specifically, as shown in FIG. 89, the radial width W21 of the side walls 831 of the insulating cover 813 and the radial width W22 of the side walls 831 of the insulating cover 814 are set to satisfy the relationship of W21>W22. More specifically, of the insulating covers 813 and 814, the insulating cover 813 is a cover which covers the second bridging portion 803B that includes the winding start end and the winding finish end of the electrical conductor wire CR. At the second bridging portion 803B that includes the winding start end and the winding finish end of the electrical conductor wire CR, the winding margin (or overlapping margin) of the electrical conductor wire CR and thus the winding width may become larger than at the other portions of the second bridging portion 803B. Taking this fact into account, the radial width W21 of the side walls 831 of the insulating cover 813 is set to be larger than the radial width W22 of the side walls 831 of the insulating cover 814. Consequently, unlike in the case of setting the radial widths W21 and W22 of the insulating covers 813 and 814 to be equal to each other, it becomes possible to prevent the number of turns of the electrical conductor wire CR from being limited by the insulating covers 813 and 814.

Figure 98:
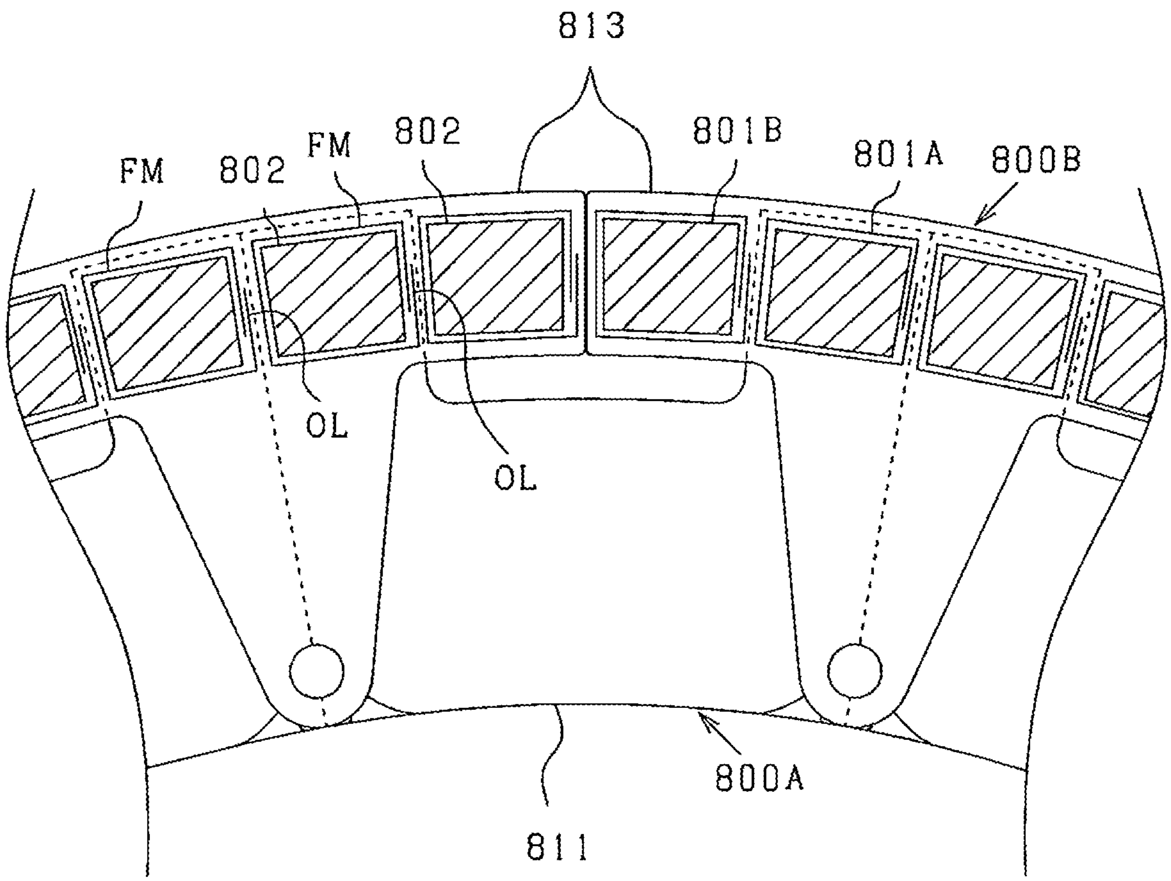
FIG. 98 is a partial cross-sectional view illustrating the overlap positions of the film material in a state where coil modules are arranged in a circumferential direction in the fifteenth modification.

FIG. 98 illustrates the overlap positions of the film material FM in a state where the first and second coil modules 800A and 800B are arranged in alignment with each other in the circumferential direction. As described above, in each of the first and second coil modules 800A and 800B, each of the intermediate conductor portions 802 has the film material FM wound therearound so that the end portions of the film material FM overlap each other in the circumferential direction on a part of the intermediate conductor portion 802 which faces one of the intermediate conductor portions 802 of the partial windings 801 of the other phases, i.e., on one of the two circumferential side surfaces of the intermediate conductor portion 802 (see FIGS. 92 and 96). Moreover, after the first and second coil modules 800A and 800B are arranged in alignment with each other in the circumferential direction, all the overlap parts OL of the film material FM in the coil modules 800A and 800B are located on the same side (i.e., the right side in FIG. 98) in the circumferential direction. Accordingly, in each circumferentially-adjacent pair of the intermediate conductor portions 802 of the partial windings 801A and 801B of different phases, the overlap parts OL of the film material FM are not superposed on each other in the circumferential direction. Consequently, between each circumferentially-adjacent pair of the intermediate conductor portions 802, there are interposed a maximum of three layers of the film material FM.

Next, the configuration related to the assembly of the coil modules 800A and 800B to the core assembly CA will be described.

In the present modification, the axial length of the first coil modules 800A is different from the axial length of the second coil modules 800B. Moreover, the shape of the first bridging portions 803A of the first partial windings 801A is different from the shape of the second bridging portions 803B of the second partial windings 801B. The coil modules 800A and 800B are mounted to the core assembly CA with the first bridging portions 803A of the first partial windings 801A located on the axially inner side and the second bridging portions 803B of the second partial windings 801B located on the axially outer side. Regarding the insulating covers 811-814, they are fixed to the core assembly CA so that: the insulating covers 811 and the insulating covers 813 overlap each other in the axial direction on one axial side of the coil modules 800A and 800B; and the insulating covers 812 and the insulating covers 814 overlap each other in the axial direction on the other axial side of the coil modules 800A and 800B.

Figure 99:
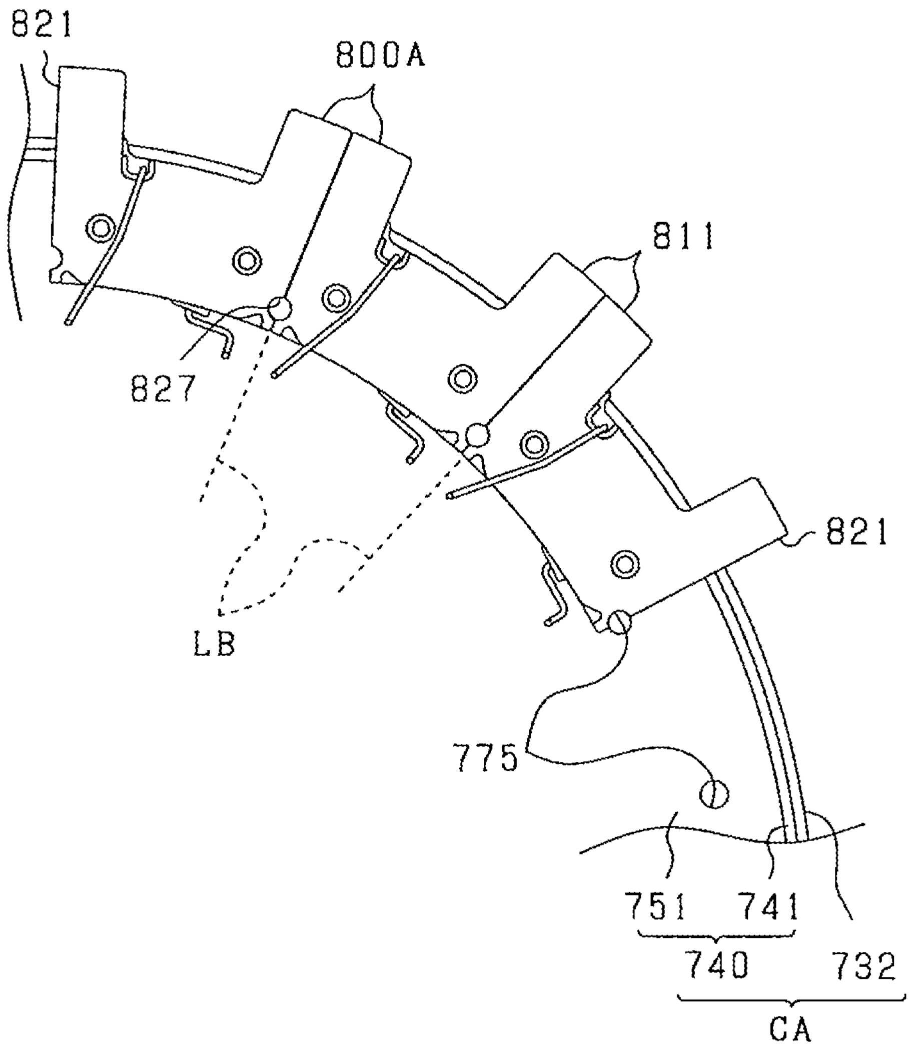
FIG. 99 is a plan view showing first coil modules in a state of having been assembled to the core assembly in the fifteenth modification.
Figure 100:
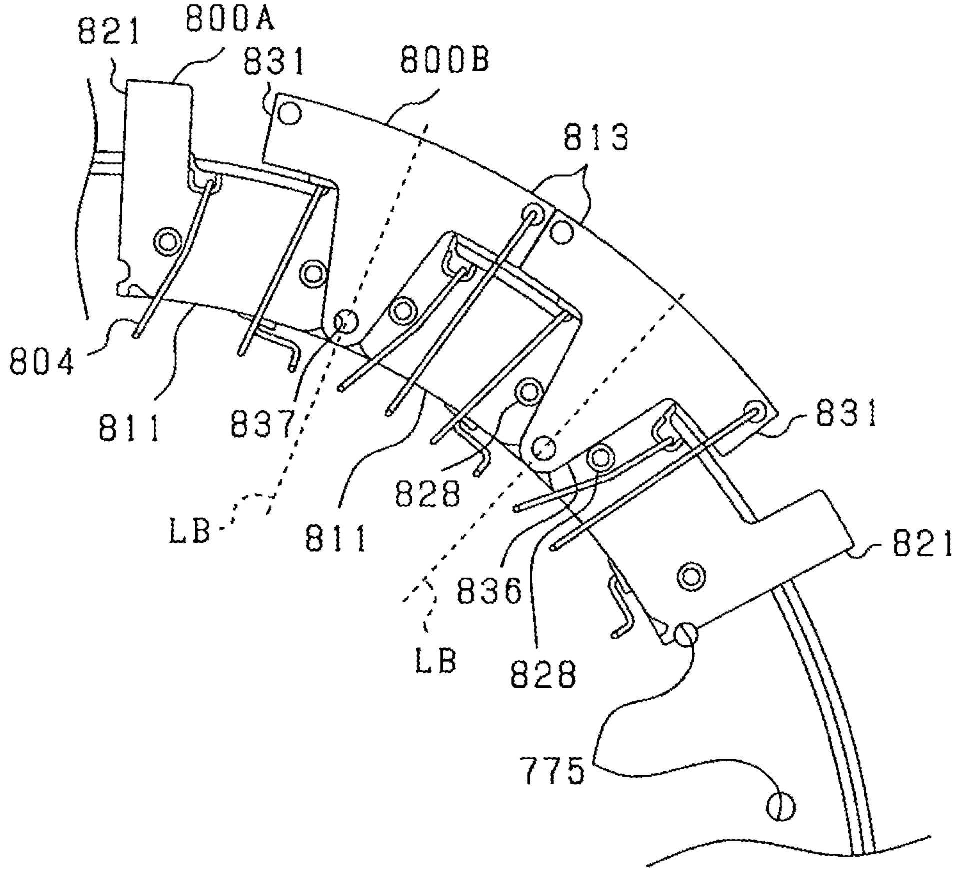
FIG. 100 is a plan view showing both the first coil modules and second coil modules in a state of having been assembled to the core assembly in the fifteenth modification.
Figure 101A:
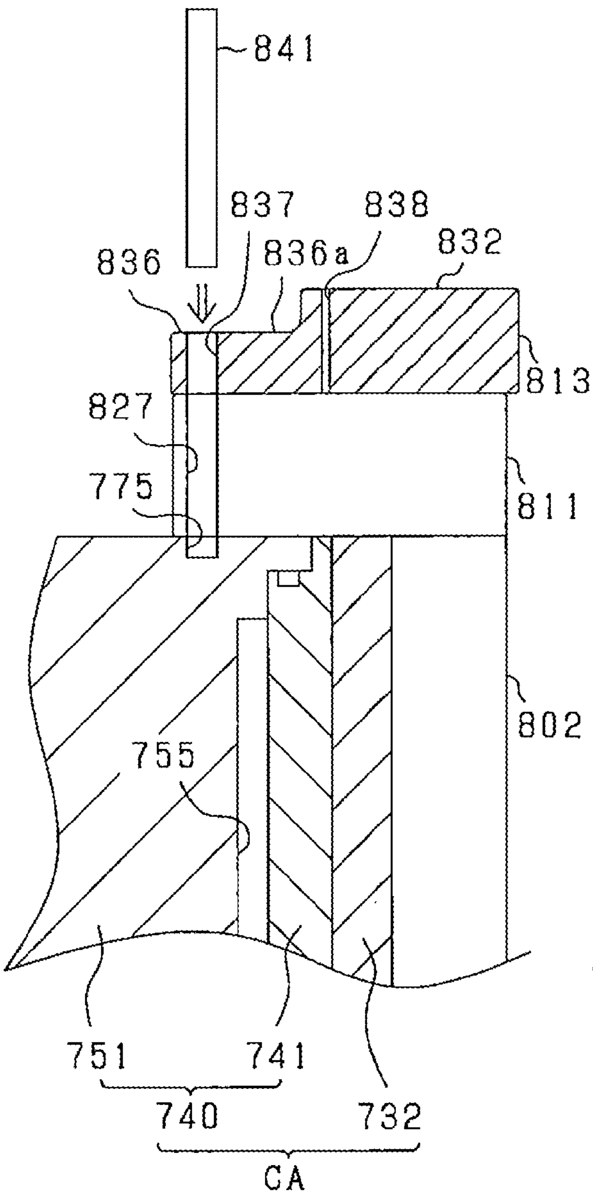
FIGS. 101(*a*) and 101(*b*) are longitudinal cross-sectional views illustrating the fixing of the first and second coil modules to the core assembly by fixing pins in the fifteenth modification.
Figure 101B:
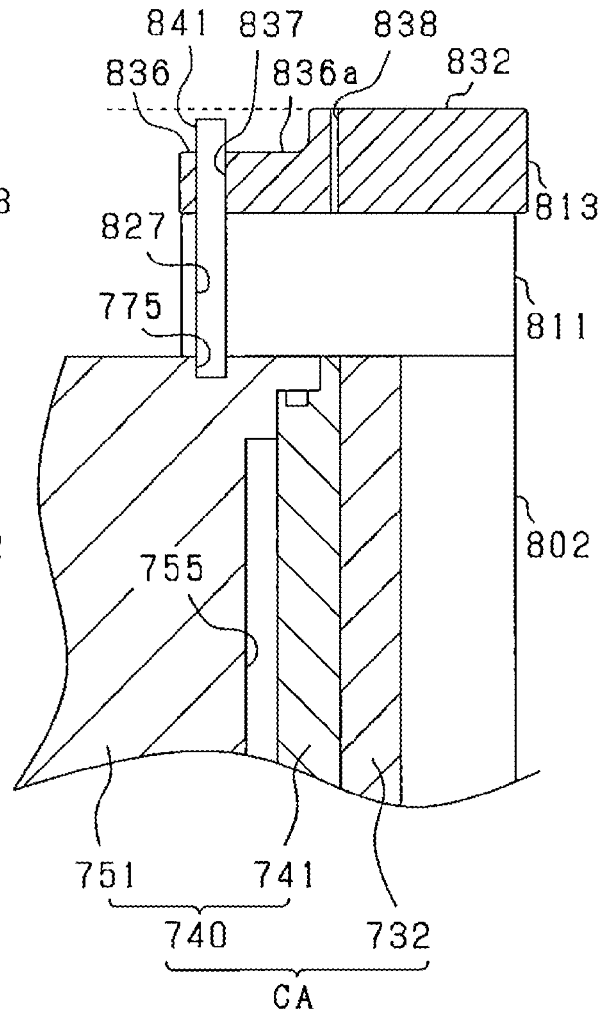

FIG. 99 is a plan view showing the insulating covers 811 arranged side by side in the circumferential direction in the state of the first coil modules 800A having been assembled to the core assembly CA. FIG. 100 is a plan view showing both the insulating covers 811 arranged side by side in the circumferential direction and the insulating covers 813 arranged side by side in the circumferential direction in the state of the first coil modules 800A and the second coil modules 800B having been assembled to the core assembly CA. FIG. 101(*a*) is a longitudinal cross-sectional view showing the assembly of the coil modules 800A and 800B to the core assembly CA before the fixing of the coil modules 800A and 800B to the core assembly CA by fixing pins 841. FIG. 101(*b*) is a longitudinal cross-sectional view showing the assembly of the coil modules 800A and 800B to the core assembly CA after the fixing of the coil modules 800A and 800B to the core assembly CA by the fixing pins 841.

As shown in FIG. 99, in a state of the first coil modules 800A having been assembled to the core assembly CA, the insulating covers 811 are arranged in the circumferential direction with the side walls 821 thereof in contact with or in close proximity to one another. More specifically, the insulating covers 811 are arranged such that the boundary lines LB between facing pairs of the side walls 821 respectively coincide with the recesses 775 formed in the axial end face of the inner cylinder member 751. Consequently, with each circumferentially-adjacent pair of the side walls 821 of the insulating covers 811 placed in contact with or in close proximity to each other, a plurality of through-holes are formed each of which is constituted of a circumferentially-adjacent pair of the recesses 827 of the insulating covers 811 and extends in the axial direction. In addition, the through-holes constituted of the recesses 827 of the insulating covers 811 are axially aligned respectively with the recesses 775 formed in the axial end face of the inner cylinder member 751.

Moreover, as shown in FIG. 100, the second coil modules 800B are further assembled to the core assembly CA and the first coil modules 800A which are integrated into one piece. Consequently, the insulating covers 813 are arranged in the circumferential direction with the side walls 831 thereof in contact with or in close proximity to one another. Moreover, the first bridging portions 803A of the first partial windings 801A and the second bridging portions 803B of the second partial windings 801B are arranged so as to intersect one another on an imaginary circle on which the intermediate conductor portions 802 of the first and second partial windings 801A and 801B are aligned with each other in the circumferential direction. Furthermore, each of the insulating covers 813 is arranged so as to have the protruding portion 836 thereof axially overlapping a circumferentially-adjacent pair of the insulating covers 811 and the through-hole 837 of the protruding portion 836 axially connected (or axially aligned) with the through-hole constituted of a pair of the recesses 827 of the circumferentially-adjacent pair of the insulating covers 811.

Moreover, at this time, for each of the insulating covers 813, the protruding portion 836 of the insulating cover 813 is guided to a predetermined position by a pair of the protrusions 828 of a circumferentially-adjacent pair of the insulating covers 811. Consequently, the through-hole 837 formed in the protruding portion 836 is brought into axial alignment with both the through-hole constituted of a pair of the recesses 827 of the circumferentially-adjacent pair of the insulating covers 811 and a corresponding one of the recesses 775 formed in the axial end face of the inner cylinder member 751. More specifically, in the state of the coil modules 800A and 800B having been assembled to the core assembly CA, the recesses 827 of the insulating covers 811 are located behind the insulating covers 813; therefore, it may be difficult to axially align, for each of the insulating covers 813, the through-hole 837 formed in the protruding portion 836 of the insulating cover 813 with the through-hole constituted of a pair of the recesses 827 of a circumferentially-adjacent pair of the insulating covers 811. In this regard, in the present modification, with the protruding portion 836 of the insulating cover 813 being guided by a pair of the protrusions 828 of a circumferentially-adjacent pair of the insulating covers 811, the through-hole 837 formed in the protruding portion 836 can be easily brought into axial alignment with the through-hole constituted of a pair of the recesses 827 of the circumferentially-adjacent pair of the insulating covers 811.

Then, as shown in FIGS. 101(*a*) and 101(*b*), for each of the insulating covers 813, the protruding portion 836 of the insulating cover 813 is fixed, by a fixing pin 841, to the circumferentially-adjacent pair of the insulating covers 811 that axially overlap the protruding portion 836. More specifically, with the through-hole 837 of the protruding portion 836 axially aligned with both the through-hole constituted of a pair of the recesses 827 of the circumferentially-adjacent pair of the insulating covers 811 and a corresponding one of the recesses 775 of the inner cylinder member 751, the fixing pin 841 is inserted into the through-hole 837, the through-hole constituted of the pair of the recesses 827 and the corresponding recess 775. Consequently, the insulating covers 811 and 813 are together fixed to the inner cylinder member 751. With the above configuration, each of the second coil modules 800B is fixed, together with a circumferentially-adjacent pair of the first coil modules 800A, to the core assembly CA by a common fixing pin 841 at the coil end CE.

It is preferable for the fixing pins 841 to be formed of a material having high thermal conductivity, such as a metal. In addition, in the present modification, the recesses 827 of the insulating covers 811 correspond to "first engaged portions"; the through-holes 837 of the insulating covers 813 correspond to "second engaged portions"; and the fixing pins 841 correspond to "fixing members".

As shown in FIG. 101(*b*), each of the fixing pins 841 is assembled to the lower step part 836*a* of the protruding portion 836 of a corresponding one of the insulating covers 813. In this state, an upper end portion of the fixing pin 841 protrudes upward from the lower step portion 836*a*, but not beyond an upper surface (or the outer wall 832) of the corresponding insulating cover 813. That is, the fixing pin 841 is longer than the axial height of the overlap part between the protruding portion 836 (more specifically, the lower step portion 836*a*) of the corresponding insulating cover 813 and a corresponding pair of the insulating cover 811, and thus has a margin for protruding upward from the overlap part. Consequently, it becomes possible to facilitate the insertion of the fixing pin 841 into the recesses 775 and 827 and the through-hole 837 (i.e., facilitate the fixing of the corresponding coil modules 800A and 800B to the core assembly CA by the fixing pin 841). Moreover, since the upper end portion of the fixing pin 841 does not protrude beyond the upper surface (or the outer wall 832) of the corresponding insulating cover 813, the axial length of the stator 730 is prevented from being increased due to the protrusion of the fixing pin 841.

After the fixing of the insulating covers 811 and 813 by the fixing pins 841, the adhesive is filled between the insulating covers 811 and 813 through the through-holes 838 formed in the insulating covers 813. Consequently, the insulating covers 811 and 813 overlapping each other in the axial direction are firmly bonded together. In addition, in FIGS. 101(*a*) and 101(*b*), for the sake of convenience, the through-hole 838 is shown in the range from the upper surface to the lower surface of the insulating cover 813; however, the through-hole 838 is actually formed in a thin plate portion of the insulating cover 813 which is formed by wall thinning or the like.

As shown in FIG. 101(*b*), the position of fixing the insulating covers 811 and 813 by the fixing pins 841 is on an axial end face of the stator holder 740 located on the radially inner side (i.e., the left side in the figure) of the stator core 732. The insulating covers 811 and 813 are fixed by the fixing pins 841 to the stator holder 740. That is, the first bridging portions 803A of the first partial windings 801A are fixed to the axial end face of the stator holder 740. In this case, since the coolant passage 755 is formed in the stator holder 740, heat generated in the first partial windings 801A can be directly transferred from the first bridging portions 803A to the vicinity of the coolant passage 755 in the stator holder 740. Moreover, since the fixing pins 841 are inserted respectively in the recesses 775 of the stator holder 740, the heat transfer to the stator holder 740 can be enhanced through the fixing pins 841. Consequently, with the above configuration, it becomes possible to improve the performance of cooling the stator coil 731.

In the present modification, eighteen insulating covers 811 and eighteen insulating covers 813 are arranged respectively on the axially inner side and the axially outer side at the coil end CE so as to overlap each other in the axial direction. Moreover, eighteen recesses 775 are formed respectively at eighteen positions in the axial end face of the stator holder 740 (see FIG. 83). That is, the number of the recesses 775 is equal to the number of the insulating covers 811 and to the number of the insulating covers 813. Furthermore, eighteen fixing pins 841 for fixing the insulating covers 811 and 813 are inserted respectively in the eighteen recesses 775.

Next, the configuration related to the winding end portions 804 and 805 of the coil modules 800A and 800B assembled to the core assembly CA will be described with reference to FIG. 102.

Figure 102:
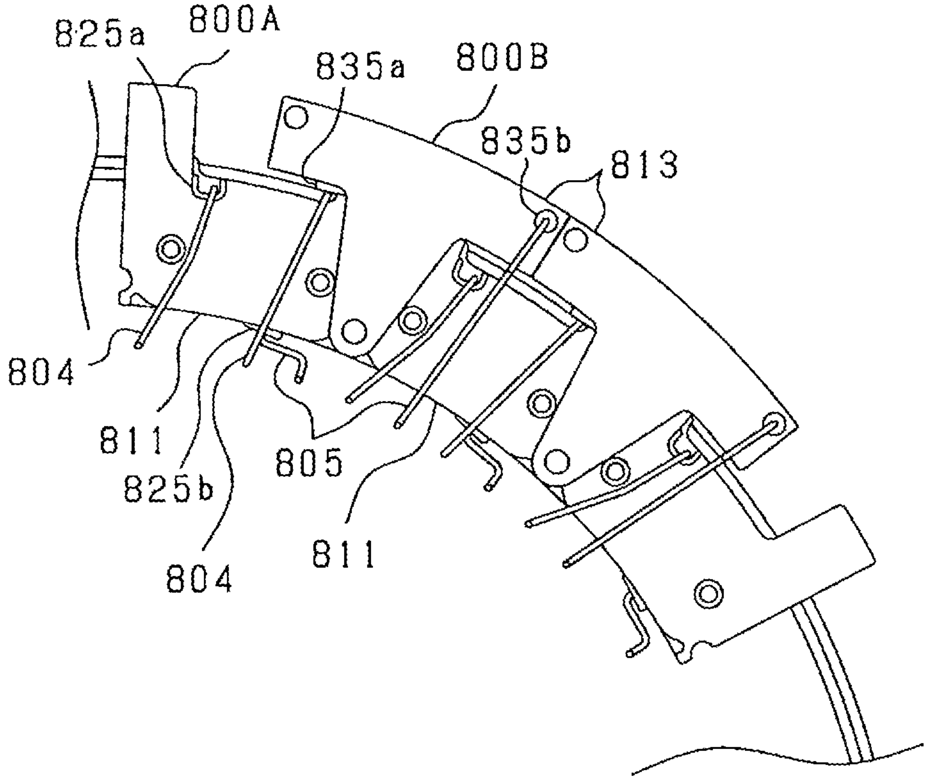
FIG. 102 is a plan view illustrating the configuration of winding end portions of the first and second coil modules in the fifteenth modification.

As shown in FIG. 102, the winding end portions 804 and 805 of the first partial windings 801A are led out (or taken out) of the insulating covers 811 through the openings 825*a* and 825*b*, and then extend radially inward. On the other hand, the winding end portions 804 and 805 of the second partial windings 801B are led out of the insulating covers 813 through the openings 835*a* and 835*b*, and then extend radially inward. In particular, the winding end portions 804 and 805 led out of the insulating covers 813 on the axially outer side extend so as to radially cross the insulating covers 811 on the axially inner side, and have middle parts thereof fixed to the upper surfaces (i.e., the outer walls 822) of the insulating covers 811.

Though not shown in the drawings, the insulating covers 812 and 814, which are located on the opposite axial side of the core assembly CA to the insulating covers 811 and 813, are fixed to the core assembly CA in a similar manner to the insulating covers 811 and 813. Specifically, in the state of the first coil modules 800A having been assembled to the core assembly CA, the insulating covers 812 are arranged in the circumferential direction with the side walls 821 thereof in contact with or in close proximity to one another. Consequently, a plurality of through-holes are formed each of which is constituted of a circumferentially-adjacent pair of the recesses 827 of the insulating covers 812 and extends in the axial direction. Moreover, the through-holes constituted of the recesses 827 of the insulating covers 812 are axially aligned respectively with the recesses 776 formed in the axial end face of the outer cylinder member 741. Further, in the state of the second coil modules 800B having been assembled to the assembly of the core assembly CA and the first coil modules 800A, the through-holes 837 of the insulating covers 814 are axially aligned respectively with the through-holes constituted of the recesses 827 of the insulating covers 812 and with the recesses 776 of the outer cylinder member 741. Then, the fixing pins 841 are inserted into the recesses 776 and 827 and the through-hole 837, thereby fixing the insulating covers 812 and 814 together to the outer cylinder member 741.

The coil modules 800A and 800B may be assembled to the core assembly CA by: first assembling all the first coil modules 800A to a radially outer part of the core assembly CA; then assembling all the second coil modules 800B to the assembly of the core assembly CA and the first coil modules 800A; and thereafter fixing all the coil modules 800A and 800B to the core assembly CA by the fixing pins 841. Alternatively, the coil modules 800A and 800B may be assembled to the core assembly CA by: first fixing a pair of the first coil modules 800A and one of the second coil modules 800B together to the core assembly CA by one of the fixing pins 841; and then repeating the assembling of one of the remaining first coil modules 800A, the assembling of one of the remaining second coil modules 800B and the fixing by one of the remaining fixing pins 841 in this order.

Next, the configuration of the busbar module 850 will be described.

Figure 103:
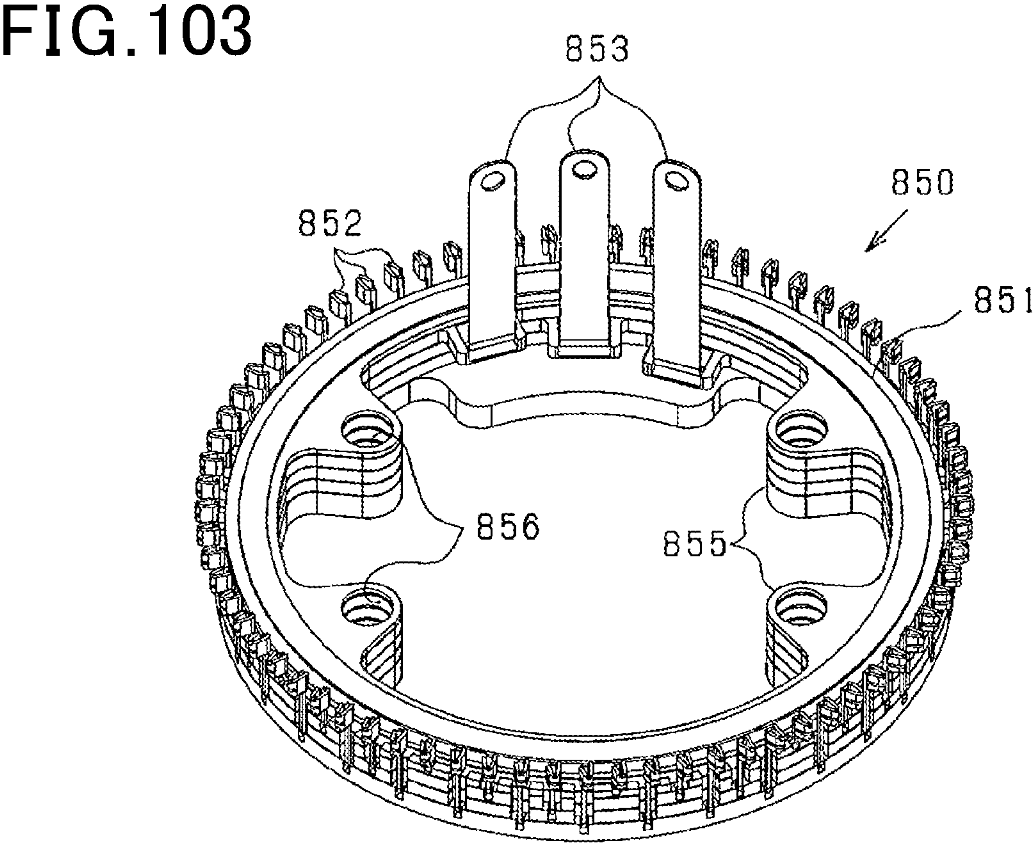
FIG. 103 is a perspective view of a busbar module in the fifteenth modification.
Figure 104:
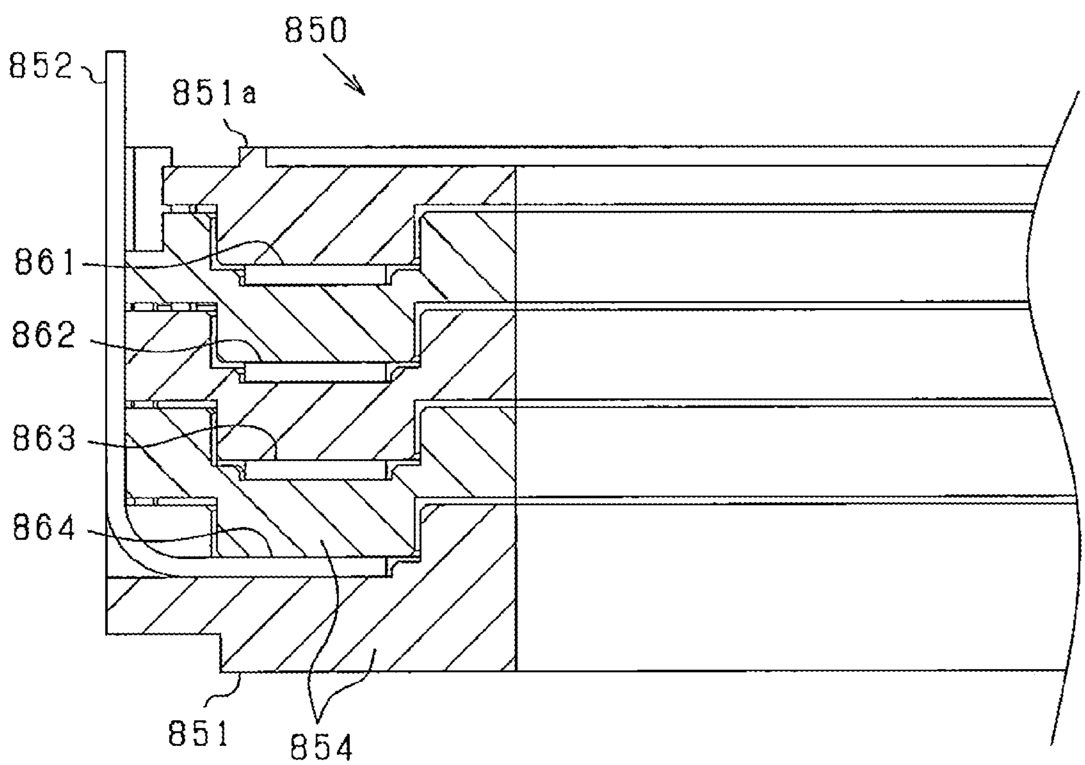
FIG. 104 is a cross-sectional view showing part of a longitudinal cross section of the busbar module in the fifteenth modification.

The busbar module 850 is electrically connected with the partial windings 801 of the coil modules 800 of the stator coil 731. The busbar module 850 is a winding connecting member which connects, for each phase of the stator coil 731, first ends of the partial windings 801 of the phase in parallel with each other and second ends of the partial windings 801 of the phase together at the neutral point. FIG. 103 is a perspective view of the busbar module 850. FIG. 104 is a cross-sectional view showing part of a longitudinal cross section of the busbar module 850.

The busbar module 850 has an annular portion 851, a plurality of connection terminals 852 extending from the annular portion 851, and three input/output terminals 853 provided respectively for the three phase windings of the stator coil 731. The annular portion 851 is formed of an electrically insulative material, such as a resin, into an annular shape.

As shown in FIG. 104, the annular portion 851 includes a plurality (e.g., five in the present modification) of substantially annular lamination plates 854 that are laminated in the axial direction. Moreover, in the annular portion 851, there are embedded four busbars 861-864 each of which is annular-shaped and sandwiched between an axially-adjacent pair of the lamination plates 854. The busbars 861-864 include a U-phase busbar 861, a V-phase busbar 862, a W-phase busbar 863 and a neutral busbar 864. The busbars 861-864 are arranged in alignment with each other in the axial direction with plate surfaces thereof facing one another. The lamination plates 854 and the busbars 861-864 are joined to one another by an adhesive. It is preferable to employ adhesive sheets as the adhesive. Alternatively, a liquid or semiliquid adhesive may be applied between the lamination plates 854 and the busbars 861-864. Each of the connection terminals 852 is connected with a corresponding one of the busbars 861-864 so as to protrude radially outside from the annular portion 851.

On an upper surface of the annular portion 851 (i.e., on an upper surface of that lamination plate 854 which is located axially outermost among all of the five lamination plates 854), there is formed a protrusion 851*a* that extends in an annular shape.

The busbar module 850 may be formed in any suitable manner such that the busbars 861-864 are embedded in the annular portion 851. For example, the busbar module 850 may be formed by insert-molding with the busbars 861-864 arranged at predetermined intervals. Moreover, the arrangement of the busbars 861-864 is not limited to the above-described configuration where all the busbars 861-864 are axially aligned with each other and all the plate surfaces of the busbars 861-864 are oriented in the same direction. For example, a configuration where all the busbars 861-864 are radially aligned with each other, a configuration where the busbars 861-864 are arranged in two rows in the axial direction as well as in two rows in the radial direction, or a configuration where the plate surfaces of the busbars 861-864 extend in different directions from each other may alternatively be employed.

As shown in FIG. 103, the connection terminals 852 are aligned with each other in the circumferential direction of the annular portion 851 and axially extend on the radially outer side of the annular portion 851. Moreover, the connection terminals 852 include U-phase connection terminals 852 connected with the U-phase busbar 861, V-phase connection terminals 852 connected with the V-phase busbar 862, and W-phase connection terminals 852 connected with the W-phase busbar 863, and neutral connection terminals 852 connected with the neutral busbar 864. The number of the connection terminals 852 is set to be equal to the number of the winding end portions 804 and 805 of the partial windings 801 of the coil modules 800. Each of the connection terminals 852 is connected to a corresponding one of the winding end portions 804 and 805 of the partial windings 801 of the coil modules 800. Consequently, the busbar module 850 is connected to each of the U-phase partial windings 801, the V-phase partial windings 801 and the W-phase partial windings 801.

The input/output terminals 853 are formed of, for example, a busbar material and arranged to extend in the axial direction. The input/output terminals 853 include a U-phase input/output terminal 853U, a V-phase input/output terminal 853V and a W-phase input/output terminal 853W. The U-phase, V-phase and W-phase input/output terminals 853U-853W are connected, in the annular portion 851, respectively with the U-phase, V-phase and W-phase busbars 861-863. Through these input/output terminals 853, electric power is inputted from an inverter (not shown in the drawings) to the phase windings of the stator coil 731 or outputted from the phase windings of the stator coil 731 to the inverter.

In the busbar module 850, there may be integrally provided current sensors that respectively detect phase currents flowing respectively through the phase windings of the stator coil 731. Further, in the busbar module 850, there may be provided a current detection terminal so that the detection results of the current sensors can be outputted to a controller (not shown in the drawings) through the current detection terminal.

The annular portion 851 has a plurality of protrusions 855 formed on the radially inner periphery thereof so as to protrude radially inward. Moreover, in each of the protrusions 855, there is formed a through-hole 856 that extends in the axial direction. In addition, in the present modification, the protrusions 855 correspond to "fixed portions" of the busbar module 850 to the stator holder 740.

Figure 105:
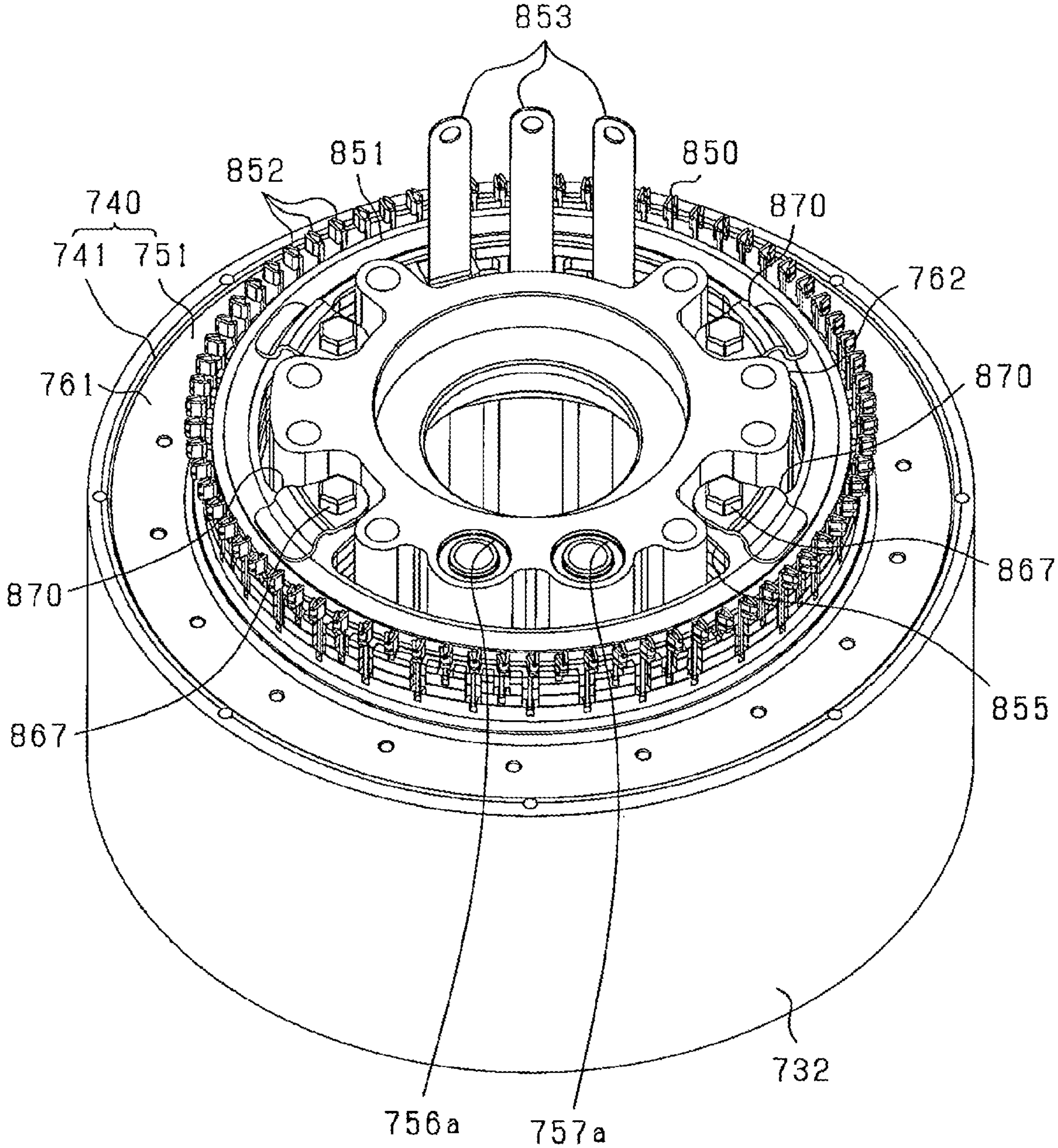
FIG. 105 is perspective view showing the busbar module in a state of having been assembled to a stator holder in the fifteenth modification.
Figure 106:
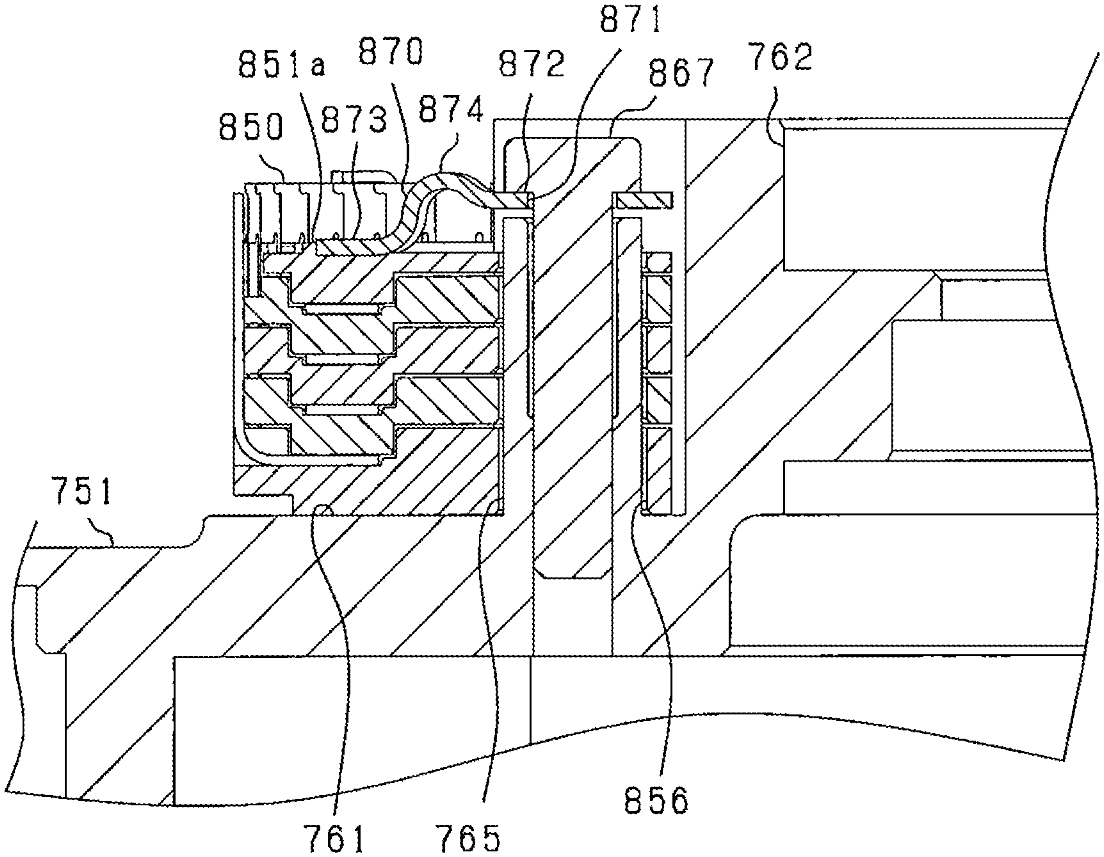
FIG. 106 is a longitudinal cross-sectional view illustrating the fixing of the busbar module to the stator holder in the fifteenth modification.

FIG. 105 is a perspective view showing the busbar module 850 in a state of having been assembled to the stator holder 740. FIG. 106 is a longitudinal cross-sectional view illustrating the fixing of the busbar module 850 to the stator holder 740. In addition, the configuration of the stator holder 740 without the busbar module 850 assembled thereto is illustrated in FIG. 83.

As shown in FIG. 105, the busbar module 850 is placed on the end plate portion 761 so as to surround the boss portion 762 of the inner cylinder member 751. The busbar module 850 is fixed, in a state of being positioned by the assembly thereof to the pillar portions 765 (see FIG. 83) of the inner cylinder member 751, to the stator holder 740 (more specifically, to the inner cylinder member 751) by fastening fasteners 867 such as bolts.

More specifically, as shown in FIG. 106, each of the pillar portions 765 is formed on the end plate portion 761 of the inner cylinder member 751 so as to extend in the axial direction. Moreover, in the state of the pillar portions 765 being inserted respectively in the through-holes 856 formed in the protrusions 855 of the annular portion 851, the busbar module 850 is fixed to the pillar portions 765 by the fasteners 867. In the present modification, the busbar module 850 is fixed with retainer plates 870 that are formed of a metal material such as iron.

Figure 107:
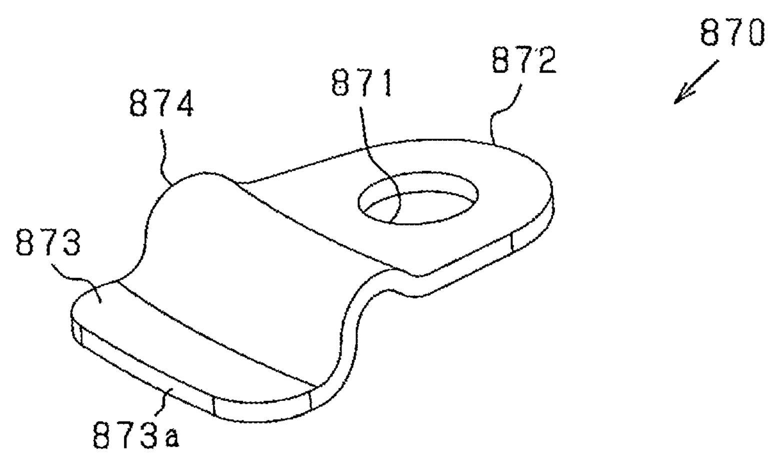
FIG. 107 is a perspective view of a retainer plate in the fifteenth modification.

FIG. 107 is a perspective view illustrating the configuration of the retainer plates 870. As shown in FIG. 107, each of the retainer plates 870 has a fastened part 872, a pressing part 873 and a bend part 874. The fastened part 872 has an insertion hole 871 through which a corresponding one of the fasteners 867 is inserted. The pressing part 873 is provided to press the upper surface of the annular portion 851 of the busbar module 850. The bend part 874 is formed between the fastened part 872 and the pressing part 873.

As shown in FIG. 106, each of the retainer plates 870 is arranged to have the fastened part 872 thereof located on the upper surface of a corresponding one of the pillar portions 765 of the inner cylinder member 751 and the pressing part 873 thereof located on the upper surface of the annular portion 851 of the busbar module 850. Further, a corresponding one of the fasteners 867 is inserted through the insertion hole 871 formed in the fastened part 872 of the retainer plate 870 and screwed into the corresponding pillar portion 765 of the inner cylinder member 751. Moreover, the pressing part 873 of the retainer plate 870 has a flat contact surface placed in contact with the upper surface of the annular portion 851 of the busbar module 850. That is, the pressing part 873 of the retainer plate 870 is configured to be in surface contact with the annular portion 851 of the busbar module 850. In addition, instead of the configuration where the pressing part 873 is in surface contact with the annular portion 851, a configuration may be employed where the pressing part 873 is in contact with the annular portion 851 at a plurality of points.

As the corresponding fastener 867 is screwed into the corresponding pillar portion 765 of the inner cylinder member 751, the retainer plate 870 is pushed downward by the corresponding fastener 867, causing the annular portion 851 of the busbar module 850 to be pressed downward by the pressing part 873 of the retainer plate 870. In this case, the downward pressing force generated by the screwing of the corresponding fastener 867 is transmitted to the pressing part 873 through the bend part 874 of the retainer plate 870; therefore, the pressing by the pressing part 873 is made with elastic force of the bend part 874.

As described above, on the upper surface of the annular portion 851 of the busbar module 850, there is formed the annular protrusion 851*a*. Moreover, a distal end of the retainer plate 870 on the pressing part 873 side is configured to be capable of abutting the protrusion 851*a*. Consequently, it is possible to prevent the downward pressing force of the retainer plate 870 from escaping radially outward. That is, the pressing force generated with the screwing of the corresponding fastener 867 can be suitably transmitted to the pressing part 873 side.

An end portion 873*a* (see FIG. 107) of the pressing part 873 on the opposite side to the insertion hole 871 is configured to abut the protrusion 851*a* at two or more points or within a range of a predetermined length or more. Specifically, the end portion 873*a* of the pressing part 873 is formed to be straight in shape, to be in the shape of an arc whose radius is equal to or greater than the inner radius of the annular protrusion 851*a*, or to have a plurality of protrusions arranged in the circumferential direction. Consequently, when the pressing force is generated with the screwing of the corresponding fastener 867, the retainer plate 870 can be prevented from being rotated by the pressing force in a rotational direction about the corresponding fastener 867.

In addition, as shown in FIG. 105, in the state of the busbar module 850 having been assembled to the stator holder 740, the input/output terminals 853 are located 180 degrees opposite in the circumferential direction to the inlet opening 756*a* and the outlet opening 757*a* both of which communicate with the coolant passage 755. It should be noted that the input/output terminals 853 may alternatively be provided at the same position as (or adjacent to) the openings 756*a* and 757*a*.

Next, explanation will be given of a relay member 880 for electrically connecting the input/output terminals 853 of the busbar module 850 to an external device (e.g., an inverter) provided outside the rotating electric machine 700.

As shown in FIG. 76, in the rotating electric machine 700, the input/output terminals 853 of the busbar module 850 are provided so as to protrude outward from the housing cover 892; and the input/output terminals 853 are connected to the relay member 880 on the outside of the housing cover 892. The relay member 880 is a member which relays the electrical connection between the input/output terminals 853 for respective phases extending from the busbar module 850 and electric power lines for respective phases extending from the external device.

Figure 108:
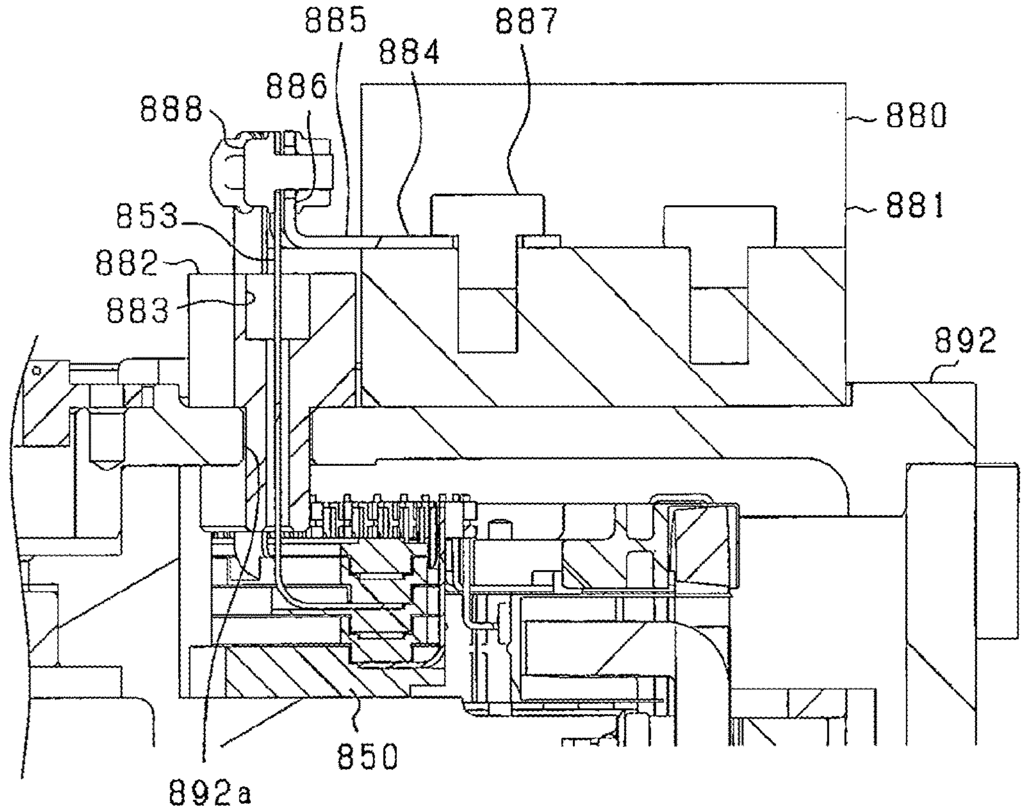
FIG. 108 is a longitudinal cross-sectional view showing a relay member in a state of having been mounted to a housing cover in the fifteenth modification.
Figure 109:
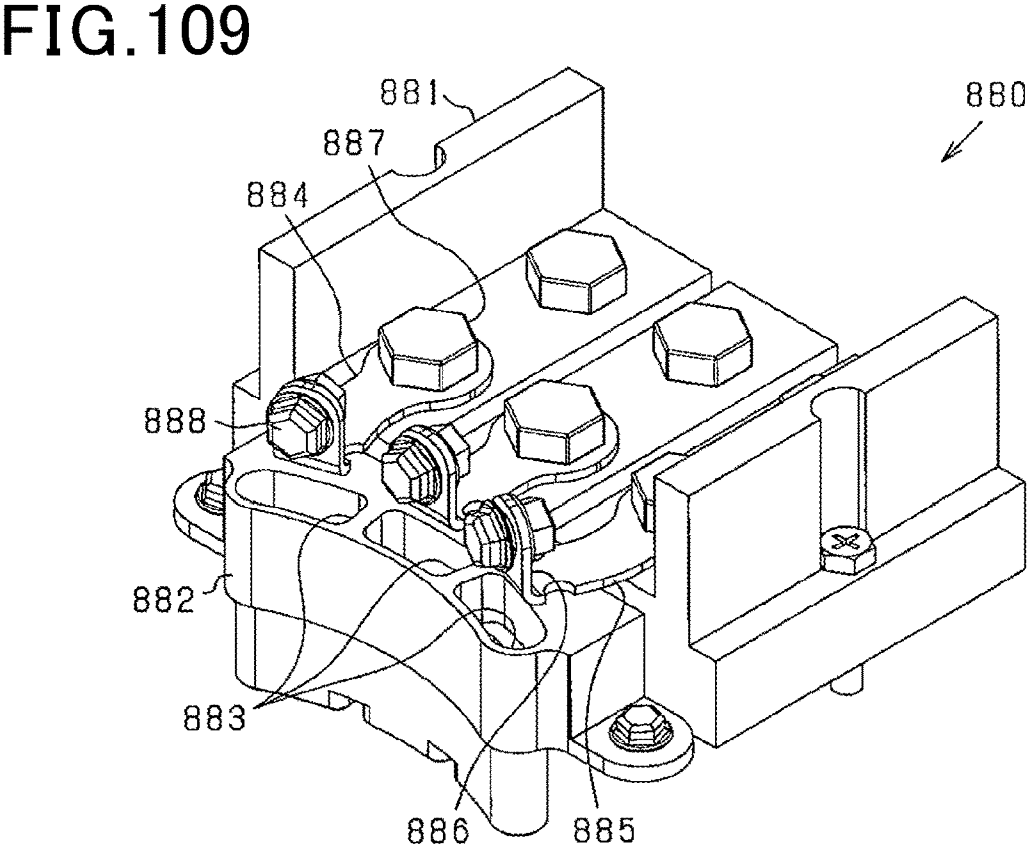
FIG. 109 is a perspective view of the relay member in the fifteenth modification.

FIG. 108 is a longitudinal cross-sectional view showing the relay member 880 in a state of having been mounted to the housing cover 892. FIG. 109 is a perspective view of the relay member 880. As shown in FIG. 108, a through-hole 892*a* is formed in the housing cover 892, so that the input/output terminals 853 can be led out through the through-hole 892*a*.

The relay member 880 has a main body 881 fixed to the housing cover 892 and a terminal insertion portion 882 inserted in the through-hole 892*a* of the housing cover 892. The terminal insertion portion 882 has three insertion holes 883 in which the three input/output terminals 853 are respectively inserted. The insertion holes 883 have respective openings that are long in cross-sectional shape. Moreover, the insertion holes 883 are formed in alignment with each other in a direction substantially coinciding with each of the longitudinal directions thereof.

To the main body 881 of the relay member 880, there are mounted three relay busbars 884 for respective phases. Each of the relay busbars 884 is formed by bending in a substantially L-shape to have a base part 885 and a bent part 886 extending substantially perpendicular to the base part 885. The base part 885 is fastened to the main body 881 of the relay member 880 by a fastener 887 such as a bolt. On the other hand, the bent part 886 is connected to a corresponding one of the input/output terminals 853.

More specifically, as shown in FIG. 108, the input/output terminals 853 are inserted respectively in the insertion holes 883 formed in the terminal insertion portion 882 of the relay member 880. The bent parts 886 of the relay busbars 884 are fixed to distal end portions of the corresponding input/output terminals 853 by fasteners 888 such as pairs of bolts and nuts.

In addition, though not shown in the drawings, the electric power lines extending from the external device can be connected to the relay member 880 to input/output electric power respectively from/to the input/output terminals 853 of the busbar module 850.

According to the present modification, it is possible to achieve the following advantageous effects.

In the present modification, the insulating covers 811-814 are mounted respectively on the bridging portions 803A and 803B of the partial windings 801A and 801B on both the axial sides of the core assembly CA, so as to electrically insulate the bridging portions 803 of the partial windings 801 of different phases from one another. Consequently, it becomes possible to prevent the insulation properties of the stator coil 731 from being lowered due to the bridging portions 803 of the partial windings 801 rubbing against each other at the coil ends CE. As a result, it becomes possible to suitably realize electrical insulation between the bridging portions 803A and 803B of the partial windings 801A and 801B at the coil ends CE of the stator coil 731.

Moreover, in the present modification, the insulating covers 811 and 812 mounted on the first bridging portions 803A of the first partial windings 801A and the insulating covers 813 and 814 mounted on the second bridging portions 803B of the second partial windings 801B are arranged to overlap one another in the axial direction. Consequently, it becomes possible to fix the overlapping insulating covers 811-814 together in the axial direction while suitably realizing electrical insulation between the bridging portions 803A and 803B of the partial windings 801A and 801B.

In the present modification, at one of the coil ends CE of the stator coil 731, the insulating covers 811 of the first coil modules 800A are arranged in an annular shape along the circumferential direction with the side walls 821 thereof in contact with or in close proximity to one another; and the insulating covers 813 of the second coil modules 800B are arranged in an annular shape along the circumferential direction with the side walls 831 thereof in contact with or in close proximity to one another. At the other of the coil ends CE of the stator coil 731, the insulating covers 812 of the first coil modules 800A are arranged in an annular shape along the circumferential direction with the side walls 821 thereof in contact with or in close proximity to one another; and the insulating covers 814 of the second coil modules 800B are arranged in an annular shape along the circumferential direction with the side walls 831 thereof in contact with or in close proximity to one another. Consequently, with the side walls 821 and 831 of the insulating covers 811-814 interposed between the partial windings 801 adjacent to one another in the circumferential direction, it becomes possible to ensure electrical insulation between the partial windings 801 at the coil ends CE while suitably arranging the partial windings 801 in the circumferential direction.

Moreover, with the side walls 821 and 831 of the insulating covers 811-814 arranged in contact with or in close proximity to one another, it becomes possible to increase the strength of the stator 730 against the force generated in the rotating electric machine 700 in the rotational direction.

In the present modification, in the insulating covers 811-814, there are formed the openings 825*a*, 825*b*, 835*a* and 835*b* for leading out the winding end portions 804 and 805 of the partial windings 801. Consequently, it becomes possible to suitably lead out the winding end portions 804 and 805 of the partial windings 801 from the insulating covers 811-814 while imparting suitable insulation properties to the bridging portions 803 of the partial windings 801 by the insulating covers 811-814.

Moreover, the second bridging portions 803B of the second partial windings 801B extend straight in the axial direction without being bent radially inward whereas the first bridging portions 803A of the first partial windings 801A are bent radially inward in the radial direction. Therefore, the distance from the second partial windings 801B to the busbar module 850 is longer than the distance from the first partial windings 801A to the busbar module 850. In view of the above, in the present modification, the winding end portions 804 and 805 of the second partial windings 801B led out from the openings 835*a* and 835*b* of the insulating covers 813 and 814 of the second coil modules 800B (i.e., the insulating covers 813 and 814 on the axially outer side) are fixed to the insulating covers 811 and 812 of the first coil modules 800A (i.e., the insulating covers 811 and 812 on the axially inner side). Consequently, it becomes possible to increase the strength of the winding end portions 804 and 805 of the second partial windings 801B.

In the present modification, of the insulating covers 811-814 of the coil modules 800, the insulating covers 811 and 813 are located on the axial side where the winding end portions 804 and 805 of the partial windings 801 are provided. Therefore, the insulating covers 811 and 813 are configured to have a larger axial height or a larger radial width than the insulating covers 812 and 814 located on the other axial side (see FIG. 89). Consequently, it becomes possible to suitably provide the insulating covers 811-814 taking into account the surplus dimension required for switching the winding turns of the electrical conductor wire CR. As a result, it becomes possible to facilitate the switching of the winding state (or the lane-changing) of the electrical conductor wire CR. In addition, it should be noted that the insulating covers 811 and 813 may be configured to have both a larger axial height and a larger radial width than the insulating covers 812 and 814.

In the present modification, each of the partial windings 801 constituting the phase windings of the stator coil 731 is ring-shaped to have a pair of intermediate conductor portions 802 each extending in the axial direction and located at a predetermined interval in the circumferential direction and a pair of bridging portions 803 located respectively on opposite axial sides of the pair of intermediate conductor portions 802 to connect the pair of intermediate conductor portions 802. Moreover, all the intermediate conductor portions 802 of the partial windings 801 constituting the phase windings of the stator coil 731 are arranged in a predetermined sequence and in alignment with each other in the circumferential direction. At each of the coil ends CE of the stator coil 731, the bridging portions 803 of the partial windings 801 of different phases intersect one another. Consequently, even with the toothless structure of the stator 730 having no teeth arranged in the circumferential direction, it still becomes possible to suitably construct the stator coil 731 by assembling each of the partial windings 801 to the core assembly CA.

Further, in the present modification, at each of the coil ends CE of the stator coil 731, for each circumferentially-adjacent pair of the partial windings 801 whose bridging portions 803 intersect one another, the insulating covers 811 and 813 or the insulating covers 812 and 814 provided respectively integrally with the pair of the partial windings 801 are together fixed to the core assembly CA by a common fixing pin 841. Consequently, it becomes possible to easily mount the partial windings 801 to the core assembly CA. Hence, in the case of manufacturing the stator 730 using a manufacturing device such as a winding machine, the manufacturing device can be downsized. As a result, it becomes possible to easily realize the assembly of the stator coil 731 in the stator 730 having the toothless structure.

In the present modification, at each of the coil ends CE of the stator coil 731, the protruding portions 836 of the insulating covers 813 or 814 are arranged to overlap corresponding ones of the insulating covers 811 or 812 in the axial direction. Further, for each axially-overlapping pair of one of the insulating covers 811 or 812 and one of the protruding portions 836 of the insulating covers 813 or 814, the fixing pin 841 is provided to engage with both the insulating cover 811 or 812 and the protruding portion 836 of the insulating cover 813 or 814 and fix them together to the core assembly CA. Consequently, it becomes possible to suitably fix each axially-overlapping pair of the insulating covers 811-814 of the coil modules 800A and 800B to the core assembly CA using the common fixing pin 841. Moreover, it becomes possible to utilize the insulating covers 811-814, which have the function of electrically insulating the bridging portions 803 of the partial windings 801 from one another, as mounting members for mounting the partial windings 801 to the core assembly CA. Consequently, it becomes possible to reduce the parts count of the stator 730.

More specifically, regarding the fixing by the fixing pins 841, at each of the coil ends CE of the stator coil 731, for each axially-overlapping pair of one of the insulating covers 811 or 812 and one of the protruding portions 836 of the insulating covers 813 or 814, one of the recesses 827 (i.e., first engaged portions) formed in the side walls 821 of the insulating cover 811 or 812 and the through-hole 837 (i.e., second engage portion) formed in the protruding portion 836 of the insulating cover 813 or 814 are axially connected with each other and one of the fixing pins 841 engages with the axially-connected first and second engaged portions. Consequently, the fixing by the fixing pins 841 can be performed at the boundary position between each circumferentially-adjacent pair of the insulating covers 811 or 812. As a result, it becomes possible to fix each circumferentially-adjacent pair of the insulating covers 811 or 812 and one of the insulating covers 813 or 814 together by a common fixing pin 841.

In the present modification, each of the first bridging portions 803A of the first partial windings 801A has such a curved shape as to be convex radially inward, i.e., toward the core assembly CA. Consequently, between each circumferentially-adjacent pair of the first bridging portions 803A of the first partial windings 801A, there is formed a gap whose width increases in the direction toward the distal ends of the first bridging portions 803A, i.e., in the radially inward direction. Hence, it becomes possible to form the recesses 827, in the respective side walls 821, at positions outside the curved parts of the first bridging portions 803A by utilizing the gaps between the first bridging portions 803A adjacent to one another in the circumferential direction. In other words, it becomes possible to fix the insulating covers 811-814 by the common fixing pins 841 in the gaps between the first bridging portions 803A adjacent to one another in the circumferential direction. As a result, it becomes possible to minimize the amount by which the protruding portions 836 of the insulating covers 813 and 814 protrude radially inward.

In the configuration where the axially-overlapping insulating covers 811-814 are fixed by the common fixing pins 841, if the fixing pins 841 were shorter than the total axial height of the overlapping parts of the insulating covers 811-814, it would be difficult to perform the fixing by the fixing pins 841. On the other hand, if the fixing pins 841 were excessively long, the axial length of the stator 730 would be increased. In consideration of the above, in the present modification, each of the protruding portions 836 of the insulating covers 813 and 814 has a lower step part 836*a* formed therein; the lower step part 836*a* has a smaller height from the corresponding axial end face of the core assembly CA than the second bridging portions 803B of the second partial windings 801B. Moreover, the protruding portions 836 of the insulating covers 813 and 814 are fixed respectively by the fixing pins 841 at the lower step parts 836*a* thereof. Consequently, it becomes possible to facilitate the fixing by the fixing pins 841 while suppressing increase in the axial length of the stator 730.

In the present modification, the insulating covers 811-814 of the coil modules 800A and 800B are fixed to the corresponding axial end faces of the core assembly CA (more specifically, the stator holder 740) that has the coolant passage 755 formed therein. Consequently, heat generated in the partial windings 801 can be directly transferred from the bridging portions 803 of the partial windings 801 to the vicinity of the coolant passage 755, thereby improving the performance of cooling the stator coil 731.

In the present modification, the core assembly CA includes the stator core 732 and the stator holder 740 located radially inside the stator core 732. The insulating covers 811-814 are fixed by the fixing pins 841 to the stator holder 740 at a position beyond the stator core 732. Consequently, it becomes unnecessary to fix the insulating covers 811-814 to the stator core 732; thus it becomes unnecessary to form recesses or the like in the stator core 732 for inserting the fixing pins 841 therein. As a result, it becomes possible to suppress generation of cogging torque. In the case of performing the fixing by the fixing pins 841 at the overlapping parts of the insulating covers 811-814, it is necessary to arrange the insulating covers 811-814 at desired positions. Moreover, in arranging the insulating covers 811-814 to axially overlap one another in the axial direction, the insulating covers 811 and 812 are first arranged on the axially inner side and then the insulating covers 813 and 814 are arranged on the axially outer side. More particularly, the recesses 827 (i.e., first engaged portions) formed in the side walls 821 of the insulating covers 811 and 812 and the through-holes 837 (i.e., second engaged portions) formed in the protruding portions 836 of the insulating covers 813 and 814 are axially aligned with each other; then the fixing pins 841 are placed to engage with the axially-aligned first and second engaged portions. In this case, since the recesses 827 of the insulating covers 811 and 812 are located behind the insulating covers 813 and 814, it may be difficult to axially align the first and second engaged portions.

In this regard, in the present modification, on the outer walls 822 of the insulating covers 811 and 812 arranged on the axially inner side, there are formed the protrusions 828 for guiding the protruding portions 836 of the insulating covers 813 and 814 to the predetermined positions where they axially overlap the insulating covers 811 and 812. Consequently, it becomes possible to easily arrange the insulating covers 811-814 at the desired positions. That is, it becomes possible to easily assemble the partial windings 801 to the core assembly CA.

Hereinafter, variations of the fifteenth modification will be described.

(First Variation of Fifteenth Modification)

Figure 110A:
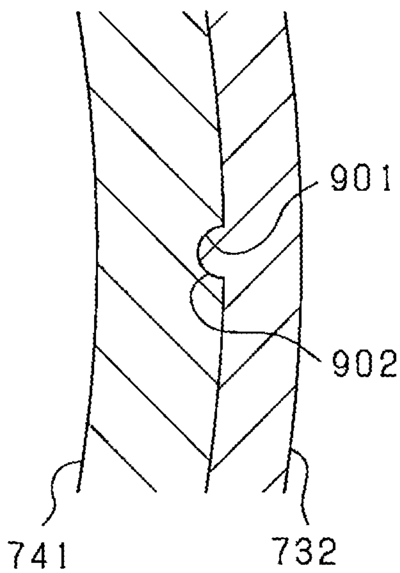
FIGS. 110(*a*) and 110(*b*) are transverse cross-sectional views of a stator core and an outer cylinder member in a first variation of the fifteenth modification.
Figure 110B:
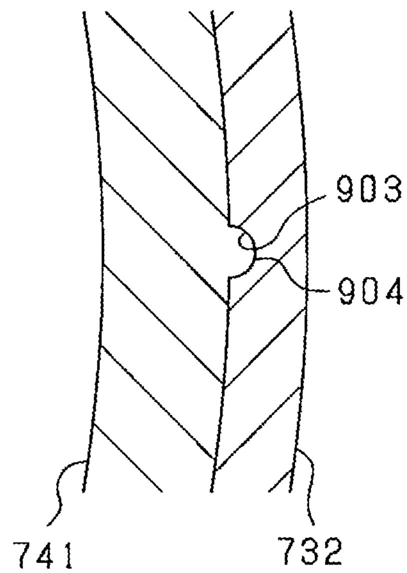

As shown in FIG. 110(*a*), a recess 901 may be formed in the radially outer surface (i.e., outer circumferential surface) of the outer cylinder member 741 of the stator holder 740; and a protrusion 902 may be formed on the radially inner surface (i.e., inner circumferential surface) of the stator core 732 so as to be inserted in and engage with the recess 91. In this case, the recess 901 of the outer cylinder member 741 and the protrusion 902 of the stator core 732 together constitute a restricting member for restricting circumferential displacement of the stator core 732.

Moreover, in the above case, with the protrusion 902 formed in the stator core 732 (in other words, without any recess formed in the stator core 732), it becomes possible to suppress generation of cogging torque while realizing the desired displacement suppression. In addition, even if the radial thickness of the stator core 732 is small, it will still be possible to provide the restricting member regardless of the radial thickness.

Alternatively, as shown in FIG. 110(*b*), a recess 903 may be formed in the radially inner surface (i.e., inner circumferential surface) of the stator core 732; and a protrusion 904 may be formed on the radially outer surface (i.e., outer circumferential surface) of the outer cylinder member 741 of the stator holder 740 so as to be inserted in and engage with the recess 903. In this case, the recess 903 of the stator core 732 and the protrusion 904 of the outer cylinder member 741 together constitute a restricting member for restricting circumferential displacement of the stator core 732.

In the case of forming a plurality of recesses in one of the stator core 732 and the outer cylinder member 741 and a plurality of protrusions in the other of the stator core 732 and the outer cylinder member 741 as shown in FIGS. 110(*a*) and 110(*b*), the recesses and the protrusions may be formed at equal intervals in the circumferential direction. Moreover, the interference between the recesses and the protrusions may be set to be different from that between the other portions of the stator core 732 and the outer cylinder member 741.

Setting the interference between the recesses and the protrusions to be different from that between the other portions of the stator core 732 and the outer cylinder member 741, portions of the stator core 732 bearing different radial loads will be distributed in the circumferential direction. Consequently, it will become possible to suitably realize both protection and displacement suppression of the stator core 732.

More specifically, the interference between the recesses and the protrusions may be set to be larger than that between the other portions of the stator core 732 and the outer cylinder member 741. In this case, the radial stress will become higher at locations apart from one another at predetermined intervals in the circumferential direction, and will become lower at the other locations. Consequently, it will become possible to suitably suppress circumferential displacement of the stator core 732.

In contrast, the interference between the recesses and the protrusions may be set to be smaller than that between the other portions of the stator core 732 and the outer cylinder member 741. In this case, the load imposed on the protrusions during the assembly of the stator core 732 and the stator holder 740 can be reduced, thereby preventing damage to the protrusions.

(Second Variation of Fifteenth Modification)

In the fifteenth modification, each of the recesses 733 is formed in the stator core 82 over the entire axial range from one axial end face to the other axial end face of the stator core 732; each of the recesses 782 is formed in the outer cylinder member 741 of the stator holder 740 over the entire axial range from one axial end face to the other axial end face of the outer cylinder member 741; and each of the engaging members 781 having the same axial length as the recesses 733 and 782 is assembled into a radially-aligned pair of the recesses 733 and 782 (see FIGS. 82, 87(*a*) and 87(*b*)). Alternatively, each of the recesses 733 may be formed in the stator core 82 within only part of the entire axial range from one axial end face to the other axial end face of the stator core 732; each of the recesses 782 may be formed in the outer cylinder member 741 of the stator holder 740 within only part of the entire axial range from one axial end face to the other axial end face of the outer cylinder member 741; and each of the engaging members 781 may have the same axial length as the recesses 733 and 782 and be assembled into a radially-aligned pair of the recesses 733 and 782.

Figure 111:
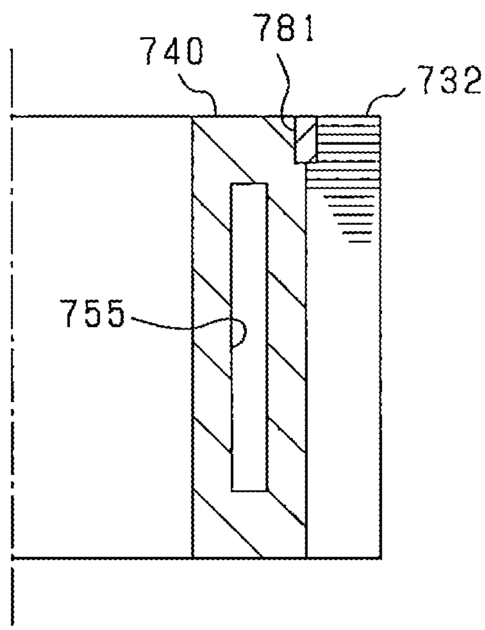
FIG. 111 is a cross-sectional view of a stator core and a stator holder in a second variation of the fifteenth modification.

Specifically, as shown in FIG. 111, the engaging members 781 may be radially interposed between only end portions of the stator core 732 and the stator holder 740 on one axial side. Moreover, in the configuration shown in FIG. 111, the engaging members 781 are provided in an axial range where no coolant passage 755 is formed. Consequently, it becomes possible to prevent the cooling performance from being lowered due to the engaging members 781 (or the restricting member for restricting circumferential displacement of the stator core 732) interposed between the stator core 732 and the stator holder 740.

In addition, though not shown in the drawings, the engaging members 781 may be radially interposed between end portions of the stator core 732 and the stator holder 740 on both axial sides. Moreover, in the configurations shown in FIGS. 110(*a*) and 110(*b*), the recess and the protrusion, which together constitute the restricting member for restricting circumferential displacement of the stator core 732, may alternatively be formed within only part of the entire axial range.

(Third Variation of Fifteenth Modification)

In the fifteenth modification, each of the intermediate conductor portions 802 of the partial windings 801 has the film material FM wound therearound such that the end portions of the film material FM overlap each other in the circumferential direction (see FIGS. 92 and 96). Alternatively, each of the intermediate conductor portions 802 of the partial windings 801 may have the film material FM wound therearound such that the end portions of the film material FM do not overlap each other. For example, in the configuration shown in FIG. 112, the film material FM is wound around each of the intermediate conductor portions 802 of the partial windings 801 without the end portions thereof overlapping each other. Moreover, in the state where all the coil modules 800A and 800B are arranged in the circumferential direction, for each of the intermediate conductor portions 802 of the partial windings 801, the gap between the end portions of the film material FM wound around the intermediate conductor portion 802 is located on a part of the intermediate conductor portion 802 which faces one of the intermediate conductor portions 802 of the partial windings 801 of the other phases, i.e., on one of the two circumferential side surfaces of the intermediate conductor portion 802.

Figure 112:
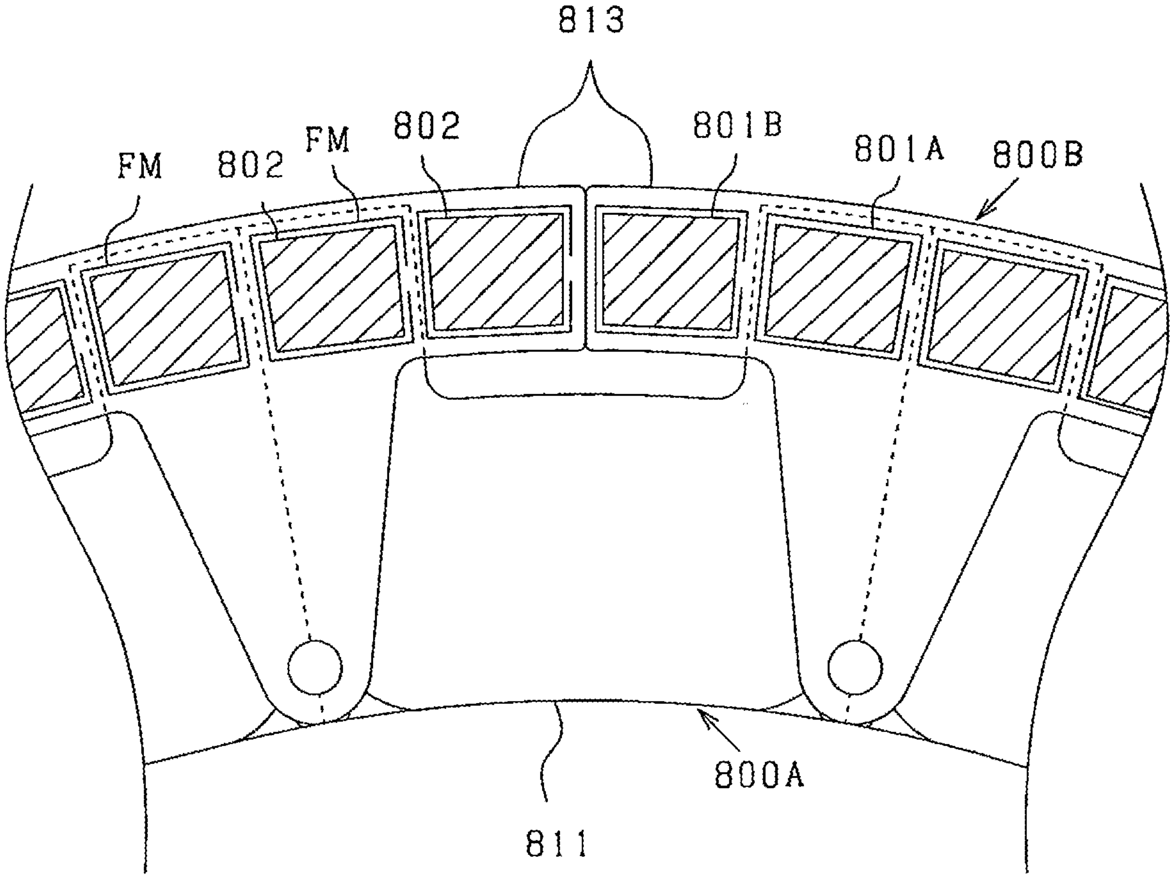
FIG. 112 is a partial cross-sectional view showing a film material in a state of having been mounted to intermediate conductor portions in a third variation of the fifteenth modification.

Furthermore, in the configuration shown in FIG. 112, for each circumferentially-adjacent pair of the intermediate conductor portions 802 of the partial windings 801 of different phases, the gaps of the film materials FM wound respectively around the pair of the intermediate conductor portions 802 are arranged so as not to face each other in the circumferential direction. That is, for all the intermediate conductor portions 802 of the partial windings 801, the gaps of the film materials FM wound respectively around the intermediate conductor portions 802 are located on the same side (i.e., the right side in FIG. 112) in the circumferential direction. In addition, though not shown in the figures, for each of the intermediate conductor portions 802 of the partial windings 801, the gap between the end portions of the film material FM wound around the intermediate conductor portion 802 may alternatively be located on the radially outer side or the radially inner side of the intermediate conductor portion 802.

Providing the insulating coats 807 of the intermediate conductor portions 802 of the partial windings 801 such that the end portions of the film material FM do not overlap each other, increase in dead spaces in the circumferential direction in the stator coil 731 can be suppressed. Further, arranging the gaps of the film materials FM of the intermediate conductor portions 802 so as not to circumferentially face one another, it is possible to suppress electrical conduction between the intermediate conductor portions 802 through the gaps of the film materials FM, thereby suitably realizing inter-phase insulation of the stator coil 731. Furthermore, arranging the gaps of the film materials FM to exist between the intermediate conductor portions 802 adjacent to one another in the circumferential direction, it is possible to suitably realize the ground insulation of the stator coil 731.

(Fourth Variation of Fifteenth Modification)

Figure 113:
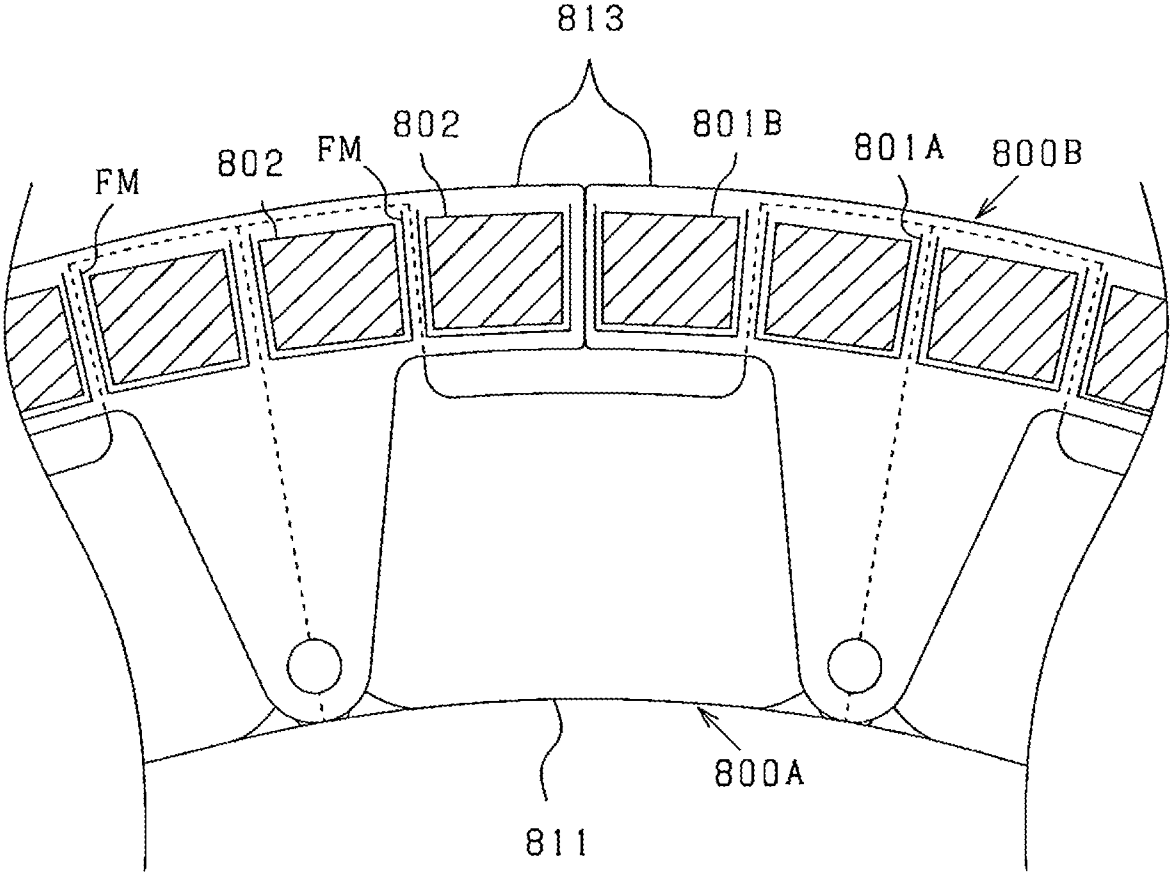
FIG. 113 is a partial cross-sectional view showing a film material in a state of having been mounted to intermediate conductor portions in one example of a fourth variation of the fifteenth modification.
Figure 114:
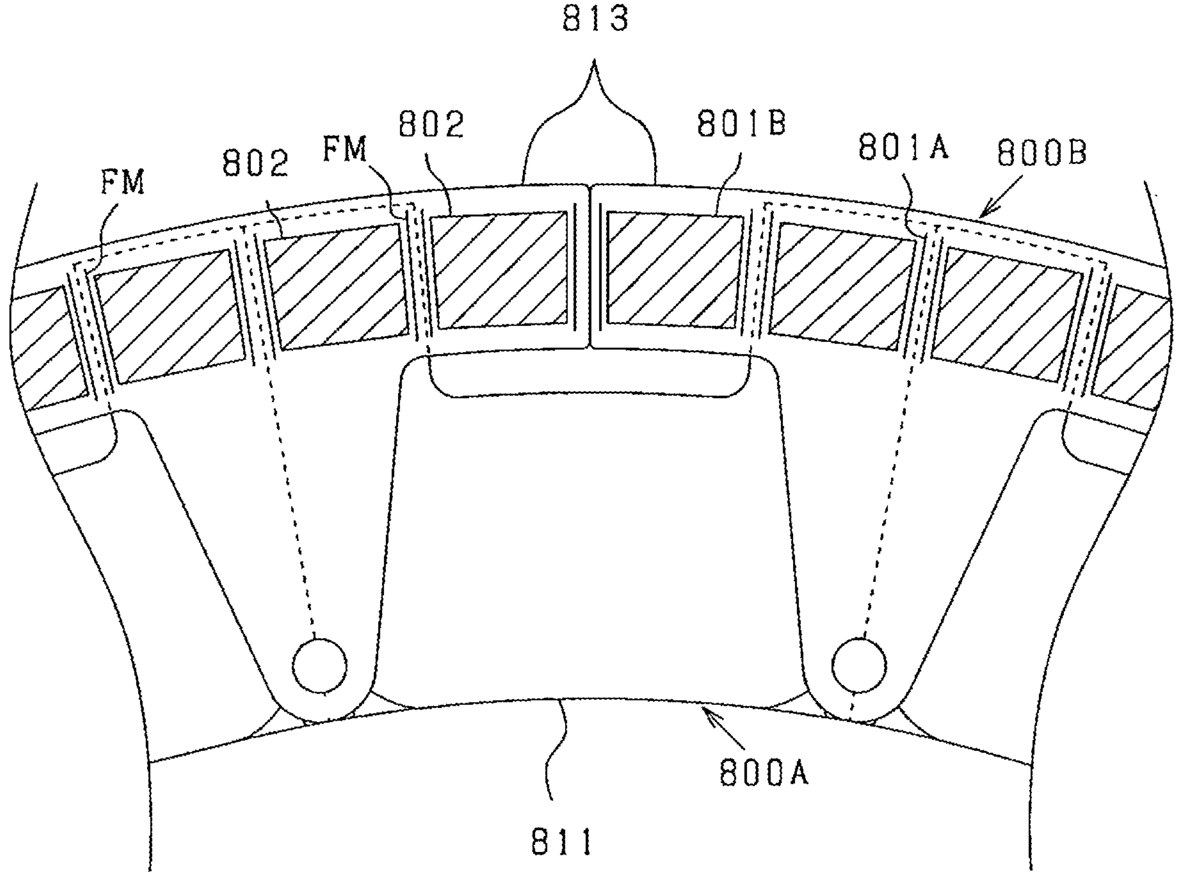
FIG. 114 is a partial cross-sectional view showing a film material in a state of having been mounted to intermediate conductor portions in another example of the fourth variation of the fifteenth modification.

In the fifteenth modification, each of the intermediate conductor portions 802 of the partial windings 801 has the insulating coat 807 provided so as to cover all of the two circumferential side surfaces and two radial side surfaces of the intermediate conductor portion 802 (see FIGS. 92 and 96). As an alternative, as shown in FIG. 113, each of the intermediate conductor portions 802 of the partial windings 801 may have the insulating coat 807 provided so as to cover only the two circumferential side surfaces and radially inner surface of the intermediate conductor portion 802. As another alternative, as shown in FIG. 114, each of the intermediate conductor portions 802 of the partial windings 801 may have the insulating coat 807 provided so as to cover only the two circumferential side surfaces of the intermediate conductor portion 802. In addition, in the configuration shown in FIG. 114, an insulating sheet may be wound around the outer circumferential surface of the stator core 732 to secure the ground insulation of the stator coil 731.

(Fifth Variation of Fifteenth Modification)

In each of the partial windings 801, the insulating coats 807 may be provided in a range not covered by the insulating covers 811 and 812 or 813 and 814. More specifically, referring to FIG. 89, in each of the first coil modules 800A, the first partial winding 801A is covered with neither of the insulating covers 811 and 812 in the range of AX1; and the insulating coats 807 may be provided in the range of AX1 or in a range narrowed both upward and downward than the range of AX1. Moreover, in each of the second coil modules 800B, the second partial winding 801B is covered with neither of the insulating covers 813 and 814 in the range of AX2; and the insulating coats 807 may be provided in the range of AX2 or in a range narrowed both upward and downward than the range of AX2.

In the above case, it is possible to improve the space factor of the intermediate conductor portions 802 arranged in the circumferential direction. More specifically, if the insulating coats 807 were provided so as to overlap the insulating covers 811-814, dead spaces corresponding to the thicknesses of the insulating coats 807 and the insulating covers 811-814 will be created in the circumferential direction. In contrast, with the insulating coats 807 arranged so as not to overlap the insulating covers 811-814, the dead spaces in the circumferential direction can be reduced, thereby improving the space factor of the intermediate conductor portions 802.

(Other Variations of Fifteenth Modification)

In the stator coil 731, the bridging portions 803 of the partial windings 801 arranged in the circumferential direction may be configured to overlap one another in the radial direction instead of the axial direction. In this case, with the insulating covers mounted respectively on the bridging portions 803, it is still possible to suitably realize electrical insulation between the bridging portions 803 at the coil ends CE of the stator coil 731.

In each of the partial windings 801, the bridging portions 803 may be bent radially inward or radially outward. More specifically, each of the first bridging portions 803A of the first partial windings 801A may be bent radially inward (i.e., to the core assembly CA side) or radially outward (i.e., to the opposite side to the core assembly CA). Moreover, each of the second bridging portions 803B of the second partial windings 801B may also be bent radially inward or radially outward such that it extends, on the axially outer side of the first bridging portions 803A of the first partial windings 801A, circumferentially across part of at least one of the first bridging portions 803A.

The partial windings 801 constituting the stator coil 731 may include only one type of partial windings 801 instead of the two types of partial windings 801 (i.e., the first partial windings 801A and the second partial windings 801B). Specifically, each of the partial windings 801 may be formed to have a substantially L-shape or a substantially Z-shape in a side view. In the case of each of the partial windings 801 being formed to have a substantially L-shape in a side view, the bridging portion of the partial winding on one axial side is bent radially inward or radially outward while the bridging portion of the partial winding on the other axial side extends straight in the axial direction without being radially bent. On the other hand, in the case of each of the partial windings 801 being formed to have a substantially Z-shape in a side view, the bridging portion of the partial winding on one axial side is bent radially inward while the bridging portion of the partial winding on the other axial side is bent radially outward. In either of the above cases, the coil modules 800 may be fixed to the core assembly CA by the insulating covers covering the bridging portions of the partial windings as described above.

Fixing members other than the fixing pins 841 may be employed to fix the insulating covers 811-814 overlapping one another in the axial direction. For example, plate-shaped fixing member or fixing members having a wedge shape in the axial direction may be employed instead of the fixing pins 841.

Moreover, the fixing by the fixing members (e.g., fixing pins 841) may be performed at only one of the two coil ends CE of the stator coil 731.

In the fifteenth modification, in each of the phase windings of the stator coil 731, all the partial windings 801 constituting the phase winding are connected in parallel with each other. As an alternative, in each of the phase windings of the stator coil 731, all the partial windings 801 constituting the phase winding may be divided into a plurality of partial-winding groups; each of the partial-winding groups includes a predetermined number of the partial windings connected in parallel with each other and all the partial-winding groups are connected in series with each other. For example, in the case of each of the phase windings of the stator coil 731 being formed of n partial windings 801, the n partial windings 801 may be divided into two (or three) partial-winding groups; each of the two (or three) partial-winding groups includes n/2 (or n/3) partial windings 801 connected in parallel with each other and the two (or three) partial-winding groups are connected in series with each other. As another alternative, in each of the phase windings of the stator coil 731, all the partial windings 801 constituting the phase winding may be connected in series with each other.

(Sixteenth Modification)

In this modification, the configuration of the stator coil 731 in the rotating electric machine 700 is changed compared to the fifteenth modification. Specifically, in this modification, in the stator coil 731, coil modules 950 shown in FIGS. 115-118 are employed instead of the coil modules 800 according to the fifteenth modification. Hereinafter, the differences of this modification from the fifteenth modification will be mainly described. In addition, in this modification, members having the same configuration as those in the fifteenth modification are designated by the same reference numerals as in the fifteenth modification and explanation of these members will not be repeated hereinafter. Regarding the partial windings 801, there is no change in configuration compared to the fifteenth modification. Specifically, the partial windings 801 in this modification also include first partial windings 801A as shown in FIG. 91(*b*) and second partial windings 801B as shown in FIG. 95(*b*).

In the present modification, each of the coil modules 950 is a subassembly that includes one of the partial windings 801 and a winding holder 951 or 952. In the following explanation, the coil modules 950 including the first partial windings 801A will also be referred to as the "first coil modules 950A"; and the coil modules 950 including the second partial windings 801B will also be referred to as the "second coil modules 950B". Moreover, the winding holders 951 included in the first coil modules 950A are different in shape from the winding holders 952 included in the second coil modules 950B. In the following explanation, the winding holders 951 of the first coil modules 950A will also be referred to as the "first winding holders 951"; and the winding holders 952 of the second coil modules 950B will also be referred to as the "second winding holders 952".

Each of the winding holders 951 and 952 is bobbin-shaped and formed of an electrically insulative material such as synthetic resin. In each of the first coil modules 950A, the first winding holder 951 is provided in a range including the pair of intermediate conductor portions 802 of the first partial winding 801A and the pair of first bridging portions 803A of the first partial winding 801A respectively on opposite axial sides of the pair of intermediate conductor portions 802. Similarly, in each of the second coil modules 950B, the second winding holder 952 is provided in a range including the pair of intermediate conductor portions 802 of the second partial winding 801B and the pair of second bridging portions 803B of the second partial winding 801B respectively on opposite axial sides of the pair of intermediate conductor portions 802. In addition, in the present modification, the first winding holders 951 correspond to "first mounting members" for respectively mounting the first partial windings 801A to the core assembly CA; and the second winding holders 952 correspond to "second mounting members" for respectively mounting the second partial windings 801B to the core assembly CA.

Next, the configurations of the first and second coil modules 950A and 950B will be described in detail.

Figure 115:
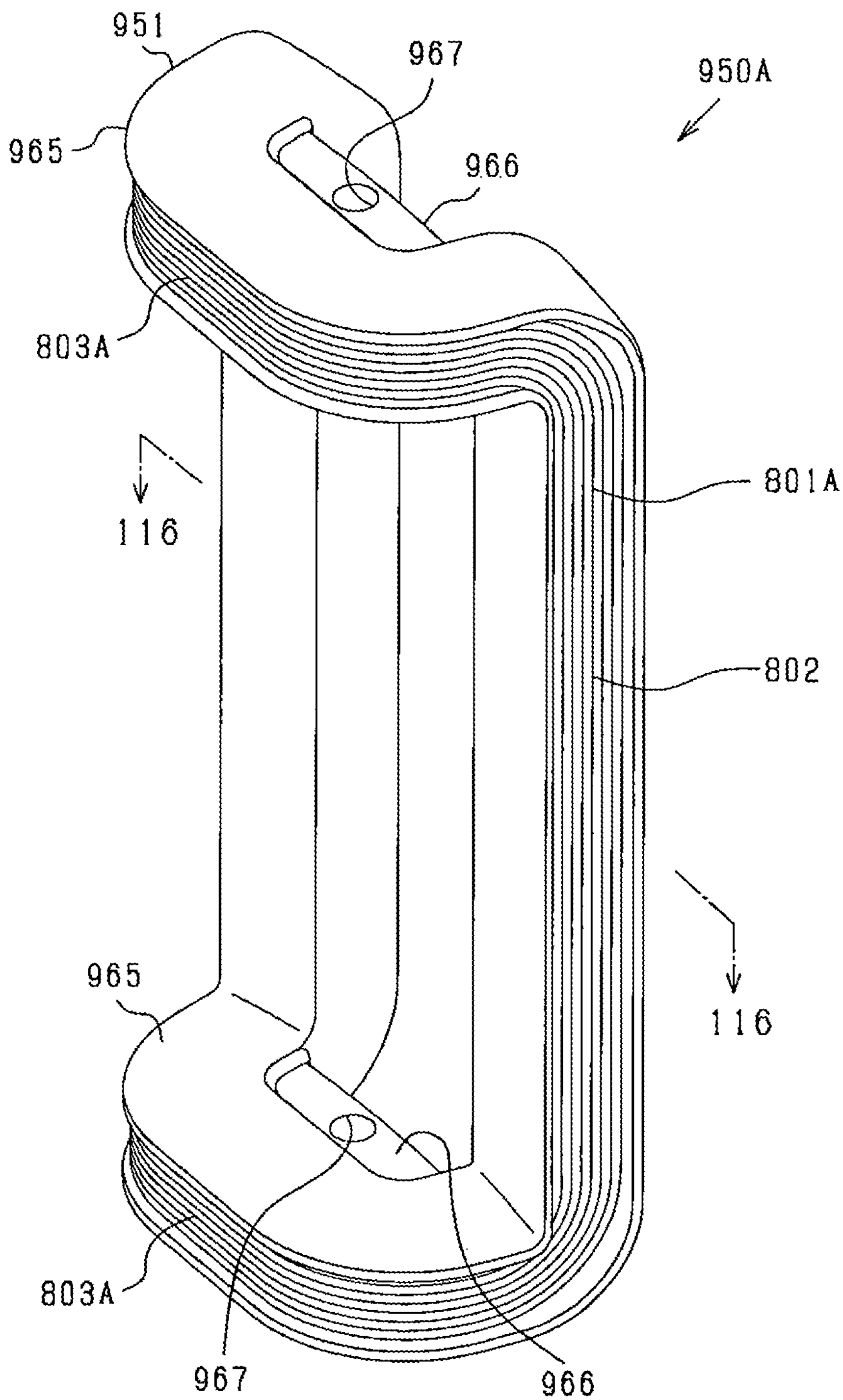
FIG. 115 is a perspective view of a first coil module in a sixteenth modification.
Figure 116:
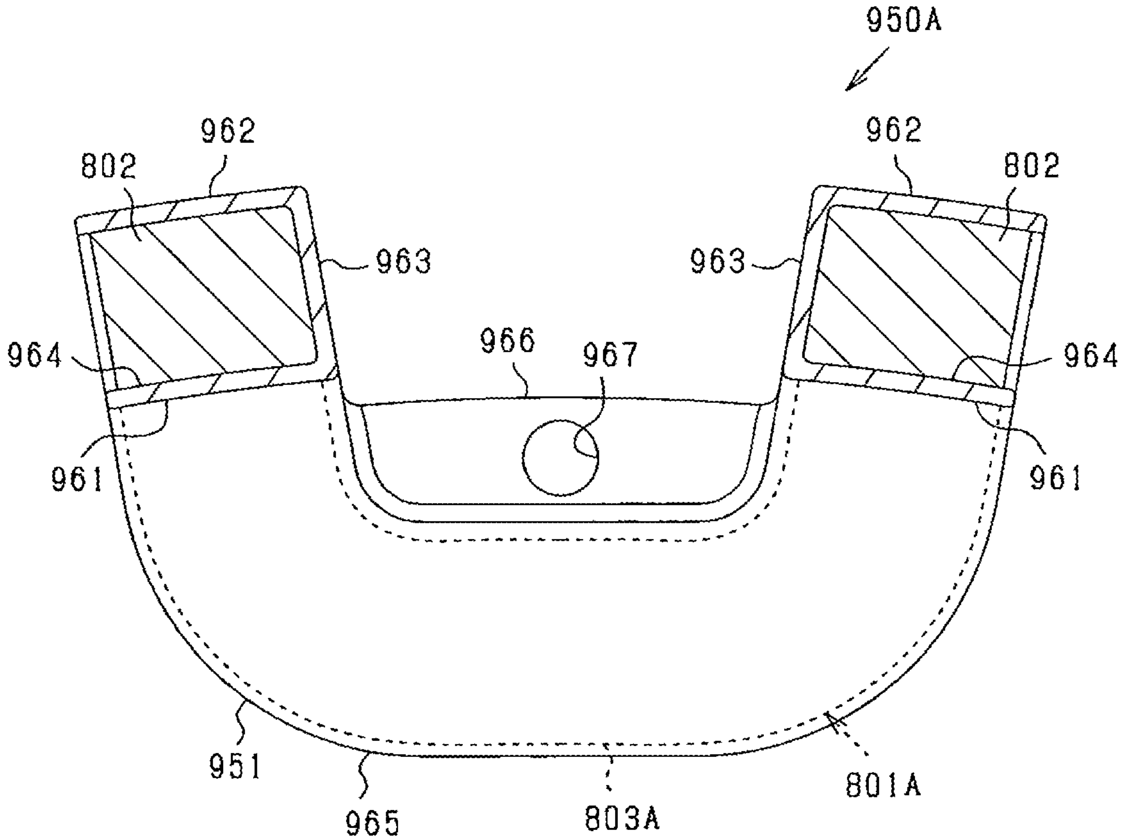
FIG. 116 is a cross-sectional view taken along the line 116-116 in FIG. 115.

First, the configuration of each of the first coil modules 950A will be described. FIG. 115 is a perspective view illustrating the configuration of each of the first coil modules 950A. FIG. 116 is a cross-sectional view taken along the line 116-116 in FIG. 115.

In each of the first coil modules 950A, similar to the first partial winding 801A, the first winding holder 951 is formed to have a substantially C-shape in a side view. That is, the first winding holder 951 has a pair of intermediate portions extending respectively along the pair of intermediate conductor portions 802 of the first partial winding 801A and a pair of end portions extending respectively along the pair of first bridging portions 803A of the first partial winding 801A.

As shown in FIG. 116, the first winding holder 951 is formed so as to surround each of the intermediate conductor portions 802 from three sides thereof on a transverse cross section of the first partial winding 801A. Specifically, the first winding holder 951 is formed to have a first wall portion 961 on the stator core 732 side, a second wall portion 962 on the non-stator-core side (i.e., on the opposite radial side to the stator core 732), and a third wall portion 963 connecting the first wall portion 961 and the second wall portion 962. The third wall portion 963 is located on the circumferentially inner side in the pair of intermediate conductor portions 802 of the first partial winding 801A which are aligned with each other in the circumferential direction.

The first winding holder 951 has a receiving portion 964 formed by the first, second and third wall portions 961-963. The first partial winding 801A is received in the receiving portion 964. Consequently, the first partial winding 801A is electrically insulated on the three sides, i.e., the stator core 732 side, the non-stator-core side and one circumferential side, by the three wall portions 961-963.

More specifically, the intermediate conductor portions 802 of the first partial winding 801A are electrically insulated from the stator core 732 (i.e., ground-insulated) by the first wall portion 961. Moreover, the intermediate conductor portions 802 of the first partial winding 801A are covered by the second wall portion 962 so as not to be exposed to the rotor 710 side (i.e., to the air gap). In addition, each circumferentially-adjacent pair of the intermediate conductor portions 802 of the partial windings 801 are electorally insulated from each other (i.e., the interphase insulation is secured) by the third wall portions 963 of the first winding holders 951 and third wall portions 973 of the second winding holders 952 which will be described later.

In addition, a resin material may be filled as an insulating material in the receiving portion 964. As an alternative, instead of the resin molding, an adhesive, which may include a varnish, may be impregnated into the first partial winding 801A received in the receiving portion 964. As another alternative, both the resin molding and the varnish impregnation may be performed. Consequently, it becomes possible to keep adjacent parts of the multiply-wound electrical conductor wire CR in a desired state of being in close proximity to each other in the first partial winding 801A. That is, it becomes possible to maintain the multiply-wound state of the electrical conductor wire CR in the first partial winding 801A. The same applies to receiving portions 974 of the second winding holders 952 which will be described later.

The first winding holder 951 has a pair of inwardly-bent portions 965 formed respectively at opposite axial ends thereof; the inwardly-bent portions 965 are bent radially inward in conformance with the bending of the first bridging portions 803A of the first partial winding 801A radially inward. Moreover, the first winding holder 951 also has a pair of overlapping portions 966 formed respectively radially outside the pair of inwardly-bent portions 965 and at positions axially overlapping the core assembly CA (more specifically, the stator core 732). In other words, in those parts of the first winding holder 951 which cover the pair of first bridging portions 803A of the first partial winding 801A, there are formed the overlapping portions 966 at positions axially overlapping the core assembly CA and between the pair of intermediate conductor portions 802 of the first partial winding 801A in the circumferential direction. Furthermore, in each of the overlapping portions 966, there is formed a through-hole 967 that extends in the axial direction.

Next, the configuration of each of the second coil modules 950B will be described.

Figure 117:
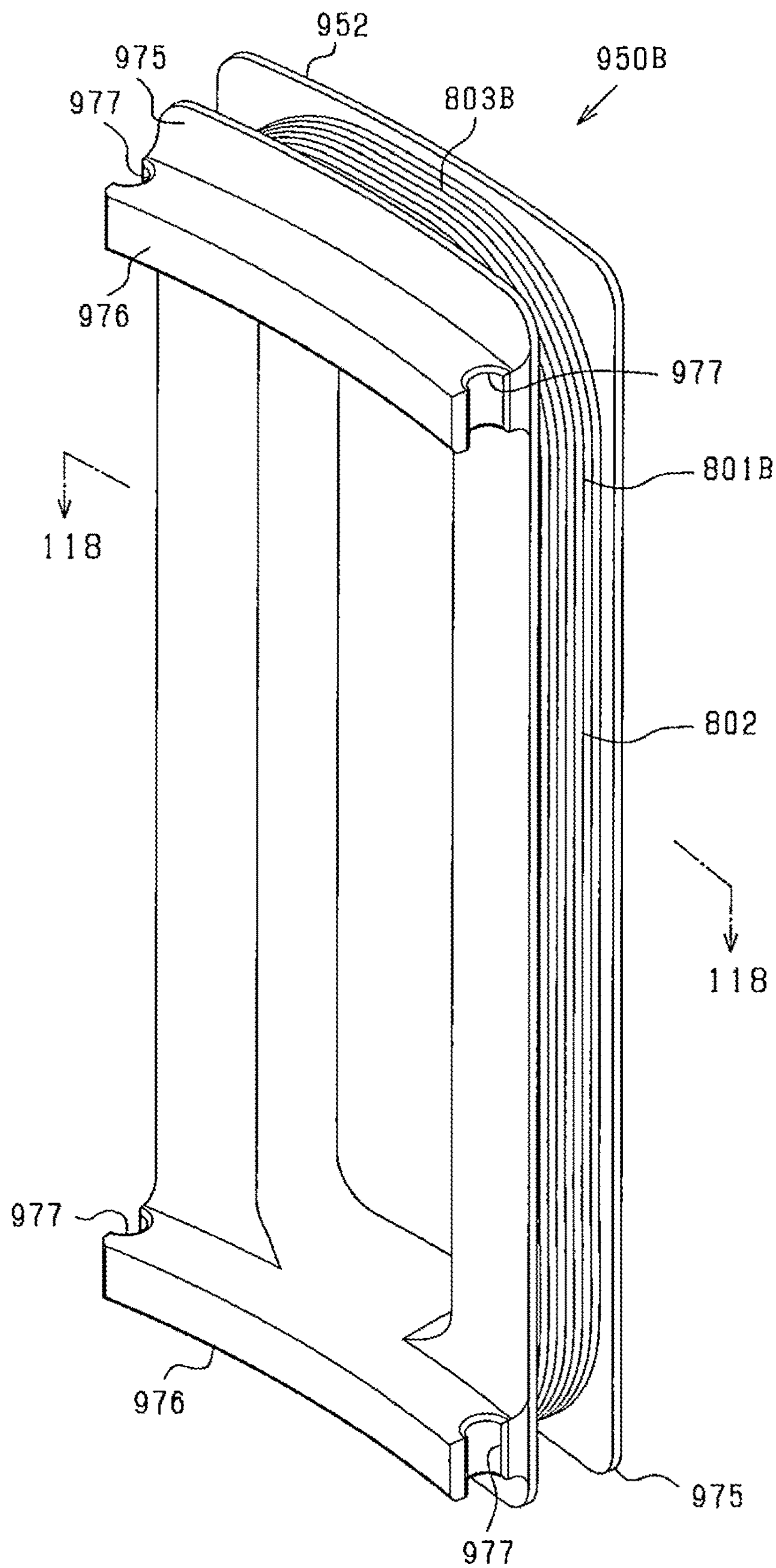
FIG. 117 is a perspective view of a second coil module in the sixteenth modification.
Figure 118:
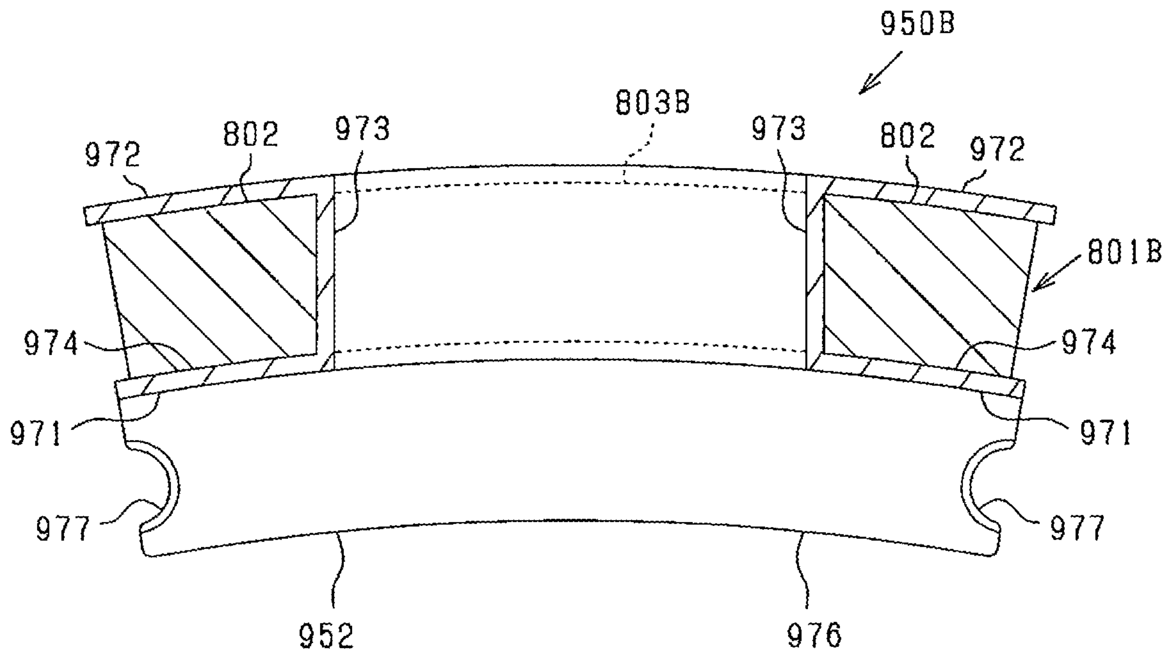

FIG. 117 is a perspective view illustrating the configuration of each of the second coil modules 950B. FIG. 118 is a cross-sectional view taken along the line 118-118 in FIG. 117.

In each of the second coil modules 950B, similar to the second partial winding 801B, the second winding holder 952 is formed to have a substantially I-shape in a side view. That is, the second winding holder 952 has a pair of intermediate portions extending respectively along the pair of intermediate conductor portions 802 of the second partial winding 801B and a pair of end portions extending respectively along the pair of second bridging portions 803B of the second partial winding 801B.

As shown in FIG. 118, the second winding holder 952 is formed so as to surround each of the intermediate conductor portions 802 from three sides thereof on a transverse cross section of the second partial winding 801B. Specifically, the second winding holder 952 is formed to have a first wall portion 971 on the stator core 732 side, a second wall portion 972 on the non-stator-core side (i.e., on the opposite radial side to the stator core 732), and a third wall portion 973 connecting the first wall portion 971 and the second wall portion 972. The third wall portion 973 is located on the circumferentially inner side in the pair of intermediate conductor portions 802 of the second partial winding 801B which are aligned with each other in the circumferential direction.

The second winding holder 952 has a receiving portion 974 formed by the first, second and third wall portions 971-973. The second partial winding 801B is received in the receiving portion 974. Consequently, the second partial winding 801B is electrically insulated on the three sides, i.e., the stator core 732 side, the non-stator-core side and one circumferential side, by the three wall portions 971-973.

More specifically, the intermediate conductor portions 802 of the second partial winding 801B are electrically insulated from the stator core 732 (i.e., ground-insulated) by the first wall portion 971. Moreover, the intermediate conductor portions 802 of the second partial winding 801B are covered by the second wall portion 972 so as not to be exposed to the rotor 710 side (i.e., to the air gap). In addition, each circumferentially-adjacent pair of the intermediate conductor portions 802 of the partial windings 801 are electorally insulated from each other (i.e., the interphase insulation is secured) by the third wall portions 973 of the second winding holders 952 and the third wall portions 963 of the first winding holders 951 described above.

Moreover, the second winding holder 952 also has a pair of protruding portions 976 formed respectively on the radially inner side of the pair of second bridging portions 803B of the second partial winding 801B. The protruding portions 976 each extend in a range from one end to the other end of the second winding holder 952 in the circumferential direction and protrude radially inward respectively from the second bridging portions 803B of the second partial winding 801B. Further, each of the protruding portions 976 has a constant radial width in the range from one end to the other end of the second winding holder 952 in the circumferential direction. Furthermore, each of the protruding portions 976 is located axially inside (i.e., located to be lower than) the axial distal end of one of the holder end portions 975 that respectively correspond to the second bridging portions 803B of the second partial winding 801B. Moreover, each of the protruding portions 976 has a pair of recesses 977 formed respectively in opposite circumferential side surfaces thereof; each of the recesses 977 is semicircular in cross-sectional shape and extends in the axial direction. In addition, in the present modification, the protruding portions 976 correspond to "lower step parts".

It should be noted that the protruding portions 976 may have other configurations than the configuration of having a constant radial width in the range from one end to the other end of the second winding holder 952 in the circumferential direction. For example, each of the protruding portions 976 may be configured to have two separate parts formed respectively at opposite circumferential ends of the second winding holder 952. That is, it is necessary for the protruding portions 976 to be formed in a range including both the ends of the second winding holder 952 in the circumferential direction.

Next, the configuration related to the assembly of the coil modules 950A and 950B to the core assembly CA will be described.

Figure 119:
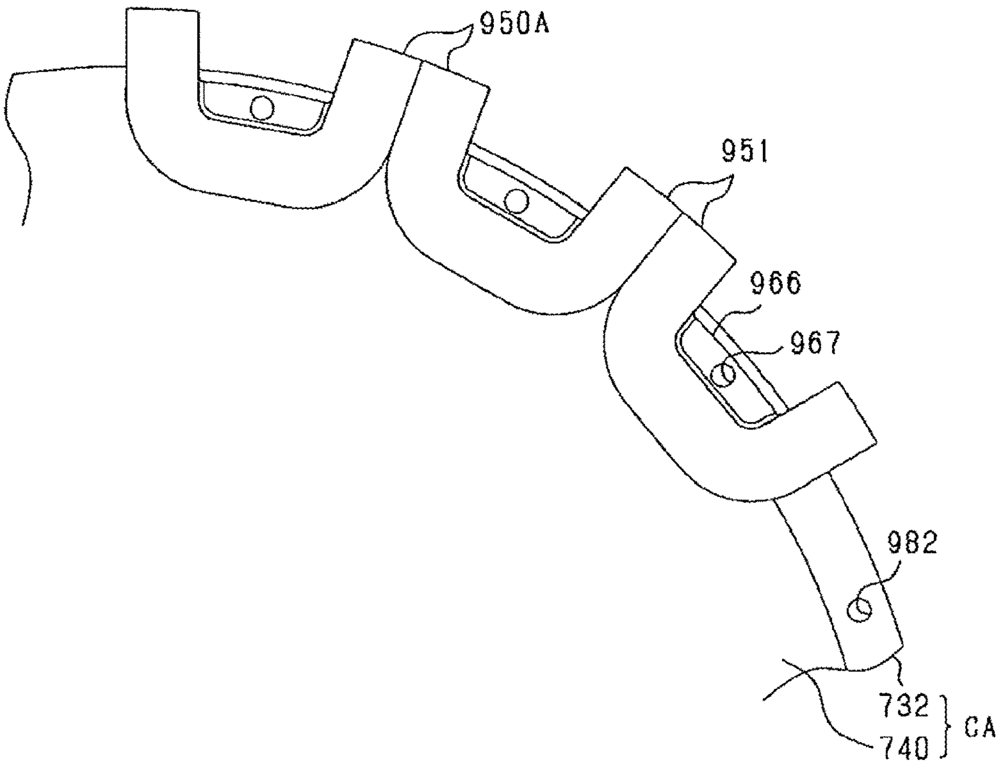
Figure 120:
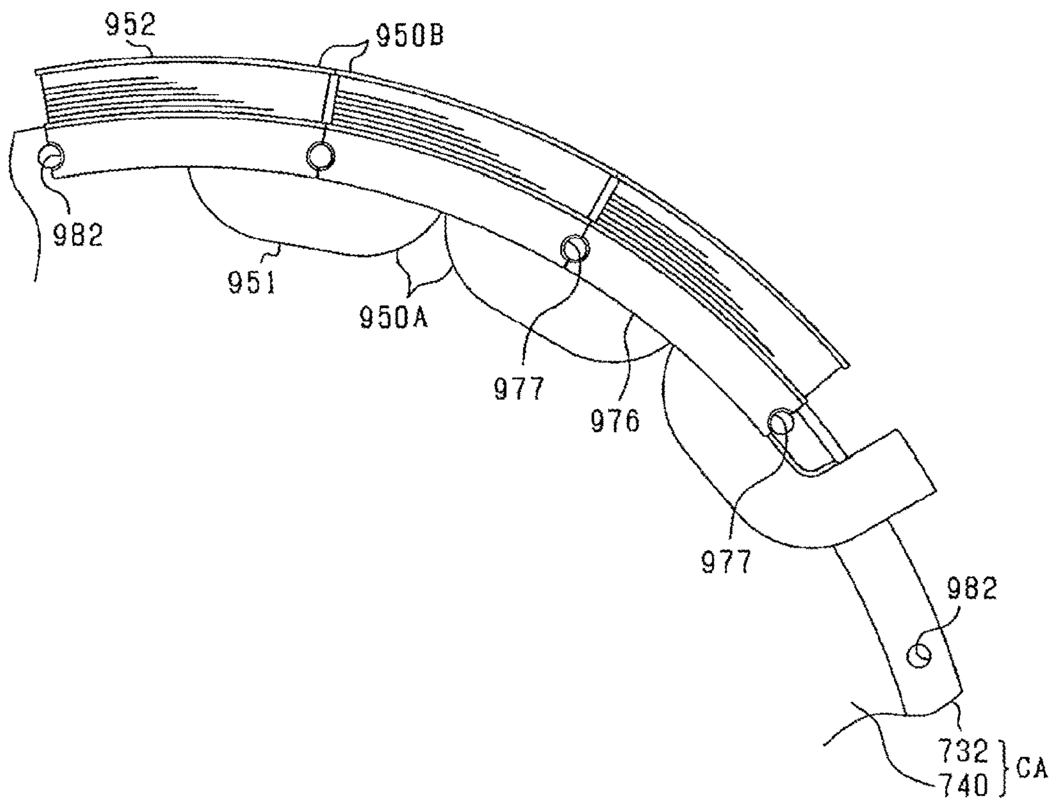

FIG. 119 is a plan view showing the first winding holders 951 arranged side by side in the circumferential direction in the state of the first coil modules 950A having been assembled to the core assembly CA. FIG. 120 is a plan view showing both the first winding holders 951 arranged side by side in the circumferential direction and the second winding holders 952 arranged side by side in the circumferential direction in the state of the first coil modules 950A and the second coil modules 950B having been assembled to the core assembly CA. FIG. 121(*a*) is a longitudinal cross-sectional view showing the assembly of the coil modules 950A and 950B to the core assembly CA before the fixing of the coil modules 950A and 950B to the core assembly CA by fixing pins 981. FIG. 121(*b*) is a longitudinal cross-sectional view showing the assembly of the coil modules 950A and 950B to the core assembly CA after the fixing of the coil modules 950A and 950B to the core assembly CA by the fixing pins 981.

In the present modification, in each of the axial end faces of the stator core 73 included in the core assembly CA, there are formed, at equal intervals in the circumferential direction, a plurality of recesses 982 for fixing the coil modules 950A and 950B to the core assembly CA.

As shown in FIG. 119, in a state of the first coil modules 950A having been assembled to the core assembly CA, the first winding holders 951 are arranged in contact with or in close proximity to one another in the circumferential direction. In addition, the through-holes 967 of the first winding holders 951 are axially aligned respectively with the recesses 982 of the stator core 732.

Moreover, as shown in FIG. 120, the second coil modules 950B are further assembled to the core assembly CA and the first coil modules 950A which are integrated into one piece. Consequently, the second winding holders 952 are arranged in contact with or in close proximity to one another in the circumferential direction; and the protruding portions 976 of the second winding holders 952 overlap the overlapping portions 966 of the first winding holders 951 in the axial direction. Moreover, a plurality of through-holes are formed each of which is constituted of a circumferentially-adjacent pair of the recesses 977 formed in the circumferential side surfaces of the protruding portions 976 of the second winding holders 952 and extends in the axial direction. In addition, the through-holes constituted of the recesses 977 of the second winding holders 952 are axially connected (or axially aligned) respectively with the through-holes 967 of the first winding holders 951.

Then, as shown in FIGS. 121(*a*) and 121(*b*), the fixing by the fixing pins 981 is performed at locations where the overlapping portions 966 of the first winding holders 951 overlap and engage with the protruding portions 976 of the second winding holders 952 in the axial direction. More specifically, in the state where the recesses 982 of the stator core 732, the through-holes 967 of the first winding holders 951 and the through-holes constituted of the recesses 977 of the second winding holders 952 are aligned with one another in the axial direction, the fixing pins 981 are inserted respectively into the axially-aligned groups of the recesses 982 and 977 and the through-holes 967. Consequently, the first and second winding holders 951 and 952 are together fixed to the stator core 732. With the above configuration, each of the first coil modules 950A is fixed, together with a circumferentially-adjacent pair of the second coil modules 950B, to the core assembly CA by a common fixing pin 981 at each of the coil ends CE.

In addition, in the present modification, the through-holes 967 of the first winding holders 951 correspond to "first engaged portions"; the recesses 977 of the second winding holders 952 correspond to "second engaged portions"; and the fixing pins 981 correspond to "fixing members".

As described above, in the rotating electric machine 700 according to the present modification, each of the partial windings 801 has one of the winding holders 951 and 952 mounted thereto in the range including the pair of intermediate conductor portions 802 and the pair of bridging portions 803 of the partial winding 801. Consequently, it becomes possible to mount the partial windings 801 to the core assembly CA by fixing the winding holders 951 and 952 to the core assembly CA. Moreover, the winding holders 951 and 952, it becomes possible to secure the interphase insulation between the partial windings 801 of different phases in the range including the pair of intermediate conductor portions 802 and the pair of bridging portions 803 of each of the partial windings 801; it also becomes possible to secure the ground insulation between the partial windings 801 and the stator core 732.

More specifically, regarding the fixing by the fixing pins 981, at each of the coil ends CE of the stator coil 731, for each axially-overlapping pair of one of the overlapping portions 966 of the first winding holders 951 and one of the protruding portions 976 of the second winding holders 952, the through-hole 967 (i.e., first engaged portion) formed in the overlapping portion 966 and one of the recesses 977 (i.e., second engaged portions) formed in the protruding portion 976 are axially connected with each other and one of the fixing pins 981 engages with the axially-connected first and second engaged portions. Consequently, the fixing by the fixing pins 981 can be performed at the boundary position between each circumferentially-adjacent pair of the second winding holders 952. As a result, it becomes possible to fix each circumferentially-adjacent pair of the second winding holders 952 and one of the first winding holders 951 together by a common fixing pin 941.

(Variations of Fifteenth and Sixteenth Modifications)

In the fifteenth modification, the fixing by the fixing members (i.e., fixing pins 841) is performed at the boundary position between each circumferentially-adjacent pair of the first coil modules 800A (in other words, at the circumferential center position of each of the second coil modules 800B) (see, for example, FIG. 100). In contrast, in the sixteenth modification, the fixing by the fixing members (i.e., fixing pins 981) is performed at the boundary position between each circumferentially-adjacent pair of the second coil modules 950B (in other words, at the circumferential center position of each of the first coil modules 950A) (see, for example, FIG. 120). However, the fixing positions of the coil modules 800 or 950 in the fifteenth and sixteenth modifications may be changed.

Specifically, as a variation of the fifteenth modification, at the boundary position between each circumferentially-adjacent pair of the second winding holders 800B (in other words, at the circumferential center position of each of the first coil modules 800A), one of first engaged portions formed in the insulating covers 811 and 812 of the first coil modules 800A and a circumferentially-adjacent pair of second engaged portions formed in the insulating covers 813 and 814 of the second coil modules 800B may be axially connected with each other; and then one of the fixing members (i.e., fixing pins 841) may be placed to engage with the axially-connected first and second engaged portions.

On the other hand, as a variation of the sixteenth modification, at the boundary position between each circumferentially-adjacent pair of the first coil modules 950A (in other words, at the circumferential center position of each of the second coil modules 950B), a circumferentially-adjacent pair of first engaged portions formed in the winding holders 951 of the first coil modules 950A and one of second engaged portions formed in the winding holders 952 of the second coil modules 950B may be axially connected with each other; and then one of the fixing members (i.e., fixing pins 981) may be placed to engage with the axially-connected first and second engaged portions.

(Seventeenth Modification)

In this modification, the configuration of the stator coil 731 in the rotating electric machine 700 is changed compared to the fifteenth modification. Specifically, in this modification, in the stator coil 731, coil modules 990A and 990B shown in FIG. 122 are employed instead of the coil modules 800A and 800B according to the fifteenth modification.

The coil modules 990A and 990B according to the present modification are formed by wrapping (or winding) a film material FM around each of first and second partial windings 801A and 801B illustrated in FIGS. 91(*b*) and 95(*b*). The cross-sectional structure of the coil modules 990A and 990B is illustrated in FIG. 123. In addition, FIG. 123 is a cross-sectional view taken along the line 123-123 in FIG. 122. It should be noted that for the sake of convenience of explanation, in FIGS. 122 and 123, there are shown only one pair of the coil modules 990A and 990B in a state of being assembled to each other.

In the present modification, for each of the coil modules 990A and 990B, the film material FM is wrapped around the entire partial winding 801 of the coil module, i.e., wrapped in a range including the pair of intermediate conductor portions 802 of the partial winding 801 and the pair of bridging portions 803 of the partial winding 801 respectively on opposite axial sides of the pair of intermediate conductor portions 802. Consequently, an insulating coat 991 is formed over the entire outer surface of the partial winding 801. In addition, the wrapping of the film material FM may be performed separately for the straight portions and the corner portions of the partial winding 801. Moreover, the corner portions of the partial winding 801 may be covered with pieces of the film material FM which are shaped in advance according to the shape of the partial winding 801.

In each of the insulating coats 991 of the coil modules 990A and 990B, the film material FM may be wrapped so as to have end portions thereof overlapping each other in the circumferential or have no end portions thereof overlapping each other. In the configuration shown in FIG. 123, for each of the intermediate conductor portions 802, the insulating coat 991 is formed to have an overlap part where end portions of the film material FM overlap each other in the circumferential direction; the overlap part is located on a part of the intermediate conductor portion 802 which faces one of the intermediate conductor portions 802 of the other phases, i.e., on one of the two circumferential side surfaces of the intermediate conductor portion 802.

In addition, though not illustrated in the drawings, the insulating covers 811-814 described in the fifteenth modification with reference to FIGS. 94(*a*)-94(*b*) and 97(*a*)-97(*b*) may be mounted on axial end portions of the coil modules 990A and 990B; the axial end portions correspond to the bridging portions 803 of the partial windings 801.

(Other Variations of Fifteenth to Seventeenth Modifications)

In the rotating electric machines 700 according to the fifteenth to the seventeenth modifications, the stator coil 731 is configured as a three-phase coil to include the U-phase, V-phase and W-phase windings. Alternatively, the stator coil 731 may be configured as a two-phase coil to include only a U-phase winding and a V-phase winding. In this case, in each of the partial windings 801, the pair of intermediate conductor portions 802 may be formed apart from each other by one coil-pitch and have one intermediate conductor portion 802 of one partial winding 801 of the other phase arranged therebetween in the circumferential direction.

The rotating electric machines 700 according to the fifteenth to the seventeenth modifications are each configured as an outer rotor type SPM (Surface Permanent Magnet) rotating electric machine. Alternatively, the rotating electric machines 700 may be each configured as an inner rotor type SPM rotating electric machine. FIGS. 124(*a*) and 124(*b*) are diagrams illustrating the configuration of a stator unit 1000 of an inner rotor type SPM rotating electric machine. Specifically, FIG. 124(*a*) is a perspective view showing coil modules 1010A and 1010B assembled to a core assembly CA. FIG. 124(*b*) is a perspective view showing partial windings 1011A and 1011B included respectively in the coil modules 1010A and 1010B. In this example, the core assembly CA includes a stator core 732 and a stator holder 740 assembled to a radially outer periphery of the stator core 732. Moreover, there are a plurality of coil modules 1010A and 1010B assembled to a radially inner periphery of the stator core 732.

The partial windings 1011A of the coil modules 1010A have substantially the same configuration as the first partial windings 801A described above. That is, each of the partial windings 1011A is ring-shaped to have a pair of intermediate conductor portions 1012 each extending in the axial direction and located at a predetermined interval in the circumferential direction and a pair of bridging portions 1013A located respectively on opposite axial sides of the pair of intermediate conductor portions 1012 to connect the pair of intermediate conductor portions 1012. Moreover, each of the bridging portions 1013A is bent to the core assembly CA side (i.e., radially outward). On the other hand, the partial windings 1011B of the coil modules 1010B have substantially the same configuration as the second partial windings 801B described above. That is, each of the partial windings 1011B is ring-shaped to have a pair of intermediate conductor portions 1012 each extending in the axial direction and located at a predetermined interval in the circumferential direction and a pair of bridging portions 1013B located respectively on opposite axial sides of the pair of intermediate conductor portions 1012 to connect the pair of intermediate conductor portions 1012. Moreover, each of the bridging portions 1013B extends straight in the axial direction without being radially bent. Furthermore, each of the bridging portions 1013B extends, on the axially outer side of the bridging portions 1013A of the partial windings 1011A, circumferentially across part of at least one of the bridging portions 1013A. Each of the bridging portions 1013A of the partial windings 1011A has an insulating cover 1015 mounted thereon, whereas each of the bridging portions 1013B of the partial windings 1011B has an insulating cover 1016 mounted thereon.

Each of the insulating covers 1015 has a pair of recesses 1017 formed respectively in opposite circumferential side walls thereof; each of the recesses 1017 is semicircular in cross-sectional shape and extends in the axial direction. On the other hand, each of the insulating covers 1016 has a protruding portion 1018 that protrudes radially outward from the bridging portion 1013B. Moreover, in a distal end part (or radially outer end part) of the protruding portion 1018, there is formed a through-hole 1019 that extends in the axial direction.

FIG. 125 is a plan view showing the coil modules 1010A and 1010B in a state of having been assembled to the core assembly CA. In addition, in the example shown in FIG. 125, in each of the axial end faces of the stator holder 740 included in the core assembly CA, there are formed a plurality of recesses 775 at equal intervals in the circumferential direction. Moreover, the stator holder 740 has a cooling structure using a liquid coolant or air. For example, the stator holder 740 may have, as an air-cooled structure, a plurality of heat-dissipating fins formed on the outer circumferential surface thereof.

As shown in FIG. 125, the insulating covers 1015 and 1016 are arranged so as to overlap one another in the axial direction. Moreover, in the state where the recesses 775 of the stator holder 740, the recesses 1017 (i.e., first engaged portions) of the insulating covers 1015 and the through-holes 1019 (i.e., second engaged portions) of the insulating covers 1016 are aligned with one another in the axial direction, fixing pins 1021 (i.e., fixing members) are inserted respectively into the axially-aligned groups of the recesses 775 and 1017 and the through-holes 1019. Consequently, the insulating covers 1015 and 1016 are together fixed to the stator holder 740.

Moreover, in the example shown in FIG. 125, the insulating covers 1015 and 1016 are fixed by the fixing pins 1021 to the axial end faces of the stator holder 740 that is located radially outside the stator core 732. In this case, since the stator holder 740 has the cooling structure formed therein, heat generated in the partial windings 1011A and 1011B can be easily transferred to the stator holder 740, thereby improving the performance of cooling the stator coil 731.

In the rotating electric machines 700 according to the fifteenth to the seventeenth modifications, the stator 730 is configured to have a toothless structure (or slot-less structure). Alternatively, the stator 730 may be configured to have protrusions (e.g., teeth) extending radially from a back yoke. In this case, the coil modules 800 may be assembled to the back yoke.

In the rotating electric machines 700 according to the fifteenth to the seventeenth modifications, the phase windings of the stator coil 731 are star-connected together. Alternatively, the phase windings of the stator coil 731 may be Δ-connected together.

The rotating electric machines 700 according to the fifteenth to the seventeenth modifications are each configured as a rotating-field type rotating electric machine. Alternatively, the rotating electric machines 700 may be each configured as a rotating-armature type rotating electric machine.

The disclosure in this specification is not limited to the embodiments illustrated above. The disclosure encompasses not only the embodiments illustrated above, but also modifications of the embodiments which can be derived by one of ordinary skill in the art from the embodiments. For example, the disclosure is not limited to the combinations of components and/or elements illustrated in the embodiments. Instead, the disclosure may be implemented by various combinations. The disclosure may include additional parts which can be added to the embodiments. The disclosure encompasses components and/or elements omitted from the embodiments. The disclosure also encompasses any replacement or combination of components and/or elements between one and another of the embodiments. The disclosed technical ranges are not limited to the description of the embodiments. Instead, the disclosed technical ranges should be understood as being shown by the recitation of the claims and as encompassing all modifications within equivalent meanings and ranges to the recitation of the claims.

What is claimed is:

1. A rotating electric machine comprising:

a field system having a plurality of magnetic poles whose polarities alternate in a circumferential direction;

a multi-phase armature coil radially opposed to the field system, the armature coil including a plurality of phase windings provided respectively for a plurality of phases, each of the phase windings being constituted of a plurality of partial windings; and a support member provided on a radially opposite side of the armature coil to the field system to support the partial windings, wherein each of the partial windings has a pair of intermediate conductor portions and a pair of bridging portions, the pair of intermediate conductor portions each extending in an axial direction and being located at a predetermined interval in the circumferential direction, the pair of bridging portions being located respectively on opposite axial sides of the pair of intermediate conductor portions to connect the pair of intermediate conductor portions, each of the partial windings is formed of an electrical conductor wire that is multiply wound in the pair of intermediate conductor portions and the pair of bridging portions, in each of the partial windings, there is interposed, between the pair of intermediate conductor portions of the partial winding, one of the pair of intermediate conductor portions of another of the partial windings which is of a different phase from the partial winding, all the intermediate conductor portions of the partial windings constituting the phase windings of the armature coil are arranged in a predetermined sequence and in alignment with each other in the circumferential direction, the armature coil has a pair of coil ends located respectively on opposite axial sides of the support member, at either or both of the coil ends of the armature coil, the bridging portions of the partial windings of different phases intersect one another, each of the partial windings has a mounting member provided integrally therewith for mounting the partial winding to the support member, and for each circumferentially-adjacent pair of the partial windings whose bridging portions intersect one another, the mounting members provided respectively integrally with the pair of the partial windings are together fixed to the support member by a common fixing member.

2. The rotating electric machine as set forth in claim 1, wherein the partial windings constituting the phase windings of the armature coil include first partial windings and second partial windings, each of the first partial windings has, as the pair of bridging portions thereof, a pair of first bridging portions that are radially bent from the pair of intermediate conductor portions of the first partial winding to the support member side, each of the second partial windings has, as the pair of bridging portions thereof, a pair of second bridging portions each of which extends, on an axially outer side of the first bridging portions of the first partial windings, circumferentially across part of at least one of the first bridging portions, each of the first partial windings has, as the mounting member thereof, a first mounting member provided integrally therewith, each of the second partial windings has, as the mounting member thereof, a second mounting member provided integrally therewith, the second mounting member having a pair of protruding portions that radially protrude respectively from the pair of second bridging portions of the second partial winding to the support member side, at either or both of the coil ends of the armature coil, the protruding portions of the second mounting members are arranged to overlap corresponding ones of the first mounting members in the axial direction, and for each axially-overlapping pair of one of the first mounting members and one of the protruding portions of the second mounting members, the fixing member is provided to engage with both the first mounting member and the protruding portion and fix them together to the support member.

3. The rotating electric machine as set forth in claim 2, wherein in each of the first partial windings, the first mounting member is mounted to cover a range including at least the pair of first bridging portions of the first partial winding, and in each of the second partial windings, the second mounting member is mounted to cover a range including at least the pair of second bridging portions of the second partial winding.

4. The rotating electric machine as set forth in claim 3, wherein each of the first mounting members has, for each of the pair of first bridging portions of the first partial winding, a pair of side walls covering the first bridging portion respectively from opposite circumferential sides of the first bridging portion, each of the first mounting members also has a pair of first engaged portions formed respectively in the pair of side walls thereof, each of the second mounting members has, for each of the pair of second bridging portions of the second partial winding, one of the protruding portions thereof formed in a part of the second mounting member which covers the second bridging portion, each of the second mounting members also has, in each of the protruding portions thereof, a second engaged portion formed at a center position between two ends of the second mounting member in the circumferential direction, and at either or both of the coil ends of the armature coil, for each axially-overlapping pair of one of the first mounting members and one of the protruding portions of the second mounting members, one of the first engaged portions formed in the pair of side walls of the first mounting member and the second engaged portion formed in the protruding portion are axially connected with each other and the fixing member engages with the axially-connected first and second engaged portions.

5. The rotating electric machine as set forth in claim 4, wherein each of the first bridging portions of the first partial windings has such a curved shape as to be convex toward the support member side in a radial direction, and in each of the first mounting members, the first engaged portions are respectively formed, in the side walls of the first mounting member, at positions outside curved parts of the first bridging portions of the first partial winding covered by the first mounting member.

6. The rotating electric machine as set forth in claim 3, wherein each of the first mounting members has, for each of the pair of first bridging portions of the first partial winding, an overlapping portion formed in a part of the first mounting member which covers the first bridging portion, the overlapping portion being located at a position axially overlapping the support member and between the pair of intermediate conductor portions of the first partial winding in the circumferential direction, each of the first mounting members also has a first engaged portion formed in the overlapping portion, each of the second mounting members has, for each of the pair of second bridging portions of the second partial winding, one of the protruding portions thereof formed in a part of the second mounting member which covers the second bridging portion, the protruding portions being formed in a range including both ends of the second mounting member in the circumferential direction, each of the second mounting members also has, in each of the protruding portions thereof, a pair of second engaged portions formed respectively at opposite circumferential ends of the protruding portion, and at either or both of the coil ends of the armature coil, for each axially-overlapping pair of one of the first mounting members and one of the protruding portions of the second mounting members, the first engaged portion formed in the overlapping portion of the first mounting member and one of the second engaged portions formed in the protruding portion are axially connected with each other and the fixing member engages with the axially-connected first and second engaged portions.

7. The rotating electric machine as set forth in claim 2, wherein each of the first partial windings has a pair of first insulating covers mounted respectively on the pair of first bridging portions thereof, the pair of first insulating covers together constituting the first mounting member for mounting the first partial winding to the support member, each of the second partial windings has a pair of second insulating covers mounted respectively on the pair of second bridging portions thereof, the pair of second insulating covers together constituting the second mounting member for mounting the second partial winding to the support member and respectively having the pair of protruding portions of the second mounting member formed therein, at either or both of the coil ends of the armature coil, the protruding portions of the second insulating covers are arranged to overlap corresponding ones of the first insulating covers in the axial direction, and for each axially-overlapping pair of one of the first insulating covers and one of the protruding portions of the second insulating covers, the fixing member is provided to engage with both the first insulating cover and the protruding portion and fix them together to the support member.

8. The rotating electric machine as set forth in claim 2, wherein each of the first partial windings has a first winding holder mounted thereto in a range including the pair of intermediate conductor portions and the pair of first bridging portions thereof, the first winding holder constituting the first mounting member for mounting the first partial winding to the support member, each of the second partial windings has a second winding holder mounted thereto in a range including the pair of intermediate conductor portions and the pair of second bridging portions thereof, the second winding holder constituting the second mounting member for mounting the second partial winding to the support member and having the pair of protruding portions of the second mounting member formed therein, at either or both of the coil ends of the armature coil, the protruding portions of the second winding holders are arranged to overlap corresponding ones of the first winding holders in the axial direction, and for each axially-overlapping pair of one of the first winding holders and one of the protruding portions of the second winding holders, the fixing member is provided to engage with both the first winding holder and the protruding portion and fix them together to the support member.

9. The rotating electric machine as set forth in claim 2, wherein at either or both of the coil ends of the armature coil, for each axially-overlapping pair of one of the first mounting members and one of the protruding portions of the second mounting members, the fixing member is inserted into overlapping parts of the first mounting member and the protruding portion in the axial direction, each of the protruding portions of the second mounting members has a lower step part formed therein, the lower step part having a smaller height from an axial end face of the support member than the second bridging portion, and each of the protruding portions of the second mounting members is fixed by the fixing member at the lower step part thereof.

10. The rotating electric machine as set forth in claim 1, wherein in each circumferentially-adjacent pair of the partial windings whose bridging portions intersect one another, one of the intersecting bridging portions is a first bridging portion that is radially bent from the intermediate conductor portions to the support member side and the other of the intersecting bridging portions is a second bridging portion that extends, on an axially outer side of the first bridging portion, circumferentially across part of the first bridging portion, the first bridging portion has, as one of the mounting members of the partial windings, a first mounting member provided integrally therewith, the second bridging portion has, as one of the mounting members of the partial windings, a second mounting member provided integrally therewith, the second mounting member has a protruding portion that radially protrudes from the second bridging portion to the support member side, the protruding portion of the second mounting member is arranged to overlap the first mounting member in the axial direction, and the fixing member is provided to engage with both the first mounting member and the protruding portion of the second mounting member and fix them together to the support member.

11. The rotating electric machine as set forth in claim 10, wherein the fixing member is inserted into overlapping parts of the first mounting member and the protruding portion of the second mounting member in the axial direction, the protruding portion of the second mounting member has a lower step part formed therein, the lower step part having a smaller height from an axial end face of the support member than the second bridging portion, and the protruding portion of the second mounting member is fixed by the fixing member at the lower step part thereof.

12. The rotating electric machine as set forth in claim 1, wherein at each of the coil ends of the armature coil, the bridging portions of the partial windings include n axially-inner bridging portions arranged in alignment with each other in the circumferential direction and n axially-outer bridging portions arranged in alignment with each other in the circumferential direction, the n axially-outer bridging portions being located axially outside and axially overlapping the n axially-inner bridging portions, where n is a natural number, in each of axial end faces of the support member, there are formed n fixing portions at equal intervals in the circumferential direction, and to each of the n fixing portions, there is fixed one end of the fixing member.

13. The rotating electric machine as set forth in claim 1, wherein the support member has a cooling part configured to cool the armature coil, and each of the bridging portions of the partial windings is fixed by the fixing member to a corresponding one of axial end faces of the support member.

14. The rotating electric machine as set forth in claim 13, wherein the support member includes an armature core and an armature holding member, the armature core being assembled to a radially inner or radially outer periphery of the armature coil, the armature holding member being located on a radially opposite side of the armature core to the armature coil and having the cooling part formed therein, and each of the bridging portions of the partial windings is fixed by the fixing member to a corresponding one of axial end faces of the armature holding member.

* * * * *